United States Patent
Bannen et al.

(10) Patent No.: US 12,503,438 B2
(45) Date of Patent: Dec. 23, 2025

(54) COMPOUNDS FOR THE TREATMENT OF KINASE-DEPENDENT DISORDERS

(71) Applicant: Exelixis, Inc., Alameda, CA (US)

(72) Inventors: Lynne Canne Bannen, Novato, CA (US); Minna Bui, Oakland, CA (US); Faming Jiang, Castro Valley, CA (US); Kin Tso, San Francisco, CA (US); Yong Wang, South San Francisco, CA (US); Wei Xu, Danville, CA (US)

(73) Assignee: Exelixis, Inc., Alameda, CA (US)

( * ) Notice: Subject to any disclaimer, the term of this patent is extended or adjusted under 35 U.S.C. 154(b) by 889 days.

(21) Appl. No.: 17/616,120

(22) PCT Filed: Jun. 3, 2020

(86) PCT No.: PCT/US2020/035808
§ 371 (c)(1),
(2) Date: Dec. 2, 2021

(87) PCT Pub. No.: WO2020/247418
PCT Pub. Date: Dec. 10, 2020

(65) Prior Publication Data
US 2023/0043835 A1 Feb. 9, 2023

Related U.S. Application Data

(60) Provisional application No. 62/856,920, filed on Jun. 4, 2019.

(51) Int. Cl.
| | |
|---|---|
| *C07D 215/233* | (2006.01) |
| *A61K 31/47* | (2006.01) |
| *A61K 31/4709* | (2006.01) |
| *A61K 31/501* | (2006.01) |
| *A61K 31/506* | (2006.01) |
| *A61K 31/5377* | (2006.01) |
| *A61K 45/06* | (2006.01) |
| *A61P 35/00* | (2006.01) |
| *A61P 35/02* | (2006.01) |
| *A61P 37/00* | (2006.01) |
| *C07D 401/04* | (2006.01) |
| *C07D 401/14* | (2006.01) |
| *C07D 405/14* | (2006.01) |
| *C07D 407/04* | (2006.01) |
| *C07D 407/14* | (2006.01) |
| *C07D 413/04* | (2006.01) |
| *C07D 413/14* | (2006.01) |
| *C07D 417/04* | (2006.01) |

(Continued)

(52) U.S. Cl.
CPC ....... *C07D 215/233* (2013.01); *C07D 401/04* (2013.01); *C07D 401/14* (2013.01); *C07D 407/04* (2013.01); *C07D 413/04* (2013.01); *C07D 417/04* (2013.01); *C07D 471/04* (2013.01)

(58) Field of Classification Search
CPC ............ C07D 215/233; C07D 401/04; C07D 401/14; C07D 405/14; C07D 407/04; C07D 407/14; C07D 413/04; C07D 413/14; C07D 417/04; C07D 471/04; C07D 487/04; A61K 31/4709; A61K 31/47; A61K 31/501; A61K 31/506; A61K 31/5377; A61K 45/06; A61P 35/00; A61P 35/02; A61P 37/00
See application file for complete search history.

(56) References Cited

U.S. PATENT DOCUMENTS

| | | |
|---|---|---|
| 2007/0197537 A1 | 8/2007 | Blake et al. |
| 2014/0018365 A1 | 1/2014 | Schultz-Fademrecht et al. |

(Continued)

FOREIGN PATENT DOCUMENTS

| | | |
|---|---|---|
| CN | 104817497 A | 8/2015 |
| JP | 2007506777 | 3/2007 |

(Continued)

OTHER PUBLICATIONS

Modi, Siddharth J., et al., "3D-QSAR Analysis of Pyrimidine Derivatives as AXL Kinase Inhibitors as Anticancer Agents." Journal of Applied Pharmaceutical Science, vol. 8, No. 11, Nov. 1, 2018, pp. 15-27.

(Continued)

*Primary Examiner* — Brenda L Coleman
(74) *Attorney, Agent, or Firm* — Honigman LLP; Heidi M. Berven; Li Gao

(57) ABSTRACT

Disclosed herein are compounds of Formula (I) which inhibit, regulate and/or modulate tyrosine kinase receptors, particularly Axl and Mer signal transduction pathways related to the changes in cellular activities, compositions containing the compounds, methods of using the compounds to treat kinase-dependent diseases and conditions, and methods for making the compounds.

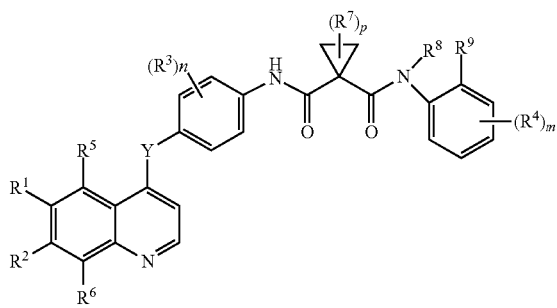

10 Claims, No Drawings

(51) Int. Cl.
  *C07D 471/04* (2006.01)
  *C07D 487/04* (2006.01)

(56) References Cited

U.S. PATENT DOCUMENTS

2018/0244667 A1 8/2018 Long et al.
2019/0248777 A1 8/2019 Shen et al.

FOREIGN PATENT DOCUMENTS

| JP | 2018520109 | | 7/2018 |
| JP | 2021506885 | | 2/2021 |
| WO | 2005030140 | A2 | 4/2005 |
| WO | 2018049861 | A1 | 3/2018 |
| WO | 2019125798 | A1 | 6/2019 |
| WO | 2019148044 | A1 | 8/2019 |

OTHER PUBLICATIONS

International Search Report for PCT/US2020/035808 mailed Aug. 19, 2020.

U.S. Appl. No. 16/964,228, filed Jul. 23, 2020, U.S. Pat. No. 11,708,367, Issued.
U.S. Appl. No. 16/964,274, filed Jul. 23, 2020, U.S. Pat. No. 11,673,897, Issued.
U.S. Appl. No. 16/964,330, filed Jul. 23, 2020, U.S. Pat. No. 11,542,259, Issued.
U.S. Appl. No. 17/312,658, filed Jun. 10, 2021, U.S. Pat. No. 12,017,995, Issued.
U.S. Appl. No. 17/425,661, filed Jul. 23, 2021, Pending.
U.S. Appl. No. 17/616,124, filed Dec. 2, 2021, Pending.
U.S. Appl. No. 17/922,208, filed Oct. 28, 2022, Pending.
U.S. Appl. No. 17/989,393, filed Nov. 17, 2022, Abandoned.
U.S. Appl. No. 18/018,805, filed Jan. 30, 2023, Pending.
U.S. Appl. No. 18/022,209, filed Feb. 20, 2023, Pending.
U.S. Appl. No. 18/132,124, filed Apr. 7, 2023, Pending.
U.S. Appl. No. 18/035,355, filed May 4, 2023, Pending.
U.S. Appl. No. 18/334,113, U.S. Pat. No. 12,195,475, filed Jun. 13, 2023, Issued.
U.S. Appl. No. 18/706,757, filed May 2, 2024, Pending.
U.S. Appl. No. 18/657,052, filed May 7, 2024, Pending.
U.S. Appl. No. 18/723,013, filed Jun. 21, 2024, Pending.
U.S. Appl. No. 18/782,504, filed Jul. 24, 2024, Abandoned.
U.S. Appl. No. 19/067,042, filed Feb. 28, 2025, Pending.

COMPOUNDS FOR THE TREATMENT OF KINASE-DEPENDENT DISORDERS

CROSS-REFERENCE TO RELATED APPLICATIONS

This application is a United States National Phase filing of PCT/US2020/035808, filed Jun. 3, 2020, which claims the benefit of priority to U.S. Provisional Application Ser. No. 62/856,920, filed Jun. 4, 2019, the entire contents of which are incorporated by reference herein.

FIELD OF THE INVENTION

The invention relates to compounds that modulate cellular activities such as proliferation, differentiation, programmed cell death, migration, and chemoinvasion by modulating protein kinase enzymatic activity. Even more specifically, the invention relates to compounds which inhibit, regulate, and/or modulate Axl and Mer receptor tyrosine kinases, compositions which contain these compounds, methods of using them to treat kinase-dependent diseases and conditions, synthesis of the compounds, and processes for formulating the compounds for pharmaceutical purposes.

BACKGROUND OF THE INVENTION

Human Axl belongs to the TAM subfamily of receptor tyrosine kinases that includes Mer. TAM kinases are characterized by an extracellular ligand binding domain consisting of two immunoglobulin-like domains and two fibronectin type III domains. Axl is overexpressed in a number of tumor cell types and was initially cloned from patients with chronic myelogenous leukemia. When overexpressed, Axl exhibits transforming potential. Axl signaling is believed to cause tumor growth through activation of proliferative and anti-apoptotic signaling pathways. Axl has been associated with cancers such as lung cancer, myeloid leukemia, uterine cancer, ovarian cancer, gliomas, melanoma, thyroid cancer, renal cell carcinoma, osteosarcoma, gastric cancer, prostate cancer, and breast cancer. The over-expression of Axl results in a poor prognosis for patients with the indicated cancers.

Activation of Mer, like Axl, conveys downstream signaling pathways that cause tumor growth and activation. Mer binds ligands such as the soluble protein Gas-6. Gas-6 binding to Mer induces autophosphorylation of Mer on its intracellular domain, resulting in downstream signal activation. Over-expression of Mer in cancer cells leads to increased metastasis, most likely by generation of soluble Mer extracellular domain protein as a decoy receptor. Tumor cells secrete a soluble form of the extracellular Mer receptor which reduces the ability of soluble Gas-6 ligand to activate Mer on endothelial cells, leading to cancer progression.

Therefore, a need exists for compounds that inhibit TAM receptor tyrosine kinases such as Axl and Mer for the treatment of selected cancers.

SUMMARY OF THE INVENTION

In one aspect, the invention includes a compound of Formula I:

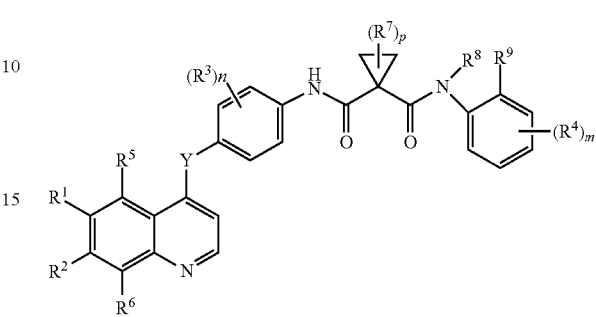

or a pharmaceutically acceptable salt thereof, wherein:

$R^1$ is selected from —H, halo, ($C_1$-$C_6$) alkyl, ($C_2$-$C_6$) alkenyl, ($C_2$-$C_6$) alkynyl, ($C_1$-$C_6$) haloalkyl, ($C_1$-$C_6$) haloalkoxy, ($C_6$-$C_{10}$) aryl, ($C_3$-$C_{10}$) cycloalkyl, 5-14 membered heteroaryl, 4-14 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-14 membered heteroaryl)-($C_1$-$C_4$) alkylene-, (4-14 membered heterocycloalkyl)-($C_1$-$C_4$) alkylene-, —CN, —$NO_2$, —$OR^a$, —$SR^a$, —$NHOR^a$, —C(O)$R^a$, —C(O)$NR^aR^a$, —C(O)$NHOR^a$, —C(O)$OR^a$, —C(O)$NR^aS(O)_2R^a$, —OC(O)$R^a$, —OC(O)$NR^aR^a$, —$NHR^a$, —$NR^aR^a$, —$NR^aC(O)R^a$, —$NR^aC(=NR^a)R^a$, —$NR^aC(O)OR^a$, —$NR^aC(O)NR^aR^a$, —C(=$NR^a$)$R^a$, —C(=NOH)$R^a$, —C(=NOH)$NR^a$, —C(=NCN)$NR^aR^a$, —$NR^aC(=NCN)NR^aR^a$, —C(=$NR^a$)$NR^aR^a$, —$NR^aC(=NR^a)NR^aR^a$, —$NR^aS(O)R^a$, —$NR^aS(O)_2R^a$, —$NR^aS(O)_2NR^aR^a$, —S(O)$R^a$, —S(O)$NR^aR^a$, —S(O)$_2R^a$, —S(O)$_2NR^aC(O)R^a$, —P(O)$R^aR^a$, —P(O)($OR^a$)($OR^a$), —B(OH)$_2$, —B($OR^a$)$_2$, and —S(O)$_2$$NR^aR^a$, wherein the ($C_1$-$C_6$) alkyl, ($C_2$-$C_6$) alkenyl, ($C_2$-$C_6$) alkynyl, ($C_6$-$C_{10}$) aryl, ($C_3$-$C_{10}$) cycloalkyl, 5-14 membered heteroaryl, 4-14 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-14 membered heteroaryl)-($C_1$-$C_4$) alkylene-, and (4-14 membered heterocycloalkyl)-($C_1$-$C_4$) alkylene- of $R_1$ are each optionally substituted with 1, 2, 3, 4, or 5 independently selected $R^b$ substituents;

$R^2$ is selected from ($C_2$-$C_6$) alkynyl, ($C_6$-$C_{10}$) aryl, $C_{3-10}$ cycloalkyl, 5-14 membered heteroaryl and 4-14 membered heterocycloalkyl, each of which is optionally substituted with 1, 2, 3, 4, or 5 independently selected $R^b$ substituents;

$R^5$ and $R^6$ are each independently selected from the group consisting of —H, halo, ($C_1$-$C_6$) alkyl, ($C_1$-$C_6$) haloalkyl, ($C_1$-$C_6$) haloalkoxy, ($C_6$-$C_{10}$) aryl, ($C_3$-$C_{10}$) cycloalkyl, 5-14 membered heteroaryl, 4-14 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-14 membered heteroaryl)-($C_1$-$C_4$) alkylene-, (4-14 membered heterocycloalkyl)-($C_1$-$C_4$) alkylene-, —CN, —$NO_2$, —$OR^a$, —$SR^a$, —$NHOR^a$, —C(O)$R^a$, —C(O)$NR^aR^a$, —C(O)$OR^a$, —C(O)$NR^aS(O)_2R^a$, —OC(O)$R^a$, —OC(O)$NR^aR^a$, —$NHR^a$, —$NR^aR^a$, —$NR^aC(O)R^a$, —$NR^aC(=NR^a)R^a$, —$NR^aC(O)OR^a$, —$NR^aC(O)NR^aR^a$, —C(=NR$^a$)R$^a$, —C(=NOH)R$^a$, —C(=NOH)NR$^a$, —C(=NCN)NR$^a$R$^a$, —NR$^a$C(=NCN)NR$^a$R$^a$, —C(=NR$^a$)NR$^a$R$^a$, —NR$^a$C(=NR$^a$)NR$^a$R$^a$, —NR$^a$S(O)R$^a$, —NR$^a$S(O)$_2$R$^a$, —NR$^a$S(O)$_2$NR$^a$R$^a$, —S(O)R$^a$, —S(O)NR$^a$R$^a$, —S(O)$_2$R$^a$, —S(O)$_2$NR$^a$C(O)R$^a$, —P(O)R$^a$R$^a$, —P(O)(OR$^a$)(OR$^a$), —B(OH)$_2$, —B(OR$^a$)$_2$, and S(O)$_2$NR$^a$R$^a$, wherein the (C$_1$-C$_6$) alkyl, (C$_6$-C$_{10}$) aryl, (C$_3$-C$_{10}$) cycloalkyl, 5-14 membered heteroaryl, 4-14 membered heterocycloalkyl, (C$_6$-C$_{10}$) aryl-(C$_1$-C$_4$) alkylene-, (C$_3$-C$_{10}$) cycloalkyl-(C$_1$-C$_4$) alkylene-, (5-14 membered heteroaryl)-(C$_1$-C$_4$) alkylene-, and (4-14 membered heterocycloalkyl)-(C$_1$-C$_4$) alkylene- of R$^5$ or R$^6$ are each optionally substituted with 1, 2, 3, 4, or 5 independently selected R$^b$ substituents;

each R$^3$ is independently selected from the group consisting of —H, halo, —OH, —CN, optionally substituted (C$_1$-C$_6$) alkyl, (C$_1$-C$_6$) alkoxy, (C$_1$-C$_6$) haloalkoxy, —NH$_2$, —NH(C$_1$-C$_6$)alkyl, —N(C$_1$-C$_6$ alkyl)$_2$, and (C$_3$-C$_6$) cycloalkyl, wherein the (C$_1$-C$_6$) alkoxy, —NH(C$_1$-C$_6$)alkyl, —N(C$_1$-C$_6$ alkyl)$_2$, and (C$_3$-C$_6$) cycloalkyl of R$^3$ are each optionally substituted with 1, 2, or 3 independently selected R$^g$ substituents;

each R$^7$ is independently selected from the group consisting of halo, —OH, —NH$_2$, —CN, (C$_1$-C$_6$) alkyl, (C$_1$-C$_6$) alkoxy, (C$_1$-C$_6$) haloalkyl, (C$_1$-C$_6$) haloalkoxy, —COOH, —NH(C$_1$-C$_6$)alkyl, —N(C$_1$-C$_6$ alkyl)$_2$, phenyl, phenyl-(C$_1$-C$_2$) alkylene, (C$_3$-C$_6$) cycloalkyl, (C$_3$-C$_6$) cycloalkyl-(C$_1$-C$_4$) alkylene-, 4- to 6-membered heterocycloalkyl, (4- to 6-membered heterocycloalkyl)-(C$_1$-C$_4$) alkylene-, 5- to 6-membered heteroaryl, (5- to 6-membered heteroaryl)-(C$_1$-C$_4$) alkylene-, and —OR$^c$, wherein the (C$_1$-C$_6$) alkyl, phenyl, phenyl-(C$_1$-C$_2$) alkylene, (C$_3$-C$_6$) cycloalkyl, (C$_3$-C$_6$) cycloalkyl-(C$_1$-C$_4$) alkylene-, 4- to 6-membered heterocycloalkyl, (4- to 6-membered heterocycloalkyl)-(C$_1$-C$_4$) alkylene-, 5- to 6-membered heteroaryl, and (5- to 6-membered heteroaryl)-(C$_1$-C$_4$) alkylene- of R$^7$ are each optionally substituted with 1, 2, or 3 independently selected R$^g$ substituents, R$^8$ is H or C$_{1-6}$ alkyl, wherein the C$_{1-6}$ alkyl of R$^8$ is optionally substituted with 1 or 2 independently selected R$^g$ substituents;

R$^9$ is selected from the group consisting of —H, halo, —OH, —COOR$^c$, —CONR$^c$R$^c$, —CN, —NH$_2$, —NH((C$_1$-C$_6$) alkyl), —N((C$_1$-C$_6$) alkyl)$_2$, (C$_1$-C$_6$) alkyl, (C$_1$-C$_6$) alkoxy, (C$_1$-C$_6$) haloalkyl, (C$_1$-C$_6$) haloalkoxy, —CONR$^a$R$^a$, —NR$^a$COR$^a$, —NR$^a$CONR$^a$R$^a$, —SO$_2$R$^a$, —NR$^a$S(O)$_2$R$^a$, —NR$^a$S(O)$_2$NR$^a$R$^a$, (C$_3$-C$_6$) cycloalkyl, 4- to 6-membered heterocycloalkyl, phenyl, 5- or 6-membered heteroaryl, (C$_3$-C$_6$) cycloalkyl-(C$_1$-C$_4$) alkylene-, (4- to 6-membered heterocycloalkyl)-(C$_1$-C$_4$) alkylene-, phenyl-(C$_1$-C$_2$) alkylene, and (5- or 6-membered heteroaryl)-(C$_1$-C$_4$) alkylene-, wherein the (C$_1$-C$_6$) alkyl, (C$_3$-C$_6$) cycloalkyl, 4- to 6-membered heterocycloalkyl, phenyl, 5- or 6-membered heteroaryl, (C$_3$-C$_6$) cycloalkyl-(C$_1$-C$_4$) alkylene-, (4- to 6-membered heterocycloalkyl)-(C$_1$-C$_4$) alkylene-, phenyl-(C$_1$-C$_2$) alkylene, and (5- or 6-membered heteroaryl)-(C$_1$-C$_4$) alkylene- of R$^9$ are each optionally substituted with 1, 2, or 3 independently selected R$^f$ substituents;

or R$^8$ and R$^9$ together with the atoms to which they are attached form fused 5-10 membered heteroaryl or fused 5-10 membered heterocycloalkyl, each of which is optionally substituted with 1 or 2 independently selected R$^g$ substituents and wherein the 5-10 membered heteroaryl or 5-10 membered heterocycloalkyl has 0-2 additional heteroatoms as ring members selected from N, or and S;

each R$^4$ is independently selected from the group consisting of —H, halo, —OH, —COOR$^c$, —CONR$^c$R$^c$, —CN, —NH$_2$, —NH((C$_1$-C$_6$) alkyl), —N((C$_1$-C$_6$) alkyl)$_2$, (C$_1$-C$_6$) alkyl, (C$_1$-C$_6$) alkoxy, (C$_1$-C$_6$) haloalkyl, (C$_1$-C$_6$) haloalkoxy, —CONR$^a$R$^a$, —NR$^a$COR$^a$, —NR$^a$CONR$^a$R$^a$, —SO$_2$R$^a$, —NR$^a$S(O)$_2$R$^a$, —NR$^a$S(O)$_2$NR$^a$R$^a$, (C$_3$-C$_6$) cycloalkyl, 4- to 6-membered heterocycloalkyl, phenyl, 5- or 6-membered heteroaryl, (C$_3$-C$_6$) cycloalkyl-(C$_1$-C$_4$) alkylene-, (4- to 6-membered heterocycloalkyl)-(C$_1$-C$_4$) alkylene-, phenyl-(C$_1$-C$_2$) alkylene, and (5- or 6-membered heteroaryl)-(C$_1$-C$_4$) alkylene-, wherein the (C$_1$-C$_6$) alkyl, (C$_3$-C$_6$) cycloalkyl, 4- to 6-membered heterocycloalkyl, phenyl, 5- or 6-membered heteroaryl, (C$_3$-C$_6$) cycloalkyl-(C$_1$-C$_4$) alkylene-, (4- to 6-membered heterocycloalkyl)-(C$_1$-C$_4$) alkylene-, phenyl-(C$_1$-C$_2$) alkylene, and (5- or 6-membered heteroaryl)-(C$_1$-C$_4$) alkylene- of R$^4$ are each optionally substituted with 1, 2, or 3 independently selected R$^f$ substituents;

each R$^a$ is independently selected from the group consisting of —H, —CN, (C$_1$-C$_6$) alkyl, (C$_1$-C$_6$) haloalkyl, (C$_2$-C$_6$) alkenyl, (C$_2$-C$_6$) alkynyl, (C$_6$-C$_{10}$) aryl, (C$_3$-C$_{10}$) cycloalkyl, 5-14 membered heteroaryl, 4-14 membered heterocycloalkyl, (C$_6$-C$_{10}$) aryl-(C$_1$-C$_4$) alkylene-, (C$_3$-C$_{10}$) cycloalkyl-(C$_1$-C$_4$) alkylene-, (5-14 membered heteroaryl)-(C$_1$-C$_4$) alkylene-, and (4-14 membered heterocycloalkyl)-(C$_1$-C$_4$) alkylene-, wherein the (C$_1$-C$_6$) alkyl, (C$_1$-C$_6$) haloalkyl, (C$_2$-C$_6$) alkenyl, (C$_2$-C$_6$) alkynyl, (C$_6$-C$_{10}$) aryl, (C$_3$-C$_{10}$) cycloalkyl, 5-14 membered heteroaryl, 4-14 membered heterocycloalkyl, (C$_6$-C$_{10}$) aryl-(C$_1$-C$_4$) alkylene-(C$_3$-C$_{10}$) cycloalkyl-(C$_1$-C$_4$) alkylene-, (5-14 membered heteroaryl)-(C$_1$-C$_4$) alkylene-, and (4-14 membered heterocycloalkyl)-(C$_1$-C$_4$) alkylene- of R$^a$ are each optionally substituted with 1, 2, 3, 4, or 5 independently selected R$^d$ substituents;

each R$^b$ is independently selected from the group consisting of halo, oxo, (C$_1$-C$_6$) alkyl, (C$_2$-C$_6$) alkenyl, (C$_2$-C$_6$) alkynyl, (C$_1$-C$_6$) haloalkyl, (C$_1$-C$_6$) haloalkoxy, ((C$_1$-C$_6$) alkyl)$_3$-silyl, (C$_6$-C$_{10}$) aryl, (C$_3$-C$_{10}$) cycloalkyl, 5-10 membered heteroaryl, 4-10 membered heterocycloalkyl, (C$_6$-C$_{10}$) aryl-(C$_1$-C$_4$) alkylene-, (C$_3$-C$_{10}$) cycloalkyl-(C$_1$-C$_4$) alkylene-, (5-10 membered heteroaryl)-(C$_1$-C$_4$) alkylene-, (4-10 membered heterocycloalkyl)-(C$_1$-C$_4$) alkylene-, —CN, —OH, —NH$_2$, —NO$_2$, —NHOR$^c$, —OR$^c$, —SR$^c$, —C(O)R$^c$, —C(O)NR$^c$R$^c$, —C(O)OR$^c$, —C(O)NR$^c$S(O)$_2$R$^c$, —OC(O)R$^c$, —OC(O)NR$^c$R$^c$, —C(=NOH)R$^c$, —C(=NOH)NR$^c$, —C(=NCN)NR$^c$R$^c$, —NR$^c$C(=NCN)NR$^c$R$^c$, —C(=NR$^c$)NR$^c$R$^c$, —NR$^c$C(=NR$^c$)NR$^c$R$^c$, —NHR$^c$, —NR$^c$R$^c$, —NR$^c$C(O)R$^c$, —NR$^c$C(=NR$^c$)R$^c$, —NR$^c$C(O)OR$^c$, —NR$^c$C(O)NR$^c$R$^c$, —NR$^c$S(O)R$^c$, —NR$^c$S(O)$_2$R$^c$, —NR$^c$S(O)$_2$NR$^c$R$^c$, —S(O)R$^c$, —S(O)NR$^c$R$^c$, —S(O)$_2$R$^c$, —S(O)$_2$NR$^c$C(O)R$^c$, —Si(R$^c$)$_3$, —P(O)R$^c$R$^c$, —P(O)(OR$^c$)(OR$^c$), —B(OH)$_2$, —B(OR$^c$)$_2$, and —S(O)$_2$NR$^c$R$^c$, wherein the (C$_1$-C$_6$) alkyl, (C$_1$-C$_6$) haloalkyl, (C$_1$-C$_6$) haloalkoxy, (C$_2$-C$_6$) alkenyl, (C$_2$-C$_6$) alkynyl, (C$_6$-C$_{10}$) aryl, (C$_3$-C$_{10}$) cycloalkyl, 5-10 membered heteroaryl, 4-10 membered heterocycloalkyl, (C$_6$-C$_{10}$) aryl-(C$_1$-C$_4$) alkylene-, (C$_3$-C$_{10}$) cycloalkyl-(C$_1$-C$_4$) alkylene-, (5-10 membered heteroaryl)-(C$_1$-C$_4$) alkylene-, and (4-10 membered heterocycloalkyl)-($C_1$-$C_4$) alkylene- of $R^b$ are each further optionally substituted with 1, 2, or 3 independently selected $R^d$ substituents;

each $R^c$ is independently selected from the group consisting of —H, ($C_1$-$C_6$) alkyl, ($C_1$-$C_6$) haloalkyl, ($C_2$-$C_6$) alkenyl, ($C_2$-$C_6$) alkynyl, ($C_6$-$C_{10}$) aryl, ($C_3$-$C_{10}$) cycloalkyl, 5-10 membered heteroaryl, 4-10 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-10 membered heteroaryl)-($C_1$-$C_4$) alkylene-, and (4-10 membered heterocycloalkyl)-($C_1$-$C_4$) alkylene-, wherein the ($C_1$-$C_6$) alkyl, ($C_2$-$C_6$) alkenyl, ($C_2$-$C_6$) alkynyl, ($C_6$-$C_{10}$) aryl, ($C_3$-$C_{10}$) cycloalkyl, 5-10 membered heteroaryl, 4-10 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-10 membered heteroaryl)-($C_1$-$C_4$) alkylene-, and (4-10 membered heterocycloalkyl)-($C_1$-$C_4$) alkylene- of $R^c$ are each optionally substituted with 1, 2, 3, 4, or 5 independently selected $R^f$ substituents;

each $R^d$ is independently selected from the group consisting of ($C_1$-$C_6$) alkyl, ($C_1$-$C_6$) haloalkyl, halo, ($C_6$-$C_{10}$) aryl, 5-10 membered heteroaryl, ($C_3$-$C_{10}$) cycloalkyl, 4-10 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-10 membered heteroaryl)-($C_1$-$C_4$) alkylene-, (4-10 membered heterocycloalkyl)-($C_1$-$C_4$) alkylene-, —CN, —$NH_2$, —$NHOR^c$, —$OR^c$, —$SR^c$, —C(O)$R^c$, —C(O)NR$^c$R$^c$, —C(O)O$R^c$, —OC(O)$R^c$, —OC(O)NR$^c$R$^c$, —NHR$^c$, —NR$^c$R$^c$, —NR$^c$C(O)R$^c$, —NR$^c$C(O)NR$^c$R$^c$, —NR$^c$C(O)OR$^c$, —C(=NR$^c$)NR$^c$R$^c$, —NR$^c$C(=NR$^c$)NR$^c$R$^c$, —NR$^c$C(=NOH)NR$^c$R$^c$, —NR$^c$C(=NCN)NR$^c$R$^c$, —S(O)R$^c$, —S(O)NR$^c$R$^c$, —S(O)$_2$R$^c$, —NR$^c$S(O)$_2$R$^c$, —NR$^c$S(O)$_2$NR$^c$R$^c$, and —S(O)$_2$NR$^c$R$^c$, wherein the ($C_1$-$C_6$) alkyl, ($C_1$-$C_6$) haloalkyl, ($C_6$-$C_{10}$) aryl, 5-10 membered heteroaryl, ($C_3$-$C_{10}$) cycloalkyl, 4-10 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-10 membered heteroaryl)-($C_1$-$C_4$) alkylene-, and (4-10 membered heterocycloalkyl)-($C_1$-$C_4$) alkylene- of $R^d$ are each optionally substituted with 1, 2, or 3 independently selected $R^f$ substituents;

each $R^e$ is independently selected from the group consisting of —H, ($C_1$-$C_6$) alkyl, ($C_3$-$C_6$) cycloalkyl, ($C_3$-$C_6$) cycloalkyl-($C_1$-$C_4$) alkylene-, ($C_6$-$C_{10}$) aryl, ($C_6$-$C_{10}$) aryl-($C_1$-$C_4$) alkylene-, 5- or 6-membered heteroaryl, (5- or 6-membered heteroaryl)-($C_1$-$C_4$) alkylene-, 4-7-membered heterocycloalkyl, (4-7-membered heterocycloalkyl)-($C_1$-$C_4$) alkylene-, ($C_1$-$C_6$) haloalkyl, ($C_1$-$C_6$) haloalkoxy, ($C_2$-$C_4$) alkenyl, and ($C_2$-$C_4$) alkynyl, wherein the ($C_1$-$C_4$) alkyl, ($C_3$-$C_6$) cycloalkyl, ($C_6$-$C_{10}$) aryl, 5 or 6-membered heteroaryl, 4-7-membered heterocycloalkyl, ($C_6$-$C_{10}$) aryl-($C_1$-$C_4$) alkylene-, (5- or 6-membered heteroaryl)-($C_1$-$C_4$) alkylene-, (4-7-membered heterocycloalkyl)-($C_1$-$C_4$) alkylene-, ($C_2$-$C_4$) alkenyl, and ($C_2$-$C_4$) alkynyl of $R^e$ are each optionally substituted with 1, 2, or 3 $R^f$ substituents, or any two $R^a$ substituents together with the nitrogen atom to which they are attached form 4-, 5-, 6-, 7-, 8-, 9-, or 10-membered heterocycloalkyl, each of which is optionally substituted with 1, 2, or 3 independently selected $R^f$ substituents;

or any two $R^c$ substituents together with the nitrogen atom to which they are attached form 4-, 5-, 6-, 7-, 8-, 9-, or 10-membered heterocycloalkyl, each of which is optionally substituted with 1, 2, or 3 independently selected $R^f$ substituents, or any two $R^e$ substituents together with the nitrogen atom to which they are attached form 4-, 5-, 6-, 7-, 8-, 9-, or 10-membered heterocycloalkyl, each of which is optionally substituted with 1, 2, or 3 independently selected $R^f$ substituents;

each $R^f$ is independently selected from the group consisting of halo, —OH, —CN, —COOH, —$NH_2$, —NH—($C_1$-$C_6$) alkyl, —N(($C_1$-$C_6$) alky)$_2$, $SO_2$, $C_{1-6}$ alkyl-$SO_2$—, $C_1$-$C_6$alkyl-C(O)—, ($C_1$-$C_6$) alkyl, ($C_1$-$C_6$) alkoxy, ($C_1$-$C_6$) alkylthio, ($C_1$-$C_6$) haloalkyl, ($C_1$-$C_6$) haloalkoxy, phenyl, 5-6 membered heteroaryl, 4-6 membered heterocycloalkyl, and ($C_3$-$C_6$) cycloalkyl, wherein the ($C_1$-$C_6$) alkyl, phenyl, ($C_3$-$C_6$) cycloalkyl, 4-6 membered heterocycloalkyl, and 5-6 membered heteroaryl of $R^f$ are each optionally substituted with 1, 2, or 3 substituents selected from halo, —OH, —CN, —COOH, —$NH_2$, ($C_1$-$C_4$) alkyl, ($C_1$-$C_4$) alkoxy, ($C_1$-$C_4$) haloalkyl, ($C_1$-$C_4$) haloalkoxy, phenyl, ($C_3$-$C_{10}$) cycloalkyl, 5-6 membered heteroaryl, and 4-6 membered heterocycloalkyl;

each $R^g$ is independently selected from the group consisting of halo, —OH, —CN, —COOH, —COO—($C_1$-$C_4$)alkyl, $C_{1-6}$ alkyl-C(O)—, —$NH_2$, —NH—($C_1$-$C_6$) alkyl, —N(($C_1$-$C_6$) alky)$_2$, ($C_1$-$C_6$) alkyl, ($C_1$-$C_6$) alkoxy, ($C_1$-$C_6$) alkylthio, ($C_1$-$C_6$) haloalkyl, ($C_1$-$C_6$) haloalkoxy, phenyl, 5-6 membered heteroaryl, 4-6 membered heterocycloalkyl, and ($C_3$-$C_6$) cycloalkyl;

Y is selected from —O—, —S—, —SO—, —$SO_2$—, —NH—, and —N(($C_1$-$C_6$) alkyl)-;

the ring nitrogen atom on the quinoline moiety in Formula I is optionally oxidized;

the subscript n is an integer of 1, 2, 3, or 4;

the subscript m is an integer of 1, 2, 3, or 4; and the subscript p is an integer of 0, 1, 2, 3, or 4.

In one aspect, the invention includes a compound of Formula II:

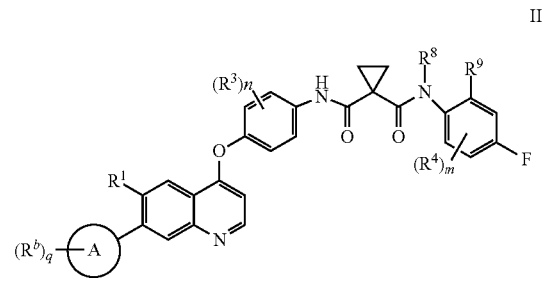

II or a pharmaceutically acceptable salt thereof, wherein:

Ring A is selected from phenyl, 5-10 membered heteroaryl, or 4-10 membered heterocycloalkyl;

$R^1$ is selected from —H, halo, ($C_1$-$C_6$) alkyl, ($C_2$-$C_6$) alkenyl, ($C_2$-$C_6$) alkynyl, ($C_1$-$C_6$) haloalkyl, ($C_1$-$C_6$) haloalkoxy, —CN, —$NO_2$, —$NH_2$, —COOH, —O($C_1$-$C_6$) alkyl, —S($C_1$-$C_6$) alkyl, —NHO($C_1$-$C_6$) alkyl, —C(O)($C_1$-$C_6$) alkyl, —C(O)$NH_2$, —C(O)NH($C_1$-$C_6$) alkyl, —C(O)N(($C_1$-$C_6$) alkyl)$_2$, —C(O)NHO($C_1$-$C_6$) alkyl, —C(O)O($C_1$-$C_6$) alkyl, —NH($C_1$-$C_6$) alkyl, —N(($C_1$-$C_6$) alkyl)$_2$, —N(($C_1$-$C_6$) alkyl)C(O)($C_1$-$C_6$) alkyl, —NHC(O)($C_1$-$C_6$) alkyl, —N(($C_1$-$C_6$) alkyl)S(O)$_2$($C_1$-$C_6$) alkyl, —NHS(O)$_2$($C_1$-$C_6$) alkyl, —S(O)($C_1$-$C_6$) alkyl, —S(O)$_2$($C_1$-$C_6$) alkyl, —S(O)$_2$N(($C_1$-$C_6$) alkyl)$_2$, —S(O)$_2$NH($C_1$-$C_6$) alkyl, and —S(O)$_2$$NH_2$, wherein $R_1$ is optionally substituted with one or more substituents selected from halo, oxo, $(C_1-C_6)$ alkyl, $(C_1-C_6)$ alkoxy, —NH$(C_1-C_6)$ alkyl, and —N$((C_1-C_6)$ alkyl$)_2$;

each $R^3$ is independently selected from the group consisting of —H, halo, —OH, —CN, and $(C_1-C_6)$ alkyl optionally substituted with halo, —OH, —CN, —COOH, —COO—$(C_1-C_4)$alkyl, —NH$_2$, —NH—$(C_1-C_6)$ alkyl, —N$((C_1-C_6)$ alky$)_2$, $(C_1-C_6)$ alkoxy, or $(C_1-C_6)$ alkylthio;

$R^8$ and $R^9$ are each independently H or $C_1$-$C_6$ alkyl, wherein each $C_{1-6}$ alkyl is optionally and independently substituted with 1 or 2 substituents selected from halo, —OH, —CN, —COOH, —COO—$(C_1-C_4)$alkyl, —NH$_2$, or $(C_1-C_6)$ alkoxy;

or $R^8$ and $R^9$ together with the atoms to which they are attached form fused 5-10 membered heterocycloalkyl optionally substituted with 1 or 2 substituents independently selected from halo, oxo, —OH, —CN, and $(C_1-C_6)$ alkyl optionally substituted with halo, —OH, —CN, —COOH, —COO—$(C_1-C_4)$alkyl, —NH$_2$, —NH—$(C_1-C_6)$ alkyl, —N$((C_1-C_6)$ alky$)_2$, $(C_1-C_6)$ alkoxy, or $(C_1-C_6)$ alkylthio;

each $R^4$ is independently selected from —H, halo, $(C_1-C_6)$ alkyl, $(C_1-C_6)$ haloalkyl, $(C_1-C_6)$ haloalkoxy, —CN, —NO$_2$, —NH$_2$, —COOH, —O$(C_1-C_6)$ alkyl, —C(O)$(C_1-C_6)$ alkyl, —C(O)NH$_2$, —C(O)NH$(C_1-C_6)$ alkyl, —C(O)N$((C_1-C_6)$ alkyl$)_2$, C(O)O$(C_1-C_6)$ alkyl, —NH$(C_1-C_6)$ alkyl, —N$((C_1-C_6)$ alkyl$)_2$, —N$((C_1-C_6)$ alkyl)C(O)$(C_1-C_6)$ alkyl, —NHC(O)$(C_1-C_6)$ alkyl, —S(O)$_2$N$((C_1-C_6)$ alkyl$)_2$, —S(O)$_2$NH$(C_1-C_6)$ alkyl, and —S(O)$_2$NH$_2$, wherein $R_4$ is optionally substituted with one or more substituents selected from halo, oxo, $(C_1-C_6)$ alkyl, $(C_1-C_6)$ alkoxy, —NH$(C_1-C_6)$ alkyl, and —N$((C_1-C_6)$ alkyl$)_2$;

each $R^b$ is independently selected from the group consisting of halo, oxo, $(C_1-C_6)$ alkyl, $(C_1-C_6)$ alkoxy, $(C_2-C_6)$ alkenyl, $(C_2-C_6)$ alkynyl, $(C_1-C_6)$ haloalkyl, $(C_1-C_6)$ haloalkoxy, phenyl, $(C_3-C_{10})$ cycloalkyl, 5-10 membered heteroaryl, 4-10 membered heterocycloalkyl, (5-10 membered heteroaryl)-$(C_1-C_4)$ alkylene-, (4-10 membered heterocycloalkyl)-$(C_1-C_4)$ alkylene-, —CN, —OH, —NH$_2$, —NO$_2$, —C(O)$(C_1-C_6)$ alkyl, —C(O)NH$(C_1-C_6)$ alkyl, —C(O)N$((C_1-C_6)$ alkyl$)_2$, —C(O)O $(C_1-C_6)$ alkyl, —NH$(C_1-C_6)$ alkyl, —N$((C_1-C_6)$ alkyl$)_2$, —S(O)$_2(C_1-C_6)$ alkyl, —S(O)$_2$NH$(C_1-C_6)$ alkyl, —S(O)$_2$N$((C_1-C_6)$ alkyl$)_2$, wherein each $R^b$ is optionally and independently substituted with 1, 2, or 3 substituents selected from the group consisting of $(C_1$-$C_6)$ alkyl, $(C_1-C_6)$ alkoxy, $(C_1-C_6)$ haloalkyl, halo, phenyl, 5-10 membered heteroaryl, $(C_3-C_{10})$ cycloalkyl, 4-10 membered heterocycloalkyl, —OH, —CN, —NH$_2$, —C(O)$(C_1-C_6)$ alkyl, —C(O)NH$(C_1-C_6)$ alkyl, —C(O)O$(C_1-C_6)$ alkyl, —NH$(C_1-C_6)$ alkyl, and —S(O)$_2$NH$(C_1-C_6)$ alkyl;

the subscript n is an integer of 1, 2, 3, or 4;
the subscript m is an integer of 1, 2, or 3; and
the subscript q is an integer of 0, 1, 2, 3, 4, or 5.

In another aspect, the invention includes a pharmaceutical composition comprising a compound of the invention, or a pharmaceutically acceptable salt thereof and a pharmaceutically acceptable carrier or excipient.

In another aspect, the invention includes a method for inhibiting a protein kinase, the method comprising contacting the protein kinase with a compound of the invention.

In another aspect, the invention includes a method for treating a disease, disorder, or syndrome in a subject, the method comprising administering to the subject in need thereof a therapeutically effective amount of a compound, or a pharmaceutical composition of the invention.

These and other aspects and embodiments are described below.

DETAILED DESCRIPTION OF THE INVENTION

Abbreviations and Definitions

The following abbreviations and terms have the indicated meanings throughout:

| Abbreviation | Meaning |
| --- | --- |
| Ac | Acetyl |
| anhyd | Anhydrous |
| Aq | Aqueous |
| Ar | Argon |
| Boc | Tert-butoxycarbonyl |
| Br | Broad |
| ° C. | Degrees Celsius |
| c- | Cyclo |
| calcd | Calculated |
| CBZ | CarboBenZoxy = benzyloxycarbonyl |
| d | Doublet |
| dd | Doublet of doublets |
| ddd | Doublet of doublets of doublets |
| dt | Doublet of triplets |
| DCM | Dichloromethane |
| DMF | N,N-Dimethylformamide |
| DMSO | Dimethyl sulfoxide |
| Dppf | 1,1'-bis(diphenylphosphano)ferrocene |
| EA | Elemental Analysis |
| EI | Electron Impact ionization |
| eq or equiv | Equivalent |
| Fmoc | Fluorenylmethyloxycarbonyl |
| g | Gram(s) |
| h or hr | Hour(s) |
| HPLC | High pressure liquid chromatography |
| H$_2$ | Hydrogen |
| L | Liter(s) |
| LiHMDS | Lithium bis(trimethylsilyl)azide |
| M | Molar or molarity |
| m | Multiplet |
| MHz | Megahertz (frequency) |
| Min | Minute(s) |
| mL | Milliliter(s) |
| Mp | Melting point |
| m/z | Mass to charge ratio |
| μL | Microliter(s) |
| Mol | Mole(s) |
| MS | Mass spectral analysis |
| N$_2$ | Nitrogen |
| N | Normal or normality |
| nM | Nanomolar |
| NMR | Nuclear magnetic resonance spectroscopy |
| Pd/C | Palladium on carbon |
| Q | Quartet |
| RT | Room temperature |
| s | Singlet |
| soln | Solution |
| S/C | Substrate/catalyst ratio |
| t or tr | Triplet |
| THF | Tetrahydrofuran |
| TLC | Thin layer chromatography |
| v/v | Volume to volume |

The symbol "—" means a single bond, and "=" means a double bond.

As used herein, the singular forms "a," "an," and "the" include plural reference unless the context clearly dictates otherwise.

When a variable is defined generically, with a number of possible substituents, each individual radical can be defined with our without the bond. For example, if $R^z$ can be hydrogen, this can be indicated as "—H" or "H" in the definition of $R^z$.

When chemical structures are depicted or described, unless explicitly stated otherwise, all carbons are assumed to have hydrogen substitution to conform to a valence of four. For example, in the structure on the left-hand side of the schematic below, there are nine hydrogens implied. The nine hydrogens are depicted in the right-hand structure. Sometimes a particular atom in a structure is described in textual formula as having a hydrogen or hydrogens as substitution (expressly defined hydrogen), for example, —CH$_2$CH$_2$—. It is understood by one of ordinary skill in the art that the aforementioned descriptive techniques are common in the chemical arts to provide brevity and simplicity to description of otherwise complex structures.

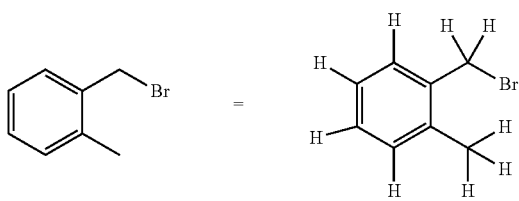

If a group "R" is depicted as "floating" on a ring system, as for example in the formula:

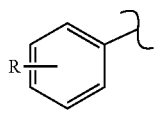

then, unless otherwise defined, a substituent "R" may reside on any atom of the ring system, assuming replacement of a depicted, implied, or expressly defined hydrogen from one of the ring atoms, so long as a stable structure is formed.

If a group "R" is depicted as floating on a fused ring system, as for example in the formulae:

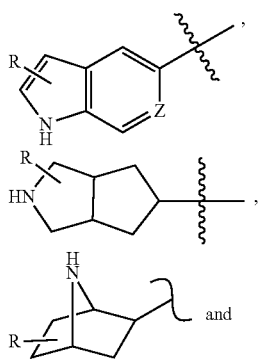

then, unless otherwise defined, a substituent "R" may reside on any atom of the fused ring system, assuming replacement of a depicted hydrogen (for example the —NH— in the formula above), implied hydrogen (for example, in the formula above, where the hydrogens are not shown but understood to be present), or expressly defined hydrogen (for example, where in the formula above, "Z" equals =CH—) from one of the ring atoms, so long as a stable structure is formed. In the example depicted, the "R" group may reside on either the 5-membered or the 6-membered ring of the fused ring system. When a group "R" is depicted as existing on a ring system containing saturated carbons, for example in the formula:

where, in this example, "y" can be more than one, assuming each replaces a currently depicted, implied, or expressly defined hydrogen on the ring; then, unless otherwise defined, where the resulting structure is stable, two "R's" may reside on the same carbon. A simple example is when R is a methyl group, there can exist a geminal dimethyl on a carbon of the depicted ring (an "annular" carbon). In another example, two R's on the same carbon, including that carbon, may form a ring, thus creating a spirocyclic ring (a "spirocyclyl" group) structure with the depicted ring as for example in the formula:

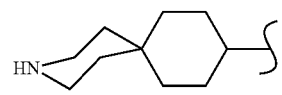

"Halogen" or "halo" refers to fluorine, chlorine, bromine, or iodine.

The term "$C_{n-m}$" or "$C_n$-$C_m$" indicates a range which includes the endpoints, wherein n and m are integers and indicate the number of carbons. Examples include $C_{1-4}$, $C_1$-$C_4$, $C_{1-6}$, $C_1$-$C_6$, and the like.

"Alkyl" refers to a branched or straight hydrocarbon chain of one to eight carbon atoms, such as methyl, ethyl, n-propyl, isopropyl, n-butyl, isobutyl, sec-butyl, t-butyl, pentyl, hexyl, and heptyl. ($C_1$-$C_6$)alkyl is preferred. The term "$C_{n-m}$ alkyl" or ($C_n$-$C_m$) alkyl, refers to an alkyl group having n to m carbon atoms. When optionally substituted, one or more hydrogen atoms of the alkyl group (e.g., from 1 to 4, from 1 to 2, or 1) may be replaced with a moiety as described below under "Optional Substitution." In some aspects, the alkyl group is unsubstituted or not optionally substituted.

"Alkylene" refers to an optionally substituted bivalent saturated aliphatic radical having from 1 to 10 carbon atoms, 1 to 8 carbon atoms, 1 to 6 carbon atoms, 1 to 4 carbon atoms, or 1 to 2 carbon atoms. When optionally substituted, one or more hydrogen atoms of the alkylene group (e.g., from 1 to 4, from 1 to 2, or 1) may be replaced with a moiety as described below under "Optional Substitution." In some aspects, the alkylene group is unsubstituted or not optionally substituted. The term "Cn-m alkylene" refers to an alkylene group having n to m carbon atoms. Examples of alkylene groups include, but are not limited to, methylene, ethan-1,2-diyl, propan-1,3-diyl, propan-1,2-diyl, butan-1,4-diyl, butan-1,3-diyl, butan-1,2-diyl, 2-methyl-propan-1,3-diyl and the like.

The term "alkenyl" refers to a straight-chain or branched hydrocarbon group corresponding to an alkyl group having one or more double carbon-carbon bonds. An alkenyl group formally corresponds to an alkene with one C—H bond replaced by the point of attachment of the alkenyl group to the remainder of the compound. The term "$C_{n-m}$ alkenyl" or ($C_n$-$C_m$) alkenyl refers to an alkenyl group having n to m carbons. In some embodiments, the alkenyl moiety contains 2 to 6, 2 to 4, or 2 to 3 carbon atoms. Example alkenyl groups include, but are not limited to, ethenyl, n-propenyl, isopropenyl, n-butenyl, sec-butenyl, and the like.

The term "alkynyl" refers to a straight-chain or branched hydrocarbon group corresponding to an alkyl group having one or more triple carbon-carbon bonds. An alkynyl group formally corresponds to an alkyne with one C—H bond replaced by the point of attachment of the alkyl group to the remainder of the compound. The term "$C_{n-m}$ alkynyl" or ($C_n$-$C_m$) alkynyl refers to an alkynyl group having n to m carbons. Example alkynyl groups include, but are not limited to, ethynyl, propyn-1-yl, propyn-2-yl, and the like. In some embodiments, the alkynyl moiety contains 2 to 6, 2 to 4, or 2 to 3 carbon atoms.

"Alkoxy" refers to a moiety of the formula —OR', wherein R' is an ($C_1$-$C_6$)alkyl moiety as defined herein. The term "$C_{n-m}$ alkoxy" or ($C_n$-$C_m$) alkoxy refers to an alkoxy group, the alkyl group of which has n to m carbons. Examples of alkoxy moieties include, but are not limited to, methoxy, ethoxy, isopropoxy, and the like.

An alkoxy group can be unsubstituted or optionally substituted. When optionally substituted, one or more hydrogen atoms of the alkoxy group (e.g., from 1 to 4, from 1 to 2, or 1) may be replaced with a moiety as described below under "Optional Substitution," with the proviso that no hydrogen atom alpha to the ether oxygen is replaced by a hydroxy, amino, or thio group. In some aspects, the alkoxy group is unsubstituted or not optionally substituted.

"Alkoxycarbonyl" refers to a group —C(O)—R' wherein R' is ($C_1$-$C_6$)alkoxy as defined herein.

The term "amino" refers to a group of formula —NH$_2$.

The term "carbamyl" refers to a group of formula —C(O)NH$_2$.

The term "carbonyl", employed alone or in combination with other terms, refers to a —C(=O)— group, which also may be written as C(O).

The term "cyano" or "nitrile" refers to a group of formula —C≡N, which also may be written as —CN or CN.

The term "oxo" refers to an oxygen atom as a divalent substituent, forming a carbonyl group when attached to carbon, or attached to a heteroatom forming a sulfoxide or sulfone group, or an N-oxide group. In some embodiments, heterocyclic groups may be optionally substituted by 1 or 2 oxo (=O) substituents.

The term "sulfide" refers to a sulfur atom as a divalent substituent, forming a thiocarbonyl group (C=S) when attached to carbon.

The term "heteroatom" used herein is meant to include boron, phosphorus, sulfur, oxygen, and nitrogen.

The term "haloalkyl" as used herein refers to an alkyl group in which one or more of the hydrogen atoms has been replaced by a halogen atom. The term "$C_{n-m}$ haloalkyl" or ($C_n$-$C_m$) haloalkyl refers to a $C_{n-m}$ alkyl group having n to m carbon atoms and from at least one up to {2(n to m)+1}halogen atoms, which may either be the same or different. In some embodiments, the halogen atoms are fluoro atoms. In some embodiments, the haloalkyl group has 1 to 6 or 1 to 4 carbon atoms. Example haloalkyl groups include $CF_3$, $C_2F_5$, $CHF_2$, $CCl_3$, $CHCl_2$, $C_2Cl_5$, and the like. In some embodiments, the haloalkyl group is a fluoroalkyl group.

The term "haloalkoxy," employed alone or in combination with other terms, refers to a group of formula —O-haloalkyl, wherein the haloalkyl group is as defined above. The term "$C_{n-m}$ haloalkoxy" or ($C_n$-$C_m$) haloalkoxy refers to a haloalkoxy group, the haloalkyl group of which has n to m carbons. Example haloalkoxy groups include trifluoromethoxy and the like. In some embodiments, the haloalkoxy group has 1 to 6, 1 to 4, or 1 to 3 carbon atoms.

"Aryl" means a monovalent six- to fourteen-membered, mono- or bi-carbocyclic ring (e.g., having two fused rings), wherein the monocyclic ring is aromatic and at least one of the rings in the bicyclic ring is aromatic. The term "$C_{n-m}$ aryl" or "($C_n$-$C_m$) aryl" refers to an aryl group having from n to m ring carbon atoms. In some embodiments, aryl groups have from 6 to about 10 carbon atoms. In some embodiments aryl groups have 6 carbon atoms. In some embodiments aryl groups have 10 carbon atoms. Unless stated otherwise, the valency of the group may be located on any atom of any ring within the radical, valency rules permitting. Representative examples include phenyl, naphthyl, and indanyl, and the like.

An aryl group can be unsubstituted or optionally substituted. When optionally substituted, one or more hydrogen atoms of the aryl group (e.g., from 1 to 5, from 1 to 2, or 1) may be replaced with a moiety as described below under "Optional Substitution." In some aspects, the alkoxy group is unsubstituted or not optionally substituted.

"Arylene" means a divalent six- to fourteen-membered, mono- or bi-carbocyclic ring, wherein the monocyclic ring is aromatic and at least one of the rings in the bicyclic ring is aromatic. Representative examples include phenylene, naphthylene, and indanylene, and the like.

"Cycloalkyl" refers to a non-aromatic hydrocarbon ring system (monocyclic, bicyclic, or polycyclic), including cyclized alkyl and alkenyl groups, and as such may optionally contain one or more alkenylene groups as part of the ring structure. The term "$C_{n-m}$ cycloalkyl" or "($C_n$-$C_m$) cycloalkyl" refers to a cycloalkyl that has n to m ring member carbon atoms. Cycloalkyl groups can include mono- or polycyclic (e.g., having 2, 3, or 4 fused rings) groups and spirocycles. Cycloalkyl groups can have 3, 4, 5, 6, 7, 8, 9, 10, 11, 12, 13, or 14 ring-forming carbons ($C_{3-14}$). In some embodiments, the cycloalkyl group has 3 to 14 members, 3 to 10 members, 3 to 6 ring members, 3 to 5 ring members, or 3 to 4 ring members. In some embodiments, the cycloalkyl group is monocyclic. In some embodiments, the cycloalkyl group is monocyclic or bicyclic. In some embodiments, the cycloalkyl group is a $C_{3-6}$ monocyclic cycloalkyl group. Ring-forming carbon atoms of a cycloalkyl group can be optionally oxidized to form an oxo or sulfido group. Cycloalkyl groups also include cycloalkylidenes. In some embodiments, cycloalkyl is cyclopropyl, cyclobutyl, cyclopentyl, or cyclohexyl. Examples of cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, bicyclo[1.1.1]pentanyl, bicyclo[2.1.1]hexanyl, and the like. In some embodiments, the cycloalkyl group is cyclopropyl, cyclobutyl, cyclopentyl, or cyclohexyl. In some embodiments, cycloalkyl includes a single saturated carbocyclic ring of three to eight ring carbons, such as cyclopropyl, cyclobutyl, cyclopentyl, and cyclohexyl. Cycloalkyl may optionally be substituted with one or more substituents, such as one, two, or three substituents. In some embodiments, the cycloalkyl substituent is selected from the group consisting of ($C_1$-$C_6$)alkyl, hydroxy, ($C_1$-$C_6$)alkoxy, halo($C_1$-$C_6$)alkyl, halo($C_1$-$C_6$)alkoxy, halo, amino, mono- and di($C_1$-$C_6$)alkylamino, hetero($C_1$-$C_6$)alkyl, acyl, aryl, and heteroaryl.

A cycloalkyl group can be unsubstituted or optionally substituted. When optionally substituted, one or more hydrogen atoms of the cycloalkyl group (e.g., from 1 to 4, from 1 to 2, or 1) may be replaced with a moiety as described below under "Optional Substitution." In some aspects, a substituted cycloalkyl group can incorporate an exo- or endocyclic alkene (e.g., cyclohex-2-en-1-yl). In some aspects, a cycloalkyl group is unsubstituted or not optionally substituted.

"Cycloalkyloxycarbonyl" means a group —C(O)—OR' wherein R' is $(C_3-C_6)$cycloalkyl as defined herein.

"Phenyloxycarbonyl" refers to a group —C(O)—Ophenyl.

"Heteroaryl" means a monocyclic, fused bicyclic, or fused tricyclic, monovalent radical of 5 to 14 ring atoms containing one or more, preferably one, two, three, or four ring heteroatoms independently selected from —O—, —S(O)$_n$— (n is 0, 1, or 2), —N—, and —N(R')—, and the remaining ring atoms being carbon, wherein the ring comprising a monocyclic radical is aromatic and wherein at least one of the fused rings comprising a bicyclic or tricyclic radical is aromatic. One or two ring carbon atoms of any nonaromatic rings comprising a bicyclic or tricyclic radical may be replaced by a —C(O)—, —C(S)—, or —C(=NH)— group. R' is hydrogen, alkyl, hydroxy, alkoxy, acyl, or alkylsulfonyl. Unless stated otherwise, the valency may be located on any atom of any ring of the heteroaryl group, valency rules permitting. In particular, when the point of valency is located on the nitrogen, an additional nitrogen substituent is not present. More specifically, the term heteroaryl includes, but is not limited to, 1,2,4-triazolyl, 1,3,5-triazolyl, phthalimidyl, pyridinyl, pyrrolyl, imidazolyl, thienyl, furanyl, indolyl, 2,3-dihydro-1H-indolyl (including, for example, 2,3-dihydro-1H-indol-2-yl or 2,3-dihydro-1H-indol-5-yl, and the like), isoindolyl, indolinyl, isoindolinyl, benzimidazolyl, benzodioxol-4-yl, benzofuranyl, cinnolinyl, indolizinyl, naphthyridin-3-yl, phthalazin-3-yl, phthalazin-4-yl, pteridinyl, purinyl, quinazolinyl, quinoxalinyl, tetrazoyl, pyrazolyl, pyrazinyl, pyrimidinyl, pyridazinyl, oxazolyl, isooxazolyl, oxadiazolyl, benzoxazolyl, quinolinyl, isoquinolinyl, tetrahydroisoquinolinyl (including, for example, tetrahydroisoquinolin-4-yl or tetrahydroisoquinolin-6-yl, and the like), pyrrolo[3,2-c]pyridinyl (including, for example, pyrrolo[3,2-c]pyridin-2-yl or pyrrolo[3,2-c]pyridin-7-yl, and the like), benzopyranyl, thiazolyl, isothiazolyl, thiadiazolyl, benzothiazolyl, benzothienyl, and the derivatives thereof, and N-oxide or a protected derivative thereof.

A five-membered heteroaryl ring is a heteroaryl group having five ring atoms wherein one or more (e.g., 1, 2, 3, or 4) ring atoms are independently selected from N, O, and S. Exemplary five-membered ring heteroaryls include thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl.

A six-membered heteroaryl ring is a heteroaryl group having six ring atoms wherein one or more (e.g., 1, 2, 3, or 4) ring atoms are independently selected from N, O, and S. Exemplary six-membered ring heteroaryls are pyridyl, pyrazinyl, pyrimidinyl, triazinyl, and pyridazinyl.

"Heteroarylene" means a monocyclic, fused bicyclic, or fused tricyclic, divalent radical of 5 to 14 ring atoms containing one or more, preferably one, two, three, or four ring heteroatoms independently selected from —O—, —S(O)$_n$— (n is 0, 1, or 2), —N—, and —N(R$^{19}$)—, and the remaining ring atoms being carbon, wherein the ring comprising a monocyclic radical is aromatic and wherein at least one of the fused rings comprising a bicyclic or tricyclic radical is aromatic. One or two ring carbon atoms of any nonaromatic rings comprising a bicyclic or tricyclic radical may be replaced by a —C(O)—, —C(S)—, or —C(=NH)— group. R$^{19}$ is hydrogen, alkyl, or alkenyl. Unless stated otherwise, the valencies may be located on any atom of any ring of the heteroarylene group, valency rules permitting. In particular, when the point of valency is located on the nitrogen, an additional nitrogen substituent is not present. More specifically, the term heteroaryl includes, but is not limited to, thien-diyl, benzo[d]isoxazol-diyl, benzo[d]isothiazol-diyl, 1H-indazol-diyl (optionally substituted at the N1 position with R$^{19}$), benzo[d]oxazol-diyl, benzo[d]thiazol-diyl, 1H-benzo[d]imidazol-diyl (optionally substituted at the N1 position with R$^{19}$) 1H-benzo[d][1,2,3]triazol-diyl (optionally substituted at the N1 position with R$^{19}$) imidazo[1,2-a]pyridin-diyl, cinnolin-diyl, quinolin-diyl, pyridin-diyl, 1-oxido-pyridin-diyl, [1,2,4]triazolo[4,3-a]pyridin-diyl, and 2,3-dihydroimidazo[1,2-a]pyridin-diyl, and the like.

As used herein, "heterocycloalkyl" or "heterocyclo" refer to a non-aromatic ring or ring system, which may optionally contain one or more alkenylene groups as part of the ring structure, which has at least one heteroatom ring member independently selected from boron, nitrogen, sulfur, oxygen, and phosphorus, and which has 4-14 ring members, 4-10 ring members, 4-7 ring members, or 4-6 ring members. Included within the term "heterocycloalkyl" are monocyclic 4-, 5-, 6-, and 7-membered heterocycloalkyl groups. Heterocycloalkyl groups can include mono- or bicyclic or polycyclic (e.g., having two or three fused or bridged rings) ring systems or spirocycles. In some embodiments, the heterocycloalkyl group is a monocyclic group having 1, 2, or 3 heteroatoms independently selected from nitrogen, sulfur, and oxygen. Ring-forming carbon atoms and heteroatoms of a heterocycloalkyl group can be optionally oxidized to form an oxo or sulfido group or other oxidized linkage (e.g., C(O), S(O), C(S), S(O)$_2$, N-oxide, and the like.) or a nitrogen atom can be quaternized. The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (i.e., having a bond in common with) to the heterocycloalkyl ring, e.g., benzo or thienyl derivatives of piperidine, morpholine, azepine, and the like. A heterocycloalkyl group containing a fused aromatic ring can be attached through any ring-forming atom, including a ring-forming atom of the fused aromatic ring. Examples of heterocycloalkyl groups include azetidinyl, azepanyl, dihydrobenzofuranyl, dihydrofuranyl, dihydropyranyl, morpholino, 3-oxa-9-azaspiro[5.5]undecanyl, 1-oxa-8-azaspiro[4.5]decanyl, piperidinyl, piperazinyl, oxopiperazinyl, pyranyl, pyrrolidinyl, quinuclidinyl, tetrahydrofuranyl, tetrahydropyranyl, 1,2,3,4-tetrahydroquinolinyl, tropanyl, 4,5,6,7-tetrahydrothiazolo[5,4-c]pyridinyl, and thiomorpholino.

"Heterocycloalkyl" or "heterocyclo," can be unsubstituted or optionally substituted. When optionally substituted, one or more hydrogen atoms of the group (e.g., from 1 to 4, from 1 to 2, or 1) may be replaced with a moiety independently selected from fluoro, hydroxy, alkoxy, amino, alkylamino, acylamino, thio, and alkylthio. In some aspects, a substituted heterocycyl group can incorporate an exo- or endocyclic alkene (e.g., cyclohex-2-en-1-yl). In some aspects, the heterocycyl group is unsubstituted or not optionally substituted.

Nitrogen protecting groups such as carbamate groups (e.g., —C(=O)OR$^{aa}$) include, but are not limited to, methyl carbamate, ethyl carbamate, 9-fluorenylmethyl carbamate (Fmoc), 9-(2-sulfo)fluorenylmethyl carbamate, 9-(2,7-dibromo)fluorenylmethyl carbamate, 2,7-di-t-butyl-[9-(10,10-dioxo-10,10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromoethyl carbamate (DB-t-BOC), 1,1-dimethyl-2,2,2-trichloroethyl carbamate (TCBOC), 1-methyl-1-(4-biphenylyl)ethyl carbamate (Bpoc), 1-(3,5-di-t-butylphenyl)-1-methylethyl carbamate (t-Bumeoc), 2-(2'- and 4'-pyridyl)ethyl carbamate (Pyoc), 2-(N,N-dicyclohexylcarboxamido)ethyl carbamate, t-butyl carbamate (BOC or Boc), 1-adamantyl carbamate (Adoc), vinyl carbamate (Voc), alkyl carbamate (Alloc), 1-isopropylallyl carbamate (Ipaoc), cinnamyl carbamate (Coc), 4-nitrocinnamyl carbamate (Noc), 8-quinolyl carbamate, N-hydroxypiperidinyl carbamate, alkyldithio carbamate, benzyl carbamate (Cbz), p-methoxybenzyl carbamate (Moz), p-nitrobenzyl carbamate, p-bromobenzyl carbamate, p-chlorobenzyl carbamate, 2,4-dichlorobenzyl carbamate, 4-methylsulfinylbenzyl carbamate (Msz), 9-anthrylmethyl carbamate, diphenylmethyl carbamate, 2-methylthioethyl carbamate, 2-methylsulfonylethyl carbamate, 2-(p-toluenesulfonyl)ethyl carbamate, [2-(1,3-dithianyl)] methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, m-chloro-p-acyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenyl carbamate, 3,5-dimethoxybenzyl carbamate, o-nitrobenzyl carbamate, 3,4-dimethoxy-6-nitrobenzyl carbamate, phenyl(o-nitrophenyl) methyl carbamate, t-amyl carbamate, S-benzyl thiocarbamate, p-cyanobenzyl carbamate, cyclobutyl carbamate, cyclohexyl carbamate, cyclopentyl carbamate, cyclopropylmethyl carbamate, p-decyloxybenzyl carbamate, 2,2-dimethoxyacylvinyl carbamate, o-(N,N-dimethylcarboxamido)benzyl carbamate, 1,1-dimethyl-3-(N,N-dimethylcarboxamido)propyl carbamate, 1,1-dimethylpropynyl carbamate, di(2-pyridyl)methyl carbamate, 2-furanylmethyl carbamate, 2-iodoethyl carbamate, isobornyl carbamate, isobutyl carbamate, isonicotinyl carbamate, p-(p'-methoxyphenylazo)benzyl carbamate, 1-methylcyclobutyl carbamate, 1-methylcyclohexyl carbamate, 1-methyl-1-cyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl)ethyl carbamate, phenyl carbamate, p-(phenylazo) benzyl carbamate, 2,4,6-tri-t-butylphenyl carbamate, 4-(trimethylammonium)benzyl carbamate, and 2,4,6-trimethylbenzyl carbamate.

Nitrogen protecting groups such as sulfonamide groups (e.g., —S(=O)$_2$R$^{aa}$) include, but are not limited to, p-toluenesulfonamide (Ts), benzenesulfonamide, 2,3,6-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), β-trimethylsilylethanesulfonamide (SES), 9-anthracenesulfonamide, 4-(4',8'-dimethoxynaphthylmethyl)benzenesulfonamide (DNMBS), benzylsulfonamide, trifluoromethylsulfonamide, and phenacylsulfonamide.

Other nitrogen protecting groups include, but are not limited to, phenothiazinyl-(10)-acyl derivative, N'-p-toluenesulfonylaminoacyl derivative, N'-phenylaminothioacyl derivative, N-benzoylphenylalanyl derivative, N-acetylmethionine derivative, 4,5-diphenyl-3-oxazolin-2-one, N-phthalimide, N-dithiasuccinimide (Dts), N-2,3-diphenylmaleimide, N-2,5-dimethylpyrrole, N-1,1,4,4-tetramethyldisilylazacyclopentane adduct (STABASE), 5-substituted 1,3-dimethyl-1,3,5-triazacyclohexan-2-one, 5-substituted 1,3-dibenzyl-1,3,5-triazacyclohexan-2-one, 1-substituted 3,5-dinitro-4-pyridone, N-methylamine, N-alkylamine, N-[2-(trimethylsilyl)ethoxy]methylamine (SEM), N-3-acetoxypropylamine, N-(1-isopropyl-4-nitro-2-oxo-3-pyroolin-3-yl)amine, quaternary ammonium salts, N-benzylamine, N-di(4-methoxyphenyl)methylamine, N-5-dibenzosuberylamine, N-triphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine, N-p-methoxybenzylideneamine, N-diphenylmethyleneamine, N-[(2-pyridyl)mesityl]methyleneamine, N—(N',N'-dimethylaminomethylene) amine, N,N'-isopropylidenediamine, N-p-nitrobenzylideneamine, N-salicylideneamine, N—5-chlorosalicylideneamine, N-(5-chloro-2-hydroxyphenyl) phenylmethyleneamine, N-cyclohexylideneamine, N-(5,5-dimethyl-3-oxo-1-cyclohexenyl)amine, N-borane derivative, N-diphenylborinic acid derivative, N—[phenyl (pentaacylchromium- or tungsten)acyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoramidate, benzenesulfenamide, o-nitrobenzenesulfenamide (Nps), 2,4-dinitrobenzenesulfenamide, pentachlorobenzenesulfenamide, 2-nitro-4-methoxybenzenesulfenamide, triphenylmethylsulfenamide, and 3-nitropyridinesulfenamide (Npys).

Exemplary oxygen protecting groups include, but are not limited to, methyl, methoxylmethyl (MOM), methylthiomethyl (MTM), t-butylthiomethyl, (phenyldimethylsilyl) methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethylsilyl) ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, alkyl, p-chlorophenyl, p-methoxyphenyl, 2,4-dinitrophenyl, benzyl (Bn), p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2- picolyl N-oxido, diphenylmethyl, p,p'-dinitrobenzhydryl, 5-dibenzosuberyl, triphenylmethyl, a-naphthyldiphenylmethyl, p-methoxyphenyldiphenylmethyl, di(p-methoxyphenyl)phenylmethyl, tri(p-methoxyphenyl)methyl, 4-(4'-bromophenacyloxyphenyl)diphenylmethyl, 4,4',4"-tris(4,5-dichlorophthalimidophenyl)methyl, 4,4',4"-tris(levulinoyloxyphenyl)methyl, 4,4',4"-tris(benzoyloxyphenyl)methyl, 3-(imidazol-1-yl)bis(4',4"-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodithiolan-2-yl, benzisothiazolyl S,S-dioxido, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), methyl carbonate, 9-fluorenylmethyl carbonate (Fmoc), ethyl carbonate, 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), isobutyl carbonate, vinyl carbonate, alkyl carbonate, t-butyl carbonate (BOC or Boc), p-nitrophenyl carbonate, benzyl carbonate, p-methoxybenzyl carbonate, 3,4-dimethoxybenzyl carbonate, o-nitrobenzyl carbonate, p-nitrobenzyl carbonate, S-benzyl thiocarbonate, 4-ethoxy-1-napththyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxyacyl)benzoate, α-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts).

As used herein, a "leaving group" (LG) is an art-understood term referring to a molecular fragment that departs with a pair of electrons in heterolytic bond cleavage, wherein the molecular fragment is an anion or neutral molecule. As used herein, a leaving group can be an atom or a group capable of being displaced by a nucleophile. See, for example, Smith, March *Advanced Organic Chemistry* 6th ed. (501-502). Exemplary leaving groups include, but are not limited to, halo (e.g., chloro, bromo, iodo), —$OR^{aa}$ (when the O atom is attached to a carbonyl group, wherein $R^{aa}$ is as defined herein), —$O(C=O)R^{LG}$, or —$O(SO)_2R^{LG}$ (e.g., tosyl, mesyl, besyl), wherein $R^{LG}$ is optionally substituted alkyl, optionally substituted aryl, or optionally substituted heteroaryl. In certain embodiments, the leaving group is a halogen.

The terms for which definitions are given above are specifically exemplified in the Examples.

"Yield" for each of the reactions described herein is expressed as a percentage of the theoretical yield.

The terms "Subject" or "Patient" are used interchangeably for the purposes of the present invention and include humans and any other animals, particularly mammals, and other organisms. Thus the methods are applicable to both human therapy and veterinary applications. In a preferred embodiment the patient is a mammal, and in a most preferred embodiment the patient is human. Examples of the preferred mammals include mice, rats, other rodents, rabbits, dogs, cats, swine, cattle, sheep, horses, and primates.

"Kinase-dependent diseases or conditions" refer to pathologic conditions that depend on the activity of one or more kinases. Kinases either directly or indirectly participate in the signal transduction pathways of a variety of cellular activities including proliferation, adhesion, migration, differentiation, and invasion. Diseases associated with kinase activities include tumor growth, the pathologic neovascularization that supports solid tumor growth, and associated with other diseases where excessive local vascularization is involved such as ocular diseases (diabetic retinopathy, age-related macular degeneration, and the like) and inflammation (psoriasis, rheumatoid arthritis, and the like).

"Therapeutically effective amount" is an amount of a compound of the invention that, when administered to a patient, ameliorates a symptom of the disease. The amount of a compound of the invention which constitutes a "therapeutically effective amount" will vary depending on the compound, the disease state and its severity, the age of the patient to be treated, and the like. The therapeutically effective amount can be determined routinely by one of ordinary skill in the art having regard to his own knowledge and to this disclosure.

"Cancer" refers to cellular-proliferative disease states, including but not limited to: Cardiac: sarcoma (angiosarcoma, fibrosarcoma, rhabdomyosarcoma, liposarcoma), myxoma, rhabdomyoma, fibroma, lipoma and teratoma; Head and neck: squamous cell carcinomas of the head and neck, laryngeal and hypopharyngeal cancer, nasal cavity and paranasal sinus cancer, nasopharyngeal cancer, salivary gland cancer, oral and oropharyngeal cancer; Lung: bronchogenic carcinoma (squamous cell, undifferentiated small cell, undifferentiated large cell, adenocarcinoma, non-small cell lung cancer), alveolar (bronchiolar) carcinoma, bronchial adenoma, sarcoma, lymphoma, chondromatous hamartoma, mesothelioma; Colon: colorectal cancer, adenocarcinoma, gastrointestinal stromal tumors, lymphoma, carcinoids, Turcot Syndrome; Gastrointestinal: gastric cancer, gastroesophageal junction adenocarcinoma, esophagus (squamous cell carcinoma, adenocarcinoma, leiomyosarcoma, lymphoma), stomach (carcinoma, lymphoma, leiomyosarcoma), pancreas (ductal adenocarcinoma, insulinoma, glucagonoma, gastrinoma, carcinoid tumors, vipoma), small bowel (adenocarcinoma, lymphoma, carcinoid tumors, Karposi's sarcoma, leiomyoma, hemangioma, lipoma, neurofibroma, fibroma), large bowel (adenocarcinoma, tubular adenoma, villous adenoma, hamartoma, leiomyoma); Breast: metastatic breast cancer, ductal carcinoma in situ, invasive ductal carcinoma, tubular carcinoma, medullary carcinoma, mucinous carcinoma, lobular carcinoma in situ, triple negative breast cancer; Genitourinary tract: kidney (adenocarcinoma, Wilm's tumor [nephroblastoma], lymphoma, leukemia, renal cell carcinoma), bladder and urethra (squamous cell carcinoma, transitional cell carcinoma, adenocarcinoma, urothelial carcinoma), prostate (adenocarcinoma, sarcoma, castrate resistant prostate cancer), testis (seminoma, teratoma, embryonal carcinoma, teratocarcinoma, choriocarcinoma, sarcoma, interstitial cell carcinoma, fibroma, fibroadenoma, adenomatoid tumors, lipoma), clear cell carcinoma, clear cell renal cell carcinoma, non-clear cell carcinoma, non-clear cell renal cell carcinoma, papillary carcinoma; Liver: hepatoma (hepatocellular carcinoma), cholangiocarcinoma, hepatoblastoma, angiosarcoma, hepatocellular adenoma, hemangioma; Bone: osteogenic sarcoma (osteosarcoma), fibrosarcoma, malignant fibrous histiocytoma, chondrosarcoma, Ewing's sarcoma, malignant lymphoma (reticulum cell sarcoma), multiple myeloma, malignant giant cell tumor chordoma, osteochondroma (osteocartilaginous exostoses), benign chondroma, chondroblastoma, chondromyxofibroma, osteoid osteoma, and giant cell tumors; Thyroid: medullary thyroid cancer, differentiated thyroid cancer, papillary thyroid cancer, follicular thyroid cancer, hurthle cell cancer, and anaplastic thyroid cancer; Nervous system: skull (osteoma, hemangioma, granuloma, xanthoma, osteitis deformans), meninges (meningioma, meningiosarcoma, gliomatosis), brain (astrocytoma, medulloblastoma, glioma, ependymoma, germinoma [pinealoma], glioblastoma multiform, glioblastoma, oligodendroglioma, schwannoma, retinoblastoma, congenital tumors), spinal cord neurofibroma, meningioma, glioma, sarcoma); Gynecological: uterus (endometrial cancer), cervix (cervical carcinoma, pre-tumor cervical dysplasia), ovaries (ovarian carcinoma [serous cystadenocarcinoma, mucinous cystadenocarcinoma, unclassified carcinoma], granulosa-thecal cell tumors, Sertoli-Leydig cell tumors, dysgerminoma, malignant teratoma), vulva (squamous cell carcinoma, intraepithelial carcinoma, adenocarcinoma, fibrosarcoma, melanoma), vagina (clear cell carcinoma, squamous cell carcinoma, botryoid sarcoma (embryonal rhabdomyosarcoma], fallopian tubes (carcinoma); Hematologic: blood (myeloid leukemia [acute and chronic], acute lymphoblastic leukemia, chronic lymphocytic leukemia, myeloproliferative diseases, multiple myeloma, myelodysplastic syndrome), Hodgkin's disease, non-Hodgkin's lymphoma [malignant lymphoma]; Skin: malignant melanoma, basal cell carcinoma, squamous cell carcinoma, Karposi's sarcoma, moles dysplastic nevi, lipoma, angioma, dermatofibroma, keloids, psoriasis; and Adrenal glands: neuroblastoma. Thus, the term "cancerous cell" as provided herein, includes a cell afflicted by any one of the above-identified conditions.

"Pharmaceutically acceptable salts" includes "pharmaceutically acceptable acid addition salts" and "pharmaceutically acceptable base addition salts." "Pharmaceutically acceptable acid addition salts" refers to those salts that retain the biological effectiveness of the free bases and that are not biologically or otherwise undesirable, formed with inorganic acids such as hydrochloric acid, hydrobromic acid, sulfuric acid, nitric acid, phosphoric acid, and the like, as well as organic acids such as acetic acid, trifluoroacetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like.

"Pharmaceutically acceptable base addition salts" include those derived from inorganic bases such as sodium, potassium, lithium, ammonium, calcium, magnesium, iron, zinc, copper, manganese, aluminum salts, and the like. Exemplary salts are the ammonium, potassium, sodium, calcium, and magnesium salts. Salts derived from pharmaceutically acceptable organic non-toxic bases include, but are not limited to, salts of primary, secondary, and tertiary amines, substituted amines including naturally occurring substituted amines, cyclic amines, and basic ion exchange resins, such as isopropylamine, trimethylamine, diethylamine, triethylamine, tripropylamine, ethanolamine, 2-dimethylaminoethanol, 2-diethylaminoethanol, dicyclohexylamine, lysine, arginine, histidine, caffeine, procaine, hydrabamine, choline, betaine, ethylenediamine, glucosamine, methylglucamine, theobromine, purines, piperazine, piperidine, N-ethylpiperidine, polyamine resins, and the like. Exemplary organic bases are isopropylamine, diethylamine, ethanolamine, trimethylamine, dicyclohexylamine, choline, and caffeine. (See, for example, S. M. Berge, et al., "Pharmaceutical Salts," J. Pharm. Sci., 1977; 66:1-19 which is incorporated herein by reference.)

The term, "compound," as used herein is meant to include all stereoisomers, geometric isomers, tautomers and isotopes of the structures depicted. The term is also meant to refer to compounds of the inventions, regardless of how they are prepared, e.g., synthetically, through biological process (e.g., metabolism or enzyme conversion), or a combination thereof.

Compounds of the invention can also include all isotopes of atoms occurring in the intermediates or final compounds. Isotopes include those atoms having the same atomic number but different mass numbers. For example, isotopes of hydrogen include tritium and deuterium.

Any one of the process steps or sequences disclosed and/or claimed herein can be performed under an inert gas atmosphere, more particularly under argon or nitrogen. In addition, the methods of the present invention may be carried out as semi-continuous or continuous processes, more preferably as continuous processes.

Moreover, many of the process steps and sequences that are described herein can be telescoped.

In general, the nomenclature used in this Application is based on naming conventions adopted by the International Union of Pure and Applied Chemistry (IUPAC). Chemical structures shown herein were prepared using CHEMDRAW®. Any open valency appearing on a carbon, oxygen, or nitrogen atom in the structures herein indicates the presence of a hydrogen atom.

EMBODIMENTS OF THE INVENTION

In one aspect, the invention includes a compound of Formula I:

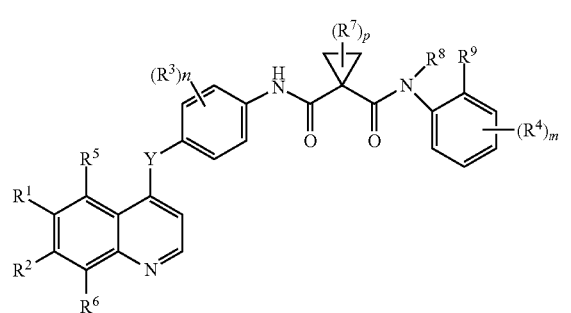

or a pharmaceutically acceptable salt thereof, wherein:
$R^1$ is selected from —H, halo, $(C_1-C_6)$ alkyl, $(C_2-C_6)$ alkenyl, $(C_2-C_6)$ alkynyl, $(C_1-C_6)$ haloalkyl, $(C_1-C_6)$ haloalkoxy, $(C_6-C_{10})$ aryl, $(C_3-C_{10})$ cycloalkyl, 5-14 membered heteroaryl, 4-14 membered heterocycloalkyl, $(C_6-C_{10})$ aryl-$(C_1-C_4)$ alkylene-, $(C_3-C_{10})$ cycloalkyl-$(C_1-C_4)$ alkylene-, (5-14 membered heteroaryl)-

($C_1$-$C_4$) alkylene-, (4-14 membered heterocycloalkyl)-($C_1$-$C_4$) alkylene-, —CN, —$NO_2$, —$OR^a$, —$SR^a$, —$NHOR^a$, —$C(O)R^a$, —$C(O)NR^aR^a$, —$C(O)NHOR^a$, —$C(O)OR^a$, —$C(O)NR^aS(O)_2R^a$, —$OC(O)R^a$, —$OC(O)NR^aR^a$, —$NHR^a$, —$NR^aR^a$, —$NR^aC(O)R^a$, —$NR^aC(=NR^a)R^a$, —$NR^aC(O)OR^a$, —$NR^aC(O)NR^aR^a$, —$C(=NR^a)R^a$, —$C(=NOH)R^a$, —$C(=NOH)NR^a$, —$C(=NCN)NR^aR^a$, —$NR^aC(=NCN)NR^aR^a$, —$C(=NR^a)NR^aR^a$, —$NR^aC(=NR^a)NR^aR^a$, —$NR^aS(O)R^a$, —$NR^aS(O)_2R^a$, —$NR^aS(O)_2NR^aR^a$, —$S(O)R^a$, —$S(O)NR^aR^a$, —$S(O)_2R^a$, —$S(O)_2NR^aC(O)R^a$, —$P(O)R^aR^a$, —$P(O)(OR^a)(OR^a)$, —$B(OH)_2$, —$B(OR^a)_2$, and —$S(O)_2NR^aR^a$, wherein the ($C_1$-$C_6$) alkyl, ($C_2$-$C_6$) alkenyl, ($C_2$-$C_6$) alkynyl, ($C_6$-$C_{10}$) aryl, ($C_3$-$C_{10}$) cycloalkyl, 5-14 membered heteroaryl, 4-14 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-14 membered heteroaryl)-($C_1$-$C_4$) alkylene-, and (4-14 membered heterocycloalkyl)-($C_1$-$C_4$) alkylene- of $R_1$ are each optionally substituted with 1, 2, 3, 4, or 5 independently selected $R^b$ substituents;

$R^2$ is selected from ($C_2$-$C_6$) alkynyl, ($C_6$-$C_{10}$) aryl, $C_{3\text{-}10}$ cycloalkyl, 5-14 membered heteroaryl and 4-14 membered heterocycloalkyl, each of which is optionally substituted with 1, 2, 3, 4, or 5 independently selected $R^b$ substituents;

$R^5$ and $R^6$ are each independently selected from the group consisting of —H, halo, ($C_1$-$C_6$) alkyl, ($C_1$-$C_6$) haloalkyl, ($C_1$-$C_6$) haloalkoxy, ($C_6$-$C_{10}$) aryl, ($C_3$-$C_{10}$) cycloalkyl, 5-14 membered heteroaryl, 4-14 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-14 membered heteroaryl)-($C_1$-$C_4$) alkylene-, (4-14 membered heterocycloalkyl)-($C_1$-$C_4$) alkylene-, —CN, —$NO_2$, —$OR^a$, —$SR^a$, —$NHOR^a$, —$C(O)R^a$, —$C(O)NR^aR^a$, —$C(O)OR^a$, —$C(O)NR^aS(O)_2R^a$, —$OC(O)R^a$, —$OC(O)NR^aR^a$, —$NHR^a$, —$NR^aR^a$, —$NR^aC(O)R^a$, —$NR^aC(=NR^a)R^a$, —$NR^aC(O)OR^a$, —$NR^aC(O)NR^aR^a$, —$C(=NR^a)R^a$, —$C(=NOH)R^a$, —$C(=NOH)NR^a$, —$C(=NCN)NR^aR^a$, —$NR^aC(=NCN)NR^aR^a$, —$C(=NR^a)NR^aR^a$, —$NR^aC(=NR^a)NR^aR^a$, —$NR^aS(O)R^a$, —$NR^aS(O)_2R^a$, —$NR^aS(O)_2NR^aR^a$, —$S(O)R^a$, —$S(O)NR^aR^a$, —$S(O)_2R^a$, —$S(O)_2NR^aC(O)R^a$, —$P(O)R^aR^a$, —$P(O)(OR^a)(OR^a)$, —$B(OH)_2$, —$B(OR^a)_2$, and $S(O)_2NR^aR^a$, wherein the ($C_1$-$C_6$) alkyl, ($C_6$-$C_{10}$) aryl, ($C_3$-$C_{10}$) cycloalkyl, 5-14 membered heteroaryl, 4-14 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-14 membered heteroaryl)-($C_1$-$C_4$) alkylene-, and (4-14 membered heterocycloalkyl)-($C_1$-$C_4$) alkylene- of $R^5$ or $R^6$ are each optionally substituted with 1, 2, 3, 4, or 5 independently selected $R^b$ substituents;

each $R^3$ is independently selected from the group consisting of —H, halo, —OH, —CN, optionally substituted ($C_1$-$C_6$) alkyl, ($C_1$-$C_6$) alkoxy, ($C_1$-$C_6$) haloalkoxy, —$NH_2$, —$NH(C_1$-$C_6)$alkyl, —$N(C_1$-$C_6$ alkyl$)_2$, and ($C_3$-$C_6$) cycloalkyl, wherein the ($C_1$-$C_6$) alkoxy, —NH($C_1$-$C_6$)alkyl, —N($C_1$-$C_6$ alkyl$)_2$, and ($C_3$-$C_6$) cycloalkyl of $R^3$ are each optionally substituted with 1, 2, or 3 independently selected $R^g$ substituents;

each $R^7$ is independently selected from the group consisting of halo, —OH, —$NH_2$, —CN, ($C_1$-$C_6$) alkyl, ($C_1$-$C_6$) alkoxy, ($C_1$-$C_6$) haloalkyl, ($C_1$-$C_6$) haloalkoxy, —COOH, —NH($C_1$-$C_6$)alkyl, —N($C_1$-$C_6$ alkyl$)_2$, phenyl, phenyl-($C_1$-$C_2$) alkylene, ($C_3$-$C_6$) cycloalkyl, ($C_3$-$C_6$) cycloalkyl-($C_1$-$C_4$) alkylene-, 4- to 6-membered heterocycloalkyl, (4- to 6-membered heterocycloalkyl)-($C_1$-$C_4$) alkylene-, 5- to 6-membered heteroaryl, (5- to 6-membered heteroaryl)-($C_1$-$C_4$) alkylene-, and —$OR^c$, wherein the ($C_1$-$C_6$) alkyl, phenyl, phenyl-($C_1$-$C_2$) alkylene, ($C_3$-$C_6$) cycloalkyl, ($C_3$-$C_6$) cycloalkyl-($C_1$-$C_4$) alkylene-, 4- to 6-membered heterocycloalkyl, (4- to 6-membered heterocycloalkyl)-($C_1$-$C_4$) alkylene-, 5- to 6-membered heteroaryl, and (5- to 6-membered heteroaryl)-($C_1$-$C_4$) alkylene- of $R^7$ are each optionally substituted with 1, 2, or 3 independently selected $R^g$ substituents, $R^8$ is H or $C_{1\text{-}6}$ alkyl, wherein the $C_{1\text{-}6}$ alkyl of $R^8$ is optionally substituted with 1 or 2 independently selected $R^g$ substituents;

$R^9$ is selected from the group consisting of —H, halo, —OH, —$COOR^c$, —$CONR^cR^c$, —CN, —$NH_2$, —NH(($C_1$-$C_6$) alkyl), —N(($C_1$-$C_6$) alkyl$)_2$, ($C_1$-$C_6$) alkyl, ($C_1$-$C_6$) alkoxy, ($C_1$-$C_6$) haloalkyl, ($C_1$-$C_6$) haloalkoxy, —$CONR^aR^a$, —$NR^aCOR^a$, —$NR^aCONR^aR^a$, —$SO_2R^a$, —$NR^aS(O)_2R^a$, —$NR^aS(O)_2NR^aR^a$, ($C_3$-$C_6$) cycloalkyl, 4- to 6-membered heterocycloalkyl, phenyl, 5- or 6-membered heteroaryl, ($C_3$-$C_6$) cycloalkyl-($C_1$-$C_4$) alkylene-, (4- to 6-membered heterocycloalkyl)-($C_1$-$C_4$) alkylene-, phenyl-($C_1$-$C_2$) alkylene, and (5- or 6-membered heteroaryl)-($C_1$-$C_4$) alkylene-, wherein the ($C_1$-$C_6$) alkyl, ($C_3$-$C_6$) cycloalkyl, 4- to 6-membered heterocycloalkyl, phenyl, 5- or 6-membered heteroaryl, ($C_3$-$C_6$) cycloalkyl-($C_1$-$C_4$) alkylene-, (4- to 6-membered heterocycloalkyl)-($C_1$-$C_4$) alkylene-, phenyl-($C_1$-$C_2$) alkylene, and (5- or 6-membered heteroaryl)-($C_1$-$C_4$) alkylene- of $R^9$ are each optionally substituted with 1, 2, or 3 independently selected $R^f$ substituents;

or $R^8$ and $R^9$ together with the atoms to which they are attached form fused 5-10 membered heteroaryl or fused 5-10 membered heterocycloalkyl, each of which is optionally substituted with 1 or 2 independently selected $R^g$ substituents and wherein the 5-10 membered heteroaryl or 5-10 membered heterocycloalkyl has 0-2 additional heteroatoms as ring members selected from N, or and S;

each $R^4$ is independently selected from the group consisting of —H, halo, —OH, —$COOR^c$, —$CONR^cR^c$, —CN, —$NH_2$, —NH(($C_1$-$C_6$) alkyl), —N(($C_1$-$C_6$) alkyl$)_2$, ($C_1$-$C_6$) alkyl, ($C_1$-$C_6$) alkoxy, ($C_1$-$C_6$) haloalkyl, ($C_1$-$C_6$) haloalkoxy, —$CONR^aR^a$, —$NR^aCOR^a$, —$NR^aCONR^aR^a$, —$SO_2R^a$, —$NR^aS(O)_2R^a$, —$NR^aS(O)_2NR^aR^a$, ($C_3$-$C_6$) cycloalkyl, 4- to 6-membered heterocycloalkyl, phenyl, 5- or 6-membered heteroaryl, ($C_3$-$C_6$) cycloalkyl-($C_1$-$C_4$) alkylene-, (4- to 6-membered heterocycloalkyl)-($C_1$-$C_4$) alkylene-, phenyl-($C_1$-$C_2$) alkylene, and (5- or 6-membered heteroaryl)-($C_1$-$C_4$) alkylene-, wherein the ($C_1$-$C_6$) alkyl, ($C_3$-$C_6$) cycloalkyl, 4- to 6-membered heterocycloalkyl, phenyl, 5- or 6-membered heteroaryl, ($C_3$-$C_6$) cycloalkyl-($C_1$-$C_4$) alkylene-, (4- to 6-membered heterocycloalkyl)-($C_1$-$C_4$) alkylene-, phenyl-($C_1$-$C_2$) alkylene, and (5- or 6-membered heteroaryl)-($C_1$-$C_4$) alkylene- of $R^4$ are each optionally substituted with 1, 2, or 3 independently selected $R^f$ substituents;

each $R^a$ is independently selected from the group consisting of —H, —CN, ($C_1$-$C_6$) alkyl, ($C_1$-$C_6$) haloalkyl, ($C_2$-$C_6$) alkenyl, ($C_2$-$C_6$) alkynyl, ($C_6$-$C_{10}$) aryl, ($C_3$-$C_{10}$) cycloalkyl, 5-14 membered heteroaryl, 4-14 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-14 membered heteroaryl)-($C_1$-$C_4$) alkylene-, and (4-14 membered heterocycloalkyl)-($C_1$-$C_4$) alkylene-, wherein the ($C_1$-$C_6$) alkyl, ($C_1$-$C_6$) haloalkyl, ($C_2$-$C_6$) alkenyl, ($C_2$-$C_6$) alkynyl, ($C_6$-$C_{10}$) aryl, ($C_3$-$C_{10}$) cycloalkyl, 5-14 membered heteroaryl, 4-14 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-14 membered heteroaryl)-($C_1$-$C_4$) alkylene-, and (4-14 membered heterocycloalkyl)-($C_1$-$C_4$) alkylene- of $R^a$ are each optionally substituted with 1, 2, 3, 4, or 5 independently selected $R^d$ substituents;

each $R^b$ is independently selected from the group consisting of halo, oxo, ($C_1$-$C_6$) alkyl, ($C_2$-$C_6$) alkenyl, ($C_2$-$C_6$) alkynyl, ($C_1$-$C_6$) haloalkyl, ($C_1$-$C_6$) haloalkoxy, (($C_1$-$C_6$) alkyl)$_3$-silyl, ($C_6$-$C_{10}$) aryl, ($C_3$-$C_{10}$) cycloalkyl, 5-10 membered heteroaryl, 4-10 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-10 membered heteroaryl)-($C_1$-$C_4$) alkylene-, (4-10 membered heterocycloalkyl)-($C_1$-$C_4$) alkylene-, —CN, —OH, —NH$_2$, —NO$_2$, —NHOR$^c$, —OR$^c$, —SR$^c$, —C(O)R$^c$, —C(O)NR$^c$R$^c$, —C(O)OR$^c$, —C(O)NR$^c$S(O)$_2$R$^c$, —OC(O)R$^c$, —OC(O)NR$^c$R$^c$, —C(=NOH)R$^c$, —C(=NOH)NR$^c$, —C(=NCN)NR$^c$R$^c$, —NR$^c$C(=NCN)NR$^c$R$^c$, —C(=NR$^c$)NR$^c$R$^c$, —NR$^c$C(=NR$^c$)NR$^c$R$^c$, —NHR$^c$, —NR$^c$R$^c$, —NR$^c$C(O)R$^c$, —NR$^c$C(=NR$^c$)R$^c$, —NR$^c$C(O)OR$^c$, —NR$^c$C(O)NR$^c$R$^c$, —NR$^c$S(O)R$^c$, —NR$^c$S(O)$_2$R$^c$, —NR$^c$S(O)$_2$NR$^c$R$^c$, —S(O)R$^c$, —S(O)NR$^c$R$^c$, —S(O)$_2$R$^c$, —S(O)$_2$NR$^c$C(O)R$^c$, —Si(R$^c$)$_3$, —P(O)R$^c$R$^c$, —P(O)(OR$^c$)(OR$^c$), —B(OH)$_2$, —B(OR$^c$)$_2$, and —S(O)$_2$NR$^c$R$^c$, wherein the ($C_1$-$C_6$) alkyl, ($C_1$-$C_6$) haloalkyl, ($C_1$-$C_6$) haloalkoxy, ($C_2$-$C_6$) alkenyl, ($C_2$-$C_6$) alkynyl, ($C_6$-$C_{10}$) aryl, ($C_3$-$C_{10}$) cycloalkyl, 5-10 membered heteroaryl, 4-10 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-10 membered heteroaryl)-($C_1$-$C_4$) alkylene-, and (4-10 membered heterocycloalkyl)-($C_1$-$C_4$) alkylene- of $R^b$ are each further optionally substituted with 1, 2, or 3 independently selected $R^d$ substituents;

each $R^c$ is independently selected from the group consisting of —H, ($C_1$-$C_6$) alkyl, ($C_1$-$C_6$) haloalkyl, ($C_2$-$C_6$) alkenyl, ($C_2$-$C_6$) alkynyl, ($C_6$-$C_{10}$) aryl, ($C_3$-$C_{10}$) cycloalkyl, 5-10 membered heteroaryl, 4-10 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-10 membered heteroaryl)-($C_1$-$C_4$) alkylene-, and (4-10 membered heterocycloalkyl)-($C_1$-$C_4$) alkylene-, wherein the ($C_1$-$C_6$) alkyl, ($C_2$-$C_6$) alkenyl, ($C_2$-$C_6$) alkynyl, ($C_6$-$C_{10}$) aryl, ($C_3$-$C_{10}$) cycloalkyl, 5-10 membered heteroaryl, 4-10 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-10 membered heteroaryl)-($C_1$-$C_4$) alkylene-, and (4-10 membered heterocycloalkyl)-($C_1$-$C_4$) alkylene- of $R^c$ are each optionally substituted with 1, 2, 3, 4, or 5 independently selected $R^f$ substituents;

each $R^d$ is independently selected from the group consisting of ($C_1$-$C_6$) alkyl, ($C_1$-$C_6$) haloalkyl, halo, ($C_6$-$C_{10}$) aryl, 5-10 membered heteroaryl, ($C_3$-$C_{10}$) cycloalkyl, 4-10 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-10 membered heteroaryl)-($C_1$-$C_4$) alkylene-, (4-10 membered heterocycloalkyl)-($C_1$-$C_4$) alkylene-, —CN, —NH$_2$, —NHOR$^e$, —OR$^e$, —SR$^e$, —C(O)R$^e$, —C(O)NR$^e$R$^e$, —C(O)OR$^e$, —OC(O)R$^e$, —OC(O)NR$^e$R$^e$, —NHR$^e$, —NR$^e$R$^e$, —NR$^e$C(O)R$^e$, —NR$^e$C(O)NR$^e$R$^e$, —NR$^e$C(O)OR$^e$, —C(=NR$^e$)NR$^e$R$^e$, —NR$^e$C(=NR$^e$)NR$^e$R$^e$, —NR$^e$C(=NOH)NR$^e$R$^e$, —NR$^e$C(=NCN)NR$^e$R$^e$, —S(O)R$^e$, —S(O)NR$^e$R$^e$, —S(O)$_2$R$^e$, —NR$^e$S(O)$_2$R$^e$, —NR$^e$S(O)$_2$NR$^e$R$^e$, and —S(O)$_2$NR$^e$R$^e$, wherein the ($C_1$-$C_6$) alkyl, ($C_1$-$C_6$) haloalkyl, ($C_6$-$C_{10}$) aryl, 5-10 membered heteroaryl, ($C_3$-$C_{10}$) cycloalkyl, 4-10 membered heterocycloalkyl, ($C_6$-$C_{10}$) aryl-($C_1$-$C_4$) alkylene-, ($C_3$-$C_{10}$) cycloalkyl-($C_1$-$C_4$) alkylene-, (5-10 membered heteroaryl)-($C_1$-$C_4$) alkylene-, and (4-10 membered heterocycloalkyl)-($C_1$-$C_4$) alkylene- of $R^d$ are each optionally substituted with 1, 2, or 3 independently selected $R^f$ substituents;

each $R^e$ is independently selected from the group consisting of —H, ($C_1$-$C_6$) alkyl, ($C_3$-$C_6$) cycloalkyl, ($C_3$-$C_6$) cycloalkyl-($C_1$-$C_4$) alkylene-, ($C_6$-$C_{10}$) aryl, ($C_6$-$C_{10}$) aryl-($C_1$-$C_4$) alkylene-, 5- or 6-membered heteroaryl, (5- or 6-membered heteroaryl)-($C_1$-$C_4$) alkylene-, 4-7-membered heterocycloalkyl, (4-7-membered heterocycloalkyl)-($C_1$-$C_4$) alkylene-, ($C_1$-$C_6$) haloalkyl, ($C_1$-$C_6$) haloalkoxy, ($C_2$-$C_4$) alkenyl, and ($C_2$-$C_4$) alkynyl, wherein the ($C_1$-$C_4$) alkyl, ($C_3$-$C_6$) cycloalkyl, ($C_6$-$C_{10}$) aryl, 5 or 6-membered heteroaryl, 4-7-membered heterocycloalkyl, ($C_6$-$C_{10}$) aryl-($C_1$-$C_4$) alkylene-, (5- or 6-membered heteroaryl)-($C_1$-$C_4$) alkylene-, (4-7-membered heterocycloalkyl)-($C_1$-$C_4$) alkylene-, ($C_2$-$C_4$) alkenyl, and ($C_2$-$C_4$) alkynyl of $R^e$ are each optionally substituted with 1, 2, or 3 $R^f$ substituents, or any two $R^a$ substituents together with the nitrogen atom to which they are attached form 4-, 5-, 6-, 7-, 8-, 9-, or 10-membered heterocycloalkyl, each of which is optionally substituted with 1, 2, or 3 independently selected $R^f$ substituents;

or any two $R^c$ substituents together with the nitrogen atom to which they are attached form 4-, 5-, 6-, 7-, 8-, 9-, or 10-membered heterocycloalkyl, each of which is optionally substituted with 1, 2, or 3 independently selected $R^f$ substituents, or any two $R^e$ substituents together with the nitrogen atom to which they are attached form 4-, 5-, 6-, 7-, 8-, 9-, or 10-membered heterocycloalkyl, each of which is optionally substituted with 1, 2, or 3 independently selected $R^f$ substituents;

each $R^f$ is independently selected from the group consisting of halo, —OH, —CN, —COOH, —NH$_2$, —NH—($C_1$-$C_6$) alkyl, —N(($C_1$-$C_6$) alky)$_2$, SO$_2$, $C_1$-$C_6$ alkyl-SO$_2$—, $C_1$-$C_6$alkyl-C(O)—, ($C_1$-$C_6$) alkyl, ($C_1$-$C_6$) alkoxy, ($C_1$-$C_6$) alkylthio, ($C_1$-$C_6$) haloalkyl, ($C_1$-$C_6$) haloalkoxy, phenyl, 5-6 membered heteroaryl, 4-6 membered heterocycloalkyl, and ($C_3$-$C_6$) cycloalkyl, wherein the ($C_1$-$C_6$) alkyl, phenyl, ($C_3$-$C_6$) cycloalkyl, 4-6 membered heterocycloalkyl, and 5-6 membered heteroaryl of $R^f$ are each optionally substituted with 1, 2, or 3 substituents selected from halo, —OH, —CN, —COOH, —NH$_2$, ($C_1$-$C_4$) alkyl, ($C_1$-$C_4$) alkoxy, ($C_1$-$C_4$) haloalkyl, ($C_1$-$C_4$) haloalkoxy, phenyl, ($C_3$-$C_{10}$) cycloalkyl, 5-6 membered heteroaryl, and 4-6 membered heterocycloalkyl;

each $R^g$ is independently selected from the group consisting of halo, —OH, —CN, —COOH, —COO—($C_1$-$C_4$)alkyl, $C_1$-$C_6$ alkyl-C(O)—, —NH$_2$, —NH—($C_1$-$C_6$) alkyl, —N(($C_1$-$C_6$) alky)$_2$, ($C_1$-$C_6$) alkyl, ($C_1$-$C_6$) alkoxy, ($C_1$-$C_6$) alkylthio, ($C_1$-$C_6$) haloalkyl, ($C_1$-$C_6$) haloalkoxy, phenyl, 5-6 membered heteroaryl, 4-6 membered heterocycloalkyl, and ($C_3$-$C_6$) cycloalkyl;

Y is selected from —O—, —S—, —SO—, —SO$_2$—, —NH—, and —N(($C_1$-$C_6$) alkyl)-;

the ring nitrogen atom on the quinoline moiety in Formula I is optionally oxidized;

the subscript n is an integer of 1, 2, 3, or 4;

the subscript m is an integer of 1, 2, 3, or 4; and the subscript p is an integer of 0, 1, 2, 3, or 4.

In one embodiment of this aspect, when $R^1$ or $R^2$ is 5-7 membered heteroaryl or 5-7 membered heterocycloalkyl, then the 5-7 membered heteroaryl or 5-7 membered heterocycloalkyl of $R^1$ or $R^2$ does not connect to the fused phenyl ring of the quinoline moiety through a ring nitrogen atom.

In another embodiment, $R^9$ is selected from the group consisting of —H, halo, —OH, —COOR$^c$, —CONR$^c$R$^c$, —CN, —NH$_2$, —NH(($C_1$-$C_6$) alkyl), —N(($C_1$-$C_6$) alkyl)$_2$, ($C_1$-$C_6$) alkyl, ($C_1$-$C_6$) alkoxy, ($C_1$-$C_6$) haloalkyl, ($C_1$-$C_6$) haloalkoxy, —CONR$^a$R$^a$, —NR$^a$COR$^a$, —NR$^a$CONR$^a$R$^a$, —SO$_2$R$^a$, —NR$^a$S(O)$_2$R$^a$, —NR$^a$S(O)$_2$NR$^a$R$^a$, ($C_3$-$C_6$) cycloalkyl, 4- to 6-membered heterocycloalkyl, phenyl, 5- or 6-membered heteroaryl, ($C_3$-$C_6$) cycloalkyl-($C_1$-$C_4$) alkylene-, (4- to 6-membered heterocycloalkyl)-($C_1$-$C_4$) alkylene-, phenyl-($C_1$-$C_2$) alkylene, and (5- or 6-membered heteroaryl)-($C_1$-$C_4$) alkylene-, wherein the ($C_1$-$C_6$) alkyl, ($C_3$-$C_6$) cycloalkyl, 4- to 6-membered heterocycloalkyl, phenyl, 5- or 6-membered heteroaryl, ($C_3$-$C_6$) cycloalkyl-($C_1$-$C_4$) alkylene-, (4- to 6-membered heterocycloalkyl)-($C_1$-$C_4$) alkylene-, phenyl-($C_1$-$C_2$) alkylene, and (5- or 6-membered heteroaryl)-($C_1$-$C_4$) alkylene- of $R^9$ are each optionally substituted with 1, 2, or 3 independently selected $R^f$ substituents.

In one embodiment, $R^8$ and $R^9$ together with the atoms to which they are attached form fused 5-10 membered heteroaryl or fused 5-10 membered heterocycloalkyl, each of which is optionally substituted with 1 or 2 independently selected $R^g$ substituents and wherein the 5-10 membered heteroaryl or 5-10 membered heterocycloalkyl has 0-2 additional heteroatoms as ring members selected from N, or and S.

In one embodiment, Y is O.

In one embodiment, $R^5$ and $R^6$ are each H.

In one embodiment of this aspect, the compound of Formula I is a compound of Formula (Ia):

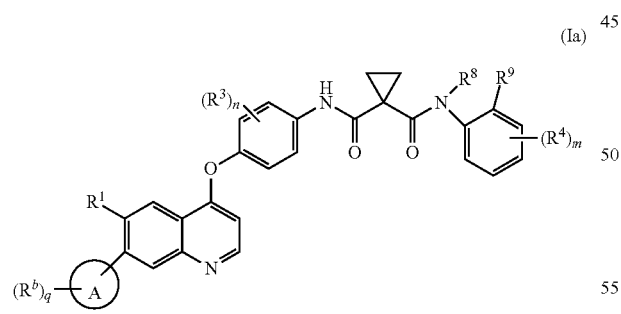

(Ia)

or a pharmaceutically acceptable salt thereof, wherein:

ring A is phenyl, $C_{3-6}$ cycloalkyl, 5-10 membered heteroaryl or 4-10 membered heterocycloalkyl;

the subscript q is an integer of 0, 1, 2 or 3; and the subscript m is an integer of 1, 2 or 3.

In one embodiment of this aspect, the compound of Formula I is a compound of Formula (Ib):

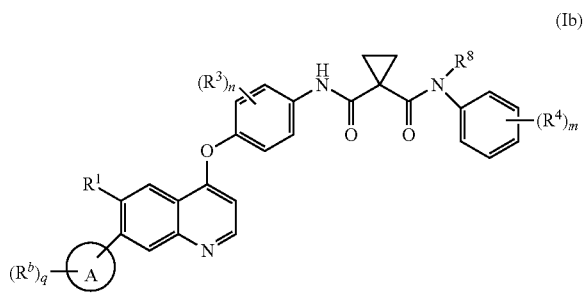

(Ib)

or a pharmaceutically acceptable salt thereof, wherein:

ring A is phenyl, $C_{3-6}$ cycloalkyl, 5-10 membered heteroaryl or 4-10 membered heterocycloalkyl;

the subscript q is an integer of 0, 1, 2 or 3; and the subscript m is an integer of 1, 2 or 3.

In one embodiment of this aspect, the compound of Formula I is a compound of Formula (Ic):

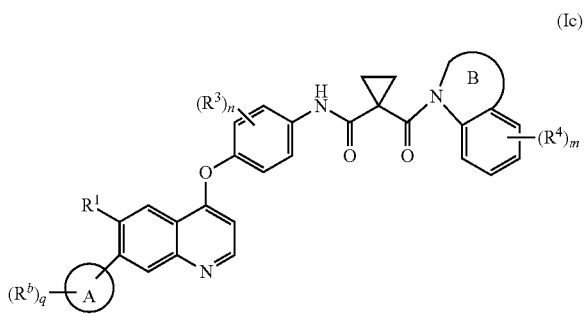

(Ic)

or a pharmaceutically acceptable salt thereof, wherein: — ring A is phenyl, $C_{3-6}$ cycloalkyl, 5-10 membered heteroaryl or 4-10 membered heterocycloalkyl;

ring B is fused 5-6 membered heteroaryl or fused 5-7 membered heterocycloalkyl;

the subscript q is an integer of 0, 1, 2 or 3; and the subscript m is an integer of 1, 2 or 3.

In one embodiment of this aspect, the compound of Formula I is a compound of Formula (Ia-1):

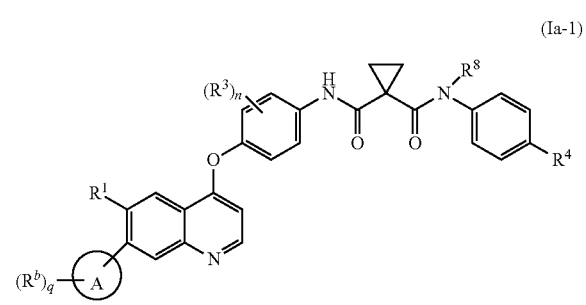

(Ia-1)

or a pharmaceutically acceptable salt thereof.

In one embodiment of this aspect, the compound of Formula I is a compound of Formula (Ia-2):

(Ia-2)

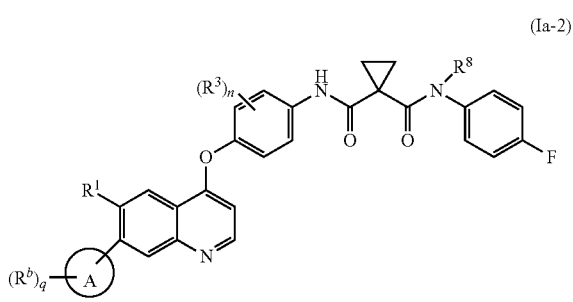

or a pharmaceutically acceptable salt thereof.

In one embodiment of this aspect, the compound of Formula I is a compound of Formula (Ia-3):

(Ia-3)

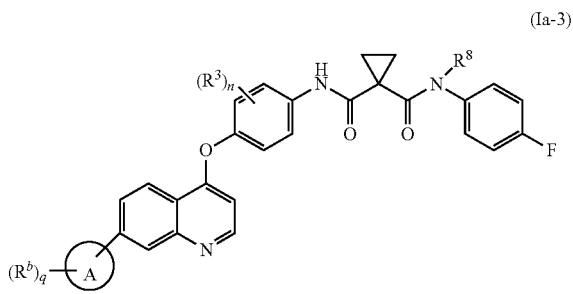

or a pharmaceutically acceptable salt thereof.

In one embodiment, $R^1$ is H, $C_{1-6}$ alkyl, $C_{1-6}$ alkoxy, halo or $C_{1-6}$ alkyl-NHC(O)—.

In another embodiment, $R^1$ is H, $CH_3$ or halo.

In a further embodiment, $R^1$ is H.

In one embodiment, $R^2$ is phenyl, pyrazolyl, imidazolyl, isoxazolyl, oxazolyl, triazolyl, oxadiazolyl, pyridyl, pyrimidinyl, pyrazinyl, pyridazinyl, furanyl, thiazolyl, tetrahydrofuranyl, dihydrofuranyl, pyrrolopyrazolyl, or pyrazolopyridinyl, each of which is optionally substituted with 1, 2 or 3 independently selected $R^f$ substituents.

In another embodiment, ring A is phenyl, pyrazolyl, imidazolyl, isoxazolyl, oxazolyl, triazolyl, oxadiazolyl, pyridyl, pyrimidinyl, pyrazinyl, pyridazinyl, furanyl, thiazolyl, tetrahydrofuranyl, dihydrofuranyl, pyrrolopyrazolyl, or pyrazolopyridinyl.

In one embodiment, $R^b$ is $C_{1-6}$ alkyl, $C_{1-6}$ alkoxy, CN, halo, OH, $NH_2$, $SO_2$, HO—$C_{1-6}$ alkyl-, $C_{1-6}$ haloalkyl, $C_{1-6}$ haloalkoxy, $C_{3-6}$ cycloalkyl, $C_{3-6}$ cycloalkyl-$C_{1-4}$alkyl-, 4-6 membered heterocycloalkyl, 4-6 membered heterocycloalkyl-$C_{1-4}$ alkyl-, $C_{1-6}$ alkyl-$SO_2$—, $C_{1-6}$ alkyl-C(O)—, —NH—($C_1$-$C_6$) alkyl, —N(($C_1$-$C_6$) ally)$_2$, phenyl, 5-6 membered heteroaryl, or 5-6 membered heteroaryl-$C_{1-4}$ alkyl-, wherein the $C_{1-6}$ alkyl, $C_{3-6}$ cycloalkyl, $C_{3-6}$ cycloalkyl-$C_{1-4}$alkyl-, 4-6 membered heterocycloalkyl, 4-6 membered heterocycloalkyl-$C_{1-4}$, phenyl, 5-6 membered heteroaryl, and 5-6 membered heteroaryl-$C_{1-4}$ alkyl are each optionally substituted with 1 or 2 independently selected $R^g$ substituents.

In a further embodiment, $R^b$ is methyl, $SO_2$, hydroxyethyl, $CF_3$, $CF_3CH_2$—, $FCH_2$, $FCH_2CH_2$, $CHF_2CH_2$, cyclopropyl, t-butyl, oxatan-3-yl, halo, methoxy, 1-methylpiperidin-4-yl, 2-methoxyethyl, $NH_2$, CN, OH, $CH_3SO_2$—, 2-morpholinoethyl, 4-methylpiperazinyl, and pyrrolin-1-yl.

In one embodiment, $R^2$ is selected from 2-oxazolyl, 4-oxazolyl, 5-oxazolyl, 1H-pyrazol-4-yl, 1H-pyrazol-3-yl, 1H-pyrazol-5-yl, 3-pyridyl, 4-pyridyl, 2-pyridyl, 4-isoxazolyl, 3-isoxazolyl, 5-isoxazolyl, pyrrolidin-1-yl, pyrrolidin-2-yl, pyrrolidin-3-yl, pyrimidin-2-yl, pyrimidin-4-yl, pyrimidin-5-yl, pyrazin-2-yl, pyridazin-3-yl, pyridazin-4-yl, 2-thiazolyl, 4-thiazolyl and 5-thiazolyl, each of which is optionally substituted with 1 or 2 independently selected $R^f$ substituents.

In a further embodiment, $R^2$ is selected from 2-oxazolyl, 4-oxazolyl, 1H-pyrazol-4-yl, 1H-pyrazol-3-yl, 1H-pyrazol-5-yl, 1-methylpyrazol-5-yl, 1-methylpyrazol-4-yl, 1-ethylpyrazol-5-yl, 1-difluoromethylpyrazol-4-yl, 1-methylpyrazol-3-yl, 1-(4-piperidinyl)pyrazol-4-yl, 1-(2-morpholinoethyl)pyrazol-4-yl, 1-(2-hydroxyethyl)pyrazol-4-yl, 1-(2,2,2-trifluoroethyl)pyrazol-4-yl, 1-(2-fluoroethyl)pyrazol-4-yl, 1-(2,2-difluoroethyl)pyrazol-4-yl, 1-fluoromethylpyrazol-4-yl, 1-isopropylpyrazol-4-yl, 1-cyclopropylpyrazol-4-yl, 1-t-butylpyrazol-4-yl, 1-methylsulfonylpyrazol-4-yl, 1-(1-methyl-4-piperidinyl)pyrazol-4-yl, 1-(1-methylcarbonyl-4-piperidinyl)pyrazol-4-yl, 3-amino-1H-pyrazol-4-yl, 3-methyl-pyrazol-1-yl, 4-methyl-pyrazol-1-yl, 1-cyclopropylpyrazol-3-yl, 1-fluoromethylpyrazol-3-yl, 5-methyl-1H-pyrazol-3-yl, 5-trifluoromethyl-1H-pyrazol-3-yl, 1,5-dimethylpyrazol-3-yl, 1-fluoromethylpyrazol-5-yl, 3-pyridyl, 4-pyridyl, 2-pyridyl, 5-methoxy-3-pyridyl, 2-methoxy-4-pyridyl, 6-methyl-3-pyridyl, 6-fluoro-3-pyridyl, 6-cyclopropyl-3-pyridyl, 2-methyl-4-pyridyl, 2-amino-4-pyridyl, 2-fluoro-4-pyridyl, 2-cyano-4-pyridyl, 2-trifluoromethyl-4-pyridyl, 2-(4-methylpiperazin-1-yl)-4-pyridyl, 2,6-dimethyl-4-pyridyl, 6-trifluoromethyl-3-pyridyl, 6-cyano-3-pyridyl, 6-amino-3-pyridyl, 6-(pyrrolidin-1-yl)-3-pyridyl, 6-isopropoxy-3-pyridyl, 6-hydroxy-3-pyridyl, 5-fluoro-3-pyridyl, 5-trifluoromethyl-3-pyridyl, 5-cyano-3-pyridyl, 5-methyl-3-pyridyl, 2-hydroxy-3-pyridyl, pyrimidin-5-yl, oxatan-3-yl, 2-methoxyethyl, tetrahydrofuran-3-yl, imidazol-1-yl, 4-methyl-imidazol-1-yl, pyrrolidin-3-yl, 1-methycarbonylpyrrolidin-3-yl, 1-methylsulfonylpyrrolidin-3-yl, 2,3-dihydrofuran-4-yl, pyrazolo[1,5]pyridine-2-yl, 5,6-dihydro-4H-pyrrolo[1,2-b]pyrazol-3-yl, 4-isoxazolyl, 3-isoxazolyl, 5-isoxazolyl, 1H-imidazol-2-yl, 1H-imidazol-4-yl, 1H-1,2,3-triazol-5-yl, 1H-1,2,3-triazol-4-yl, 2-methyltriazol-4-yl, pyridazin-4-yl, and 1,3,4-oxadiazol-2-yl.

In one embodiment, $R^3$ is H or halo.
In one embodiment, $R^4$ is $C_{1-6}$ alkyl or halo.
In one aspect, the invention includes a compound of Formula II:

II

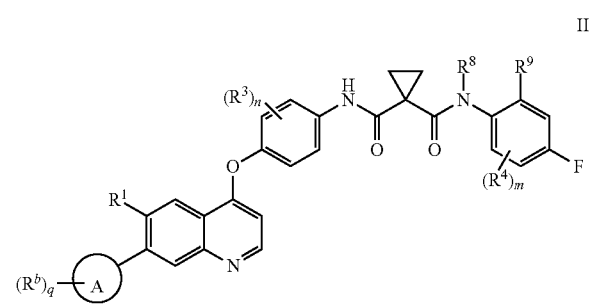

or a pharmaceutically acceptable salt thereof, wherein:
Ring A is selected from phenyl, 5-10 membered heteroaryl, or 4-10 membered heterocycloalkyl;
$R^1$ is selected from —H, halo, ($C_1$-$C_6$) alkyl, ($C_2$-$C_6$) alkenyl, ($C_2$-$C_6$) alkynyl, ($C_1$-$C_6$) haloalkyl, ($C_1$-$C_6$) haloalkoxy, —CN, —$NO_2$, —$NH_2$, —COOH, —O($C_1$-

$C_6$) alkyl, —S($C_1$-$C_6$) alkyl, —NHO($C_1$-$C_6$) alkyl, —C(O)($C_1$-$C_6$) alkyl, —C(O)$NH_2$, —C(O)NH($C_1$-$C_6$) alkyl, —C(O)N(($C_1$-$C_6$) alkyl)$_2$, —C(O)NHO($C_1$-$C_6$) alkyl, —C(O)O($C_1$-$C_6$) alkyl, —NH($C_1$-$C_6$) alkyl, —N(($C_1$-$C_6$) alkyl)$_2$, —N(($C_1$-$C_6$) alkyl)C(O)($C_1$-$C_6$) alkyl, —NHC(O)($C_1$-$C_6$) alkyl, —N(($C_1$-$C_6$) alkyl)S(O)$_2$($C_1$-$C_6$) alkyl, —NHS(O)$_2$($C_1$-$C_6$) alkyl, —S(O)($C_1$-$C_6$) alkyl, —S(O)$_2$($C_1$-$C_6$) alkyl, —S(O)$_2$N(($C_1$-$C_6$) alkyl)$_2$, —S(O)$_2$NH($C_1$-$C_6$) alkyl, and —S(O)$_2$$NH_2$, wherein $R_1$ is optionally substituted with one or more substituents selected from halo, oxo, ($C_1$-$C_6$) alkyl, ($C_1$-$C_6$) alkoxy, —NH($C_1$-$C_6$) alkyl, and —N(($C_1$-$C_6$) alkyl)$_2$;

each $R^3$ is independently selected from the group consisting of —H, halo, —OH, —CN, and ($C_1$-$C_6$) alkyl optionally substituted with halo, —OH, —CN, —COOH, —COO—($C_1$-$C_4$)alkyl, —$NH_2$, —NH—($C_1$-$C_6$) alkyl, —N(($C_1$-$C_6$) alky)$_2$, ($C_1$-$C_6$) alkoxy, or ($C_1$-$C_6$) alkylthio;

$R^8$ and $R^9$ are each independently H or $C_{1-6}$ alkyl, wherein each $C_{1-6}$ alkyl is optionally and independently substituted with 1 or 2 substituents selected from halo, —OH, —CN, —COOH, —COO—($C_1$-$C_4$)alkyl, —$NH_2$, or ($C_1$-$C_6$) alkoxy;

or $R^8$ and $R^9$ together with the atoms to which they are attached form fused 5-10 membered heterocycloalkyl optionally substituted with 1 or 2 substituents independently selected from halo, oxo, —OH, —CN, and ($C_1$-$C_6$) alkyl optionally substituted with halo, —OH, —CN, —COOH, —COO—($C_1$-$C_4$)alkyl, —$NH_2$, —NH—($C_1$-$C_6$) alkyl, —N(($C_1$-$C_6$) alky)$_2$, ($C_1$-$C_6$) alkoxy, or ($C_1$-$C_6$) alkylthio;

each $R^4$ is independently selected from —H, halo, ($C_1$-$C_6$) alkyl, ($C_1$-$C_6$) haloalkyl, ($C_1$-$C_6$) haloalkoxy, —CN, —$NO_2$, —$NH_2$, —COOH, —O($C_1$-$C_6$) alkyl, —C(O)($C_1$-$C_6$) alkyl, —C(O)$NH_2$, —C(O)NH($C_1$-$C_6$) alkyl, —C(O)N(($C_1$-$C_6$) alkyl)$_2$, C(O)O($C_1$-$C_6$) alkyl, —NH($C_1$-$C_6$) alkyl, —N(($C_1$-$C_6$) alkyl)$_2$, —N(($C_1$-$C_6$) alkyl)C(O)($C_1$-$C_6$) alkyl, —NHC(O)($C_1$-$C_6$) alkyl, —S(O)$_2$N(($C_1$-$C_6$) alkyl)$_2$, —S(O)$_2$NH($C_1$-$C_6$) alkyl, and —S(O)$_2$$NH_2$, wherein $R_4$ is optionally substituted with one or more substituents selected from halo, oxo, ($C_1$-$C_6$) alkyl, ($C_1$-$C_6$) alkoxy, —NH($C_1$-$C_6$) alkyl, and —N(($C_1$-$C_6$) alkyl)$_2$;

each $R^b$ is independently selected from the group consisting of halo, oxo, ($C_1$-$C_6$) alkyl, ($C_1$-$C_6$) alkoxy, ($C_2$-$C_6$) alkenyl, ($C_2$-$C_6$) alkynyl, ($C_1$-$C_6$) haloalkyl, ($C_1$-$C_6$) haloalkoxy, phenyl, ($C_3$-$C_{10}$) cycloalkyl, 5-10 membered heteroaryl, 4-10 membered heterocycloalkyl, (5-10 membered heteroaryl)-($C_1$-$C_4$) alkylene-, (4-10 membered heterocycloalkyl)-($C_1$-$C_4$) alkylene-, —CN, —OH, —$NH_2$, —$NO_2$, —C(O)($C_1$-$C_6$) alkyl, —C(O)NH($C_1$-$C_6$) alkyl, —C(O)N(($C_1$-$C_6$) alkyl)$_2$, —C(O)O($C_1$-$C_6$) alkyl, —NH($C_1$-$C_6$) alkyl, —N(($C_1$-$C_6$) alkyl)$_2$, —S(O)$_2$($C_1$-$C_6$) alkyl, —S(O)$_2$NH($C_1$-$C_6$) alkyl, —S(O)$_2$N(($C_1$-$C_6$) alkyl)$_2$, wherein each $R^b$ is optionally and independently substituted with 1, 2, or 3 substituents selected from the group consisting of ($C_1$-$C_6$) alkyl, ($C_1$-$C_6$) alkoxy, ($C_1$-$C_6$) haloalkyl, halo, phenyl, 5-10 membered heteroaryl, ($C_3$-$C_{10}$) cycloalkyl, 4-10 membered heterocycloalkyl, —OH, —CN, —$NH_2$, —C(O)($C_1$-$C_6$) alkyl, —C(O)NH($C_1$-$C_6$) alkyl, —C(O)O($C_1$-$C_6$) alkyl, —NH($C_1$-$C_6$) alkyl, and —S(O)$_2$NH($C_1$-$C_6$) alkyl;

the subscript n is an integer of 1, 2, 3, or 4;
the subscript m is an integer of 1, 2, or 3; and
the subscript q is an integer of 0, 1, 2, 3, 4, or 5.

In one embodiment of this aspect, each $R^4$ is independently selected from halo, ($C_1$-$C_6$) alkyl, ($C_1$-$C_6$) haloalkyl, —CN, —$NH_2$, —COOH, —O($C_1$-$C_6$) alkyl, —C(O)($C_1$-$C_6$) alkyl, and —NH($C_1$-$C_6$) alkyl.

In another embodiment, each $R^4$ is independently selected from halo and ($C_1$-$C_6$) alkyl.

In a further embodiment, each $R^4$ is independently selected from methyl, ethyl, propyl, and isopropyl, and m is 0, 1, or 2.

In still a further embodiment, each $R^4$ is methyl and m is 0 or 2.

In one embodiment, m is 0.

In one embodiment, each $R^3$ is independently selected from the group consisting of halo, —OH, —CN, and ($C_1$-$C_6$) alkyl.

In another embodiment, each $R^3$ is independently selected from the group consisting of halo and ($C_1$-$C_6$) alkyl, and n is 0, 1, 2, or 3.

In a further embodiment, each $R^3$ is independently selected from the group consisting of F, Cl, and Br, and n is 0, 1, 2, or 3.

In still a further embodiment, each $R^3$ is independently selected from the group consisting of F and $C_1$, and n is 0, 2, or 3.

In one embodiment, n is 0.

In one embodiment, $R^1$ is selected from —H, halo, ($C_1$-$C_6$) alkyl, —CN, —$NH_2$, —COOH, —O($C_1$-$C_6$) alkyl, —C(O)($C_1$-$C_6$) alkyl, —C(O)$NH_2$, —C(O)NH($C_1$-$C_6$) alkyl, —C(O)N(($C_1$-$C_6$) alkyl)$_2$, —C(O)O($C_1$-$C_6$) alkyl, —NH($C_1$-$C_6$) alkyl, —N(($C_1$-$C_6$) alkyl)$_2$, —NHC(O)($C_1$-$C_6$) alkyl, —NHS(O)$_2$($C_1$-$C_6$) alkyl, —S(O)$_2$($C_1$-$C_6$) alkyl, —S(O)$_2$N(($C_1$-$C_6$) alkyl)$_2$, —S(O)$_2$NH($C_1$-$C_6$) alkyl, and —S(O)$_2$$NH_2$.

In another embodiment, $R^1$ is selected from —H, halo, ($C_1$-$C_6$) alkyl, —O($C_1$-$C_6$) alkyl, —C(O)$NH_2$, —C(O)NH($C_1$-$C_6$) alkyl, —C(O)N(($C_1$-$C_6$) alkyl)$_2$, —C(O)O($C_1$-$C_6$) alkyl, —NHC(O)($C_1$-$C_6$) alkyl, and —NHS(O)$_2$($C_1$-$C_6$) alkyl.

In a further embodiment, $R^1$ is selected from —H, ($C_1$-$C_6$) alkyl, —O($C_1$-$C_6$) alkyl, and —C(O)NH($C_1$-$C_6$) alkyl.

In still a further embodiment, $R^1$ is —H.

In another further embodiment, $R^1$ is selected from methyl, ethyl, propyl, isopropyl, butyl, and tert-butyl.

In still a further embodiment, wherein $R^1$ is methyl.

In another embodiment, $R^1$ is selected from methoxy, ethoxy, propoxy, and isopropoxy.

In a further embodiment, $R^1$ is methoxy.

In another embodiment, $R^1$ is selected from —C(O)NHMe, —C(O)NHEt, —C(O)NHPr, and —C(O)NHi-Pr.

In a further embodiment, $R^1$ is —C(O)NHMe.

In one embodiment, Ring A is a 4-10 membered heterocycloalkyl.

In a further embodiment, Ring A is selected from pyrrolidinyl, tetrahydrofuranyl, 2,5-dihydrofuranyl, and pyridine-2(1H)-one-yl.

In still a further embodiment, Ring A is selected from 3-pyrrolidinyl, 3-tetrahydrofuranyl, 2,5-dihydrofuran-3-yl, and pyridine-2(1H)-one-4-yl.

In another embodiment, Ring A is phenyl.

In some embodiments, Ring A is a 5-10 membered heteroaryl.

In other embodiments, Ring A is selected from pyrazolyl, imidazolyl, isoxazolyl, oxazolyl, triazolyl, oxadiazolyl, pyridyl, pyrimidinyl, pyridazinyl, thiazolyl, pyrrolopyrazolyl, pyrrolopyridinyl, and pyrazolopyridinyl.

In a further embodiment, Ring A is selected from 1-pyrazolyl, 3-pyrazolyl, 4-pyrazolyl, 5-pyrazolyl, 1-imidazolyl, 2-imidazolyl, 4-imidazolyl, 5-imidazolyl, 4-isoxazolyl, 2-oxazolyl, 3-triazolyl, 5-triazolyl, 2-oxadiazolyl, 2-pyridyl, 3-pyridyl, 4-pyridyl, 4-pyrimidinyl, 5-pyrimidinyl, 4-pyridazinyl, 5-thiazolyl, 5,6-dihydro-4H-pyrrolo[1,2-b]pyrazole-3-yl, 1H-pyrrolo[2,3-b]pyridine-5-yl, and 1H-pyrazolo[3,4-b]pyridine-5-yl.

In one embodiment, each $R^b$ is independently selected from the group consisting of halo, oxo, $(C_1-C_6)$ alkyl, $(C_1-C_6)$ alkoxy, $(C_1-C_6)$ haloalkyl, $(C_3-C_{10})$ cycloalkyl, 4-10 membered heterocycloalkyl, —CN, —OH, —NH$_2$, —C(O)($C_1-C_6$) alkyl, —S(O)$_2$($C_1-C_6$) alkyl, wherein each $R^b$ is optionally and independently substituted with 1, 2, or 3 substituents selected from the group consisting of $(C_1-C_6)$ alkyl, $(C_1-C_6)$ alkoxy, 4-10 membered heterocycloalkyl, —OH, —NH$_2$, and —C(O)($C_1-C_6$) alkyl, and q is 0, 1, or 2.

In a further embodiment, each $R^b$ is independently selected from the group consisting of methyl, ethyl, isopropyl, tert-butyl, hydroxyethyl, fluoromethyl, difluoromethyl, trifluoromethyl, trifluoroethyl, difluoroethyl, fluoroethyl, piperidyl, N-morpholinoethyl, methylsulfonyl, N-methylpiperidyl, cyclopropyl, N-acetylpiperidyl, oxetanyl, methoxyethyl, amino, acetyl, methoxy, isopropoxy, fluoro, cyano, pyrrolidinyl, hydroxyl, oxo, and N-methylpiperizyl.

In some embodiments, the moiety

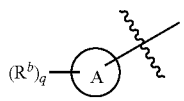

is selected from the group consisting of

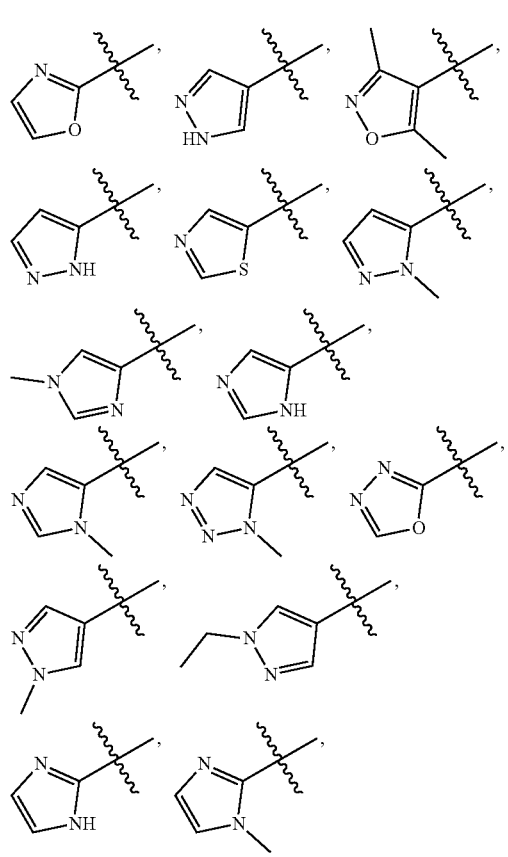

-continued

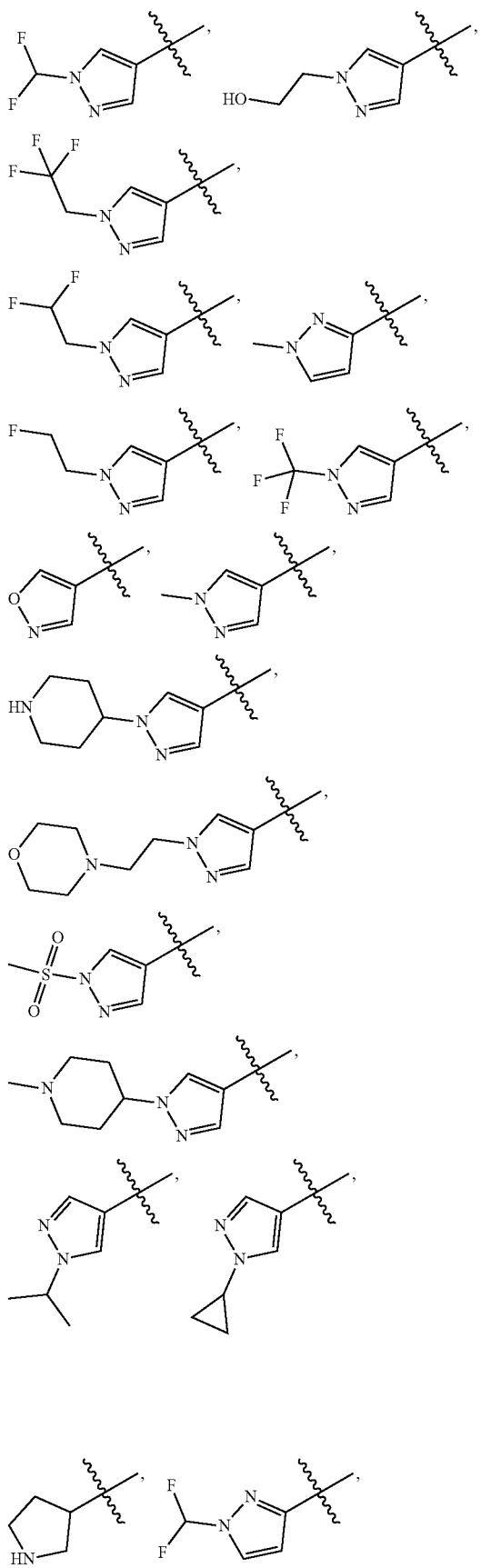

-continued
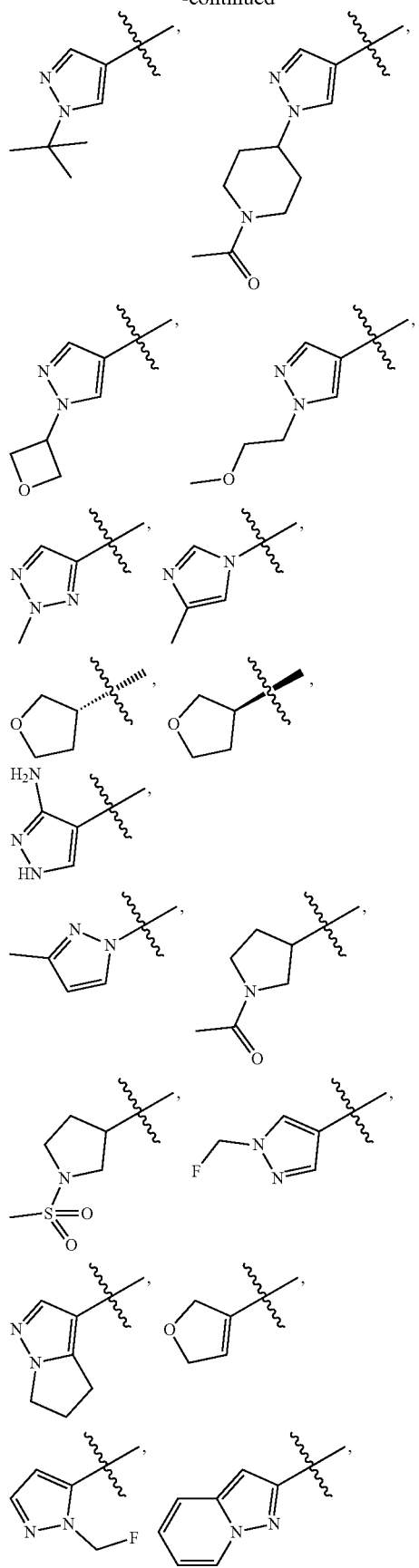
-continued
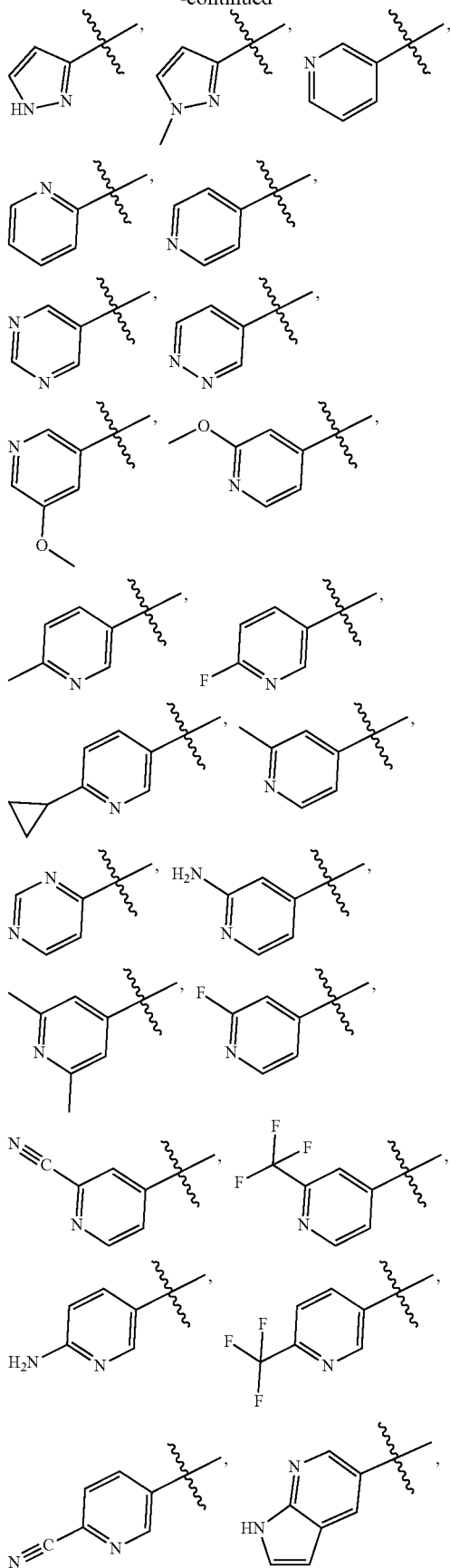

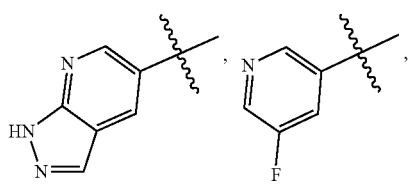

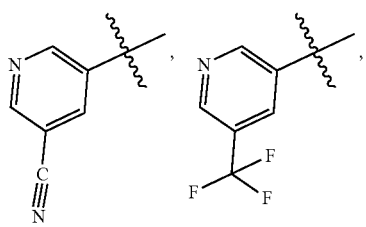

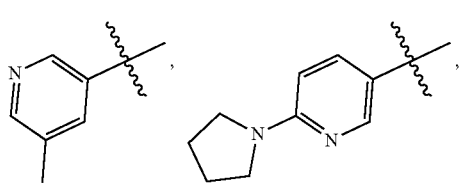

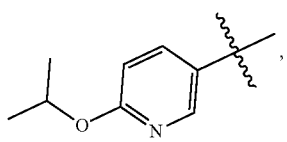

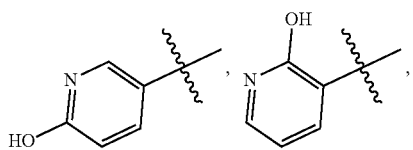

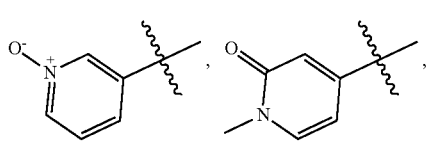

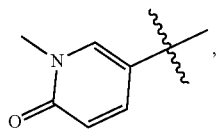

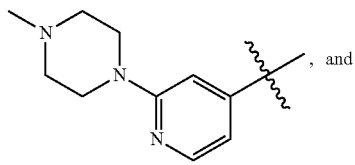

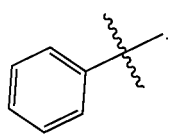 [SMILES: *c1ccccc1]

In one embodiment, the compound of Formula II is a compound of Formula IIa:

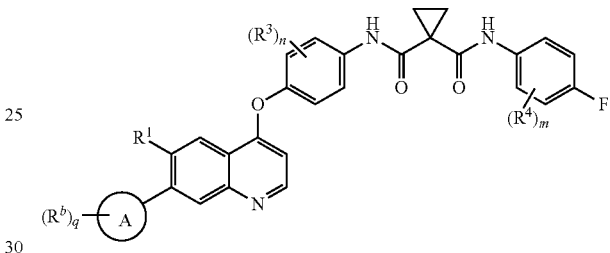

IIa or a pharmaceutically acceptable salt thereof.

In another embodiment, the compound of Formula II is a compound of Formula IIb:

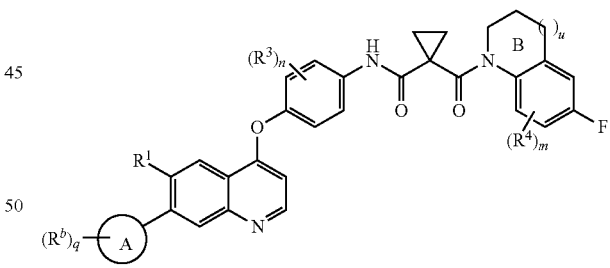

IIb or a pharmaceutically acceptable salt thereof, wherein
u is 0, 1, or 2; and
Ring B is optionally substituted with 1 or 2 substituents independently selected from halo, oxo, and ($C_1$-$C_6$) alkyl optionally substituted with halo or —$NH_2$.

In one embodiment, Ring B is optionally substituted with methyl.

In another embodiment, u is 0 or 1.

In a further embodiment, u is 0.

In one embodiment, the compound of the invention is selected from those listed in Table 1.

TABLE 1

Compounds of Formula 1

| Cmpd. No. | Structure | IUPAC Name |
|---|---|---|
| 10 | 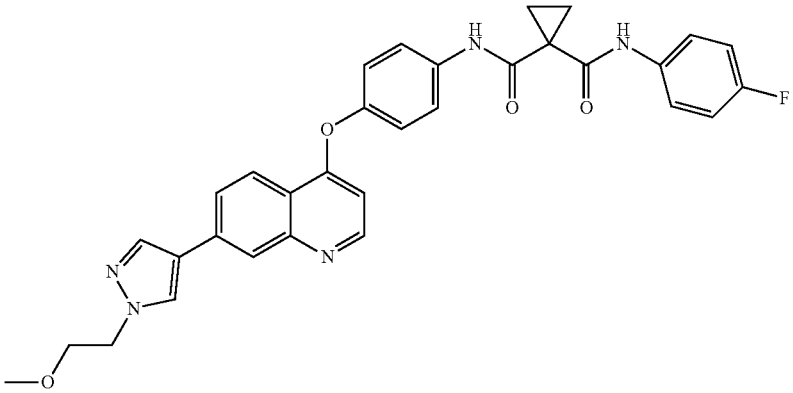 [SMILES: COCCn1cc(-c2ccc3c(Oc4ccc(NC(=O)C5(C(=O)Nc6ccc(F)cc6)CC5)cc4)ccnc3c2)cn1] | 1-N'-(4-fluorophenyl)-1-N-[4-[7-[1-(2-methoxyethyl)pyrazol-4-yl]quinolin-4-yl]oxyphenyl]cyclopropane-1,1-dicarboxamide |
| 11 | 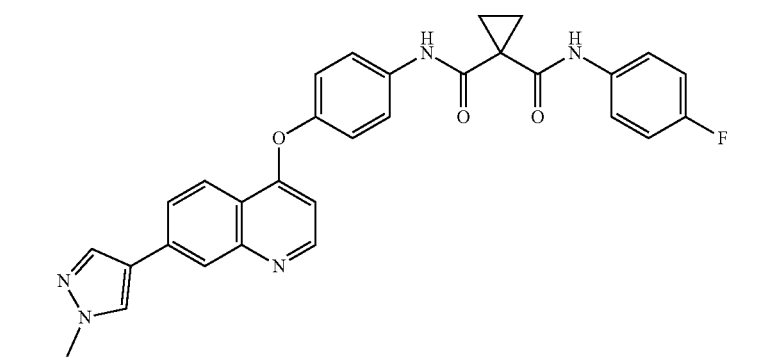 [SMILES: Cn1cc(-c2ccc3c(Oc4ccc(NC(=O)C5(C(=O)Nc6ccc(F)cc6)CC5)cc4)ccnc3c2)cn1] | 1-N'-(4-fluorophenyl)-1-N-[4-[7-(1-methylpyrazol-4-yl)quinolin-4-yl]oxyphenyl]cyclopropane-1,1-dicarboxamide |
| 12 | 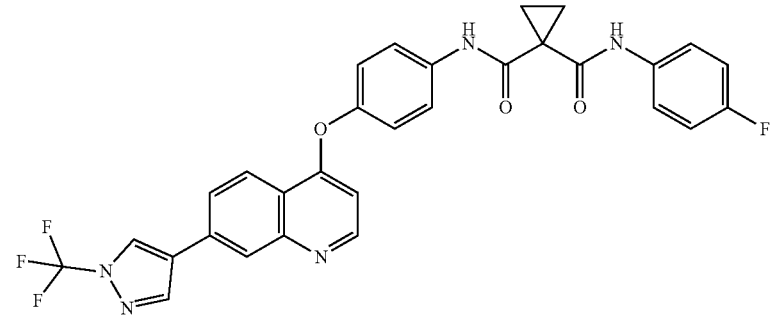 [SMILES: O=C(Nc1ccc(F)cc1)C1(C(=O)Nc2ccc(Oc3ccnc4cc(-c5cnn(C(F)(F)F)c5)ccc34)cc2)CC1] | 1-N'-(4-fluorophenyl)-1-N-[4-[7-[1-(trifluoromethyl)pyrazol-4-yl]quinolin-4-yl]oxyphenyl]cyclopropane-1,1-dicarboxamide |
| 13 | 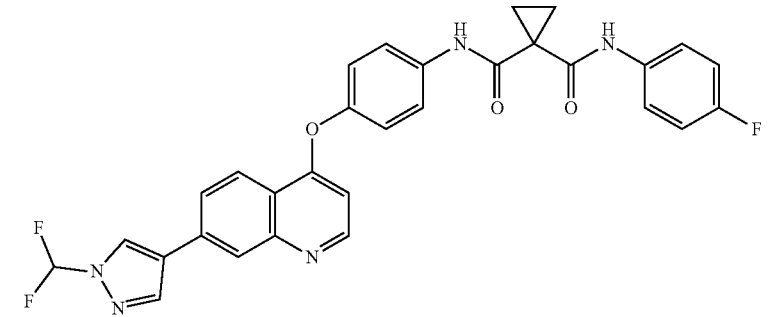 [SMILES: CCn1cc(-c2ccc3c(Oc4ccc(NC(=O)C5(C(=O)Nc6ccc(F)cc6)CC5)cc4)ccnc3c2)cn1] | 1-N-[4-[7-[1-(difluoromethyl)pyrazol-4-yl]quinolin-4-yl]oxyphenyl]-1-N'-(4-fluorophenyl)cyclopropane-1,1-dicarboxamide |

TABLE 1-continued

Compounds of Formula 1

| Cmpd. No. | Structure | IUPAC Name |
|---|---|---|
| 14 | 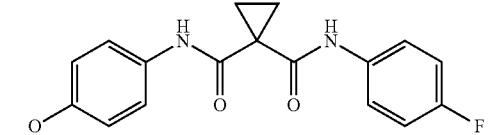 | 1-N-[4-[7-[1-(2-fluoroethyl)pyrazol-4-yl]quinolin-4-yl]oxyphenyl]-1-N'-(4-fluorophenyl)cyclopropane-1,1-dicarboxamide |
| 15 | 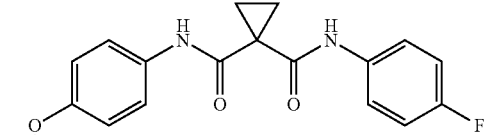 | 1-N-[4-[7-[1-(2,2-difluoroethyl)pyrazol-4-yl]quinolin-4-yl]oxyphenyl]-1-N'-(4-fluorophenyl)cyclopropane-1,1-dicarboxamide |
| 16 | 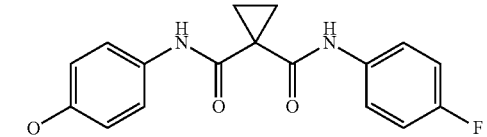 | 1-N'-(4-fluorophenyl)-1-N-[4-[7-[1-(2,2,2-trifluoroethyl)pyrazol-4-yl]quinolin-4-yl]oxyphenyl]cyclopropane-1,1-dicarboxamide |
| 17 | 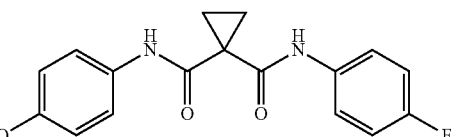 | 1-N'-(4-fluorophenyl)-1-N-[4-[7-(1-methylpyrazol-3-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 18 | | 1-N'-(4-fluorophenyl)-1-N-[4-[7-[1-(2-hydroxyethyl)pyrazol-4-yl]quinolin-4-yl]oxyphenyl]cyclopropane-1,1-dicarboxamide |
| 19 | | 1-N'-(4-fluorophenyl)-1-N-[4-[7-[1-(2-morpholin-4-ylethyl)pyrazol-4-yl]quinolin-4-yl]oxyphenyl]cyclopropane-1,1-dicarboxamide |
| 20 | | 1-N-[4-[7-(1-ethylpyrazol-4-yl)quinolin-4-yl]oxyphenyl]-1-N'-(4-fluorophenyl)cyclopropane-1,1-dicarboxamide |
| 21 | | 1-N'-(4-fluorophenyl)-1-N-[4-[7-(1-propan-2-ylpyrazol-4-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 22 | | 1-N-[4-[7-(1-cyclopropylpyrazol-4-yl)quinolin-4-yl]oxyphenyl]-1-N'-(4-fluorophenyl)cyclopropane-1,1-dicarboxamide |
| 23 | | 1-N-[4-[7-(1-tert-butylpyrazol-4-yl)quinolin-4-yl]oxyphenyl]-1-N'-(4-fluorophenyl)cyclopropane-1,1-dicarboxamide |
| 24 | | 1-N'-(4-fluorophenyl)-1-N-[4-[7-[1-(oxetan-3-yl)pyrazol-4-yl]quinolin-4-yl]oxyphenyl]cyclopropane-1,1-dicarboxamide |
| 25 | | 1-N'-(4-fluorophenyl)-1-N-[4-(7-pyridin-3-ylquinolin-4-yl)oxyphenyl]cyclopropane-1,1-dicarboxamide |

TABLE 1-continued

Compounds of Formula 1

| Cmpd. No. | Structure | IUPAC Name |
|---|---|---|
| 26 | | 1-N'-(4-fluorophenyl)-1-N-[4-(7-pyridin-4-ylquinolin-4-yl)oxyphenyl]cyclopropane-1,1-dicarboxamide |
| 27 | | 1-N'-(4-fluorophenyl)-1-N-[4-(7-pyrimidin-5-ylquinolin-4-yl)oxyphenyl]cyclopropane-1,1-dicarboxamide |
| 28 | | 1-N'-(4-fluorophenyl)-1-N-[4-(7-pyridazin-4-ylquinolin-4-yl)oxyphenyl]cyclopropane-1,1-dicarboxamide |
| 29 | | 1-N-[4-[7-(5,6-dihydro-4H-pyrrolo[1,2-b]pyrazol-3-yl)quinolin-4-yl)oxyphenyl]-1-N'-(4-fluorophenyl)cyclopropane-1,1-dicarboxamide |

TABLE 1-continued

Compounds of Formula 1

| Cmpd. No. | Structure | IUPAC Name |
| --- | --- | --- |
| 30 | | 1-N'-(4-fluorophenyl)-1-N-[4-[7-(2-methylpyridin-4-yl)quinolin-4-yl]oxyphenyl]cyclopropane-1,1-dicarboxamide |
| 31 | | 1-N'-(4-fluorophenyl)-1-N-[4-[7-(2-methoxypyridin-4-yl)quinolin-4-yl]oxyphenyl]cyclopropane-1,1-dicarboxamide |
| 32 | | 1-N-[4-[7-(2,6-dimethylpyridin-4-yl)quinolin-4-yl]oxyphenyl]-1-N'-(4-fluorophenyl)cyclopropane-1,1-dicarboxamide |
| 33 | | 1-N'-(4-fluorophenyl)-1-N-[4-[7-(2-fluoropyridin-4-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 34 | | 1-N-[4-[7-(2-cyanopyridin-4-yl)quinolin-4-yl]oxyphenyl]-1-N'-(4-fluorophenyl)cyclopropane-1,1-dicarboxamide |
| 35 | | 1-N'-(4-fluorophenyl)-1-N-[4-[7-[6-(trifluoromethyl)pyridin-3-yl]quinolin-4-yl]oxyphenyl]cyclopropane-1,1-dicarboxamide |
| 36 | | 1-N'-(4-fluorophenyl)-1-N-[4-[7-[2-(trifluoromethyl)pyridin-4-yl]quinolin-4-yl]oxyphenyl]cyclopropane-1,1-dicarboxamide |
| 37 | | 1-N'-(4-fluorophenyl)-1-N-[4-[7-(6-methylpyridin-3-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 38 | 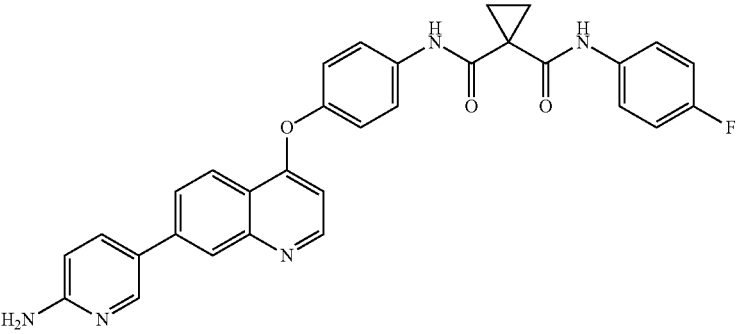 [SMILES: Nc1ccc(-c2ccc3c(Oc4ccc(NC(=O)C5(C(=O)Nc6ccc(F)cc6)CC5)cc4)ccnc3c2)cn1] | 1-N-[4-[7-(6-aminopyridin-3-yl)quinolin-4-yl]oxyphenyl]-1-N'-(4-fluorophenyl)cyclopropane-1,1-dicarboxamide |
| 39 | 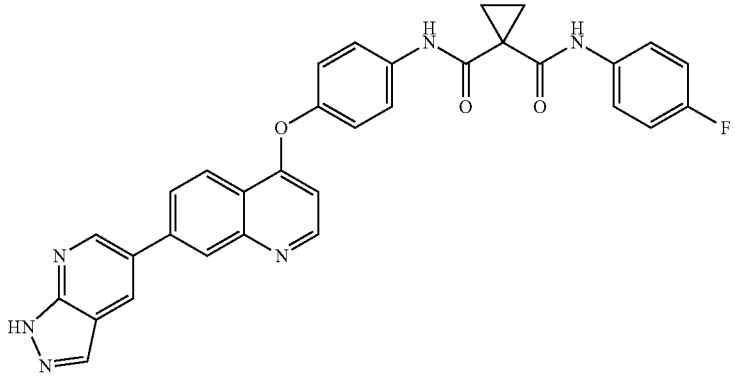 [SMILES: O=C(Nc1ccc(F)cc1)C1(C(=O)Nc2ccc(Oc3ccnc4cc(-c5cnc6[nH]ncc6c5)ccc34)cc2)CC1] | 1-N'-(4-fluorophenyl)-1-N-[4-[7-(1H-pyrazolo[3,4-b]pyridin-5-yl)quinolin-4-yl]oxyphenyl]cyclopropane-1,1-dicarboxamide |
| 40 | 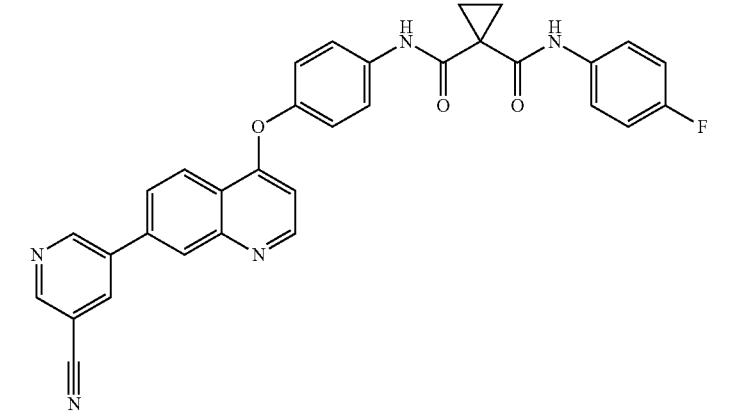 [SMILES: N#Cc1cncc(-c2ccc3c(Oc4ccc(NC(=O)C5(C(=O)Nc6ccc(F)cc6)CC5)cc4)ccnc3c2)c1] | 1-N-[4-[7-(5-cyanopyridin-3-yl)quinolin-4-yl]oxyphenyl]-1-N'-(4-fluorophenyl)cyclopropane-1,1-dicarboxamide |
| 41 | 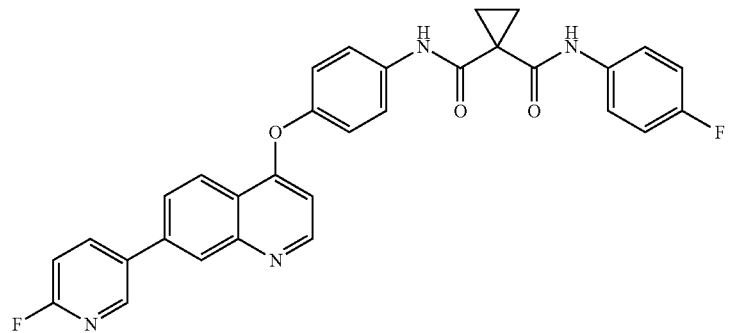 [SMILES: O=C(Nc1ccc(F)cc1)C1(C(=O)Nc2ccc(Oc3ccnc4cc(-c5ccc(F)nc5)ccc34)cc2)CC1] | 1-N'-(4-fluorophenyl)-1-N-[4-[7-(6-fluoropyridin-3-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 42 | | 1-N-[4-[7-(6-cyanopyridin-3-yl)quinolin-4-yl]oxyphenyl]-1-N'-(4-fluorophenyl)cyclopropane-1,1-dicarboxamide |
| 43 | | 1-N-[4-[7-(6-cyclopropylpyridin-3-yl)quinolin-4-yl]oxyphenyl]-1-N'-(4-fluorophenyl)cyclopropane-1,1-dicarboxamide |
| 44 | | 1-N'-(4-fluorophenyl)-1-N-[4-[7-(1H-pyrrolo[2,3-b]pyridin-5-yl)quinolin-4-yl]oxyphenyl]cyclopropane-1,1-dicarboxamide |
| 45 | | 1-N'-(4-fluorophenyl)-1-N-[4-[7-(5-fluoropyridin-3-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 46 | | 1-N'-(4-fluorophenyl)-1-N-[4-[7-(5-methylpyridin-3-yl)quinolin-4-yl]oxyphenyl]cyclopropane-1,1-dicarboxamide |
| 47 | | 1-N'-(4-fluorophenyl)-1-N-[4-[7-(5-methoxypyridin-3-yl)quinolin-4-yl]oxyphenyl]cyclopropane-1,1-dicarboxamide |
| 48 | | 1-N'-(4-fluorophenyl)-1-N-[4-[7-[5-(trifluoromethyl)pyridin-3-yl]quinolin-4-yl]oxyphenyl]cyclopropane-1,1-dicarboxamide |
| 49 | | 1-N'-(4-fluorophenyl)-1-N-[4-[7-(6-pyrrolidin-1-ylpyridin-3-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 50 | | 1-N'-(4-fluorophenyl)-1-N-[4-[7-(6-propan-2-yloxypyridin-3-yl)quinolin-4-yl]oxyphenyl]cyclopropane-1,1-dicarboxamide |
| 51 | | 1-N'-(4-fluorophenyl)-1-N-[4-[7-(6-hydroxypyridin-3-yl)quinolin-4-yl]oxyphenyl]cyclopropane-1,1-dicarboxamide |
| 52 | | 1-N'-(4-fluorophenyl)-1-N-[4-[7-(2-hydroxypyridin-3-yl)quinolin-4-yl]oxyphenyl]cyclopropane-1,1-dicarboxamide |
| 53 | | 1-N-[4-[7-(3,5-dimethyl-1,2-oxazol-4-yl)quinolin-4-yl]oxyphenyl]-1-N'-(4-fluorophenyl)cyclopropane-1,1-dicarboxamide |

TABLE 1-continued

Compounds of Formula 1

| Cmpd. No. | Structure | IUPAC Name |
|---|---|---|
| 54 | | 1-N'-(4-fluorophenyl)-1-N-[4-[7-(2-methylpyrazol-3-yl)quinolin-4-yl]oxyphenyl]cyclopropane-1,1-dicarboxamide |
| 55 | | 1-N'-(4-fluorophenyl)-1-N-[4-(7-phenylquinolin-4-yl)oxyphenyl]cyclopropane-1,1-dicarboxamide |
| 57 | | 1-N'-(4-fluorophenyl)-1-N-[4-[7-(1,2-oxazol-4-yl)quinolin-4-yl]oxyphenyl]cyclopropane-1,1-dicarboxamide |
| 60 | | 1-N'-(4-fluorophenyl)-1-N-[4-[7-(1-piperidin-4-ylpyrazol-4-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 61 | | 1-N'-(4-fluorophenyl)-1-N-[4-[7-[1-(1-methylpiperidin-4-yl)pyrazol-4-yl]quinolin-4-yl]oxyphenyl]cyclopropane-1,1-dicarboxamide |
| 62 | | 1-N-[4-[7-[1-(1-acetylpiperidin-4-yl)pyrazol-4-yl]quinolin-4-yl]oxyphenyl]-1-N'-(4-fluorophenyl)cyclopropane-1,1-dicarboxamide |
| 63 | | 1-N'-(4-fluorophenyl)-1-N-[4-[7-(2-trimethylsilylethynyl)quinolin-4-yl]oxyphenyl]cyclopropane-1,1-dicarboxamide |
| 64 | | 1-N-[4-(7-ethynylquinolin-4-yl)oxyphenyl]-1-N'-(4-fluorophenyl)cyclopropane-1,1-dicarboxamide |

TABLE 1-continued

Compounds of Formula 1

| Cmpd. No. | Structure | IUPAC Name |
|---|---|---|
| 65 | | 1-N'-(4-fluorophenyl)-1-N-[4-[7-(1H-triazol-5-yl)quinolin-4-yl]oxyphenyl]cyclopropane-1,1-dicarboxamide |
| 66 | | 1-N'-(4-fluorophenyl)-1-N-[4-[7-(1,3-oxazol-2-yl)quinolin-4-yl]oxyphenyl]cyclopropane-1,1-dicarboxamide |
| 67 | | 1-N'-(4-fluorophenyl)-1-N-[4-[7-(1H-pyrazol-4-yl)quinolin-4-yl]oxyphenyl]cyclopropane-1,1-dicarboxamide |
| 68 | | 1-N'-(4-fluorophenyl)-1-N-[4-[7-(1H-pyrazol-5-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 69 | | 1-N'-(4-fluorophenyl)-1-N-[4-[7-(1-methylimidazol-4-yl)quinolin-4-yl]oxyphenyl]cyclopropane-1,1-dicarboxamide |
| 72 | | 1-N'-(4-fluorophenyl)-1-N-[4-[7-(1H-imidazol-5-yl)quinolin-4-yl]oxyphenyl]cyclopropane-1,1-dicarboxamide |
| 73 | | 1-N'-(4-fluorophenyl)-1-N-[4-[7-(1,3,4-oxadiazol-2-yl)quinolin-4-yl]oxyphenyl]cyclopropane-1,1-dicarboxamide |
| 74 | | 1-N'-(4-fluorophenyl)-1-N-[4-[7-(1H-imidazol-2-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 75 | | 1-N'-(4-fluorophenyl)-1-N-[4-[7-(1-methylimidazol-2-yl)quinolin-4-yl]oxyphenyl]cyclopropane-1,1-dicarboxamide |
| 76 | | 1-N'-(4-fluorophenyl)-1-N-[4-[6-methoxy-7-(1-methylpyrazol-4-yl)quinolin-4-yl]oxyphenyl]cyclopropane-1,1-dicarboxamide |
| 77 | | 1-N'-(4-fluorophenyl)-1-N-[4-[6-(methylcarbamoyl)-7-(1-methylpyrazol-4-yl)quinolin-4-yl]oxyphenyl]cyclopropane-1,1-dicarboxamide |
| 78 | | 1-N'-(4-fluorophenyl)-1-N-[4-[6-methyl-7-(1-methylpyrazol-4-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 79 | | 1-N'-(4-fluorophenyl)-1-N-[4-[7-(1-methylsulfonylpyrazol-4-yl)quinolin-4-yl]oxyphenyl]cyclopropane-1,1-dicarboxamide |
| 80 | | 1-(5-fluoro-2-methyl-2,3-dihydroindole-1-carbonyl)-N-[4-[7-(1-methylpyrazol-4-yl)quinolin-4-yl]oxyphenyl]cyclopropane-1-carboxamide |
| 81 | | 1-(5-fluoro-2,3-dihydroindole-1-carbonyl)-N-[4-[7-(1-methylpyrazol-4-yl)quinolin-4-yl]oxyphenyl]cyclopropane-1-carboxamide |
| 82 | | 1-N'-(4-fluoro-2,6-dimethylphenyl)-1-N-[4-[7-(1-methylpyrazol-4-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 82A | | 1-N'-(4-fluorophenyl)-1-N'-methyl-1-N-[4-[7-(1-methylpyrazol-4-yl)quinolin-4-yl]oxyphenyl]cyclopropane-1,1-dicarboxamide |
| 83 | | 1-N'-(4-fluorophenyl)-1-N-[4-(7-pyrrolidin-3-ylquinolin-4-yl)oxyphenyl]cyclopropane-1,1-dicarboxamide |
| 84 | | 1-N-[4-[7-[1-(difluoromethyl)pyrazol-3-yl]quinolin-4-yl]oxyphenyl]-1-N'-(4-fluorophenyl)cyclopropane-1,1-dicarboxamide |
| 85 | | 1-N'-(4-fluorophenyl)-1-N-[4-(7-pyridin-2-ylquinolin-4-yl)oxyphenyl]cyclopropane-1,1-dicarboxamide |

TABLE 1-continued

Compounds of Formula 1

| Cmpd. No. | Structure | IUPAC Name |
|---|---|---|
| 86 | | 1-N'-(4-fluorophenyl)-1-N-[4-[7-(2-methyltriazol-4-yl)quinolin-4-yl]oxyphenyl]cyclopropane-1,1-dicarboxamide |
| 87 | | 1-N'-(4-fluorophenyl)-1-N-[4-[7-(4-methylimidazol-1-yl)quinolin-4-yl]oxyphenyl]cyclopropane-1,1-dicarboxamide |
| 88 | AND Enantiomer | 1-N'-(4-fluorophenyl)-1-N-[4-[7-[rac-(3R)-oxolan-3-yl]quinolin-4-yl]oxyphenyl]cyclopropane-1,1-dicarboxamide |
| 89 | | 1-N'-(4-fluorophenyl)-1-N-[4-[7-[(3R)-oxolan-3-yl]quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 90 | | 1-N-[4-[7-(3-amino-1H-pyrazol-4-yl)quinolin-4-yl]oxyphenyl]-1-N'-(4-fluorophenyl)cyclopropane-1,1-dicarboxamide |
| 91 | | 1-N'-(4-fluorophenyl)-1-N-[4-[7-(3-methylpyrazol-1-yl)quinolin-4-yl]oxyphenyl]cyclopropane-1,1-dicarboxamide |
| 92 | | 1-N-[4-[7-(1-acetylpyrrolidin-3-yl)quinolin-4-yl]oxyphenyl]-1-N'-(4-fluorophenyl)cyclopropane-1,1-dicarboxamide |
| 93 | | 1-N'-(4-fluorophenyl)-1-N-[4-[7-(1-methylsulfonylpyrrolidin-3-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 94 | | 1-N-[4-[7-[1-(fluoromethyl)pyrazol-4-yl]quinolin-4-yl]oxyphenyl]-1-N'-(4-fluorophenyl)cyclopropane-1,1-dicarboxamide |
| 95 | | 1-N-[4-[7-(2,5-dihydrofuran-3-yl)quinolin-4-yl]oxyphenyl]-1-N'-(4-fluorophenyl)cyclopropane-1,1-dicarboxamide |
| 96 | | 1-N'-(4-fluorophenyl)-1-N-[4-[7-(4-methylpyrazol-1-yl)quinolin-4-yl]oxyphenyl]cyclopropane-1,1-dicarboxamide |
| 97 | | 1-N-[4-[7-(2-aminopyridin-4-yl)quinolin-4-yl]oxyphenyl]-1-N'-(4-fluorophenyl)cyclopropane-1,1-dicarboxamide |

TABLE 1-continued

Compounds of Formula 1

| Cmpd. No. | Structure | IUPAC Name |
|---|---|---|
| 98 | | 1-N-[4-[7-(1-cyclopropylpyrazol-3-yl)quinolin-4-yl]oxyphenyl]-1-N'-(4-fluorophenyl)cyclopropane-1,1-dicarboxamide |
| 99 | | 1-N'-(4-fluorophenyl)-1-N-[4-[7-(5-methyl-1H-pyrazol-3-yl)quinolin-4-yl]oxyphenyl]cyclopropane-1,1-dicarboxamide |
| 100 | | 1-N'-(4-fluorophenyl)-1-N-[4-[7-[5-(trifluoromethyl)-1H-pyrazol-3-yl]quinolin-4-yl]oxyphenyl]cyclopropane-1,1-dicarboxamide |
| 101 | | 1-N-[4-[7-(1,5-dimethylpyrazol-3-yl)quinolin-4-yl]oxyphenyl]-1-N'-(4-fluorophenyl)cyclopropane-1,1-dicarboxamide |

TABLE 1-continued

Compounds of Formula 1

| Cmpd. No. | Structure | IUPAC Name |
|---|---|---|
| 102 | | 1-N-[4-[7-[1-(fluoromethyl)pyrazol-3-yl]quinolin-4-yl]oxyphenyl]-1-N'-(4-fluorophenyl)cyclopropane-1,1-dicarboxamide |
| 103 | | 1-N-[4-[7-[2-(fluoromethyl)pyrazol-3-yl]quinolin-4-yl]oxyphenyl]-1-N'-(4-fluorophenyl)cyclopropane-1,1-dicarboxamide |
| 104 | | 1-N'-(4-fluorophenyl)-1-N-[4-(7-pyrazolo[1,5-a]pyridin-2-ylquinolin-4-yl)oxyphenyl]cyclopropane-1,1-dicarboxamide |
| 105 | | 1-N'-[2,5-difluoro-4-[6-methyl-7-(1-methylpyrazol-4-yl)quinolin-4-yl]oxyphenyl]-1-N-(4-fluorophenyl)cyclopropane-1,1-dicarboxamide |

TABLE 1-continued

Compounds of Formula 1

| Cmpd. No. | Structure | IUPAC Name |
|---|---|---|
| 106 | 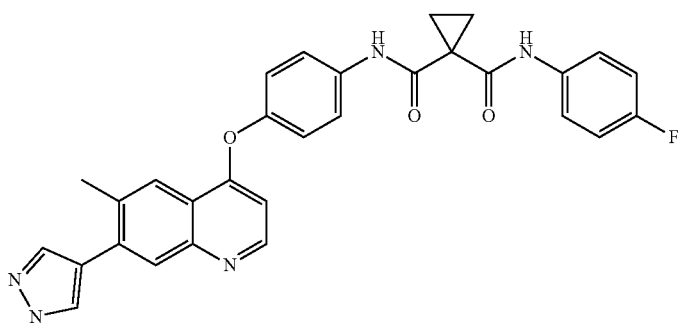 | 1-N'-(4-fluorophenyl)-1-N-[4-[6-methyl-7-(1H-pyrazol-4-yl)quinolin-4-yl]oxyphenyl]cyclopropane-1,1-dicarboxamide |
| 107 | 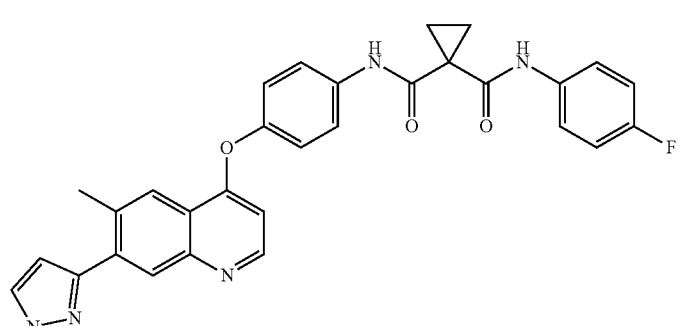 | 1-N'-(4-fluorophenyl)-1-N-[4-[6-methyl-7-(1H-pyrazol-3-yl)quinolin-4-yl]oxyphenyl]cyclopropane-1,1-dicarboxamide |
| 108 | 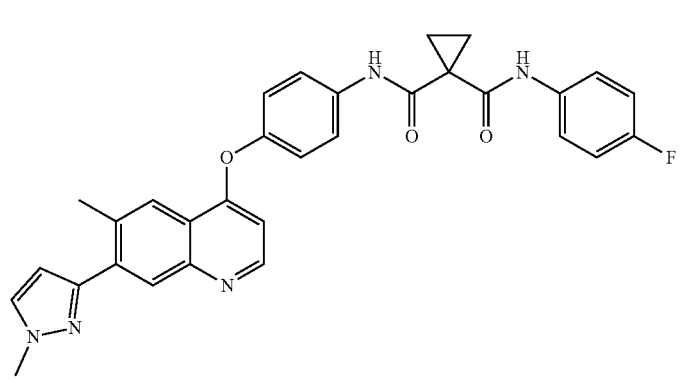 | 1-N'-(4-fluorophenyl)-1-N-[4-[6-methyl-7-(1-methylpyrazol-3-yl)quinolin-4-yl]oxyphenyl]cyclopropane-1,1-dicarboxamide |
| 109 | 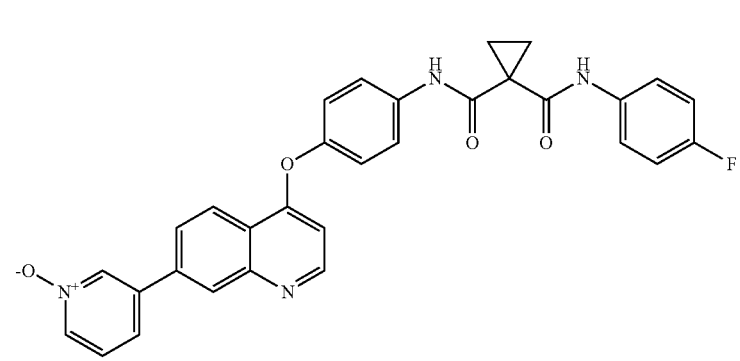 | 1-N'-(4-fluorophenyl)-1-N-[4-[7-(1-oxidopyridin-1-ium-3-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 110 | | 1-N-(4-fluorophenyl)-1-N'-[2,3,5-trifluoro-4-[6-methyl-7-(1-methylpyrazol-4-yl)quinolin-4-yl]oxyphenyl]cyclopropane-1,1-dicarboxamide |
| 111 | | 1-N'-(4-fluorophenyl)-1-N-[4-[7-[2-(4-methylpiperazin-1-yl)pyridin-4-yl]quinolin-4-yl]oxyphenyl]cyclopropane-1,1-dicarboxamide |
| 112 | | 1-N'-[2-chloro-5-fluoro-4-[6-methyl-7-(1-methylpyrazol-4-yl)quinolin-4-yl]oxyphenyl]-1-N-(4-fluorophenyl)cyclopropane-1,1-dicarboxamide |
| 113 | | 1-N-(4-fluorophenyl)-1-N'-[3-fluoro-4-(7-pyridin-3-ylquinolin-4-yl)oxyphenyl]cyclopropane-1,1-dicarboxamide |

TABLE 1-continued

Compounds of Formula 1

| Cmpd. No. | Structure | IUPAC Name |
|---|---|---|
| 114 | | 1-N'-(4-fluorophenyl)-1-N-[4-(7-pyrimidin-4-ylquinolin-4-yl)oxyphenyl]cyclopropane-1,1-dicarboxamide |
| 115 | | 1-N'-[2,5-difluoro-4-(7-pyridin-3-ylquinolin-4-yl)oxyphenyl]-1-N-(4-fluorophenyl)cyclopropane-1,1-dicarboxamide |
| 116 | | 1-N'-(4-fluorophenyl)-1-N-[4-[7-(1,3-thiazol-5-yl)quinolin-4-yl]oxyphenyl]cyclopropane-1,1-dicarboxamide |
| 117 | | 1-N'-(4-fluorophenyl)-1-N-[4-[7-(1-methyl-2-oxopyridin-4-yl)quinolin-4-yl]oxyphenyl]cyclopropane-1,1-dicarboxamide |

TABLE 1-continued

Compounds of Formula 1

| Cmpd. No. | Structure | IUPAC Name |
|---|---|---|
| 118 | 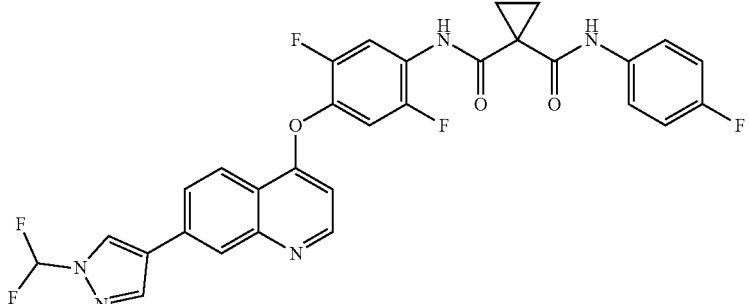 | 1-N'-[4-[7-[1-(difluoromethyl)pyrazol-4-yl]quinolin-4-yl]oxy-2,5-difluorophenyl]-1-N-(4-fluorophenyl)cyclopropane-1,1-dicarboxamide |
| 119 | 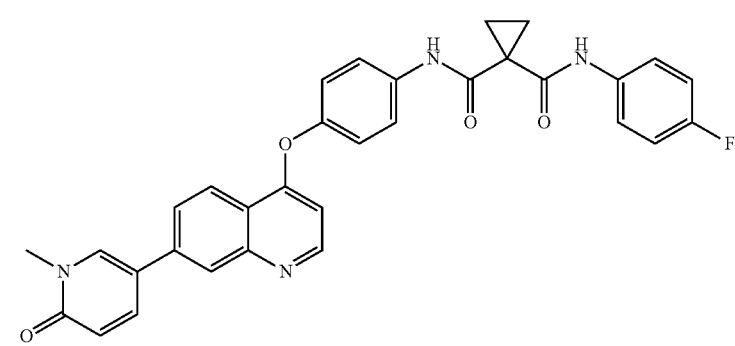 | 1-N'-(4-fluorophenyl)-1-N-[4-[7-(1-methyl-6-oxopyridin-3-yl)quinolin-4-yl]oxyphenyl]cyclopropane-1,1-dicarboxamide |
| 120 | 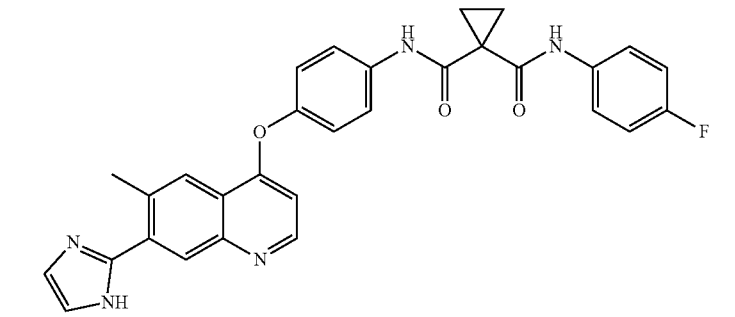 | 1-N'-(4-fluorophenyl)-1-N-[4-[7-(1H-imidazol-2-yl)-6-methylquinolin-4-yl]oxyphenyl]cyclopropane-1,1-dicarboxamide |
| 121 | 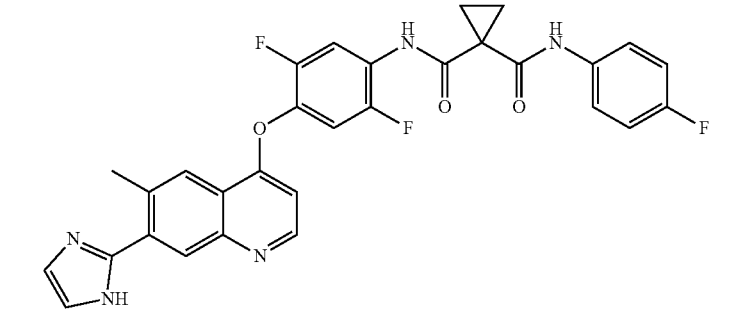 | 1-N'-[2,5-difluoro-4-[7-(1H-imidazol-2-yl)-6-methylquinolin-4-yl]oxyphenyl]-1-N-(4-fluorophenyl)cyclopropane-1,1-dicarboxamide |

TABLE 1-continued

Compounds of Formula 1

| Cmpd. No. | Structure | IUPAC Name |
|---|---|---|
| 122 | | 1-N'-[3-fluoro-4-[7-(1H-imidazol-2-yl)-6-methylquinolin-4-yl]oxyphenyl]-1-N-(4-fluorophenyl)cyclopropane-1,1-dicarboxamide |
| 123 | | 1-N'-[4-[7-[1-(difluoromethyl)pyrazol-4-yl]quinolin-4-yl]oxy-3-fluorophenyl]-1-N-(4-fluorophenyl)cyclopropane-1,1-dicarboxamide |
| 124 | | 1-N-[4-[7-(5,6-dihydro-4H-pyrrolo[1,2-b]pyrazol-2-yl)quinolin-4-yl]oxyphenyl]-1-N'-(4-fluorophenyl)cyclopropane-1,1-dicarboxamide |
| 126 | | 1-N-[4-[7-[1-(difluoromethyl)pyrazol-4-yl]quinolin-4-yl]oxyphenyl]-1-N'-(4-fluorophenyl)-1-N'-methylcyclopropane-1,1-dicarboxamide |

In one aspect, the invention includes a pharmaceutical composition comprising a compound of the invention, or a pharmaceutically acceptable salt thereof and a pharmaceutically acceptable carrier or excipient.

In another aspect, the invention includes a method for inhibiting a protein kinase, the method comprising contacting the protein kinase with a compound of the invention.

In one embodiment of this aspect, the protein kinase is Axl, Mer, c-Met, KDR, or a combination thereof.

In one aspect, the invention includes a method for treating a disease, disorder, or syndrome in a subject, the method comprising administering to the subject in need thereof a therapeutically effective amount of a compound, or a pharmaceutical composition of the invention.

In one embodiment of this aspect, the disease, disorder, or syndrome is cancer.

General Administration

Administration of the compounds of the invention, or their pharmaceutically acceptable salts, in pure form or in an appropriate pharmaceutical composition, can be carried out via any of the accepted modes of administration or agents for serving similar utilities. Thus, administration can be, for example, orally, nasally, parenterally (intravenous, intramuscular, or subcutaneous), topically, transdermally, intravaginally, intravesically, intracistemally, or rectally, in the form of solid, semi-solid, lyophilized powder, or liquid dosage forms, such as, for example, tablets, suppositories, pills, soft elastic and hard gelatin capsules, powders, solutions, suspensions, aerosols, and the like, preferably in unit dosage forms suitable for simple administration of precise dosages.

The compositions will include a conventional pharmaceutical carrier or excipient and a compound of the invention as the/an active agent, and, in addition, may include other medicinal agents, pharmaceutical agents, carriers, adjuvants, and the like. Compositions of the invention may be used in combination with anticancer or other agents that are generally administered to a patient being treated for cancer. Adjuvants include preserving, wetting, suspending, sweetening, flavoring, perfuming, emulsifying, and dispensing agents. Prevention of the action of microorganisms can be ensured by various antibacterial and antifungal agents, for example, parabens, chlorobutanol, phenol, sorbic acid, and the like. It may also be desirable to include isotonic agents, for example sugars, sodium chloride, and the like. Prolonged absorption of the injectable pharmaceutical form can be brought about by the use of agents delaying absorption, for example, aluminum monostearate, and gelatin.

If desired, a pharmaceutical composition of the invention may also contain minor amounts of auxiliary substances such as wetting or emulsifying agents, pH buffering agents, antioxidants, and the like, such as, for example, citric acid, sorbitan monolaurate, triethanolamine oleate, butylated hydroxytoluene, and the like.

Compositions suitable for parenteral injection may comprise physiologically acceptable sterile aqueous or nonaqueous solutions, dispersions, suspensions or emulsions, and sterile powders for reconstitution into sterile injectable solutions or dispersions. Examples of suitable aqueous and nonaqueous carriers, diluents, solvents, or vehicles include water, ethanol, polyols (propyleneglycol, polyethyleneglycol, glycerol, and the like), suitable mixtures thereof, vegetable oils (such as olive oil), and injectable organic esters such as ethyl oleate. Proper fluidity can be maintained, for example, by the use of a coating such as lecithin, by the maintenance of the required particle size in the case of dispersions, and by the use of surfactants.

One preferable route of administration is oral, using a convenient daily dosage regimen that can be adjusted according to the degree of severity of the disease-state to be treated.

Solid dosage forms for oral administration include capsules, tablets, pills, powders, and granules. In such solid dosage forms, the active compound is admixed with at least one inert customary excipient (or carrier) such as sodium citrate or dicalcium phosphate or (a) fillers or extenders, as for example, starches, lactose, sucrose, glucose, mannitol, and silicic acid, (b) binders, as for example, cellulose derivatives, starch, alignates, gelatin, polyvinylpyrrolidone, sucrose, and gum acacia, (c) humectants, as for example, glycerol, (d) disintegrating agents, as for example, agar-agar, calcium carbonate, potato or tapioca starch, alginic acid, croscarmellose sodium, complex silicates, and sodium carbonate, (e) solution retarders, as for example paraffin, (f) absorption accelerators, as for example, quaternary ammonium compounds, (g) wetting agents, as for example, cetyl alcohol, and glycerol monostearate, magnesium stearate, and the like (h) adsorbents, as for example, kaolin and bentonite, and (i) lubricants, as for example, talc, calcium stearate, magnesium stearate, solid polyethylene glycols, sodium lauryl sulfate, or mixtures thereof. In the case of capsules, tablets, and pills, the dosage forms may also comprise buffering agents.

Solid dosage forms as described above can be prepared with coatings and shells, such as enteric coatings and others well known in the art. They may contain pacifying agents and can also be of such composition that they release the active compound or compounds in a certain part of the intestinal tract in a delayed manner. Examples of embedded compositions that can be used are polymeric substances and waxes. The active compounds can also be in microencapsulated form, if appropriate, with one or more of the above-mentioned excipients.

Liquid dosage forms for oral administration include pharmaceutically acceptable emulsions, solutions, suspensions, syrups, and elixirs. Such dosage forms are prepared, for example, by dissolving, dispersing, and the like, a compound(s) of the invention, or a pharmaceutically acceptable salt thereof, and optional pharmaceutical adjuvants in a carrier, such as, for example, water, saline, aqueous dextrose, glycerol, ethanol, and the like; solubilizing agents and emulsifiers, as for example, ethyl alcohol, isopropyl alcohol, ethyl carbonate, ethyl acetate, benzyl alcohol, benzyl benzoate, propyleneglycol, 1,3-butyleneglycol, and dimethylformamide; oils, in particular, cottonseed oil, groundnut oil, corn germ oil, olive oil, castor oil, and sesame oil, glycerol, tetrahydrofurfuryl alcohol, polyethyleneglycols, and fatty acid esters of sorbitan; or mixtures of these substances, and the like, to thereby form a solution or suspension.

Suspensions, in addition to the active compounds, may contain suspending agents, as for example, ethoxylated isostearyl alcohols, polyoxyethylene sorbitol, and sorbitan esters, microcrystalline cellulose, aluminum metahydroxide, bentonite, agar-agar, and tragacanth, or mixtures of these substances, and the like.

Compositions for rectal administrations are, for example, suppositories that can be prepared by mixing the compounds of the present invention with for example suitable non-irritating excipients or carriers such as cocoa butter, polyethyleneglycol, or a suppository wax, which are solid at ordinary temperatures but liquid at body temperature and therefore melt while in a suitable body cavity and release the active component therein.

Dosage forms for topical administration of a compound of this invention include ointments, powders, sprays, and inhalants. The active component is admixed under sterile conditions with a physiologically acceptable carrier and any preservatives, buffers, or propellants as may be required. Ophthalmic formulations, eye ointments, powders, and solutions are also contemplated as being within the scope of this invention.

Generally, depending on the intended mode of administration, the pharmaceutically acceptable compositions will contain about 1% to about 99% by weight of a compound(s) of the invention, or a pharmaceutically acceptable salt thereof, and 99% to 1% by weight of a suitable pharmaceutical excipient. In one example, the composition will be between about 5% and about 75% by weight of a compound(s) of the invention, or a pharmaceutically acceptable salt thereof, with the rest being suitable pharmaceutical excipients.

Actual methods of preparing such dosage forms are known, or will be apparent, to those skilled in this art; for example, see Remington's Pharmaceutical Sciences, 18th Ed., (Mack Publishing Company, Easton, Pa., 1990). The composition to be administered will, in any event, contain a therapeutically effective amount of a compound of the invention, or a pharmaceutically acceptable salt thereof, for treatment of a disease-state in accordance with the teachings of this invention.

The compounds of the invention, or their pharmaceutically acceptable salts, are administered in a therapeutically effective amount which will vary depending upon a variety of factors including the activity of the specific compound employed, the metabolic stability and length of action of the compound, the age, body weight, general health, sex, diet, mode, and time of administration, rate of excretion, drug combination, the severity of the particular disease-states, and the host undergoing therapy. The compounds of the present invention can be administered to a patient at dosage levels in the range of about 0.1 to about 1,000 mg per day. For a normal human adult having a body weight of about 70 kilograms, a dosage in the range of about 0.01 to about 100 mg per kilogram of body weight per day is an example. The specific dosage used, however, can vary. For example, the dosage can depend on a number of factors including the requirements of the patient, the severity of the condition being treated, and the pharmacological activity of the compound being used. The determination of optimum dosages for a particular patient is well known to one of ordinary skill in the art.

Combination Therapy

A compound as disclosed herein can be administered as a single therapy or in combination ("co-administered") with one or more additional therapies for the treatment of a disease or disorder, for instance a disease or disorder associated with hyper-proliferation such as cancer. Therapies that may be used in combination with a compound disclosed herein include: (i) surgery; (ii) radiotherapy (for example, gamma radiation, neutron beam radiotherapy, electron beam radiotherapy, proton therapy, brachytherapy, and systemic radioactive isotopes); (iii) endocrine therapy; (iv) adjuvant therapy, immunotherapy, CAR T-cell therapy; and (v) other chemotherapeutic agents.

The term "co-administered" ("co-administering") refers to either simultaneous administration, or any manner of separate sequential administration, of a compound of the invention or a salt thereof, and a further active pharmaceutical ingredient or ingredients, including cytotoxic agents and radiation treatment. If the administration is not simultaneous, the compounds are administered in a close time proximity to each other. Furthermore, it does not matter if the compounds are administered in the same dosage form, e.g. one compound may be administered topically and another compound may be administered orally.

Typically, any agent that has activity against a disease or condition being treated may be co-administered. Examples of such agents for cancer treatment can be found, for instance, at https://www.cancer.gov/about-cancer/treatment/drugs (last visited Jan. 22, 2019) and in publically available sources such as Cancer Principles and Practice of Oncology by V. T. Devita and S. Hellman (editors), 11 edition (2018), Lippincott Williams & Wilkins Publishers. A person of ordinary skill in the art would be able to discern which combinations of agents would be useful based on the particular characteristics of the drugs and the disease involved.

In one embodiment, the treatment method includes the co-administration of a compound as disclosed herein or a pharmaceutically acceptable salt thereof and at least one immunotherapy. Immunotherapy (also called biological response modifier therapy, biologic therapy, biotherapy, immune therapy, or biological therapy) is a treatment that uses parts of the immune system to fight disease. Immunotherapy can help the immune system recognize cancer cells, or enhance a response against cancer cells. Immunotherapies include active and passive immunotherapies. Active immunotherapies stimulate the body's own immune system while passive immunotherapies generally use immune system components created outside of the body.

Examples of active immunotherapies include, but are not limited to vaccines including cancer vaccines, tumor cell vaccines (autologous or allogeneic), dendritic cell vaccines, antigen vaccines, anti-idiotype vaccines, DNA vaccines, viral vaccines, or Tumor-Infiltrating Lymphocyte (TIL) Vaccine with Interleukin-2 (IL-2) or Lymphokine-Activated Killer (LAK) Cell Therapy.

Examples of passive immunotherapies include but are not limited to monoclonal antibodies and targeted therapies containing toxins. Monoclonal antibodies include naked antibodies and conjugated monoclonal antibodies (also called tagged, labeled, or loaded antibodies). Naked monoclonal antibodies do not have a drug or radioactive material attached whereas conjugated monoclonal antibodies are joined to, for example, a chemotherapy drug (chemolabeled), a radioactive particle (radiolabeled), or a toxin (immunotoxin). Examples of these naked monoclonal antibody drugs include, but are not limited to Rituximab (Rituxan), an antibody against the CD20 antigen used to treat, for example, B cell non-Hodgkin lymphoma; Trastuzumab (Herceptin), an antibody against the HER2 protein used to treat, for example, advanced breast cancer; Alemtuzumab (Campath), an antibody against the CD52 antigen used to treat, for example, B cell chronic lymphocytic leukemia (B-CLL); Cetuximab (Erbitux), an antibody against the EGFR protein used, for example, in combination with irinotecan to treat, for example, advanced colorectal cancer and head and neck cancers; and Bevacizumab (Avastin) which is an antiangiogenesis therapy that works against the VEGF protein and is used, for example, in combination with chemotherapy to treat, for example, metastatic colorectal cancer. Examples of the conjugated monoclonal antibodies include, but are not limited to Radiolabeled antibody Ibritumomab tiuxetan (Zevalin) which delivers radioactivity directly to cancerous B lymphocytes and is used to treat, for example, B cell non-Hodgkin lymphoma; radiolabeled antibody Tositumomab (Bexxar) which is used to treat, for example, certain types of non-Hodgkin lymphoma; and immunotoxin Gemtuzumab ozogamicin (Mylotarg) which contains calicheamicin and is used to treat, for example, acute myelogenous leukemia (AML). BL22 is a conjugated monoclonal antibody for treating, for example, hairy cell leukemia, immunotoxins for treating, for example, leukemias, lymphomas, and brain tumors, and radiolabeled antibodies such as OncoScint for example, for colorectal and ovarian cancers and ProstaScint for example, for prostate cancers. In some embodiments, the antibody that binds to EGFR is panitumumab, tomuzotuximab, zalutumumab, cetuximab, futuximab, imgatuzumab, laprituximab emtansine, matuzumab, modotuximab, necitumumab, nimotuzumab, or zalutumumab.

Further examples of therapeutic antibodies that can be used include, but are not limited to, HERCEPTIN™ (Trastuzumab) (Genentech, Calif.) which is a humanized anti-HER2 monoclonal antibody for the treatment of patients with metastatic breast cancer; REOPRO® (abciximab) (Centocor) which is an anti-glycoprotein IIb/IIIa receptor on the platelets for the prevention of clot formation; ZENAPAX™ (daclizumab) (Roche Pharmaceuticals, Switzerland) which is an immunosuppressive, humanized anti-CD25 monoclonal antibody for the prevention of acute renal allograft rejection; PANOREX™ which is a murine anti-17-IA cell surface antigen IgG2a antibody (Glaxo Wellcome/Centocor); BEC2 which is a murine anti-idiotype (GD3epitope) IgG antibody (ImClone System); IMC-C225 which is a chimeric anti-EGFR IgG antibody (ImClone System); VITAXIN™ which is a humanized anti-alpha V beta 3 integrin antibody (Applied Molecular Evolution/MedImmune); Campath 1H/LDP-03 which is a humanized anti CD52 IgG1 antibody (Leukosite); Smart M195 which is a humanized anti-CD33 IgG antibody (Protein Design Lab/Kanebo); RITUXAN™ which is a chimeric anti-CD20 IgG1 antibody (IDEC Pharm/Genentech, Roche/Zettyaku); LYMPHOCIDE™ which is a humanized anti-CD22 IgG antibody (Immunomedics); LYMPHOCIDE™ Y-90 (Immunomedics); Lymphoscan (Tc-99m-labeled; radioimaging; Immunomedics); Nuvion (against CD3; Protein Design Labs); CM3 is a humanized anti-ICAM3 antibody (ICOS Pharm); IDEC-114 is a primatized anti-CD80 antibody (IDEC Pharm/Mitsubishi); ZEVALIN™ is a radiolabelled murine anti-CD20 antibody (IDEC/Schering AG); IDEC-131 is a humanized anti-CD40L antibody (IDEC/Eisai); IDEC-151 is a primatized anti-CD4 antibody (IDEC); IDEC-152 is a primatized anti-CD23 antibody (IDEC/Seikagaku); SMART anti-CD3 is a humanized anti-CD3 IgG (Protein Design Lab); 5G1.1 is a humanized anti-complement factor 5 (C5) antibody (Alexion Pharm); D2E7 is a humanized anti-TNF-alpha antibody (CAT/BASF); CDP870 is a humanized anti-TNF-alpha. Fab fragment (Celltech); IDEC-151 is a primatized anti-CD4 IgG1 antibody (IDEC Pharm/SmithKline Beecham); MDX-CD4 is a human anti-CD4 IgG antibody (Medarex/Eisai/Genmab); CD20-streptavidin (+biotin-yttrium 90; NeoRx); CDP571 is a humanized anti-TNF-alpha. IgG4 antibody (Celltech); LDP-02 is a humanized anti-alpha4 beta7 antibody (LeukoSite/Genentech); OrthoClone OKT4A is a humanized anti-CD4 IgG antibody (Ortho Biotech); ANTOVA™ is a humanized anti-CD40L IgG antibody (Biogen); ANTEGREN™ is a humanized anti-VLA-4 IgG antibody (Elan); and CAT-152 is a human anti-TGF-beta$_2$ antibody (Cambridge Ab Tech). Others are provided in later paragraphs.

Immunotherapies that can be used in combination with a compound as disclosed herein include adjuvant immunotherapies. Examples include cytokines, such as granulocyte-macrophage colony-stimulating factor (GM-CSF), granulocyte-colony stimulating factor (G-CSF), macrophage inflammatory protein (MIP)-1-alpha, interleukins (including IL-1, IL-2, IL-4, IL-6, IL-7, IL-12, IL-15, IL-18, IL-21, and IL-27), tumor necrosis factors (including TNF-alpha), and interferons (including IFN-alpha, IFN-beta, and IFN-gamma); aluminum hydroxide (alum); Bacille Calmette-Guerin (BCG); Keyhole limpet hemocyanin (KLH); Incomplete Freund's adjuvant (IFA); QS-21; DETOX; Levamisole; and Dinitrophenyl (DNP), and combinations thereof, such as, for example, combinations of, interleukins, for example, IL-2 with other cytokines, such as IFN-alpha.

In various embodiments, a compound of the present invention can be combined with an immunological therapy and/or an immunological therapeutic agent. In various embodiments, an immunological therapy and/or an immunological therapeutic agent can include, one or more of the following: an adoptive cell transfer, an angiogenesis inhibitor, Bacillus Calmette-Guerin therapy, biochemotherapy, a cancer vaccine, a chimeric antigen receptor (CAR) T-cell therapy, a cytokine therapy, gene therapy, an immune checkpoint modulator, an immunoconjugate, a radioconjugate, an oncolytic virus therapy, or a targeted drug therapy. The immunological therapy or immunological therapeutic agent, is collectively referred to herein as an "immunotherapeutic agent".

The present disclosure provides a method for preventing, treating, reducing, inhibiting or controlling a neoplasia, a tumor or a cancer in a subject in need thereof, involving administering a therapeutically effective amount of a combination comprising a compound of the invention and an immunotherapeutic agent. In one non-limiting embodiment, the method comprises administering a therapeutically effective amount of a combination comprising a compound of the invention in combination with an immunotherapeutic agent. In various embodiments, the combination provides a cooperative effect, an additive effect, or a synergistic effect in reducing the number of cancer cells when treated with the combination as compared to each treatment alone. In some embodiments, administration of a therapeutically effective amount of a combination comprising a compound of the invention and an immunotherapeutic agent, results in synergistic anti-tumor activity and/or antitumor activity that is more potent than the additive effect of administration of a compound of the invention or immunotherapeutic agent alone.

Human cancers harbor numerous genetic and epigenetic alterations, generating neoantigens potentially recognizable by the immune system (Sjoblom et al. (2006) Science 314:268-74). The adaptive immune system, comprised of T and B lymphocytes, has powerful anti-cancer potential, with a broad capacity and exquisite specificity to respond to diverse tumor antigens. Further, the immune system demonstrates considerable plasticity and a memory component. The successful harnessing of all these attributes of the adaptive immune system would make immunotherapy unique among all cancer treatment modalities.

The present disclosure provides a combination of a compound of the invention and an immunotherapeutic agent. These exemplified combinations can be used to treat a subject with a cancer. In various embodiments, immunotherapeutic agents that find utility in the present compositions, formulations, and methods can include one or more agents or therapies, including: an adoptive cell transfer, an angiogenesis inhibitor, *Bacillus* Calmette-Guerin therapy, biochemotherapy, a cancer vaccine, a chimeric antigen receptor (CAR) T-cell therapy, a cytokine therapy, gene therapy, an immune checkpoint modulator, for example an immune checkpoint inhibitor, an immunoconjugate, a radioconjugate, an oncolytic virus therapy, or a targeted drug therapy.

In certain embodiments of the present disclosure, a therapeutically effective combination comprises a compound of the invention and an immunotherapeutic agent. In various related embodiments, the compound of the invention enhances the activity of the immunotherapeutic agent.

In certain embodiments of each of the aforementioned aspects, as well as other aspects and embodiments described elsewhere herein, the immunotherapeutic agent enhances the activity of the compound of the invention.

In certain embodiments of each of the aforementioned aspects, as well as other aspects and embodiments described elsewhere herein, the compound of the invention and the immunotherapeutic agent act synergistically. In various embodiments described herein, an exemplary immunotherapeutic agent is an immune cell (e.g. T-cell, dendritic cell, a natural killer cell and the like) modulator chosen from an agonist or an activator of a costimulatory molecule, wherein the modulator is a monoclonal antibody, a bispecific antibody comprising one or more immune checkpoint antigen binding moieties, a trispecific antibody, or an immune cell-engaging multivalent antibody/fusion protein/construct known in the art. In some embodiments, the immunotherapeutic agent can be an antibody that modulates a costimulatory molecule, bind to an antigen on the surface of an immune cell, or a cancer cell. In each of these different embodiments, the antibody modulator can be a monoclonal antibody, a polyclonal antibody, a bispecific antibody, a trispecific or multispecific format antibody, a fusion protein, or a fragment thereof, for example, a Diabody, a Single-chain (sc)-diabody (scFv)2, a Miniantibody, a Minibody, a Barnase-barstar, a scFv-Fc, a sc(Fab)2, a Trimeric antibody construct, a Triabody antibody construct, a Trimerbody antibody construct, a Tribody antibody construct, a Collabody antibody construct, a (scFv-TNFa)3, or a F(ab)3/DNL antibody construct.

In certain embodiments of each of the aforementioned aspects, as well as other aspects and embodiments described elsewhere herein, the immunotherapeutic agent is an agent that modulates immune responses, for example, a checkpoint inhibitor or a checkpoint agonist. In some embodiments, the immunotherapeutic agent is an agent that enhances anti-tumor immune responses. In some embodiments, the immunotherapeutic agent is an agent that increases cell-mediated immunity. In some embodiments, the immunotherapeutic agent is an agent that increases T-cell activity. In some embodiments, the immunotherapeutic agent is an agent that increases cytolytic T-cell (CTL) activity.

In some embodiments, the present methods of treatment may include administering a compound of the present invention together in combination with a molecule, for example, a binding agent, for example, an antibody of functional fragment thereof that modulates (activates or inhibits) a checkpoint protein. A checkpoint inhibitor can be any molecule, agent, treatment and/or method of inhibiting an immune checkpoint, and/or promoting an inhibitor of an immune checkpoint, e.g., by promoting an intrinsic immune checkpoint inhibitor; inhibiting a transcription factor involved in the expression of an immune checkpoint; and/or by acting in concert with some additional extrinsic factor. For example, a checkpoint inhibitor could include a treatment that inhibits transcription factors involved the expression of immune checkpoint genes, or promotes the expression of transcription factors for tumor-suppressor genes, e.g., BACH2 (Luan et al., (2016). Transcription Factors and Checkpoint Inhibitor Expression with Age: Markers of Immunosenescence. Blood, 128(22), 5983). Moreover, a checkpoint inhibitor can inhibit the transcription of immune checkpoint genes; the modification and/or processing of immune checkpoint mRNA; the translation of immune checkpoint proteins; and/or molecules involved in immunity or the immune checkpoint pathway, e.g., PD-1 transcription factors such as HIF-1, STAT3, NF-κB, and AP-1, or the activation of common oncogenic pathways such as JAK/STAT, RAS/ERK, or PI3K/AKT/mTOR (Zerdes et al., Genetic, transcriptional and post-translational regulation of the programmed death protein ligand 1 in cancer: biology and clinical correlations, Oncogene volume 37, pages 4639-4661 (2018), the disclosure of which is incorporated herein by reference in its entirety).

Checkpoint inhibitors can include treatments, molecules, agents, and/or methods that regulate immune checkpoints at the transcriptional level, e.g., using the RNA-interference pathway co-suppression, and/or post-transcriptional gene silencing (PTGS) (e.g., microRNAs, miRNA; silencing-RNA, small-interfering-RNA, or short-interfering-RNA (siRNA). Transcriptional regulation of checkpoint molecules has been shown to involve mir-16, which has been shown to target the 3'UTR of the checkpoint mRNAs CD80, CD274 (PD-L1) and CD40 (Leibowitz et al., Post-transcriptional regulation of immune checkpoint genes by mir-16 in melanoma, Annals of Oncology (2017) 28; v428-v448). Mir-33a has also been shown to be involved in regulating the expression of PD-1 in cases of lung adenocarcinoma (Boldini et al., Role of microRNA-33a in regulating the expression of PD-1 in lung adenocarcinoma, Cancer Cell Int. 2017; 17: 105, the disclosure of which is incorporated herein by reference in its entirety).

T-cell-specific aptamer-siRNA chimeras have been suggested as a highly specific method of inhibiting molecules in the immune checkpoint pathway (Hossain et al., The aptamer-siRNA conjugates: reprogramming T cells for cancer therapy, Ther. Deliv. 2015 January; 6(1): 1-4, the disclosure of which is incorporated herein by reference in its entirety).

Alternatively, members of the immune checkpoint pathway can be inhibited using treatments that affect associated pathways, e.g., metabolism. For example, oversupplying the glycolytic intermediate pyruvate in mitochondria from CAD macrophages promoted expression of PD-L1 via induction of the bone morphogenetic protein 4/phosphorylated SMAD1/5/IFN regulatory factor 1 (BMP4/p-SMAD1/5/IRF1) signaling pathway. Accordingly, implementing treatments that modulate the metabolic pathway can result in subsequent modulation of the immunoinhibitory PD-1/PD-L1 checkpoint pathway (Watanabe et al., Pyruvate controls the checkpoint inhibitor PD-L1 and suppresses T cell immunity, J Clin Invest. 2017 Jun. 30; 127(7): 2725-2738).

Checkpoint immunity can be regulated via oncolytic viruses that selectively replicate within tumor cells and induce acute immune responses in the tumor-micro-environment, i.e., by acting as genetic vectors that carry specific agents (e.g., antibodies, miRNA, siRNA, and the like) to cancer cells and effecting their oncolysis and secretion of cytokines and chemokines to synergize with immune checkpoint inhibition (Shi et al., Cancer Immunotherapy: A Focus on the Regulation of Immune Checkpoints, Int J Mol Sci. 2018 May; 19(5): 1389). Currently, there are clinical trials underway that utilize the following viruses as checkpoint inhibitors: poliovirus, measles virus, adenoviruses, poxviruses, herpes simplex virus (HSV), coxsackieviruses, reovirus, Newcastle disease virus (NDV), T-VEC (a herpes virus encoded with GM-CSF (granulocyte-macrophage colony stimulating factor)), and H101 (Shi et al., supra).

Checkpoint inhibitors can operate at the translational level of checkpoint immunity. The translation of mRNA into protein represents a key event in the regulation of gene expression, thus inhibition of immune checkpoint translation is a method in which the immune checkpoint pathway can be inhibited.

Inhibition of the immune checkpoint pathway can occur at any stage of the immune checkpoint translational process. For example, drugs, molecules, agents, treatments, and/or methods can inhibit the initiation process (whereby the 40S ribosomal subunit is recruited to the 5' end of the mRNA and scans the 5'UTR of the mRNA toward its 3' end. Inhibition can occur by targeting the anticodon of the initiator methionyl-transfer RNA (tRNA) (Met-tRNAi), its base-pairing with the start codon, or the recruitment of the 60S subunit to begin elongation and sequential addition of amino acids in the translation of immune-checkpoint-specific genes. Alternatively, a checkpoint inhibitor can inhibit checkpoints at the translational level by preventing the formation of the ternary complex (TC), i.e., eukaryotic initiation factor (eIF)2 (or one or more of its α, β, and γ subunits); GTP; and Met-tRNAi.

Checkpoint inhibition can occur via destabilization of eIF2α by precluding its phosphorylation via protein kinase R (PKR), PERK, GCN2, or HRI, or by precluding TCs from associating with the 40S ribosome and/or other initiation factors, thus preventing the preinitiation complex (PIC) from forming; inhibiting the eIF4F complex and/or its cap-binding protein eIF4E, the scaffolding protein eIF4G, or eIF4A helicase. Methods discussing the translational control of cancer are discussed in Truitt et al., New frontiers in translational control of the cancer genome, Nat Rev Cancer. 2016 Apr. 26; 16(5): 288-304, the disclosure of which is incorporated herein by reference in its entirety.

Checkpoint inhibitors can also include treatments, molecules, agents, and/or methods that regulate immune checkpoints at the cellular and/or protein level, e.g., by inhibiting an immune checkpoint receptor. Inhibition of checkpoints can occur via the use of antibodies, antibody fragments, antigen-binding fragments, small-molecules, and/or other drugs, agents, treatments, and/or methods.

Immune checkpoints refer to inhibitory pathways in the immune system that are responsible for maintaining self-tolerance and modulating the degree of immune system response to minimize peripheral tissue damage. However, tumor cells can also activate immune system checkpoints to decrease the effectiveness of immune response ('block' the immune response) against tumor tissues. In contrast to the majority of anti-cancer agents, checkpoint inhibitors do not target tumor cells directly, but rather target lymphocyte receptors or their ligands in order to enhance the endogenous antitumor activity of the immune system. (Pardoll, 2012, Nature Reviews Cancer 12:252-264).

In some embodiments, the immunotherapeutic agent is a modulator of PD-1 activity, a modulator of PD-L1 activity, a modulator of PD-L2 activity, a modulator of CTLA-4 activity, a modulator of CD28 activity, a modulator of CD80 activity, a modulator of CD86 activity, a modulator of 4-1BB activity, an modulator of OX40 activity, a modulator of KIR activity, a modulator of Tim-3 activity, a modulator of LAG3 activity, a modulator of CD27 activity, a modulator of CD40 activity, a modulator of GITR activity, a modulator of TIGIT activity, a modulator of CD20 activity, a modulator of CD96 activity, a modulator of IDO1 activity, a cytokine, a chemokine, an interferon, an interleukin, a lymphokine, a member of the tumor necrosis factor (TNF) family, or an immunostimulatory oligonucleotide. In some embodiments, the immune checkpoint modulator, i.e. is an inhibitor or antagonist, or is an activator or agonist, for example, a CD28 modulator, a 4-1BB modulator, an OX40 modulator, a CD27 modulator, a CD80 modulator, a CD86 modulator, a CD40 modulator, or a GITR modulator, a Lag-3 modulator, a 41BB modulator, a LIGHT modulator, a CD40 modulator, a GITR modulator, a TGF-beta modulator, a TIM-3 modulator, a SIRP-alpha modulator, a TIGIT modulator, a VSIG8 modulator, a BTLA modulator, a SIGLEC7 modulator, a SIGLEC9 modulator, a ICOS modulator, a B7H3 modulator, a B7H4 modulator, a FAS modulator, and/or a BTNL2 modulator. In some embodiments, the immunotherapeutic agent is an immune checkpoint modulator as described above (e.g., an immune checkpoint modulator antibody, which can be in the form of a monoclonal antibody, a bispecific antibody comprising one or more immune checkpoint antigen binding moieties, a trispecific antibody, or an immune cell-engaging multivalent antibody/fusion protein/construct known in the art).

In some embodiments, the immunotherapeutic agent is an agent that inhibits the activity of PD-1. In some embodiments, the immunotherapeutic agent is an agent that inhibits the activity of PD-L1 and/or PD-L2. In some embodiments, the immunotherapeutic agent is an agent that inhibits the activity of CTLA-4. In some embodiments, the immunotherapeutic agent is an agent that inhibits the activity of CD80 and/or CD86. In some embodiments, the immunotherapeutic agent is an agent that inhibits the activity of TIGIT. In some embodiments, the immunotherapeutic agent is an agent that inhibits the activity of KIR. In some embodiments, the immunotherapeutic agent is an agent that enhances or stimulates the activity of activating immune checkpoint receptors.

PD-1 (also known as Programmed Death 1, CD279, PDCD1) is a cell surface receptor with a critical role in regulating the balance between stimulatory and inhibitory signals in the immune system and maintaining peripheral tolerance (Ishida, Y et al. 1992 EMBO J. 11 3887; Kier, Mary E et al. 2008 Annu Rev Immunol 26 677-704; Okazaki, Taku et al. 2007 International Immunology 19 813-824). PD-1 is an inhibitory member of the immunoglobulin super-family with homology to CD28. The structure of PD-1 is a monomeric type 1 transmembrane protein, consisting of one immunoglobulin variable-like extracellular domain and a cytoplasmic domain containing an immunoreceptor tyrosine-based inhibitory motif (ITIM) and an immunoreceptor tyrosine-based switch motif (ITSM). Expression of PD-1 is inducible on T cells, B cells, natural killer (NK) cells and monocytes, for example upon lymphocyte activation via T cell receptor (TCR) or B cell receptor (BCR) signalling (Kier, Mary E et al. 2008 Annu Rev Immunol 26 677-704; Agata, Y et al 1996 Int Immunol 8 765-72). PD-1 is a receptor for the ligands CD80, CD86, PD-L1 (B7-H1, CD274) and PD-L2 (B7-DC, CD273), which are cell surface expressed members of the B7 family (Freeman, Gordon et al. 2000 J Exp Med 192 1027; Latchman, Y et al. 2001 Nat Immunol 2 261). Upon ligand engagement, PD-1 recruits phosphatases such as SHP-1 and SHP-2 to its intracellular tyrosine motifs which subsequently dephosphorylate effector molecules activated by TCR or BCR signalling (Chemnitz, J et al. 2004 J Immunol 173 945-954; Riley, James L 2009 Immunological Reviews 229 114-125) In this way, PD-1 transduces inhibitory signals into T and B cells only when it is engaged simultaneously with the TCR or BCR.

PD-1 has been demonstrated to down-regulate effector T cell responses via both cell-intrinsic and cell-extrinsic functional mechanisms. Inhibitory signaling through PD-1 induces a state of unresponsiveness in T cells, resulting in the cells being unable to clonally expand or produce optimal levels of effector cytokines. PD-1 may also induce apoptosis in T cells via its ability to inhibit survival signals from co-stimulation, which leads to reduced expression of key anti-apoptotic molecules such as Bcl-XL (Kier, Mary E et al. 2008 Annu Rev Immunol 26 677-704). In addition to these direct effects, recent publications have implicated PD-1 as being involved in the suppression of effector cells by promoting the induction and maintenance of regulatory T cells (TREG). For example, PD-L1 expressed on dendritic cells was shown to act in synergy with TGF-β to promote the induction of CD4+FoxP3+TREG with enhanced suppressor function (Francisco, Loise M et al. 2009 J Exp Med 206 3015-3029).

TIM-3 (also known as T-cell immunoglobulin and mucin-domain containing-3, TIM-3, Hepatitis A virus cellular receptor 2, HAVCR2, HAVcr-2, KIM-3, TIMD-3, TIMD3, Tim-3, and CD366) is a ~33.4-kDa single-pass type I membrane protein involved in immune responses (Sanchez-Fueyo et al., Tim-3 inhibits T helper type 1-mediated auto- and alloimmune responses and promotes immunological tolerance, Nat. Immunol. 4:1093-1101(2003)).

TIM-3 is selectively expressed on Th1-cells, and phagocytic cells (e.g., macrophages and dendritic cells). The use of siRNA or a blocking antibody to reduce the expression of human resulted in increased secretion of interferon γ (IFN-γ) from CD4 positive T-cells, implicating the inhibitory role of TIM-3 in human T cells. Analysis of clinical samples from autoimmune disease patients showed no expression of TIM-3 in CD4 positive cells. In particular, expression level of TIM-3 is lower and secretion of IFN-γ is higher in T cell clones derived from the cerebrospinal fluid of patients with multiple sclerosis than those in clones derived from normal healthy persons (Koguchi K et al., J Exp Med. 203:1413-8. (2006)).

TIM-3 is the receptor for the ligands Galectin-9, which is a member of galectin family, molecules ubiquitously expressed on a variety of cell types and which binds P-galactoside; Phosphatidyl serine (PtdSer) (DeKryff et al., T cell/transmembrane, Ig, and mucin-3 allelic variants differentially recognize phosphatidylserine and mediate phagocytosis of apoptotic cells, J Immunol. 2010 Feb. 15; 184(4): 1918-30); High Mobility Group Protein 1 (also known as HMGB1, HMG1, HMG3, SBP-1, HMG-1, and high mobility group box 1) Chiba et al., Tumor-infiltrating DCs suppress nucleic acid-mediated innate immune responses through interactions between the receptor TIM-3 and the alarmin HMGB1, Nat Immunol. 2012 September; 13(9): 832-42); and Carcinoembryonic Antigen Related Cell Adhesion Molecule 1 (also known as CEACAM1, BGP, BGP1, BGPI, carcinoembryonic antigen related cell adhesion molecule 1) (Huang et al., CEACAM1 regulates TIM-3-mediated tolerance and exhaustion, Nature. 2015 Jan. 15; 517 (7534):386-90).

BTLA (also known as B- and T-lymphocyte attenuator, BTLA1, CD272, and B and T lymphocyte associated) is a ~27.3-kDa single-pass type I membrane protein involved in lymphocyte inhibition during immune response. BTLA is constitutively expressed in both B and T cells. BTLA interacts with HVEM (herpes virus-entry mediator), a member of the tumor-necrosis factor receptor (TNFR) family (Gonzalez et al., Proc. Natl. Acad. Sci. USA, 2005, 102: 1116-21). The interaction of BTLA, which belongs to the CD28 family of the immunoglobulin superfamily, and HVEM, a costimulatory tumor-necrosis factor (TNF) receptor (TNFR), is unique in that it defines a cross talk between these two families of receptors. BTLA contains a membrane proximal immunoreceptor tyrosine-based inhibitory motif (ITIM) and membrane distal immunoreceptor tyrosine-based switch motif (ITSM). Disruption of either the ITIM or ITSM abrogated the ability of BTLA to recruit either SHP1 or SHP2, suggesting that BTLA recruits SHP1 and SHP2 in a manner distinct from PD-1 and both tyrosine motifs are required to block T cell activation. The BTLA cytoplasmic tail also contains a third conserved tyrosine-containing motif within the cytoplasmic domain, similar in sequence to a Grb-2 recruitment site (YXN). Also, a phosphorylated peptide containing this BTLA N-terminal tyrosine motif can interact with GRB2 and the p85 subunit of PI3K in vitro, although the functional effects of this interaction remain unexplored in vivo (Gavrieli et al., Bioochem. Biophysi Res Commun, 2003, 312, 1236-43). BTLA is the receptor for the ligands PTPN6/SHP-1; PTPN11/SHP-2; TNFRSF14/HVEM; and B7H4.

VISTA (also known as V-domain Ig suppressor of T cell activation VSIR, B7-H5, B7H5, GI24, PP2135, SISP1, DD1alpha, VISTA, C10orf54, chromosome 10 open reading frame 54, PD-1H, and V-set immunoregulatory receptor) is a ~33.9-kDa single-pass type I membrane protein involved in T-cell inhibitory response, embryonic stem cells differentiation via BMP4 signaling inhibition, and MMP14-mediated MMP2 activation (Yoon et al., Control of signaling-mediated clearance of apoptotic cells by the tumor suppressor p53, Science. 2015 Jul. 31; 349(6247): 1261669). VISTA interacts with the ligand VSIG-3 (Wang et al., VSIG-3 as a ligand of VISTA inhibits human T-cell function, Immunology. 2019 January; 156(1):74-85)

LAG-3 (also known as Lymphocyte-activation gene 3, LAG3, CD223, and lymphocyte activating 3) is a ~57.4-kDa single-pass type I membrane protein involved in lymphocyte activation that also binds to HLA class-II antigens. LAG-3 is a member of the immunoglobulin supergene family, and is expressed on activated T cells (Huard et al., 1994, Immunogenetics 39:213), NK cells (Triebel et al., 1990, J. Exp. Med. 171:1393-1405), regulatory T cells (Huang et al., 2004, Immunity 21:503-513; Camisaschi et al., 2010, J Immunol. 184:6545-6551; Gagliani et al., 2013, Nat Med 19:739-746), and plasmacytoid dendritic cells (DCs) (Workman et al., 2009, J Immunol 182:1885-1891). LAG-3 is a membrane protein encoded by a gene located on chromosome 12, and is structurally and genetically related to CD4. Similar to CD4, LAG-3 can interact with MHC class II molecules on the cell surface (Baixeras et al., 1992, J. Exp. Med. 176:327-337; Huard et al., 1996, Eur. J. Immunol. 26:1180-1186). It has been suggested that the direct binding of LAG-3 to MHC class II plays a role in down-regulating antigen-dependent stimulation of CD4+ T lymphocytes (Huard et al., 1994, Eur. J. Immunol. 24:3216-3221) and LAG-3 blockade has also been shown to reinvigorate CD8+ lymphocytes in both tumor or self-antigen (Gross et al., 2007, J Clin Invest. 117:3383-3392) and viral models (Blackburn et al., 2009, Nat. Immunol. 10:29-37). Further, the intra-cytoplasmic region of LAG-3 can interact with LAP (LAG-3-associated protein), which is a signal transduction molecule involved in the downregulation of the CD3/TCR activation pathway (Iouzalen et al., 2001, Eur. J. Immunol. 31:2885-2891). Moreover, CD4+CD25+ regulatory T cells (Treg) have been shown to express LAG-3 upon activation, which contributes to the suppressor activity of Treg cells (Huang, C. et al., 2004, Immunity 21:503-513). LAG-3 can also negatively regulate T cell homeostasis by Treg cells in both T cell-dependent and independent mechanisms (Workman, C. J. and Vignali, D. A., 2005, J. Immunol. 174:688-695).

LAG-3 has been shown to interact with MHC class II molecules (Huard et al., CD4/major histocompatibility complex class II interaction analyzed with CD4− and lymphocyte activation gene-3 (LAG-3)-Ig fusion proteins, Eur J Immunol. 1995 September; 25(9):2718-21).

Additionally, several kinases are known to be checkpoint inhibitors. For example, CHEK-1, CHEK-2, and A2aR.

CHEK-1 (also known as CHK 1 kinase, CHK1, and checkpoint kinase 1) is a ~54.4-kDa serine/threonine-protein kinase that is involved with checkpoint-mediated cell cycle arrest, and the activation of DNA repair in response to the DNA damage and/or unreplicated DNA.

CHEK-2 (also known as CHK2 kinase, CDS1, CHK2, HuCds1, LFS2, PP1425, RAD53, hCds1, and checkpoint kinase 2) is a ~60.9-kDa. serine/threonine-protein kinase involved in checkpoint-mediated cell cycle arrest, DNA-repair activation, and double-strand break-mediated apoptosis.

A2aR (also known as adenosine A2A receptor, ADORA2A, adenosine A2a receptor, A2aR, ADORA2, and RDC8) is a ~44.7-kDa multi-pass membrane receptor for adenosine and other ligands.

In some embodiments, illustrative immunotherapeutic agents can include one or more antibody modulators that target PD-1, PD-L1, PD-L2, CEACAM (e.g., CEACAM-1, -3 and/or -5), CTLA-4, TIM-3, LAG-3, VISTA, BTLA, TIGIT, LAIR1, CD160, 2B4, TGF beta, OX40, 41BB, LIGHT, CD40, GITR, TGF-beta, TIM-3, SIRP-alpha, VSIG8, BTLA, SIGLEC7, SIGLEC9, ICOS, B7H3, B7H4, FAS, and/or BTNL2 among others known in the art. In some embodiments, the immunotherapeutic agent is an agent that increases natural killer (NK) cell activity. In some embodiments, the immunotherapeutic agent is an agent that inhibits suppression of an immune response. In some embodiments, the immunotherapeutic agent is an agent that inhibits suppressor cells or suppressor cell activity. In some embodiments, the immunotherapeutic agent is an agent or therapy that inhibits Treg activity. In some embodiments, the immunotherapeutic agent is an agent that inhibits the activity of inhibitory immune checkpoint receptors.

In some embodiments, the combination of the present disclosure comprises a compound of the invention and an immunotherapeutic agent, wherein the immunotherapeutic agent includes a T cell modulator chosen from an agonist or an activator of a costimulatory molecule. In one embodiment, the agonist of the costimulatory molecule is chosen from an agonist (e.g., an agonistic antibody or antigen-binding fragment thereof, or a soluble fusion) of GITR, OX40, SLAM (e.g., SLAMF7), HVEM, LIGHT, CD2, CD27, CD28, CDS, ICAM-1, LFA-1 (CD11a/CD18), ICOS (CD278), 4-1BB (CD137), CD30, CD40, BAFFR, CD7, NKG2C, NKp80, CD160, B7-H3, or CD83 ligand. In other embodiments, the effector cell combination includes a bispecific T cell engager (e.g., a bispecific antibody molecule that binds to CD3 and a tumor antigen (e.g., EGFR, PSCA, PSMA, EpCAM, HER2 among others).

In some embodiments, the immunotherapeutic agent is a modulator of PD-1 activity, a modulator of PD-L1 activity, a modulator of PD-L2 activity, a modulator of CTLA-4 activity, a modulator of CD28 activity, a modulator of CD80 activity, a modulator of CD86 activity, a modulator of 4-1BB activity, an modulator of OX40 activity, a modulator of KIR activity, a modulator of Tim-3 activity, a modulator of LAG3 activity, a modulator of CD27 activity, a modulator of CD40 activity, a modulator of GITR activity, a modulator of TIGIT activity, a modulator of CD20 activity, a modulator of CD96 activity, a modulator of IDO1 activity, a modulator of SIRP-alpha activity, a modulator of TIGIT activity, a modulator of VSIG8 activity, a modulator of BTLA activity, a modulator of SIGLEC7 activity, a modulator of SIGLEC9 activity, a modulator of ICOS activity, a modulator of B7H3 activity, a modulator of B7H4 activity, a modulator of FAS activity, a modulator of BTNL2 activity, a cytokine, a chemokine, an interferon, an interleukin, a lymphokine, a member of the tumor necrosis factor (TNF) family, or an immunostimulatory oligonucleotide.

In some embodiments, the immunotherapeutic agent is an immune checkpoint modulator (e.g., an immune checkpoint inhibitor e.g. an inhibitor of PD-1 activity, a modulator of PD-L1 activity, a modulator of PD-L2 activity, a modulator of CTLA-4, or a CD40 agonist (e.g., an anti-CD40 antibody molecule), (xi) an OX40 agonist (e.g., an anti-OX40 antibody molecule), or (xii) a CD27 agonist (e.g., an anti-CD27 antibody molecule). In one embodiment, the immunotherapeutic agent is an inhibitor of: PD-1, PD-L1, PD-L2, CTLA-4, TIM-3, LAG-3, CEACAM (e.g., CEACAM-1, -3 and/or -5), VISTA, BTLA, TIGIT, LAIR1, CD160, 2B4 and/or TGF beta, Galectin 9, CD69, Galectin-1, CD113, GPR56, CD48, GARP, PD1H, LAIR1, TIM-1, and TIM-4. In one embodiment, the inhibitor of an immune checkpoint molecule inhibits PD-1, PD-L1, LAG-3, TIM-3, CEACAM (e.g., CEACAM-1, -3 and/or -5), CTLA-4, or any combination thereof.

In one embodiment, the immunotherapeutic agent is an agonist of a protein that stimulates T cell activation such as B7-1, B7-2, CD28, 4-1BB (CD137), 4-1BBL, ICOS, ICOS-L, OX40, OX40L, GITR, GITRL, CD70, CD27, CD40, DR3 and CD28H.

In some embodiments, the immunotherapeutic agent used in the combinations disclosed herein (e.g., in combination with a compound of the invention) is an activator or agonist of a costimulatory molecule. In one embodiment, the agonist of the costimulatory molecule is chosen from an agonist (e.g., an agonistic antibody or antigen-binding fragment thereof, or a soluble fusion) of CD2, CD28, CDS, ICAM-1, LFA-1 (CD11a/CD18), ICOS (CD278), 4-1BB (CD137), GITR, CD30, BAFFR, HVEM, CD7, LIGHT, NKG2C, SLAMF7, NKp80, CD160, B7-H3, or CD83 ligand.

Inhibition of an inhibitory molecule can be performed at the DNA, RNA or protein level. In embodiments, an inhibitory nucleic acid (e.g., a dsRNA, siRNA or shRNA), can be used to inhibit expression of an inhibitory molecule. In other embodiments, the inhibitor of an inhibitory signal is, a polypeptide e.g., a soluble ligand (e.g., PD-1-Ig or CTLA-4 Ig), or an antibody or antigen-binding fragment thereof, for example, a monoclonal antibody, a bispecific antibody comprising one or more immune checkpoint antigen binding moieties, a trispecific antibody, or an immune cell-engaging multivalent antibody/fusion protein/construct known in the art that binds to the inhibitory molecule; e.g., an antibody or fragment thereof (also referred to herein as "an antibody molecule") that binds to PD-1, PD-L1, PD-L2, CTLA-4, TIM-3, LAG-3, CEACAM (e.g., CEACAM-1, -3 and/or -5), VISTA, BTLA, TIGIT, LAIR1, CD160, 2B4 and/or TGF beta, Galectin 9, CD69, Galectin-1, CD113, GPR56, CD48, GARP, PD1H, LAIR1, TIM-1, TIM-4, or a combination thereof.

In some embodiments, where the combination comprises a compound of the invention and an immunotherapeutic agent, wherein the immunotherapeutic agent is a monoclonal antibody or a bispecific antibody. For example, the monoclonal or bispecific antibody may specifically bind a member of the c-Met pathway and/or an immune checkpoint modulator (e.g., the bispecific antibody binds to both a hepatocyte growth factor receptor (HGFR) and an immune checkpoint modulator described herein, such as an antibody that binds PD-1, PD-L1, PD-L2, or CTLA-4, LAG-3, OX40, 41BB, LIGHT, CD40, GITR, TGF-beta, TIM-3, SIRP-alpha, TIGIT, VSIG8, BTLA, SIGLEC7, SIGLEC9, ICOS, B7H3, B7H4, FAS, BTNL2 or CD27). In particular embodiments, the bispecific antibody specifically binds a human HGFR protein and one of PD-1, PD-L1, and CTLA-4.

In some of the embodiments of the methods described herein, the immunotherapeutic agent is a PD-1 antagonist, a PD-L1 antagonist, a PD-L2 antagonist, a CTLA-4 antagonist, a CD80 antagonist, a CD86 antagonist, a KIR antagonist, a Tim-3 antagonist, a LAG3 antagonist, a TIGIT antagonist, a CD20 antagonist, a CD96 antagonist, or an IDO1 antagonist.

In some embodiments, the PD-1 antagonist is an antibody that specifically binds PD-1. In some embodiments, the antibody that binds PD-1 is pembrolizumab (KEYTRUDA®, MK-3475; Merck), pidilizumab (CT-011; Curetech Ltd.), nivolumab (OPDIVO®, BMS-936558, MDX-1106; Bristol Myer Squibb), MEDI0680 (AMP-514; AstraZenenca/MedImmune), REGN2810 (Regeneron Pharmaceuticals), BGB-A317 (BeiGene Ltd.), PDR-001 (Novartis), or STI-A1110 (Sorrento Therapeutics). In some embodiments, the antibody that binds PD-1 is described in PCT Publication WO 2014/179664, for example, an antibody identified as APE2058, APE1922, APE1923, APE1924, APE 1950, or APE1963 (Anaptysbio), or an antibody containing the CDR regions of any of these antibodies. In other embodiments, the PD-1 antagonist is a fusion protein that includes the extracellular domain of PD-L1 or PD-L2, for example, AMP-224 (AstraZeneca/MedImmune). In other embodiments, the PD-1 antagonist is a peptide inhibitor, for example, AUNP-12 (Aurigene). In some embodiments, the antibody that binds PD-1 is camrelizumab, cetrelimab, sintillimab, prolgolimab, or spartalizumab. In some embodiments, the antibody that binds PD-L1 is durvalumab.

In some embodiments, the PD-L1 antagonist is an antibody that specifically binds PD-L1. In some embodiments, the antibody that binds PD-L1 is atezolizumab (RG7446, MPDL3280A; Genentech), MEDI4736 (AstraZeneca/MedImmune), BMS-936559 (MDX-1105; Bristol Myers Squibb), avelumab (MSB0010718C; Merck KGaA), KD033 (Kadmon), the antibody portion of KD033, or STI-A1014 (Sorrento Therapeutics). In some embodiments, the antibody that binds PD-L1 is described in PCT Publication WO 2014/055897, for example, Ab-14, Ab-16, Ab-30, Ab-31, Ab-42, Ab-50, Ab-52, or Ab-55, or an antibody that contains the CDR regions of any of these antibodies, the disclosure of which is incorporated herein by reference in its entirety.

In some embodiments, the CTLA-4 antagonist is an antibody that specifically binds CTLA-4. In some embodiments, the antibody that binds CTLA-4 is ipilimumab (YERVOY®; Bristol Myer Squibb) or tremelimumab (CP-675, 206; Pfizer). In some embodiments, the CTLA-4 antagonist a CTLA-4 fusion protein or soluble CTLA-4 receptor, for example, KARR-102 (Kahr Medical Ltd.).

In some embodiments, the LAG3 antagonist is an antibody that specifically binds LAG3. In some embodiments, the antibody that binds LAG3 is IMP701 (Prima BioMed), IMP731 (Prima BioMed/GlaxoSmithKline), BMS-986016 (Bristol Myer Squibb), LAG525 (Novartis), and GSK2831781 (GlaxoSmithKline). In some embodiments, the LAG3 antagonist includes a soluble LAG3 receptor, for example, IMP321 (Prima BioMed).

In some embodiments, the KIR antagonist is an antibody that specifically binds KIR. In some embodiments, the antibody that binds KIR is lirilumab (Bristol Myer Squibb/Innate Pharma).

In some embodiments, the immunotherapeutic agent is a cytokine, for example, a chemokine, an interferon, an interleukin, lymphokine, or a member of the tumor necrosis factor family. In some embodiments, the cytokine is IL-2, IL15, or interferon-gamma.

In some embodiments of any of the above aspects or those described elsewhere herein, the cancer is selected from the group consisting of lung cancer (e.g., a non-small cell lung cancer (NSCLC)), a kidney cancer (e.g., a kidney urothelial carcinoma), a bladder cancer (e.g., a bladder urothelial (transitional cell) carcinoma), a breast cancer, a colorectal cancer (e.g., a colon adenocarcinoma), an ovarian cancer, a pancreatic cancer, a gastric carcinoma, an esophageal cancer, a mesothelioma, a melanoma (e.g., a skin melanoma), a head and neck cancer (e.g., a head and neck squamous cell carcinoma (HNSCC)), a thyroid cancer, a sarcoma (e.g., a soft-tissue sarcoma, a fibrosarcoma, a myxosarcoma, a liposarcoma, an osteogenic sarcoma, an osteosarcoma, a chondrosarcoma, an angiosarcoma, an endotheliosarcoma, a lymphangiosarcoma, a lymphangioendotheliosarcoma, a leiomyosarcoma, or a rhabdomyosarcoma), a prostate cancer, a glioblastoma, a cervical cancer, a thymic carcinoma, a leukemia (e.g., an acute lymphocytic leukemia (ALL), an acute myelocytic leukemia (AML), a chronic myelocytic leukemia (CML), a chronic eosinophilic leukemia, or a chronic lymphocytic leukemia (CLL)), a lymphoma (e.g., a Hodgkin lymphoma or a non-Hodgkin lymphoma (NHL)), a myeloma (e.g., a multiple myeloma (MM)), a mycoses fungoides, a merkel cell cancer, a hematologic malignancy, a cancer of hematological tissues, a B cell cancer, a bronchus cancer, a stomach cancer, a brain or central nervous system cancer, a peripheral nervous system cancer, a uterine or endometrial cancer, a cancer of the oral cavity or pharynx, a liver cancer, a testicular cancer, a biliary tract cancer, a small bowel or appendix cancer, a salivary gland cancer, an adrenal gland cancer, an adenocarcinoma, an inflammatory myofibroblastic tumor, a gastrointestinal stromal tumor (GIST), a colon cancer, a myelodysplastic syndrome (MDS), a myeloproliferative disorder (MPD), a polycythemia Vera, a chordoma, a synovioma, an Ewing's tumor, a squamous cell carcinoma, a basal cell carcinoma, an adenocarcinoma, a sweat gland carcinoma, a sebaceous gland carcinoma, a papillary carcinoma, a papillary adenocarcinoma, a medullary carcinoma, a bronchogenic carcinoma, a renal cell carcinoma, a hepatoma, a bile duct carcinoma, a choriocarcinoma, a seminoma, an embryonal carcinoma, a Wilms' tumor, a bladder carcinoma, an epithelial carcinoma, a glioma, an astrocytoma, a medulloblastoma, a craniopharyngioma, an ependymoma, a pinealoma, a hemangioblastoma, an acoustic neuroma, an oligodendroglioma, a meningioma, a neuroblastoma, a retinoblastoma, a follicular lymphoma, a diffuse large B-cell lymphoma, a mantle cell lymphoma, a hepatocellular carcinoma, a thyroid cancer, a small cell cancer, an essential thrombocythemia, an agnogenic myeloid metaplasia, a hypereosinophilic syndrome, a systemic mastocytosis, a familiar hypereosinophilia, a neuroendocrine cancer, or a carcinoid tumor.

In some embodiments of any of the above aspects or those described elsewhere herein, the subject's cancer or tumor does not respond to immune checkpoint inhibition (e.g., to any immune checkpoint inhibitor described herein, such as a PD-1 antagonist or PD-L1 antagonist) or the subject's cancer or tumor has progressed following an initial response to immune checkpoint inhibition (e.g., to any immune checkpoint inhibitor described herein, such as a PD-1 antagonist or PD-L1 antagonist).

In various embodiments, the immunotherapeutic agent can comprise an antibody or an antigen binding fragment thereof. Within this definition, immune checkpoint inhibitors include bispecific antibodies and immune cell-engaging multivalent antibody/fusion protein/constructs known in the art. In some embodiments, immunotherapeutic agents which comprise bispecific antibodies may include bispecific antibodies that are bivalent and bind either the same epitope of the immune checkpoint molecule, two different epitopes of the same immune checkpoint molecule or different epitopes of two different immune checkpoints.

Persons of ordinary skill in the art can implement several bispecific antibody formats known in the field to target one or more of CTLA4, PD1, PD-L1 TIM-3, LAG-3, various B-7 ligands, B7H3, B7H4, CHK 1 and CHK2 kinases, BTLA, A2aR, OX40, 41BB, LIGHT, CD40, GITR, TGF-beta, SIRP-alpha, TIGIT, VSIG8, SIGLEC7, SIGLEC9, ICOS, FAS, BTNL2 and other for use in the combination described herein.

In various embodiments, the immunotherapeutic agent can include am immune cell-engaging multivalent antibody/fusion protein/construct.

In an embodiment of the disclosure, the checkpoint inhibitor, in combination with a compound of the invention, is used to reduce or inhibit metastasis of a primary tumor or cancer to other sites, or the formation or establishment of metastatic tumors or cancers at other sites distal from the primary tumor or cancer thereby inhibiting or reducing tumor or cancer relapse or tumor or cancer progression.

In a further embodiment of the disclosure, provided herein is a combination therapy for treating cancer, which comprises a compound of the invention and a checkpoint inhibitor with the potential to elicit potent and durable immune responses with enhanced therapeutic benefit and more manageable toxicity.

In a further embodiment of the disclosure, provided herein is a combination therapy for treating cancer, which comprises a compound of the invention and an immune checkpoint inhibitor. In an embodiment of the disclosure provided herein is a method for treating cancer and/or preventing the establishment of metastases by employing a compound of the present invention, which acts synergistically with a checkpoint inhibitor.

In some embodiments, compounds as disclosed herein can be used in combination therapy with a therapeutic agent disclosed herein for the treatment of diseases such as cancer. Exemplary therapeutic agents include imatinib, baricitinib gefitinib, erlotinib, sorafenib, dasatinib, sunitinib, lapatinib, nilotinib, pirfenidone, pazopanib, crizotinib, vemurafenib, vandetanib, ruxolitinib, axitinib, bosutinib, regorafenib, tofacitinib, cabozantinib, ponatinib, trametinib, dabrafenib, afatinib, ibrutinib, ceritinib, idelalisib, nintedanib, palbociclib, lenvatinib, cobimetinib, abemaciclib, acalabrutinib, alectinib, binimetinib, brigatinib, encorafenib, erdafitinib, everolimus, fostamatinib, gilter, larotrectinib, lorlatinib, netarsudil, osimertinib, pemigatinib, pexidartinib, ribociclib, temsirolimus, XL-092, XL-147, XL-765, XL-499, and XL-880. In some embodiments, a compound as described herein can be used in combination with a HSP90 inhibitor (e.g., XL888), liver X receptor (LXR) modulators, retinoid-related orphan receptor gamma (RORγ) modulators, checkpoint inhibitors such as a CK1 inhibitor or aCK1α inhibitor, a Wnt pathway inhibitor (e.g., SST-215), or a mineralocorticoid receptor inhibitor, (e.g., esaxerenone) for the treatment of a disease disclosed herein such as cancer. In some embodiments, the therapeutic agent is parp inhibitor such as olaparib, rucaparib, niraparib, or talazoparib.

In some embodiments, compounds as disclosed herein can be used in combination for the treatment of diseases such as cancer exemplary chemotherapeutic agents include dexamethasone, interferons, colchicine, metoprine, cyclosporine, amphotericin, metronidazole, alemtuzumab, alitretinoin, allopurinol, amifostine, arsenic trioxide, asparaginase, BCG live, bevacizumab, bexarotene, cladribine, clofarabine, darbepoetin alfa, denileukin, dexrazoxane, epoetin alfa, erlotinib, filgrastim, histrelin acetate, ibritumomab, interferon alfa-2a, interferon alfa-2b, lenalidomide, levamisole, mesna, methoxsalen, nandrolone, nelarabine, nofetumomab, oprelvekin, palifermin, pamidronate, pegademase, pegaspargase, pegfilgrastim, pemetrexed disodium, plicamycin, porfimer sodium, quinacrine, rasburicase, sargramostim, pemetrexed, temozolomide, VM-26, 6-TG, toremifene, tretinoin, ATRA, valrubicin, zoledronate, and zoledronic acid, and pharmaceutically acceptable salts thereof.

In further embodiments, the disclosure provides methods for one or more of the following: 1) reducing or inhibiting growth, proliferation, mobility or invasiveness of tumor or cancer cells that potentially or do develop metastases, 2) reducing or inhibiting formation or establishment of metastases arising from a primary tumor or cancer to one or more other sites, locations or regions distinct from the primary tumor or cancer; 3) reducing or inhibiting growth or proliferation of a metastasis at one or more other sites, locations or regions distinct from the primary tumor or cancer after a metastasis has formed or has been established, 4) reducing or inhibiting formation or establishment of additional metastasis after the metastasis has been formed or established, 5) prolonged overall survival, 6) prolonged progression free survival, or 7) disease stabilization. The methods include administering to a subject in need thereof a compound of the present invention in combination with a checkpoint inhibitor as described herein.

In an embodiment of the disclosure, administration of a compound of the present invention with the immunotherapeutic agent provides a detectable or measurable improvement in a condition of a given subject, such as alleviating or ameliorating one or more adverse (physical) symptoms or consequences associated with the presence of a cell proliferative or cellular hyperproliferative disorder, neoplasia, tumor or cancer, or metastasis, i e., a therapeutic benefit or a beneficial effect.

A therapeutic benefit or beneficial effect is any objective or subjective, transient, temporary, or long-term improvement in the condition or pathology, or a reduction in onset, severity, duration or frequency of adverse symptom associated with or caused by cell proliferation or a cellular hyperproliferative disorder such as a neoplasia, tumor or cancer, or metastasis. It may lead to improved survival. A satisfactory clinical endpoint of a treatment method in accordance with the disclosure is achieved, for example, when there is an incremental or a partial reduction in severity, duration or frequency of one or more associated pathologies, adverse symptoms or complications, or inhibition or reversal of one or more of the physiological, biochemical or cellular manifestations or characteristics of cell proliferation or a cellular hyperproliferative disorder such as a neoplasia, tumor or cancer, or metastasis. A therapeutic benefit or improvement therefore may be, but is not limited to destruction of target proliferating cells (e.g., neoplasia, tumor or cancer, or metastasis) or ablation of one or more, most or all pathologies, adverse symptoms or complications associated with or caused by cell proliferation or the cellular hyperproliferative disorder such as a neoplasia, tumor or cancer, or metastasis. However, a therapeutic benefit or improvement need not be a cure or complete destruction of all target proliferating cells (e.g., neoplasia, tumor or cancer, or metastasis) or ablation of all pathologies, adverse symptoms or complications associated with or caused by cell proliferation or the cellular hyperproliferative disorder such as a neoplasia, tumor or cancer, or metastasis. For example, partial destruction of a tumor or cancer cell mass, or a stabilization of the tumor or cancer mass, size or cell numbers by inhibiting progression or worsening of the tumor or cancer, can reduce mortality and prolong lifespan even if only for a few days, weeks or months, even though a portion or the bulk of the tumor or cancer mass, size or cells remain.

Specific non-limiting examples of therapeutic benefit include a reduction in neoplasia, tumor or cancer, or metastasis volume (size or cell mass) or numbers of cells, inhibiting or preventing an increase in neoplasia, tumor or cancer volume (e.g., stabilizing), slowing or inhibiting neoplasia, tumor or cancer progression, worsening or metastasis, or inhibiting neoplasia, tumor or cancer proliferation, growth or metastasis.

In an embodiment of the disclosure, administration of the immunotherapeutic agent, in combination therapy with a compound of the invention, provides a detectable or measurable improvement or overall response according to the irRC (as derived from time-point response assessments and based on tumor burden), including one of more of the following: (i) irCR—complete disappearance of all lesions, whether measurable or not, and no new lesions (confirmation by a repeat, consecutive assessment no less than 4 weeks from the date first documented), (ii) irPR—decrease in tumor burden ≥50% relative to baseline (confirmed by a consecutive assessment at least 4 weeks after first documentation).

Optionally, any method described herein may not take effect immediately. For example, treatment may be followed by an increase in the neoplasia, tumor or cancer cell numbers or mass, but over time eventual stabilization or reduction in tumor cell mass, size or numbers of cells in a given subject may subsequently occur.

Additional adverse symptoms and complications associated with neoplasia, tumor, cancer and metastasis that can be inhibited, reduced, decreased, delayed or prevented include, for example, nausea, lack of appetite, lethargy, pain and discomfort. Thus, a partial or complete decrease or reduction in the severity, duration or frequency of adverse symptom or complication associated with or caused by a cellular hyperproliferative disorder, an improvement in the subjects quality of life and/or well-being, such as increased energy, appetite, psychological well-being, are all particular non-limiting examples of therapeutic benefit.

A therapeutic benefit or improvement therefore can also include a subjective improvement in the quality of life of a treated subject. In additional embodiment, a method prolongs or extends lifespan (survival) of the subject. In a further embodiment, a method improves the quality of life of the subject.

In one embodiment, administration of the immunotherapeutic agent, in combination therapy with a compound of the invention, results in a clinically relevant improvement in one or more markers of disease status and progression selected from one or more of the following: (i): overall survival, (ii): progression-free survival, (iii): overall response rate, (iv): reduction in metastatic disease, (v): circulating levels of tumor antigens such as carbohydrate antigen 19.9 (CA19.9) and carcinoembryonic antigen (CEA) or others depending on tumor, (vii) nutritional status (weight, appetite, serum albumin), (viii): pain control or analgesic use, (ix): CRP/albumin ratio.

Treatment with a compound of the invention in combination with an immunotherapeutic agent gives rise to more complex immunity including not only the development of innate immunity and type-1 immunity, but also immunoregulation which more efficiently restores appropriate immune functions.

In various exemplary methods, a checkpoint inhibitor antibody (monoclonal or polyclonal, bispecific, trispecific, or an immune cell-engaging multivalent antibody/fusion protein/construct) directed to a checkpoint molecule of interest (e.g., PD-1) may be sequenced and the polynucleotide sequence may then be cloned into a vector for expression or propagation. The sequence encoding the antibody or antigen-binding fragment thereof of interest may be maintained in vector in a host cell and the host cell can then be expanded and frozen for future use. Production of recombinant monoclonal antibodies in cell culture can be carried out through cloning of antibody genes from B cells by means known in the art. See, e.g. Tiller et al., 2008, J. Immunol. Methods 329, 112; U.S. Pat. No. 7,314,622.

Pharmaceutical compositions containing a compound of the invention according to the present disclosure will comprise an effective amount of a compound of the invention, an immunotherapeutic agent, and/or both, typically dispersed in a pharmaceutically acceptable carrier. The phrases "pharmaceutically or pharmacologically acceptable" refers to molecular entities and compositions that do not produce adverse, allergic or other untoward reaction when administered to animal, such as, for example, a human, as appropriate. The preparation of an pharmaceutical composition that contains a compound of the invention will be known to those of skill in the art in light of the present disclosure, as exemplified by Remington's Pharmaceutical Sciences, 18th Ed. Mack Printing Company, 1990, Moreover, for animal (e.g., human) administration, it will be understood that preparations should meet sterility, pyrogenicity, general safety and purity standards. A specific example of a pharmacologically acceptable carrier for a combination compositions, containing a compound of the invention in admixture with an immunotherapeutic agent as described herein is borate buffer or sterile saline solution (0.9% NaCl).

Formulations of the an immunotherapeutic agent, for example an immune checkpoint modulator antibody used in accordance with the present disclosure can be prepared for storage by mixing an antibody having the desired degree of purity with optional pharmaceutically acceptable carriers, excipients or stabilizers as amply described and illustrated in Remington's Pharmaceutical Sciences 16th edition, Osol, A. Ed. [1980], in the form of lyophilized formulations or aqueous solutions and/or suspensions. Acceptable carriers, excipients, buffers or stabilizers are nontoxic to recipients at the dosages and concentrations employed, and include suitable aqueous and/or non-aqueous excipients that may be employed in the pharmaceutical compositions of the disclosure, for example, water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size in the case of dispersions, and by the use of surfactants, buffers such as phosphate, citrate, and other organic acids. Antioxidants may be included, for example, (1) water soluble antioxidants, such as ascorbic acid, cysteine hydrochloride, sodium bisulfate, sodium metabisulfite, sodium sulfite and the like; (2) oil-soluble antioxidants, such as ascorbyl palmitate, butylated hydroxyanisole (BHA), butylated hydroxytoluene (BHT), lecithin, propyl gallate, alpha-tocopherol, and the like; and (3) metal chelating agents, such as citric acid, ethylenediamine tetraacetic acid (EDTA), sorbitol, tartaric acid, phosphoric acid, and the like; preservatives (such as octade-cyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues). Other exemplary pharmaceutically acceptable excipients may include polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as TWEEN™, PLURONICS™ or polyethylene glycol (PEG).

In one illustrative embodiment, the pharmaceutical compositions can optionally contain pharmaceutically acceptable auxiliary substances as required to approximate physiological conditions such as pH adjusting and buffering agents and toxicity adjusting agents, for example, sodium acetate, sodium chloride, potassium chloride, calcium chloride and sodium lactate. In some embodiments, the checkpoint inhibitor antibodies or antigen-binding fragments thereof of the present disclosure are formulated for and can be lyophilized for storage and reconstituted in a suitable excipient prior to use according to art-known lyophilization and reconstitution techniques. In one exemplary pharmaceutical composition containing one or more checkpoint inhibitor antibodies or antigen-binding fragment thereof, the composition is formulated as a sterile, preservative-free solution of one or more checkpoint inhibitor antibodies or antigen-binding fragment thereof for intravenous or subcutaneous administration. The formulation can be supplied as either a single-use, prefilled pen, as a single-use, for example containing about 1 mL prefilled glass syringe, or as a single-use institutional use vial. Preferably, the pharmaceutical composition containing the checkpoint inhibitor antibody or antigen-binding fragment thereof is clear and colorless, with a pH of about 6.9-5.0, preferably a pH of 6.5-5.0, and even more preferably a pH ranging from about 6.0 to about 5.0. In various embodiments, the formulations comprising the pharmaceutical compositions can contain from about 500 mg to about 10 mg, or from about 400 mg to about 20 mg, or from about 300 mg to about 30 mg or from about 200 mg to about 50 mg of the checkpoint inhibitor antibody or antigen-binding fragment thereof per mL of solution when reconstituted and administered to the subject. Exemplary injection or infusion excipients can include mannitol, citric acid monohydrate, dibasic sodium phosphate dihydrate, monobasic sodium phosphate dihydrate, polysorbate 80, sodium chloride, sodium citrate and water for parenteral administration, for example, intravenously, intramuscularly, intraperitoneally, or subcutaneous administration.

In another exemplary embodiment, one or more immunotherapeutic agents, or an antigen-binding fragment thereof is formulated for intravenous or subcutaneous administration as a sterile aqueous solution containing 1-75 mg/mL, or more preferably, about 5-60 mg/mL, or yet more preferably, about 10-50 mg/mL, or even more preferably, about 10-40 mg/mL of antibody, with sodium acetate, polysorbate 80, and sodium chloride at a pH ranging from about 5 to 6. Preferably, the intravenous or infusion formulation is a sterile aqueous solution containing 5, 10, 15, 20, 25, 30, 35, 40, 45, or 50 mg/mL of the immunotherapeutic agent, for example, an immune checkpoint inhibitor antibody or an antigen-binding fragment thereof, with 20 mM sodium acetate, 0.2 mg/mL polysorbate 80, and 140 mM sodium chloride at pH 5.5. Further, a solution comprising a checkpoint inhibitor antibody or an antigen-binding fragment thereof, can comprise, among many other compounds, histidine, mannitol, sucrose, trehalose, glycine, poly(ethylene) glycol, EDTA, methionine, and any combination thereof, and many other compounds known in the relevant art.

In one embodiment, a pharmaceutical composition of the present disclosure comprises the following components: 5-500 mg of an immunotherapeutic agent or antigen-binding fragment thereof of the present disclosure, 10 mM histidine, 5% sucrose, and 0.01% polysorbate 80 at pH 5.8, and a compound of the invention. This composition may be provided as a lyophilized powder. When the powder is reconstituted at full volume, the composition retains the same formulation. Alternatively, the powder may be reconstituted at half volume, in which case the composition comprises 10-500 mg of an immunotherapeutic agent or antigen-binding fragment thereof of the present disclosure, 20 mM histidine, 10% sucrose, and 0.02% polysorbate 80 at pH 5.8.

In one embodiment, part of the dose is administered by an intravenous bolus and the rest by infusion of the immunotherapeutic agent formulation. For example, from about 0.001 to about 200 mg/kg, for example, from about 0.001 mg/kg to about 100 mg/kg, or from about 0.001 mg/kg to about 50 mg/kg, or from about 0.001 mg/kg to about 10 mg/kg intravenous injection of the immunotherapeutic agent, or antigen-binding fragment thereof, may be given as a bolus, and the rest of the antibody dose may be administered by intravenous injection. A predetermined dose of the immunotherapeutic agent, or antigen-binding fragment thereof, may be administered, for example, over a period of an hour to two hours to five hours.

In a further embodiment, part of the dose is administered by a subcutaneous injection and/or infusion in the form of a bolus and the rest by infusion of the immunotherapeutic agent formulation. In some exemplary doses, the immunotherapeutic agent formulation can be administered subcutaneously in a dose ranging from about 0.001 to about 200 mg/kg, for example, from about 0.001 mg/kg to about 100 mg/kg, or from about 0.001 mg/kg to about 50 mg/kg, or from about 0.001 mg/kg to about 10 mg/kg intravenous injection of the immunotherapeutic agent, or antigen-binding fragment thereof. In some embodiments the dose may be given as a bolus, and the rest of the immunotherapeutic agent dose may be administered by subcutaneous or intravenous injection. A predetermined dose of the immunotherapeutic agent, or antigen-binding fragment thereof, may be administered, for example, over a period of an hour to two hours to five hours.

The formulation herein may also contain more than one active compound as necessary for the particular indication being treated, preferably those with complementary activities that do not adversely affect each other. For example, it may be desirable to provide one or more immunotherapeutic agents with other specificities. Alternatively, or in addition, the composition may comprise an anti-inflammatory agent, a chemotherapeutic agent, a cytotoxic agent, a cytokine, a growth inhibitory agent and/or a small molecule antagonist. Such molecules are suitably present in combination in amounts that are effective for the purpose intended.

The formulations to be used for in vivo administration should be sterile, or nearly so. This is readily accomplished by filtration through sterile filtration membranes.

In various embodiments, illustrative formulations of the pharmaceutical compositions described herein can be prepared using methods widely known in the field of pharmaceutical formulations. In general, such preparatory methods can include the step of bringing the active ingredient into association with a carrier or one or more other accessory ingredients, and then, if desirable, packaging the product into a desired single- or multi-dose unit.

In some embodiments, the composition comprising a compound of the invention can be also delivered in a vesicle, and the immunotherapeutic agent can be delivered in the same liposome formulation, or in a separate formulation that is compatible with the liposomal formulation containing the compound of the invention, In some illustrative examples, a liposome containing one or more liposomal surface moieties for example, polyethylene glycol, antibodies and antibody fragments thereof that target a desired tumor surface antigen, receptor, growth factor, glycoprotein, glycolipid or neoantigen, which are selectively transported into specific cells or organs, thus enhance targeted drug delivery.

In another embodiment, a compound of the invention can be delivered in a vesicle, in particular a liposome (see Langer, Science 249:1527-1533 (1990); Treat et al., in LIPOSOMES IN THE THERAPY OF INFECTIOUS DISEASE AND CANCER, Lopez-Berestein and Fidler (eds.), Liss, N.Y., pp. 353-365 (1989); Lopez-Berestein, ibid., pp. 317-327; see generally ibid.).

In yet another embodiment, a compound of the invention, or the composition containing the combination, or a composition containing the immunotherapeutic agent, can be delivered in a controlled release system. In one embodiment, a pump can be used (see Langer, supra; Sefton, CRC Crit. Ref. Biomed. Eng. 14:201 (1987); Buchwald et al., Surgery 88:507 (1980); Saudek et al., N. Engl. J. Med. 321:574 (1989)). In another embodiment, controlled release of the compound of the invention can comprise polymeric materials to provide sustained, intermediate, pulsatile, or alternate release (see MEDICAL APPLICATIONS OF CONTROLLED RELEASE, Langer and Wise (eds.), CRC Pres., Boca Raton, Fla. (1974); CONTROLLED DRUG BIOAVAILABILITY, DRUG PRODUCT DESIGN AND PERFORMANCE, Smolen and Ball (eds.), Wiley, New York (1984); Ranger and Peppas, J. Macromol. Sci. Rev. Macromol. Chem. 23:61 (1983); see also Levy et al., Science 228:190 (1985); During et al., Ann. Neurol. 25:351(1989); Howard et al., J. Neurosurg. 71:105 (1989)). Other controlled-release systems discussed in the review by Langer (Science 249:1527-1533 (1990)) can be used.

The optimum concentration of the active ingredient(s) in the chosen medium can be determined empirically, according to procedures well known to the skilled artisan, and will depend on the ultimate pharmaceutical formulation desired and the use to be employed.

The present disclosure also provides a pharmaceutical pack or kit comprising one or more containers filled with one or more of the ingredients of the pharmaceutical compositions of the disclosure, which at minimum will include a compound of the invention and one or more checkpoint inhibitor antibodies or antigen-binding fragment thereof as described herein. In other embodiments, the kit may contain one or more further containers providing a pharmaceutically acceptable excipient, for example a diluent. In one embodiment a kit may comprise at least one container, wherein the container can include a compound of the invention, a checkpoint inhibitor antibody or an antigen-binding fragment thereof of the present disclosure. The kit may also include a set of instructions for preparing and administering the final pharmaceutical composition to the subject in need thereof, for the treatment of a checkpoint molecule-mediated disease or disorder.

Some embodiments of the present disclosure, the immunotherapeutic agent is a population of immune cells, which can be administered in combination with a compound of the invention to treat a subject with cancer. In some embodiments, the immunotherapeutic agent is a population of immune cells, such as leukocytes (nucleated white blood cells), comprising (e.g., expressing) a receptor that binds to an antigen of interest. A leukocyte of the present disclosure may be, for example, a neutrophil, eosinophil, basophil, lymphocyte or a monocyte. In some embodiments, a leukocyte is a lymphocyte. Examples of lymphocytes include T cells, B cells, Natural Killer (NK) cells or NKT cells. In some embodiments, a T-cell is a CD4+ Th (T helper) cell, a CD8+ cytotoxic T cell, a γδT cell or a regulatory (suppressor) T cell. In some embodiments, an immune cell is a dendritic cell.

Immune cells of the present disclosure, in some embodiments, are genetically engineered to express an antigen-binding receptor. A cell is considered "engineered" if it contains an engineered (exogenous) nucleic acid. Engineered nucleic acids of the present disclosure may be introduced into a cell by any known (e.g., conventional) method. For example, an engineered nucleic acid may be introduced into a cell by electroporation (see, e.g., Heiser W. C. Transcription Factor Protocols: Methods in Molecular Biology™ 2000; 130: 117-134), chemical (e.g., calcium phosphate or lipid), transfection (see, e.g., Lewis W. H., et al., Somatic Cell Genet. 1980 May; 6(3): 333-47; Chen C., et al., Mol Cell Biol. 1987 August; 7(8): 2745-2752), fusion with bacterial protoplasts containing recombinant plasmids (see, e.g., Schaffner W. Proc Natl Acad Sci USA. 1980 April; 77(4): 2163-7), microinjection of purified DNA directly into the nucleus of the cell (see, e.g., Capecchi M. R. Cell. 1980 November; 22(2 Pt 2): 479-88), or retrovirus transduction.

Some aspects of the present disclosure provide an "adoptive cell" approach, which involves isolating immune cells (e.g., T-cells) from a subject with cancer, genetically engineering the immune cells (e.g., to express an antigen-binding receptor, such as a chimeric antigen receptor), expanding the cells ex vivo, and then re-introducing the immune cells into the subject. This method results in a greater number of engineered immune cells in the subject relative to what could be achieved by conventional gene delivery and vaccination methods. In some embodiments, immune cells are isolated from a subject, expanded ex vivo without genetic modification, and then re-introduced into the subject.

Immune cells of the present disclosure comprise receptors that bind to antigens, such as an antigen encoded by an exogenously delivered nucleic acid, as provided herein. In some embodiments, a leukocyte is modified (e.g., genetically modified) to express a receptor that binds to an antigen. The receptor may be, in some embodiments, a naturally-occurring antigen receptor (normally expressed on the immune cell), recombinant antigen receptor (not normally expressed on the immune cell) or a chimeric antigen receptor (CAR). Naturally-occurring and recombinant antigen receptors encompassed by the present disclosure include T cell receptors, B cell receptors, NK cell receptors, NKT cell receptors and dendritic cell receptors. A "chimeric antigen receptor" refers to an artificial immune cell receptor that is engineered to recognize and bind to an antigen expressed by tumor cells. Generally, a CAR is designed for a T cell and is a chimera of a signaling domain of the T-cell receptor (TcR) complex and an antigen-recognizing domain (e.g., a single chain fragment (scFv) of an antibody) (Enblad et al., Human Gene Therapy. 2015; 26(8):498-505), the disclosure of which is incorporated herein by reference in its entirety.

In some embodiments, an antigen binding receptor is a chimeric antigen receptor (CAR). A T cell that expressed a CAR is referred to as a "CAR T cell." A CAR T cell receptor, in some embodiments, comprises a signaling domain of the T-cell receptor (TcR) complex and an antigen-recognizing domain (e.g., a single chain fragment (scFv) of an antibody) (Enblad et al., Human Gene Therapy. 2015; 26(8):498-505) the disclosure of which is incorporated herein by reference in its entirety.

There are four generations of CARs, each of which contains different components. First generation CARs join an antibody-derived scFv to the CD3zeta (zeta. or z) intracellular signaling domain of the T-cell receptor through hinge and transmembrane domains. Second generation CARs incorporate an additional domain, e.g., CD28, 4-1BB (41BB), or ICOS, to supply a costimulatory signal. Third-generation CARs contain two costimulatory domains fused with the TcR CD3-zeta chain. Third-generation costimulatory domains may include, e.g., a combination of CD3z, CD27, CD28, 4-1BB, ICOS, or OX40. CARs, in some embodiments, contain an ectodomain (e.g., CD3), commonly derived from a single chain variable fragment (scFv), a hinge, a transmembrane domain, and an endodomain with one (first generation), two (second generation), or three (third generation) signaling domains derived from CD3Z and/or co-stimulatory molecules (Maude et al., Blood. 2015; 125(26):4017-4023; Kakarla and Gottschalk, Cancer J. 2014; 20(2):151-155) the disclosure of which is incorporated herein by reference in its entirety.

In some embodiments, the chimeric antigen receptor (CAR) is a T-cell redirected for universal cytokine killing (TRUCK), also known as a fourth generation CAR. TRUCKs are CAR-redirected T-cells used as vehicles to produce and release a transgenic cytokine that accumulates in the targeted tissue, e.g., a targeted tumor tissue. The transgenic cytokine is released upon CAR engagement of the target. TRUCK cells may deposit a variety of therapeutic cytokines in the target. This may result in therapeutic concentrations at the targeted site and avoid systemic toxicity.

CARs typically differ in their functional properties. The CD3zeta signaling domain of the T-cell receptor, when engaged, will activate and induce proliferation of T-cells but can lead to anergy (a lack of reaction by the body's defense mechanisms, resulting in direct induction of peripheral lymphocyte tolerance). Lymphocytes are considered anergic when they fail to respond to a specific antigen. The addition of a costimulatory domain in second-generation CARs improved replicative capacity and persistence of modified T-cells. Similar antitumor effects are observed in vitro with CD28 or 4-1BB CARs, but preclinical in vivo studies suggest that 4-1BB CARs may produce superior proliferation and/or persistence. Clinical trials suggest that both of these second-generation CARs are capable of inducing substantial T-cell proliferation in vivo, but CARs containing the 4-1BB costimulatory domain appear to persist longer. Third generation CARs combine multiple signaling domains (costimulatory) to augment potency. Fourth generation CARs are additionally modified with a constitutive or inducible expression cassette for a transgenic cytokine, which is released by the CAR T-cell to modulate the T-cell response. See, for example, Enblad et al., Human Gene Therapy. 2015; 26(8):498-505; Chmielewski and Hinrich, Expert Opinion on Biological Therapy. 2015; 15(8): 1145-1154 the disclosures of which are incorporated herein by reference in their entireties.

In some embodiments, an illustrative immunotherapeutic agent is a first generation chimeric antigen receptor CAR. In some embodiments, a chimeric antigen receptor is a third generation CAR. In some embodiments, a chimeric antigen receptor is a second generation CAR. In some embodiments, a chimeric antigen receptor is a third generation CAR. In some embodiments, the chimeric antigen receptor is a fourth generation CAR or a T-cell redirected for universal cytokine killing (TRUCK).

In some embodiments, a chimeric antigen receptor (CAR) comprises an extracellular domain comprising an antigen binding domain, a transmembrane domain, and a cytoplasmic domain. In some embodiments, a CAR is fully human. In some embodiments, the antigen binding domain of a CAR is specific for one or more antigens. In some embodiments, a "spacer" domain or "hinge" domain is located between an extracellular domain (comprising the antigen binding domain) and a transmembrane domain of a CAR, or between a cytoplasmic domain and a transmembrane domain of the CAR. A "spacer domain" refers to any oligopeptide or polypeptide that functions to link the transmembrane domain to the extracellular domain and/or the cytoplasmic domain in the polypeptide chain. A "hinge domain" refers to any oligopeptide or polypeptide that functions to provide flexibility to the CAR, or domains thereof, or to prevent steric hindrance of the CAR, or domains thereof. In some embodiments, a spacer domain or hinge domain may comprise up to 300 amino acids (e.g., 10 to 100 amino acids, or 5 to 20 amino acids). In some embodiments, one or more spacer domain(s) may be included in other regions of a CAR.

In some embodiments, a CAR of the disclosure comprises an antigen binding domain, such as a single chain Fv (scFv) specific for a tumor antigen. The choice of binding domain depends upon the type and number of ligands that define the surface of a target cell. For example, the antigen binding domain may be chosen to recognize a ligand that acts as a cell surface marker on target cells associated with a particular disease state, such as cancer or an autoimmune disease. Thus, examples of cell surface markers that may act as ligands for the antigen binding domain in the CAR of the present disclosure include those associated with cancer cells and/or other forms of diseased cells. In some embodiments, a CAR is engineered to target a tumor antigen of interest by way of engineering a desired antigen binding domain that specifically binds to an antigen on a tumor cell encoded by an engineered nucleic acid, as provided herein.

An antigen binding domain (e.g., an scFv) that "specifically binds" to a target or an epitope is a term understood in the art, and methods to determine such specific binding are also known in the art. A molecule is said to exhibit "specific binding" if it reacts or associates more frequently, more rapidly, with greater duration and/or with greater affinity with a particular target antigen than it does with alternative targets. An antigen binding domain (e.g., an scFv) that specifically binds to a first target antigen may or may not specifically bind to a second target antigen. As such, "specific binding" does not necessarily require (although it can include) exclusive binding.

In some embodiments, immune cells expressing a CAR are genetically modified to recognize multiple targets or antigens, which permits the recognition of unique target or antigen expression patterns on tumor cells. Examples of CARs that can bind multiple targets include: "split signal CARs," which limit complete immune cell activation to tumors expressing multiple antigens; "tandem CARs" (TanCARs), which contain ectodomains having two scFvs; and "universal ectodomain CARs," which incorporate avidin or a fluorescein isothiocyanate (FITC)-specific scFv to recognize tumor cells that have been incubated with tagged monoclonal antibodies (Mabs).

A CAR is considered "bispecific" if it recognizes two distinct antigens (has two distinct antigen recognition domains). In some embodiments, a bispecific CAR is comprised of two distinct antigen recognition domains present in tandem on a single transgenic receptor (referred to as a TanCAR; see, e.g., Grada Z et al. Molecular Therapy Nucleic Acids 2013; 2:e105, incorporated herein by reference in its entirety). Thus, methods, in some embodiments, comprise delivering to a tumor a combination comprising a compound of the invention and an immunotherapeutic agent, wherein the immunotherapeutic agent is an engineered nucleic acid that encodes an antigen, or delivering to a tumor an engineered nucleic acid that induces expression of a self-antigen, and delivering to the tumor an immune cell expressing a bispecific CAR that binds to two antigens, one of which is encoded by the engineered nucleic acid.

In some embodiments, a CAR is an antigen-specific inhibitory CAR (iCAR), which may be used, for example, to avoid off-tumor toxicity (Fedorov, V D et al. Sci. Transl. Med. published online Dec. 11, 2013, incorporated herein by reference in its entirety). iCARs contain an antigen-specific inhibitory receptor, for example, to block nonspecific immunosuppression, which may result from extra tumor target expression. iCARs may be based, for example, on inhibitory molecules CTLA-4 or PD-1. In some embodiments, these iCARs block T cell responses from T cells activated by either their endogenous T cell receptor or an activating CAR. In some embodiments, this inhibiting effect is temporary.

In some embodiments, CARs may be used in adoptive cell transfer, wherein immune cells are removed from a subject and modified so that they express receptors specific to an antigen, e.g., a tumor-specific antigen. The modified immune cells, which may then recognize and kill the cancer cells, are reintroduced into the subject (Pule, et al., Cytotherapy. 2003; 5(3): 211-226; Maude et al., Blood. 2015; 125(26): 4017-4023, each of which is incorporated herein by reference in their entireties).

According to other aspects of the disclosure, the tumor antigenic component in the vaccine of the invention is any natural or synthetic tumor-associated protein or peptide or combination of tumor-associated proteins and/or peptides or glycoproteins or glycopeptides. In still yet other aspects, the antigenic component can be patient-specific or common to many or most patients with a particular type of cancer. According to one aspect, the antigenic component consists of a cell lysate derived from tumor tissue removed from the patient being treated. In another aspect, the lysate can be engineered or synthesized from exosomes derived from tumor tissue. In yet another aspect, the antigenic component consists of a cell lysate derived from tumor tissue extracted from one or more unrelated individuals or from tumor-cell lines.

In various embodiments, an illustrative immunotherapeutic agent comprises one or more cancer vaccines, for use in combination with a compound of the invention. The tumor-associated antigen component of the vaccine may be manufactured by any of a variety of well-known techniques. For individual protein components, the antigenic protein is isolated from tumor tissue or a tumor-cell line by standard chromatographic means such as high-pressure liquid chromatography or affinity chromatography or, alternatively, it is synthesized by standard recombinant DNA technology in a suitable expression system, such as E. coli, yeast or plants. The tumor-associated antigenic protein is then purified from the expression system by standard chromatographic means. In the case of peptide antigenic components, these are generally prepared by standard automated synthesis. Proteins and peptides can be modified by addition of amino acids, lipids and other agents to improve their incorporation into the delivery system of the vaccine (such as a multilamellar liposome). For a tumor-associated antigenic component derived from the patient's own tumor, or tumors from other individuals, or cell lines, the tumor tissue, or a single cell suspension derived from the tumor tissue, is typically homogenized in a suitable buffer. The homogenate can also be fractionated, such as by centrifugation, to isolate particular cellular components such as cell membranes or soluble material. The tumor material can be used directly or tumor-associated antigens can be extracted for incorporation in the vaccine using a buffer containing a low concentration of a suitable agent such as a detergent. An example of a suitable detergent for extracting antigenic proteins from tumor tissue, tumor cells, and tumor-cell membranes is diheptanoyl phosphatidylcholine. Exosomes derived from tumor tissue or tumor cells, whether autologous or heterologous to the patient, can be used for the antigenic component for incorporation in the vaccine or as a starting material for extraction of tumor-associated antigens.

In some embodiments of the present disclosure, a combination therapy comprises a compound of the present invention in combination with a cancer vaccine immunotherapeutic agent. In various examples, the cancer vaccine includes at least one tumor-associated antigen, at least one immunostimulant, and optionally, at least one cell-based immunotherapeutic agent. In some embodiments, the immunostimulant component in the cancer vaccine of the disclosure is any Biological Response Modifier (BRM) with the ability to enhance the therapeutic cancer vaccine's effectiveness to induce humoral and cellular immune responses against cancer cells in a patient. According to one aspect, the immunostimulant is a cytokine or combination of cytokines. Examples of such cytokines include the interferons, such as IFN-gamma, the interleukins, such as IL-2, IL-15 and IL-23, the colony stimulating factors, such as M-CSF and GM-CSF, and tumor necrosis factor. According to another aspect, the immunostimulant component of the disclosed cancer vaccine includes one or more adjuvant-type immunostimulatory agents such as APC Toll-like Receptor agonists or costimulatory/cell adhesion membrane proteins, with or without immunostimulatory cytokines. Examples of Toll-like Receptor agonists include lipid A and CpG, and costimulatory/adhesion proteins such as CD80, CD86, and ICAM-1.

In some embodiments, the immunostimulant is selected from the group consisting of IFN-gamma (IFN-γ), IL-2, IL-15, IL-23, M-CSF, GM-CSF, tumor necrosis factor, lipid A, CpG, CD80, CD86, and ICAM-1, or combinations thereof. According to other aspects, the cell-based immunotherapeutic agent is selected from the group consisting of dendritic cells, tumor-infiltrating T lymphocytes, chimeric antigen receptor-modified T effector cells directed to the patient's tumor type, B lymphocytes, natural killer cells, bone marrow cells, and any other cell of a patient's immune system, or combinations thereof. In one aspect, the cancer vaccine immunostimulant includes one or more cytokines, such as interleukin 2 (IL-2), GM-CSF, M-CSF, and interferon-gamma (IFN-γ), one or more Toll-like Receptor agonists and/or adjuvants, such as monophosphoryl lipid A, lipid A, muramyl dipeptide (MDP) lipid conjugate and double stranded RNA, or one or more costimulatory membrane proteins and/or cell adhesion proteins, such CD80, CD86 and ICAM-1, or any combination of the above. In one aspect, the cancer vaccine includes an immunostimulant that is a cytokine selected from the group consisting of interleukin 2 (IL-2), GM-CSF, M-CSF, and interferon-gamma (IFN-γ). In another aspect, the cancer vaccine includes an immunostimulant that is a Toll-like Receptor agonist and/or adjuvant selected from the group consisting of monophosphoryl lipid A, lipid A, and muramyl dipeptide (MDP) lipid conjugate and double stranded RNA. In yet another aspect, the cancer vaccine includes an immunostimulant that is a costimulatory membrane protein and/or cell adhesion protein selected from the group consisting of CD80, CD86, and ICAM-1.

In various embodiments, an immunotherapeutic agent can include a cancer vaccine, wherein the cancer vaccine incorporates any tumor antigen that can be potentially used to construct a fusion protein according to the invention and particularly the following:

(a) cancer-testis antigens including NY-ESO-1, SSX2, SCP1 as well as RAGE, BAGE, GAGE and MAGE family polypeptides, for example, GAGE-1, GAGE-2, MAGE-1 MAGE-2, MAGE-3, MAGE-4, MAGE-5, MAGE-6, and MAGE-12, which can be used, for example, to address melanoma, lung, head and neck, NSCLC, breast, gastrointestinal, and bladder tumors; (b) mutated antigens, including p53, associated with various solid tumors, e.g., colorectal, lung, head and neck cancer; p21/Ras associated with, e.g., melanoma, pancreatic cancer and colorectal cancer; CDK4, associated with, e.g., melanoma; MUM1 associated with, e.g., melanoma; caspase-8 associated with, e.g., head and neck cancer; CIA 0205 associated with, e.g., bladder cancer; HLA-A2-R1701, beta catenin associated with, e.g., melanoma; TCR associated with, e.g., T-cell non-Hodgkin lymphoma; BCR-abl associated with, e.g., chronic myelogenous leukemia; triosephosphate isomerase; KIA 0205; CDC-27, and LDLR-FUT; (c) over-expressed antigens, including, Galectin 4 associated with, e.g., colorectal cancer; Galectin 9 associated with, e.g., Hodgkin's disease; proteinase 3 associated with, e.g., chronic myelogenous leukemia; WT 1 associated with, e.g., various leukemias; carbonic anhydrase associated with, e.g., renal cancer; aldolase A associated with, e.g., lung cancer; PRAME associated with, e.g., melanoma; HER-2/neu associated with, e.g., breast, colon, lung and ovarian cancer; mammaglobin, alpha-fetoprotein associated with, e.g., hepatoma; KSA associated with, e.g., colorectal cancer; gastrin associated with, e.g., pancreatic and gastric cancer; telomerase catalytic protein, MUC-1 associated with, e.g., breast and ovarian cancer; G-250 associated with, e.g., renal cell carcinoma; p53 associated with, e.g., breast, colon cancer; and carcinoembryonic antigen associated with, e.g., breast cancer, lung cancer, and cancers of the gastrointestinal tract such as colorectal cancer; (d) shared antigens, including melanoma-melanocyte differentiation antigens such as MART-1/Melan A; gp100; MC1R; melanocyte-stimulating hormone receptor; tyrosinase; tyrosinase related protein-1/TRP1 and tyrosinase related protein-2/TRP2 associated with, e.g., melanoma; (e) prostate associated antigens including PAP, PSA, PSMA, PSH-P1, PSM-P1, PSM-P2, associated with e.g., prostate cancer; (f) immunoglobulin idiotypes associated with myeloma and B cell lymphomas. In certain embodiments, the one or more TAA can be selected from pi 5, Hom/Mel-40, H-Ras, E2A-PRL, H4-RET, IGH-IGK, MYL-RAR, Epstein Barr virus antigens, EBNA, human papillomavirus (HPV) antigens, including E6 and E7, hepatitis B and C virus antigens, human T-cell lymphotropic virus antigens, TSP-180, pl85erbB2, pl 80erbB-3, c-met, mn-23H1, TAG-72-4, CA 19-9, CA 72-4, CAM 17.1, NuMa, K-ras, pi 6, TAGE, PSCA, CT7, 43-9F, 5T4, 791 Tgp72, beta-HCG, BCA225, BTAA, CA 125, CA 15-3 (CA 27.29\BCAA), CA 195, CA 242, CA-50, CAM43, CD68†KP1, CO-029, FGF-5, Ga733 (EpCAM), HTgp-175, M344, MA-50, MG7-Ag, MOV18, NB/70K, NY-CO-1, RCAS1, SDCCAG16, TA-90 (Mac-2 binding protein/cyclophilin C-associated protein), TAAL6, TAG72, TLP, TPS or any combinations thereof.

In some embodiments, the present disclosure provides a compound of the present invention for use in combination with a cancer vaccine, which can include a tumor antigen comprising the entire amino acid sequence, a portion of it, or specific immunogenic epitopes of a human protein.

In various embodiments, an illustrative immunotherapeutic agent may include an mRNA operable to encode any one or more of the aforementioned cancer antigens useful for synthesizing a cancer vaccine. In some illustrative embodiments, the mRNA based cancer vaccine may have one or more of the following properties: a) the mRNA encoding each cancer antigen is interspersed by cleavage sensitive sites; b) the mRNA encoding each cancer antigen is linked directly to one another without a linker; c) the mRNA encoding each cancer antigen is linked to one another with a single nucleotide linker; d) each cancer antigen comprises a 20-40 amino acids and includes a centrally located SNP mutation; e) at least 40% of the cancer antigens have a highest affinity for class I MHC molecules from the subject; f) at least 40% of the cancer antigens have a highest affinity for class II MHC molecules from the subject; g) at least 40% of the cancer antigens have a predicted binding affinity of IC>500 nM for HLA-A, HLA-B and/or DRB1; h) the mRNA encodes 1 to 15 cancer antigens; i) 10-60% of the cancer antigens have a binding affinity for class I MHC and 10-60% of the cancer antigens have a binding affinity for class II MHC; and/or j) the mRNA encoding the cancer antigens is arranged such that the cancer antigens are ordered to minimize pseudo-epitopes.

In various embodiments, the combination comprising a compound of the invention and a cancer vaccine immunotherapeutic agent as disclosed herein can be used to illicit an immune response in a subject against a cancer antigen. The method involves administering to the subject a RNA vaccine comprising at least one RNA polynucleotide having an open reading frame encoding at least one antigenic polypeptide or an immunogenic fragment thereof, thereby inducing in the subject an immune response specific to the antigenic polypeptide or an immunogenic fragment thereof, in combination with administering a compound of the invention either in the same composition or a separate composition, administered at the same time, or sequentially dosed, wherein the anti-antigenic polypeptide antibody titer in the subject is increased following vaccination relative to anti-antigenic polypeptide antibody titer in a subject vaccinated with a prophylactically effective dose of a traditional vaccine against the cancer. An "anti-antigenic polypeptide antibody" is a serum antibody the binds specifically to the antigenic polypeptide.

A prophylactically effective dose is a therapeutically effective dose that prevents advancement of cancer at a clinically acceptable level. In some embodiments the therapeutically effective dose is a dose listed in a package insert for the vaccine. A traditional vaccine, as used herein, refers to a vaccine other than the mRNA vaccines of the invention.

For instance, a traditional vaccine includes but is not limited to live microorganism vaccines, killed microorganism vaccines, subunit vaccines, protein antigen vaccines, DNA vaccines, and the like. In exemplary embodiments, a traditional vaccine is a vaccine that has achieved regulatory approval and/or is registered by a national drug regulatory body, for example the Food and Drug Administration (FDA) in the United States or the European Medicines Agency (EMA.)

In some embodiments the anti-antigenic polypeptide antibody titer in the subject is increased 1 log to 10 log following vaccination relative to anti-antigenic polypeptide antibody titer in a subject vaccinated with a prophylactically effective dose of a traditional vaccine against the cancer. In some embodiments the anti-antigenic polypeptide antibody titer in the subject is increased 1 log following vaccination relative to anti-antigenic polypeptide antibody titer in a subject vaccinated with a prophylactically effective dose of a traditional vaccine against the cancer. In some embodiments the anti-antigenic polypeptide antibody titer in the subject is increased 2 log following vaccination relative to anti-antigenic polypeptide antibody titer in a subject vaccinated with a prophylactically effective dose of a traditional vaccine against the cancer.

Aspects of the invention provide nucleic acid vaccines comprising one or more RNA polynucleotides having an open reading frame encoding a first antigenic polypeptide, wherein the RNA polynucleotide is present in the formulation for in vivo administration to a host, which confers an antibody titer superior to the criterion for sero-protection for the first antigen for an acceptable percentage of human subjects. In some embodiments, the antibody titer produced by the mRNA vaccines of the invention is a neutralizing antibody titer. In some embodiments the neutralizing antibody titer is greater than a protein vaccine. In other embodiments the neutralizing antibody titer produced by the mRNA vaccines of the invention is greater than an adjuvanted protein vaccine. In yet other embodiments the neutralizing antibody titer produced by the mRNA vaccines of the invention is 1,000-10,000, 1,200-10,000, 1,400-10,000, 1,500-10,000, 1,000-5,000, 1,000-4,000, 1,800-10,000, 2000-10,000, 2,000-5,000, 2,000-3,000, 2,000-4,000, 3,000-5,000, 3,000-4,000, or 2,000-2,500. A neutralization titer is typically expressed as the highest serum dilution required to achieve a 50% reduction in the number of plaques.

In preferred aspects, RNA vaccine immunotherapeutic agents of the present disclosure (e.g., mRNA vaccines) produce prophylactically- and/or therapeutically-efficacious levels, concentrations and/or titers of antigen-specific antibodies in the blood or serum of a vaccinated subject. As defined herein, the term antibody titer refers to the amount of antigen-specific antibody produces in s subject, e.g., a human subject. In exemplary embodiments, antibody titer is expressed as the inverse of the greatest dilution (in a serial dilution) that still gives a positive result. In exemplary embodiments, antibody titer is determined or measured by enzyme-linked immunosorbent assay (ELISA). In exemplary embodiments, antibody titer is determined or measured by neutralization assay, e.g., by microneutralization assay. In certain aspects, antibody titer measurement is expressed as a ratio, such as 1:40, 1:100, and the like.

In exemplary embodiments of the invention, an efficacious vaccine produces an antibody titer of greater than 1:40, greater that 1:100, greater than 1:400, greater than 1:1000, greater than 1:2000, greater than 1:3000, greater than 1:4000, greater than 1:500, greater than 1:6000, greater than 1:7500, greater than 1:10000. In exemplary embodiments, the antibody titer is produced or reached by 10 days following vaccination, by 20 days following vaccination, by 30 days following vaccination, by 40 days following vaccination, or by 50 or more days following vaccination. In exemplary embodiments, the titer is produced or reached following a single dose of vaccine administered to the subject. In other embodiments, the titer is produced or reached following multiple doses, e.g., following a first and a second dose (e.g., a booster dose.) In exemplary aspects of the invention, antigen-specific antibodies are measured in units of g/mL or are measured in units of IU/L (International Units per liter) or mIU/mL (milli International Units per mL). In exemplary embodiments of the invention, an efficacious vaccine produces >0.5 µg/mL, >0.1 µg/mL, >0.2 µg/mL, >0.35 µg/mL, >0.5 µg/mL, >1 µg/mL, >2 µg/mL, >5 µg/mL or >10 µg/mL. In exemplary embodiments of the invention, an efficacious vaccine produces >10 mIU/mL, >20 mIU/mL, >50 mIU/mL, >100 mIU/mL, >200 mIU/mL, >500 mIU/mL or >1000 mIU/mL. In exemplary embodiments, the antibody level or concentration is produced or reached by 10 days following vaccination, by 20 days following vaccination, by 30 days following vaccination, by 40 days following vaccination, or by 50 or more days following vaccination. In exemplary embodiments, the level or concentration is produced or reached following a single dose of vaccine administered to the subject. In other embodiments, the level or concentration is produced or reached following multiple doses, e.g., following a first and a second dose (e.g., a booster dose.) In exemplary embodiments, antibody level or concentration is determined or measured by enzyme-linked immunosorbent assay (ELISA). In exemplary embodiments, antibody level or concentration is determined or measured by neutralization assay, e.g., by microneutralization assay. Also provided are nucleic acid vaccines comprising one or more RNA polynucleotides having an open reading frame encoding a first antigenic polypeptide or a concatemeric polypeptide, wherein the RNA polynucleotide is present in a formulation for in vivo administration to a host for eliciting a longer lasting high antibody titer than an antibody titer elicited by an mRNA vaccine having a stabilizing element or formulated with an adjuvant and encoding the first antigenic polypeptide. In some embodiments, the RNA polynucleotide is formulated to produce a neutralizing antibodies within one week of a single administration. In some embodiments, the adjuvant is selected from a cationic peptide and an immunostimulatory nucleic acid. In some embodiments, the cationic peptide is protamine.

Immunotherapeutic agents comprising a nucleic acid vaccine comprising one or more RNA polynucleotides having an open reading frame comprising at least one chemical modification or optionally no nucleotide modification, the open reading frame encoding a first antigenic polypeptide or a concatemeric polypeptide, wherein the RNA polynucleotide is present in the formulation for in vivo administration to a host such that the level of antigen expression in the host significantly exceeds a level of antigen expression produced by an mRNA vaccine having a stabilizing element or formulated with an adjuvant and encoding the first antigenic polypeptide.

Other aspects provide nucleic acid vaccines comprising one or more RNA polynucleotides having an open reading frame comprising at least one chemical modification or optionally no nucleotide modification, the open reading frame encoding a first antigenic polypeptide or a concatemeric polypeptide, wherein the vaccine has at least 10 fold less RNA polynucleotide than is required for an unmodified mRNA vaccine to produce an equivalent antibody titer. In some embodiments, the RNA polynucleotide is present in a dosage of 25-100 micrograms.

Aspects of the invention also provide a unit of use vaccine, comprising between 10 μg and 400 μg of one or more RNA polynucleotides having an open reading frame comprising at least one chemical modification or optionally no nucleotide modification, the open reading frame encoding a first antigenic polypeptide or a concatemeric polypeptide, and a pharmaceutically acceptable carrier or excipient, formulated for delivery to a human subject. In some embodiments, the vaccine further comprises a cationic lipid nanoparticle.

Aspects of the invention provide methods of creating, maintaining or restoring antigenic memory to a tumor in an individual or population of individuals comprising administering to said individual or population an antigenic memory booster nucleic acid vaccine comprising (a) at least one RNA polynucleotide, said polynucleotide comprising at least one chemical modification or optionally no nucleotide modification and two or more codon-optimized open reading frames, said open reading frames encoding a set of reference antigenic polypeptides, and (b) optionally a pharmaceutically acceptable carrier or excipient. In some embodiments, the vaccine is administered to the individual via a route selected from the group consisting of intramuscular administration, intradermal administration and subcutaneous administration. In some embodiments, the administering step comprises contacting a muscle tissue of the subject with a device suitable for injection of the composition. In some embodiments, the administering step comprises contacting a muscle tissue of the subject with a device suitable for injection of the composition in combination with electroporation.

Aspects of the invention provide methods of vaccinating a subject comprising administering to the subject a single dosage of between 25 μg/kg and 400 μg/kg of a nucleic acid vaccine comprising one or more RNA polynucleotides having an open reading frame encoding a first antigenic polypeptide or a concatemeric polypeptide in an effective amount to vaccinate the subject.

Other aspects provide nucleic acid vaccines comprising one or more RNA polynucleotides having an open reading frame comprising at least one chemical modification, the open reading frame encoding a first antigenic polypeptide or a concatemeric polypeptide, wherein the vaccine has at least 10 fold less RNA polynucleotide than is required for an unmodified mRNA vaccine to produce an equivalent antibody titer. In some embodiments, the RNA polynucleotide is present in a dosage of 25-100 micrograms.

In some embodiments, a compound of the invention can be used in combination with a bispecific antibody immunotherapeutic agent. The bispecific antibody can include a protein construct having a first antigen binding moiety and a second antigen binding site that binds to a cytotoxic immune cell. The first antigen binding site can bind to a tumor antigen that is specifically being treated with the combination of the present invention. For example, the first antigen binding moiety may bind to a non-limiting example of tumor antigens selected from: EGFR, HGFR, Her2, Ep-CAM, CD20, CD30, CD33, CD47, CD52, CD133, CEA, gpA33, Mucins, TAG-72, CIX, PSMA, folate-binding protein, GD2, GD3, GM2, VEGF, VEGFR, Integrin αVβ3, Integrin α5β1, MUC1, ERBB2, ERBB3, MET, IGF1R, EPHA3, TRAILR1, TRAILR2, RANKL, FAP and Tenascin among others. In some embodiments, the first antigen binding moiety has specificity to a protein or a peptide that is overexpressed on a tumor cell as compared to a corresponding non-tumor cell. In some embodiments, the first antigen binding moiety has specificity to a protein that is overexpressed on a tumor cell as compared to a corresponding non-tumor cell. A "corresponding non-tumor cell" as used here, refers to a non-tumor cell that is of the same cell type as the origin of the tumor cell. It is noted that such proteins are not necessarily different from tumor antigens. Non-limiting examples include carcinoembryonic antigen (CEA), which is overexpressed in most colon, rectum, breast, lung, pancreas and gastrointestinal tract carcinomas; heregulin receptors (HER-2, neu or c-erbB-2), which is frequently overexpressed in breast, ovarian, colon, lung, prostate and cervical cancers; epidermal growth factor receptor (EGFR), which is highly expressed in a range of solid tumors including those of the breast, head and neck, non-small cell lung and prostate; asialoglycoprotein receptor; transferrin receptor; serpin enzyme complex receptor, which is expressed on hepatocytes; fibroblast growth factor receptor (FGFR), which is overexpressed on pancreatic ductal adenocarcinoma cells; vascular endothelial growth factor receptor (VEGFR), for anti-angiogenesis gene therapy; folate receptor, which is selectively overexpressed in 90% of nonmucinous ovarian carcinomas; cell surface glycocalyx; carbohydrate receptors; and polymeric immunoglobulin receptor.

The second antigen-binding moiety is any molecule that specifically binds to an antigen or protein or polypeptide expressed on the surface of a cytotoxic immune cell (a CIK cell). Exemplary non-limiting antigens expressed on the surface of the cytotoxic immune cells suitable for use with the present disclosure may include CD2, CD3, CD4, CD5, CD8, CD11a, CD11 b, CD14, CD16a, CD27, CD28, CD45, CD45RA, CD56, CD62L, the Fc receptor, LFA, LFA-1, TCRαβ, CCR7, macrophage inflammatory protein 1a, perforin, PD-1, PD-L1, PD-L2, or CTLA-4, LAG-3, OX40, 41BB, LIGHT, CD40, GITR, TGF-beta, TIM-3, SIRP-alpha, TIGIT, VSIG8, BTLA, SIGLEC7, SIGLEC9, ICOS, B7H3, B7H4, FAS, BTNL2, CD27 and Fas ligand. In some embodiments, the second antigen binding moiety binds to CD3 of the cytotoxic immune cell, e.g., CIK cell. In some embodiments, the second antigen binding moiety binds to CD56 of the cytotoxic immune cell. In some embodiments, the second antigen binding moiety binds to the Fc receptor of the cytotoxic immune cell. In some embodiments, the Fc region of the bispecific antibody binds to the Fc receptor of the cytotoxic immune cell. In some embodiments, a second antigen-binding moiety is any molecule that specifically binds to an antigen expressed on the surface of a cytotoxic immune cell (e.g., a CIK cell). The second antigen binding moiety is specific for an antigen on a cytotoxic immune cell. Exemplary cytotoxic immune cells include, but are not limited to CIK cells, T-cells, CD8+ T cells, activated T-cells, monocytes, natural killer (NK) cells, NK T cells, lymphokine-activated killer (LAK) cells, macrophages, and dendritic cells. The second antigen binding moiety specifically binds to an antigen expressed on the surface of a cytotoxic immune cell. Exemplary non-limiting antigens expressed on the surface of the cytotoxic immune cells suitable for modulation with the present disclosure may include CD2, CD3, CD4, CD5, CD8, CD11a, CD11 b, CD14, CD16a, CD27, CD28, CD45, CD45RA, CD56, CD62L, the Fc receptor, LFA, LFA-1, TCRαβ, CCR7, macrophage inflammatory protein 1a, perforin, PD-1, PD-L1, PD-L2, or CTLA-4, LAG-3, OX40, 41BB, LIGHT, CD40, GITR, TGF-beta, TIM-3, SIRP-alpha, TIGIT, VSIG8, BTLA, SIGLEC7, SIGLEC9, ICOS, B7H3, B7H4, FAS, BTNL2, CD27 and Fas ligand. In other embodiments, the bispecific antibody modulator is an activator of a costimulatory molecule (e.g., an OX40 agonist). In one embodiment, the OX40 agonist is a bispecific antibody molecule to OX40 and another tumor antigen or a costimulatory antigen. The OX40 agonist can be administered alone, or in combination with other immunomodulators, e.g., in combination with an inhibitor (for example an antibody construct) of PD-1, PD-L1, CTLA-4, CEACAM (e.g., CEACAM-1, -3 and/or -5), TIM-3 or LAG-3. In some embodiments, the anti-OX40 antibody molecule is a bispecific antibody that binds to GITR and PD-1, PD-L1, CTLA-4, CEACAM (e.g., CEACAM-1, -3 and/or -5), TIM-3 or LAG-3. In one exemplary embodiment, an OX40 antibody molecule is administered in combination with an anti-PD-1 antibody molecule (e.g., an anti-PD-1 molecule as described herein). The OX40 antibody molecule and the anti-PD-1 antibody molecule may be in the form of separate antibody composition, or as a bispecific antibody molecule. In other embodiments, the OX40 agonist can be administered in combination with other costimulatory molecule, e.g., an agonist of GITR, CD2, CD27, CD28, CDS, ICAM-1, LFA-1 (CD11a/CD18), ICOS (CD278), 4-1BB (CD137), CD30, CD40, BAFFR, HVEM, CD7, LIGHT, NKG2C, SLAMF7, NKp80, CD160, B7-H3, or CD83 ligand. In some embodiments, the second antigen binding moiety binds to the Fc receptor on the cytotoxic immune cell, e.g., CIK cell.

In some embodiments, the bispecific antibody immunotherapeutic agent has specificities for a tumor antigen and a CIK cell, which brings the tumor antigen expressing tumor cell in close proximity of the CIK cell, leading to the elimination of the tumor cell through anti-tumor cytotoxicity of CIK cell. In some embodiments, the bispecific antibody has specificity for a tumor antigen but does not have specificity for a CIK cell, however, the Fc region of the bispecific antibody can bind to the Fc receptor of the CIK cell, which in turn brings the tumor cell in close proximity of the CIK cell, leading to the elimination of the tumor cell through anti-tumor cytotoxicity of CIK cell. In some embodiments, the bispecific antibody has specificity for a CIK cell but does not have specificity for tumor cell, however, the Fc region of the bispecific antibody can bind to the Fc receptor of the tumor cell, which in turn brings the tumor cell in close proximity of the CIK cell, leading to the elimination of the tumor cell through anti-tumor cytotoxicity of CIK cell.

In some embodiments, a compound of the invention can be used in combination with an immune cell-engaging multivalent antibody/fusion protein/construct immunotherapeutic agent. In various embodiments, an exemplary immunotherapeutic agent can include immune cell-engaging multivalent antibody/fusion protein/construct which may comprise a recombinant structure, for example, all engineered antibodies that do not imitate the original IgG structure. Here, different strategies to multimerize antibody fragments are utilized. For example, shortening the peptide linker between the V domains forces the scFv to self-associate into a dimer (diabody; 55 kDa). Bispecific diabodies are formed by the noncovalent association of two VHA-VLB and VHB-VLA fragments expressed in the same cell. This leads to the formation of heterodimers with two different binding sites. Single-chain diabodies (sc-diabodies) are bispecific molecules where the VHA-VLB and VHB-VLA fragments are linked together by an additional third linker. Tandem-diabodies (Tandabs) are tetravalent bispecific antibodies generated by two scDiabodies.

Also included are the di-diabodies known in the art. This 130-kDa molecule is formed by the fusion of a diabody to the N-terminus of the CH3 domain of an IgG, resulting in an IgG-like structure. Further diabody derivatives are the triabody and the tetra-body, which fold into trimeric and tetrameric fragments by shortening the linker to <5 or 0-2 residues. Also exemplified are (scFv)2 constructs known as 'bispecific T cell engager' (BITE). BITEs are bispecific single-chain antibodies consisting of two scFv antibody fragments, joined via a flexible linker, that are directed against a surface antigen on target cells and CD3 on T cells. Also exemplified are bivalent (Fab)2 and trivalent (Fab)$_3$ antibody formats. Also exemplified are minibodies and trimerbodies generated from scFvs. Exemplary constructs useful to target tumor antigens as can include one or more of: Diabody, Single-chain (sc)-diabody (scFv)2, Minianti-body, Minibody, Barnase-barstar, scFv-Fc, sc(Fab)2, Trimeric antibody constructs, Triabody antibody constructs, Trimerbody antibody constructs, Tribody antibody constructs, Collabody antibody constructs, (scFv-TNFa)3, F(ab)3/DNL. Exemplary cytotoxic immune cells include, but are not limited to CIK cells, T-cells, CD8+ T cells, activated T-cells, monocytes, natural killer (NK) cells, NK T cells, lymphokine-activated killer (LAK) cells, macrophages, and dendritic cells.

In some embodiments, a compound of the invention can by used in combination with a radioconjugate immunotherapeutic agent.

In various embodiments, a radioconjugate is a small molecule or large molecule (herein referred to as a "cell targeting agent"), for example and polypeptide, an antibody or an antibody fragment thereof, that is coupled to or otherwise affixed to a radionuclide, or a plurality of radionuclides, such that the binding of the radioconjugate to its target (a protein or molecule on or in a cancer cell), will lead to the death or morbidity of said cancer cell. In various embodiments, the radioconjugate can be a cell targeting agent labelled with a radionuclide, or the cell targeting agent may be coupled or otherwise affixed to a particle, or microparticle, or nanoparticle containing a plurality of radionuclides, wherein the radionuclides are the same or different. Methods for synthesizing radioconjugates are known in the art, and may include the class of immunoglobulin or antigen binding parts thereof, that are conjugated to a toxic radionuclide.

In some embodiments, the molecule that binds to the cancer cell can be known as a "cell targeting agent". As used herein, an exemplary cell targeting agent can allow the drug-containing nanoparticles or radionuclide to target the specific types of cells of interest. Examples of cell targeting agents include, but are not limited to, small molecules (e.g., folate, adenosine, purine) and large molecule (e.g., peptide or antibody) that bind to or target a tumor associated antigen. Examples of tumor associated antigens include, but are not limited to, adenosine receptors, alpha v beta 3, aminopeptidase P, alpha fetoprotein, cancer antigen 125, carcinoembryonic antigen, cCaveolin-1, chemokine receptors, clusterin, oncofetal antigens, CD20, epithelial tumor antigen, melanoma associated antigen, Ras, p53, Her2/Neu, ErbB2, ErbB3, ErbB4, folate receptor, prostate-specific membrane antigen, prostate specific antigen, purine receptors, radiation-induced cell surface receptor, serpin B3, serpin B4, squamous cell carcinoma antigens, thrombospondin, tumor antigen 4, tumor-associated glycoprotein 72, tyrosinase, and tyrosine kinases. In some embodiments, the cell targeting agent is folate or a folate derivative that binds specifically to folate receptors (FRs). In some embodiments, the cell targeting agent is an antibody, a bispecific antibody, a trispecific antibody or an antigen binding construct thereof, that specifically binds to a cancer antigen selected from: EGFR, HGFR, Her2, Ep-CAM, CD20, CD30, CD33, CD47, CD52, CD133, CEA, gpA33, Mucins, TAG-72, CIX, PSMA, folate-binding protein, GD2, GD3, GM2, VEGF. VEGFR, Integrin αVβ, Integrin α5β1, MUC1, ERBB2, ERBB3, MET, IGF1R, EPHA3, TRAILR1, TRAILR2, RANKL, FAP and Tenascin among others.

The use of folate as a targeting agent in the radioconjugate also allow both tumor cells and regulatory T (Treg) cells to be targeted for destruction. It is well accepted that high numbers of Treg cells suppress tumor immunity. Specifically, Treg cells suppress (foreign and self) reactive T cells without killing them through contact-dependent or cytokine (e.g., IL-10, TGF-.beta., and the like.) secretion. FR4 is selectively upregulated on Treg cells. It has been shown that antibody blockade of FR4 depleted Treg cells and provoked tumor immunity in tumor-bearing mice. Thus, folate-coated PBM nanoparticles carrying a cytotoxic agent would take FR-expressing cells for their destruction, which would both directly (i.e., BrCa cell) and indirectly (i.e., breast tumor associated and peripheral Treg cells) inhibit tumor progression.

In another further embodiment, the targeting agent is an antibody or peptide, or immune cell-engaging multivalent antibody/fusion protein/constructs capable of binding tumor associated antigens consisting of but not limited to: adenosine receptors, alpha v beta 3, aminopeptidase P, alpha fetoprotein, cancer antigen 125, carcinoembryonic antigen, caveolin-1, chemokine receptors, clusterin, oncofetal antigens, CD20, Human Growth Factor Receptor (HGFR), epithelial tumor antigen, melanoma associated antigen, MUC1, Ras, p53, Her2/Neu, ErbB2, ErbB3, ErbB4, folate receptor, prostate-specific membrane antigen, prostate specific antigen, purine receptors, radiation-induced cell surface receptor, serpin B3, serpin B4, squamous cell carcinoma antigens, thrombospondin, tumor antigen 4, tumor-associated glycoprotein 72, tyrosinase, tyrosine kinases, and the like.

In some embodiments, a compound as described herein can be used in combination with a vaccination protocol for the treatment of cancer. In some embodiments, a compound as described herein can be used in combination with an immunotherapeutic agent such as a vaccine. In various embodiments, exemplary vaccines include those used to stimulate the immune response to cancer antigens.

The amount of both the compound disclosed herein or salt thereof and the additional one or more additional therapeutic agent (in those compositions which comprise an additional therapeutic agent as described above) that may be combined with carrier materials to produce a single dosage form will vary depending upon the host treated and the particular mode of administration. In certain embodiments, compositions of this invention are formulated such that a dosage of between 0.01-100 mg/kg body weight/day of an inventive can be administered.

The additional therapeutic agent and the compound disclosed herein may act synergistically. Therefore, the amount of additional therapeutic agent in such compositions may be less than that required in a monotherapy utilizing only that therapeutic agent, or there may be fewer side effects for the patient given that a lower dose is used. In certain embodiments, in such compositions a dosage of between 0.01-10,000 µg/kg body weight/day of the additional therapeutic agent can be administered.

Labeled Compounds and Assay Methods

Another aspect of the present invention relates to labeled compounds of the invention (radio-labeled, fluorescent-labeled, and the like.) that would be useful not only in imaging techniques but also in assays, both in vitro and in vivo, for localizing and quantitating TAM kinases in tissue samples, including human, and for identifying TAM kinase ligands by inhibition binding of a labeled compound. Accordingly, the present invention includes TAM kinase assays that contain such labeled compounds.

The present invention further includes isotopically-labeled compounds of the invention. An "isotopically" or "radio-labeled" compound is a compound of the invention where one or more atoms are replaced or substituted by an atom having an atomic mass or mass number different from the atomic mass or mass number typically found in nature (i.e., naturally occurring). Suitable radionuclides that may be incorporated in compounds of the present invention include but are not limited to $^2H$ (also written as D for deuterium), $^3H$ (also written as T for tritium), $^{11}C$, $^{13}C$, $^{14}C$, $^{13}N$, $^{15}N$, $^{15}O$, $^{17}O$, $^{18}O$, $^{18}F$, $^{35}S$, $^{36}C_1$, $^{82}Br$, $^{75}Br$, $^{76}Br$, $^{77}Br$, $^{123}I$, $^{124}I$, $^{125}I$, and $^{131}I$. The radionuclide that is incorporated in the instant radio-labeled compounds will depend on the specific application of that radio-labeled compound. For example, for in vitro metalloprotease labeling and competition assays, compounds that incorporate $^3H$, $^{14}C$, $^{82}Br$, $^{125}I$, $^{131}I$, or $^{35}S$ will generally be most useful. For radio-imaging applications $^{11}C$, $^{18}F$, $^{125}I$, $^{123}I$, $^{124}I$, $^{131}I$ $^{75}Br$, $^{76}Br$, or $^{77}Br$ will generally be most useful.

It is understood that a "radio-labeled" or "labeled compound" is a compound that has incorporated at least one radionuclide. In some embodiments, the radionuclide is selected from the group consisting of $^3H$, $^{14}C$, $^{125}I$, $^{35}S$, and $^{82}Br$.

The present invention can further include synthetic methods for incorporating radio-isotopes into compounds of the invention. Synthetic methods for incorporating radio-isotopes into organic compounds are well known in the art, and a person of ordinary skill in the art will readily recognize the methods applicable for the compounds of invention.

A labeled compound of the invention can be used in a screening assay to identify/evaluate compounds. For example, a newly synthesized or identified compound (i.e., test compound) which is labeled can be evaluated for its ability to bind a TAM by monitoring its concentration variation when contacting with the TAM kinases, through tracking of the labeling. For example, a test compound (labeled) can be evaluated for its ability to reduce binding of another compound which is known to bind to a TAM kinase (i.e., standard compound). Accordingly, the ability of a test compound to compete with the standard compound for binding to the TAM kinase directly correlates to its binding affinity. Conversely, in some other screening assays, the standard compound is labeled, and test compounds are unlabeled. Accordingly, the concentration of the labeled standard compound is monitored in order to evaluate the competition between the standard compound and the test compound, and the relative binding affinity of the test compound is thus ascertained.

Synthesis

Compounds of this invention can be made by the synthetic procedures described below. The starting materials and reagents used in preparing these compounds are either available from commercial suppliers such as Sigma Aldrich Chemical Co. (Milwaukee, Wis.), or Bachem (Torrance, Calif.), or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4' Edition); and Larock's Comprehensive Organic Transformations (VCH Publishers Inc., 1989). These schemes are merely illustrative of some methods by which the compounds of this invention can be synthesized, and various modifications to these schemes can be made and will be suggested to one skilled in the art having referred to this disclosure. The starting materials and the intermediates of the reaction may be isolated and purified if desired using conventional techniques, including but not limited to filtration, distillation, crystallization, chromatography, and the like. Such materials may be characterized using conventional means, including physical constants and spectral data.

Unless specified to the contrary, the reactions described herein take place at atmospheric pressure and over a temperature range from about −78° C. to about 150° C., more preferably from about 0° C. to about 125° C., and most preferably at about room (or ambient) temperature, e.g., about 20° C. Unless otherwise stated (as in the case of a hydrogenation), all reactions are performed under an atmosphere of nitrogen.

The compounds disclosed and claimed herein have asymmetric carbon atoms or quaternized nitrogen atoms in their structure and may be prepared through the syntheses described herein as single stereoisomers, racemates, or mixtures of enantiomers and diastereomers. The compounds may also exist as geometric isomers. All such single stereoisomers, racemates, and geometric isomers, and mixtures thereof are intended to be within the scope of this invention.

Some of the compounds of the invention may exist as tautomers. For example, where a ketone or aldehyde is present, the molecule may exist in the enol form; where an amide is present, the molecule may exist as the imidic acid; and where an enamine is present, the molecule may exist as an imine. All such tautomers are within the scope of the invention.

Methods for the preparation and/or separation and isolation of single stereoisomers from racemic mixtures or nonracemic mixtures of stereoisomers are well known in the art. For example, optically active (R)- and (S)-isomers may be prepared using chiral synthons or chiral reagents, or resolved using conventional techniques. Enantiomers (R- and S-isomers) may be resolved by methods known to one of ordinary skill in the art, for example by: formation of diastereomeric salts or complexes which may be separated, for example, by crystallization; via formation of diastereomeric derivatives which may be separated, for example, by crystallization; selective reaction of one enantiomer with an enantiomer-specific reagent, for example enzymatic oxidation or reduction, followed by separation of the modified and unmodified enantiomers; or gas-liquid or liquid chromatography in a chiral environment, for example on a chiral support, such as silica with a bound chiral ligand or in the presence of a chiral solvent. It will be appreciated that where a desired enantiomer is converted into another chemical entity by one of the separation procedures described above, a further step may be required to liberate the desired enantiomeric form. Alternatively, specific enantiomers may be synthesized by asymmetric synthesis using optically active reagents, substrates, catalysts, or solvents, or by converting on enantiomer to the other by asymmetric transformation. For a mixture of enantiomers, enriched in a particular enantiomer, the major component enantiomer may be further enriched (with concomitant loss in yield) by recrystallization.

In addition, the compounds of the present invention can exist in unsolvated as well as solvated forms with pharmaceutically acceptable solvents such as water, ethanol, and the like. In general, the solvated forms are considered equivalent to the unsolvated forms for the purposes of the present invention.

The methods of the present invention may be carried out as semi-continuous or continuous processes, more preferably as continuous processes.

The present invention as described above unless indicated otherwise may be carried out in the presence of a solvent or a mixture of two or more solvents. In particular the solvent is an aqueous or an organic solvent such as the ether-like solvent (e.g. tetrahydrofuran, methyltetrahydrofuran, diisopropyl ether, t-butylmethyl ether, or dibutyl ether), aliphatic hydrocarbon solvent (e.g. hexane, heptane, or pentane), saturated alicyclic hydrocarbon solvent (e.g. cyclohexane or cyclopentane), or aromatic solvent (e.g. toluene, o-, m-, or p-xylene, or t-butyl-benzene), or mixture thereof.

The starting materials and reagents, which do not have their synthetic route explicitly disclosed herein, are generally available from commercial sources or are readily prepared using methods well known to the person skilled in the art.

The following general synthetic schemes and examples are provided for the purpose of further illustration and are not intended to limit the scope of the claimed invention.

General Synthesis

In the following general schemes, the variables $R^1$, $R^2$, $R^3$, $R^4$, $R^5$, $R^6$, $R^7$, $R^8$, $R^9$, Y, m, n, and p are described above.

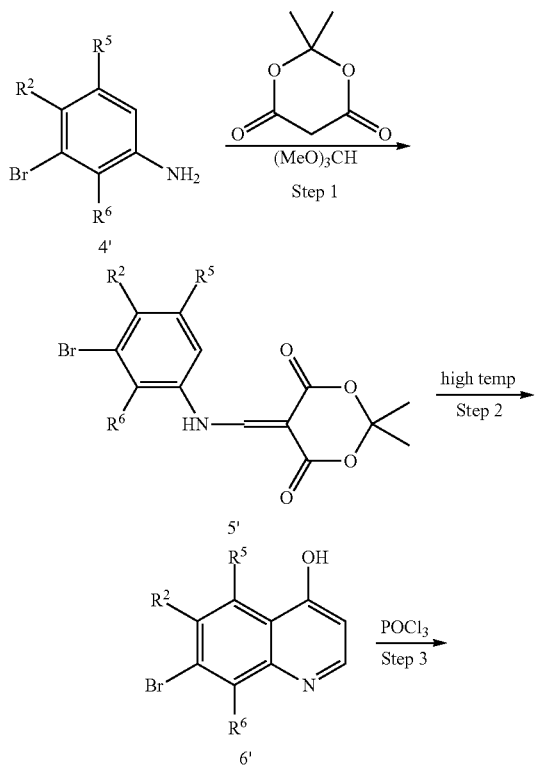

Scheme1: Synthesis of Intermediate Compounds

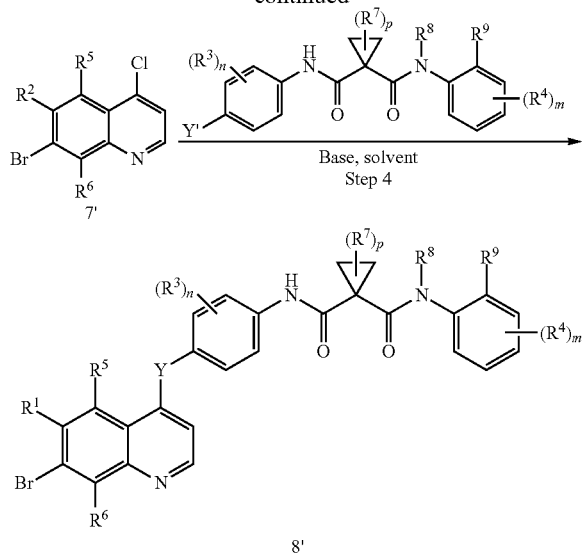

Step 4
Base, solvent

8'

Intermediate compounds of Formula 8' can be synthesized starting from a bromoaniline compound of Formula 4' by first reacting with 2,2-dimethyl-1,3-dioxane-4,6-dione in the presence of trimethyl orthoformate to provide a compound of Formula 5'. A compound of Formula 6' can be synthesized by exposing a compound of Formula 5' to high heat in an appropriate solvent to accomplish the cyclization. Conversion of the phenolic oxygen of a compound of Formula 6' to the corresponding chloride moiety can be accomplish using a reagent such as phosphorus oxychloride. The resulting compound of Formula 7' can then be coupled with a compound of Formula 3', wherein Y' is a nucleophilic moiety such as —OH, —SH, —SOH, —SO$_2$H, —NH$_2$, or —NH ((C$_1$-C$_6$) alkyl), using an appropriate base and solvent system to produce a compound of Formula 8'.

Scheme 2: Synthesis of a Compound of Formula 3'

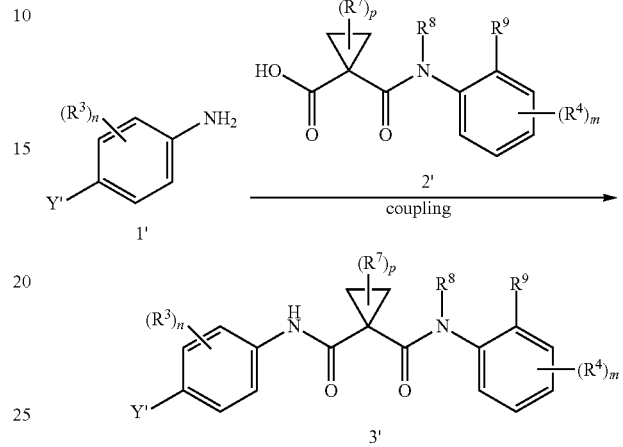

Compounds of Formula 3' can be synthesized via a coupling reaction between a compound of Formula 1' and a compound of Formula 2'. Coupling reagents appropriate for this transformation are well known in the art, and include EDCI, DCC, BOP, HATU, HBTU, and T3P, among many others.

Scheme 3: Synthesis pf the Compounds of Formula I

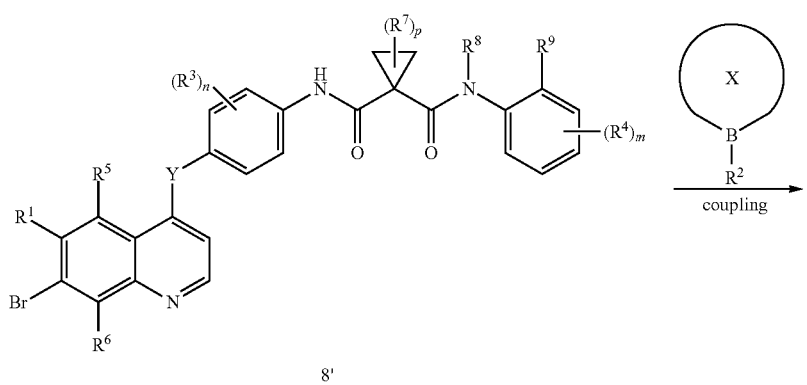

8'

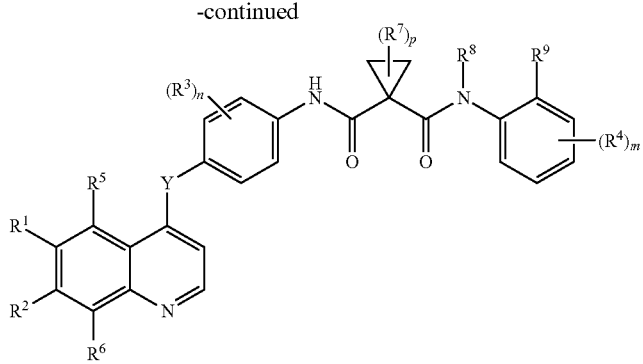

Formula I

Compounds of Formula 8' can be converted to compounds of Formula I by coupling with boron compounds of the Formula Z, wherein Ring X can be a carbocycle, such as 3,3,4,4-tetramethylborolane, using coupling chemistry known to those skilled in the art. Typical reagents to accomplish this type of coupling are palladium-containing complexes, such as 4-di-tert-butylphosphanyl-N,N-dimethyl-aniline; dichloropalladium ([Bis(di-tert-butyl(4-dimethylaminophenyl)phosphine) dichloropalladium(II)]; Pd(amphos)Cl$_2$).

EXAMPLES

Experimental Procedures

Example 1: N-(4-Fluorophenyl)-N-(4-hydroxyphenyl)cyclopropane-1,1-dicarboxamide (3)

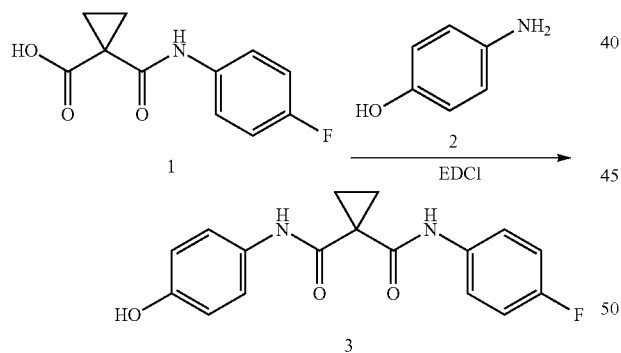

N-(4-Fluorophenyl)-N-(4-hydroxyphenyl)cyclopropane-1,1-dicarboxamide (3): To a solution of Compound 1 (10 g, 45 mmol, 1 eq) and Compound 2 (5.87 g, 53.8 mmol, 1.2 eq) in DMA (60 mL) was added 3-(ethyliminomethyleneamino)-N,N-dimethyl-propan-1-amine hydrochloride (EDCI) (10.31 g, 53.8 mmol, 1.2 eq). The mixture was stirred vigorously at 20° C. until the reaction was complete. The mixture was poured into aqueous (aq) saturated NaHCO$_3$(400 mL) and extracted with EtOAc (4×100 mL). The combined organic phases were washed with aq saturated NaCl (100 mL), dried over anhydrous (anhyd) Na$_2$SO$_4$ and concentrated. Compound 3 (21 g, crude) was obtained as a dark brown solid. $^1$H NMR (400 MHz, DMSO-d$_6$) δ 10.16 (br s, 1H), 9.72 (br s, 1H), 7.61 (dd, 2H), 7.34 (d, 2H), 7.13 (t, 2H) 6.68 (d, 2H), 1.42 (s, 4H); MS (EI) for C$_{17}$H$_{15}$FN$_2$O$_3$. found 314.9 (MH+).

The following compound was made using the same procedure as that used to make Compound 3 in Example 1:

N-(3-Fluoro-4-hydroxyphenyl)-N-(4-fluorophenyl)cyclopropane-1,1-dicarboxamide (3A): MS (EI) for C$_{17}$H$_{14}$F$_2$N$_2$O$_3$. found 333.4 (MH+).

Example 2: N-(4-((7-Bromoquinolin-4-yl)oxy)phenyl)-N-(4-fluorophenyl)-cyclopropane-1,1-dicarboxamide (8)

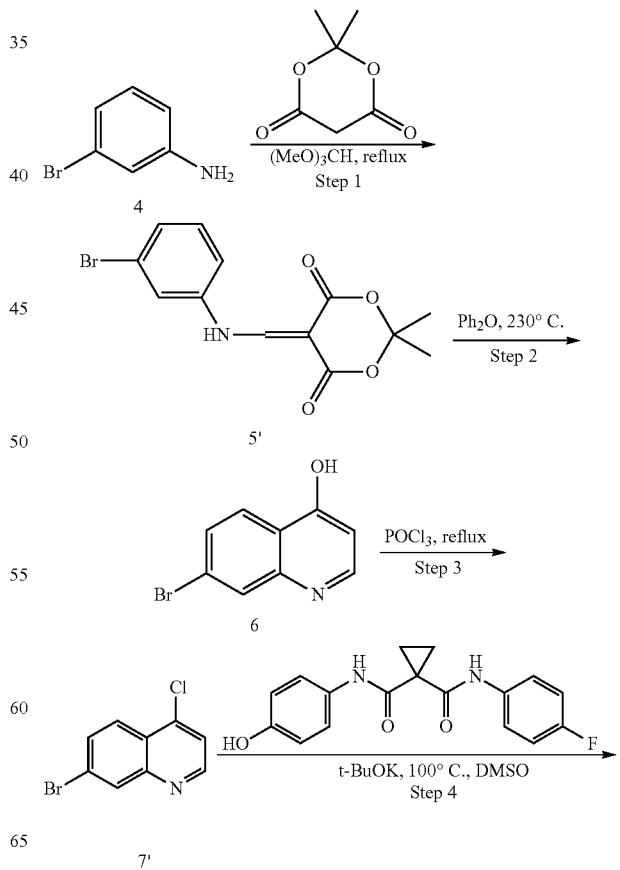

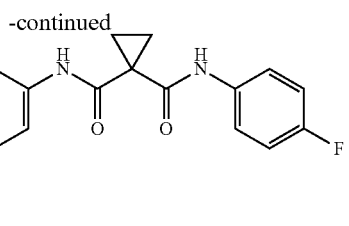

8

Step 1: 5-(((3-Bromophenyl)amino)methylene)-2,2-dimethyl-1,3-dioxane-4,6-dione (5): A mixture of 2,2-dimethyl-1,3-dioxane-4,6-dione (10.1 g, 69.8 mmol, 1.2 eq) in trimethyl orthoformate (96.8 g, 912 mmol, 100 mL, 15.7 eq) was stirred at 105° C. for 1.5 hours. 3-Bromoaniline (Compound 4, 10 g, 58 mmol, 6.33 mL, 1 eq) was then added and the resulting mixture stirred for 1 h. The resulting suspension was filtered and the solid was washed with MeOH and dried under vacuum. Crude Compound 5 (17.5 g, 92% yield) was obtained as a white solid and used in the next step without further purification. $^1$H NMR (400 MHz, CDCl$_3$) δ 11.28 (br d, 1H), 8.69 (d, 1H), 7.56-7.46 (m, 2H), 7.44-7.33 (m, 1H), 7.28 (br d, 1H), 1.85 (s, 6H).

Step 2: 7-Bromoquinolin-4-ol (6): To Ph$_2$O (90 mL) at 230° C. was added Compound 5 (16 g, 49.06 mmol, 1 eq) and the mixture was stirred for 0.5 h. The reaction mixture was poured into petroleum ether after being cooled to room temperature. The resulting precipitate was filtered and washed with petroleum ether. Compound 6 (6.1 g, 55.5% yield) was obtained as a dark brown solid which was used in subsequent reactions without further purification.

Step 3: 7-Bromo-4-chloroquinoline (7): Compound 6 (2.0 g, 8.93 mmol, 1 eq) in POCl$_3$ (4.9 mL) was stirred at 110° C. for 2 h. The solvent was removed under pressure. Dichloromethane (DCM) (300 mL.) and ice water (200 mL) were slowly added. The resulting mixture was washed with water (2×100 mL), aq saturated NaHCO$_3$ (2×100 mL), aq saturated NaCl, dried over anhyd Na$_2$SO$_4$ and concentrated. Crude Compound 7 (2.2 g) was recovered as a brown solid and used for the next step directly without further purification. $^1$H NMR (400 MHz, CDCl$_3$) δ 8.78 (d, 1H), 8.32 (d, 1H), 8.10 (d, 1H), 7.73 (m, 1H), 7.51 (d, 1H); MS (EI) for C$_9$H$_5$BrClN. found 243.9 (MH+).

Step 4: N-(4-((7-Bromoquinolin-4-yl)oxy)phenyl)-N-(4-fluorophenyl)-cyclopropane-1,1-dicarboxamide (8): A mixture of Compound 7 (2.9 g, 11.96 mmol, 1 eq), Compound 3 (4.5 g, 14.32 mmol, 1.20 eq) and t-BuOK (2.67 g, 23.78 mmol, 1.99 eq) in N,N-dimethyl sulfoxide (DMSO) (20 mL) was stirred at 100° C. for 1 h. The reaction mixture was partitioned between water (50 mL) and ethyl acetate (EtOAc) (2×20 mL). The combined organic phases were separated, washed with aq saturated NaCl (10 mL), dried over anhyd Na$_2$SO$_4$ and concentrated. The resulting crude residue was purified by flash silica gel chromatography (ISCO®; 20 g SepaFlash® Silica Flash Column, Eluent of 0~45% Ethyl acetate/Petroleum ether gradient @ 20 mL/min) to give Compound 8 as a brown solid (4.7 g, 75.5% yield). MS (EI) for C$_{26}$H$_{19}$BrFN$_3$O$_3$. found 520.1 (MH+).

Example 3: 1-N'-(4-Fluorophenyl)-1-N-[4-[7-[1-(2-methoxyethyl)pyrazol-4-yl]quinolin-4-yl]oxyphenyl]cyclopropane-1,1-dicarboxamide (10)

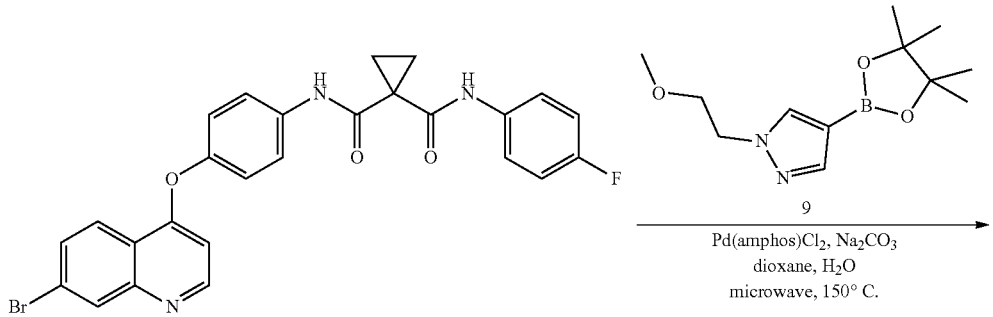

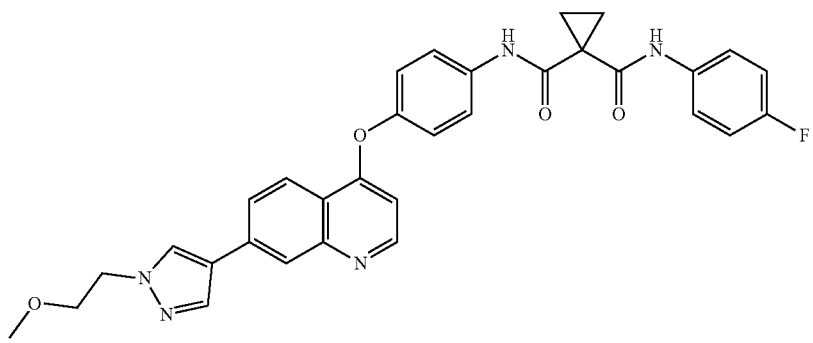

10

1-N'-(4-Fluorophenyl)-1-N-[4-[7-[1-(2-methoxyethyl)pyrazol-4-yl]quinolin-4-yl]oxyphenyl]cyclopropane-1,1-dicarboxamide (10): Compound 8 (100 mg, 0.19 mmol, 1 eq), Compound 9 (58 mg, 0.23 mmol, 1.2 eq), Pd(amphos)Cl$_2$ (15 mg, 0.021 mmol, 0.015 mL, 0.11 eq), Na$_2$CO$_3$ (61 mg, 0.57 mmol, 3.0 eq), water (0.5 mL) and dioxane (2.5 mL) were combined in a microwave reaction tube. The sealed tube was heated at 150° C. for 30 min under microwave irradiation. The resulting mixture was quenched with water (10 mL) and extracted with EtOAc (3×10 mL). The combined organic layers were washed with aq saturated NaCl (30 mL), dried over anhyd Na$_2$SO$_4$ and concentrated under reduced pressure. The crude residue was purified by prep-HPLC (Waters Xbridge 150*25 mm*5 μm; ([water(10 mM NH$_4$HCO$_3$)-MeCN]; B %: 40%-70%, 10 min) to give Compound 10 as a white solid (22.5 mg, 21% yield). $^1$H NMR (400 MHz, d$^6$-DMSO) δ 10.20 (br s, 1H), 10.07 (br s, 1H), 8.64 (br d, 1H), 8.42 (s, 1H), 8.27 (br d, 1H), 8.20 (s, 1H), 8.13 (s, 1H), 7.90 (br d, 1H), 7.78 (br d, 2H), 7.69-7.60 (m, 2H), 7.26 (br d, 2H), 7.15 (m, 2H), 6.49 (br d, 1H), 4.36-4.29 (m, 2H), 3.75 (m, 2H), 3.26 (s, 3H), 1.48 (s, 4H); MS (EI) for C$_{32}$H$_{28}$FN$_5$O$_4$. found 565.9 (MH+).

The following compounds were prepared in a method analogous to that used to synthesize Compound 10 from Compound 8 in Example 3, replacing Compound 9 with the appropriate commercially available boronic acid or ester. Hydrochloride salts were recovered when prep-HPLC purifications were performed with eluents that contained aq HCl.

1-N'-(4-Fluorophenyl)-1-N-[4-[7-(1-methylpyrazol-4-yl)quinolin-4-yl]oxyphenyl]cyclopropane-1,1-dicarboxamide (11). $^1$H NMR (400 MHz, CD$_3$OD) δ 8.61 (d, 1H), 8.40 (d, 1H), 8.23 (s, 1H), 8.14 (s, 1H), 8.06 (s, 1H), 7.91 (dd, 1H), 7.76 (d, 2H), 7.59 (dd, 2H), 7.27 (d, 2H), 7.10 (t, 2H), 6.61 (d, 1H), 4.01 (s, 3H), 1.66 (s, 4H); MS (EI) for C$_{30}$H$_{24}$FN$_5$O$_3$. found 522.2 (MH+).

1-N'-(4-Fluorophenyl)-1-N-[4-[7-[1-(trifluoromethyl)pyrazol-4-yl]quinolin-4-yl]oxyphenyl]cyclopropane-1,1-dicarboxamide (12). $^1$H NMR (400 MHz, CDCl$_3$) δ 9.49 (s, 1H), 8.71 (br s, 1H), 8.67 (d, 1H), 8.40 (d, 1H), 8.15-8.26 (m, 3H), 7.72 (dd, 1H), 7.65 (d, 2H), 7.43-7.50 (m, 2H), 7.16-7.22 (m, 2H), 7.01-7.09 (m, 2H), 6.54 (d, 1H), 1.74-1.77 (m, 2H), 1.62-1.68 (m, 2H); MS (EI) for C$_{30}$H$_{21}$F$_4$N$_5$O$_3$. found 576.1 (MH+).

1-N-[4-[7-[1-(Difluoromethyl)pyrazol-4-yl]quinolin-4-yl]oxyphenyl]-1-N'-(4-fluorophenyl)cyclopropane-1,1-dicarboxamide (13). $^1$H NMR (400 MHz, CDCl$_3$) δ 9.42 (s, 1H), 8.71-8.60 (m, 2H), 8.39 (d, 1H), 8.27-8.20 (m, 2H), 8.12 (s, 1H), 7.74 (dd, 1H), 7.65 (d, 2H), 7.51-7.44 (m, 2H), 7.27 (t, 1H), 7.19 (d, 2H), 7.06 (t, 2H), 6.54 (d, 1H), 1.78-1.72 (m, 2H), 1.69-1.64 (m, 2H); MS (EI) for C$_{30}$H$_{22}$F$_3$N$_5$O$_3$. found 558.1 (MH+).

1-N-[4-[7-[1-(2-Fluoroethyl)pyrazol-4-yl]quinolin-4-yl]oxyphenyl]-1-N'-(4-fluorophenyl)cyclopropane-1,1-dicarboxamide hydrochloride (14). $^1$H NMR (400 MHz, DMSO-d$_6$) δ 10.20 (s, 1H), 10.06 (s, 1H), 8.65 (d, 1H), 8.49 (s, 1H), 8.28 (d, 1H), 8.22 (d, 1H), 8.19 (s, 1H), 7.91 (dd, 1H), 7.72-7.81 (m, 2H), 7.57-7.69 (m, 2H), 7.22-7.31 (m, 2H), 7.08-7.19 (m, 2H), 6.50 (d, 1H), 4.74-4.94 (m, 2H), 4.42-4.57 (m, 2H), 1.48 (s, 4H); MS (EI) for C$_{31}$H$_{25}$F$_2$N$_5$O$_3$. found 554.1 (MH+).

1-N-[4-[7-[1-(2,2-Difluoroethyl)pyrazol-4-yl]quinolin-4-yl]oxyphenyl]-1-N'-(4-fluorophenyl)cyclopropane-1,1-dicarboxamide hydrochloride (15). $^1$H NMR (400 MHz, DMSO-d$_6$) δ 10.34 (s, 1H), 10.05 (s, 1H), 8.94 (d, 1H), 8.61 (s, 1H), 8.54 (d, 1H), 8.36 (s, 1H), 8.27 (s, 1H), 8.20 (dd, 1H), 7.93-7.82 (m, 2H), 7.60-7.70 (m, 2H), 7.45-7.31 (m, 2H), 7.05-7.21 (m, 2H), 6.84 (d, 1H), 6.25-6.63 (m, 1H), 4.89-4.61 (m, 2H), 1.50 (d, 4H); MS (EI) for C$_{31}$H$_{24}$F$_3$N$_5$O$_3$. found 572.1 (MH+).

1-N'-(4-Fluorophenyl)-1-N-[4-[7-[1-(2,2,2-trifluoroethyl)pyrazol-4-yl]quinolin-4-yl]oxyphenyl]cyclopropane-1,1-dicarboxamide hydrochloride (16). $^1$H NMR (400 MHz, DMSO-d$_6$) δ 10.33 (s, 1H), 10.04 (s, 1H), 8.95 (d, 1H), 8.68 (s, 1H), 8.55 (d, 1H), 8.40-8.30 (m, 2H), 8.22 (d, 1H), 7.86 (d, 2H), 7.67-7.63 (m, 2H), 7.39 (d, 2H), 7.16 (t, 2H), 6.85 (d, 1H), 5.28 (q, 2H), 1.50 (d, 4H); MS (EI) for C$_{31}$H$_{23}$F$_4$N$_5$O$_3$. found 590.0 (MH+).

1-N'-(4-Fluorophenyl)-1-N-[4-[7-(1-methylpyrazol-3-yl)quinolin-4-yl]oxyphenyl]cyclopropane-1,1-dicarboxamide hydrochloride (17). $^1$H NMR (400 MHz, DMSO-d$_6$) δ 10.38 (s, 1H), 10.08 (s, 1H), 9.02 (d, 1H), 8.68 (d, 1H), 8.60 (d, 1H), 8.42-8.39 (m, 1H), 7.98-7.83 (m, 3H), 7.71-7.59 (m, 2H), 7.41 (d, 2H), 7.15 (t, 2H), 7.01 (d, 1H), 6.91 (d, 1H), 3.99 (s, 3H), 1.50 (d, 4H); MS (EI) for C$_{30}$H$_{24}$FN$_5$O$_3$. found 522.0 (MH+).

1-N'-(4-Fluorophenyl)-1-N-[4-[7-[1-(2-hydroxyethyl)pyrazol-4-yl]quinolin-4-yl]oxyphenyl]cyclopropane-1,1-dicarboxamide (18). $^1$H NMR (400 MHz, DMSO-d$_6$) δ 10.20 (s, 1H), 10.07 (s, 1H), 8.64 (d, 1H), 8.42 (s, 1H), 8.27 (d, 1H), 8.20 (s, 1H), 8.13 (s, 1H), 7.91 (d, 1H), 7.78 (d, 2H), 7.69-7.61 (m, 2H), 7.26 (d, 2H), 7.15 (t, 2H), 6.49 (d, 1H), 4.98 (t, 1H), 4.20 (t, 2H), 3.86-3.76 (m, 2H), 1.48 (s, 4H); MS (EI) for C$_{31}$H$_{26}$FN$_5$O$_4$. found 552.4 (MH+).

1-N'-(4-Fluorophenyl)-1-N-[4-[7-[1-(2-morpholin-4-ylethyl)pyrazol-4-yl]quinolin-4-yl]oxyphenyl]cyclopropane-1,1-dicarboxamide (19). $^1$H NMR (400 MHz, CDCl$_3$) δ 9.40 (s, 1H), 8.79 (br s, 1H), 8.64 (d, 1H), 8.34 (d, 1H), 8.17 (d, 1H), 7.94 (d, 2H), 7.73 (dd, 1H), 7.60-7.68 (m, 2H), 7.46-7.52 (m, 2H), 7.15-7.23 (m, 2H), 7.01-7.10 (m, 2H), 6.51 (d, 1H), 4.33 (t, 2H), 3.63-3.80 (m, 4H), 2.89 (t, 2H), 2.47-2.57 (m, 4H), 1.72-1.76 (m, 2H), 1.64-1.68 (m, 2H); MS (EI) for C$_{35}$H$_{33}$FN$_6$O$_4$. found 621.1 (MH+).

1-N-[4-[7-(1-Ethylpyrazol-4-yl)quinolin-4-yl]oxyphenyl]-1-N'-(4-fluorophenyl)cyclopropane-1,1-dicarboxamide (20). $^1$H NMR (400 MHz, DMSO-d$_6$) δ 10.20 (s, 1H), 10.07 (s, 1H), 8.65 (d, 1H), 8.47 (s, 1H), 8.28 (d, 1H), 8.21 (s, 1H), 8.12 (s, 1H), 7.91 (dd, 1H), 7.78 (d, 2H), 7.65 (dd, 2H), 7.26 (d, 2H), 7.16 (t, 2H), 6.50 (d, 1H), 4.20 (q, 2H), 1.48 (s, 4H), 1.45 (t, 3H); MS (EI) for C$_{31}$H$_{26}$FN$_5$O$_3$. found 536.2 (MH+).

1-N'-(4-Fluorophenyl)-1-N-[4-[7-(1-propan-2-ylpyrazol-4-yl)quinolin-4-yl]oxyphenyl]cyclopropane-1,1-dicarboxamide hydrochloride (21). $^1$H NMR (400 MHz, DMSO-d$_6$) δ 10.38 (s, 1H), 10.08 (br s, 1H), 8.98 (d, 1H), 8.64 (s, 1H), 8.57 (d, 1H), 8.36 (d, 1H), 8.26 (dd, 1H), 8.16 (s, 1H), 7.89 (d, 2H), 7.72-7.62 (m, 2H), 7.47-7.35 (m, 2H), 7.21-7.11 (m, 2H), 6.87 (d, 1H), 4.70-4.53 (m, 1H), 1.53-1.46 (m, 1OH); MS (EI) for C$_{32}$H$_{28}$FN$_5$O$_3$. found 550.1 (MH+).

1-N-[4-[7-(1-Cyclopropylpyrazol-4-yl)quinolin-4-yl]oxyphenyl]-1-N'-(4-fluorophenyl)cyclopropane-1,1-dicarboxamide hydrochloride (22). $^1$H NMR (400 MHz, DMSO-d$_6$) δ 10.32 (s, 1H), 10.03 (s, 1H), 8.92 (d, 1H), 8.64 (s, 1H), 8.52 (d, 1H), 8.28-8.12 (m, 3H), 7.85 (d, 2H), 7.64 (dd, 2H), 7.38 (d, 2H), 7.16 (t, 2H), 6.83 (d, 1H), 3.89-3.81 (m, 1H), 1.49 (d, 4H), 1.14 (s, 2H), 1.04 (d, 2H); MS (EI) for C$_{32}$H$_{26}$FN$_5$O$_3$. found 548.3 (MH+).

1-N-[4-[7-(1-tert-Butylpyrazol-4-yl)quinolin-4-yl]oxyphenyl]-1-N'-(4-fluorophenyl)cyclopropane-1,1-dicarboxamide (23). $^1$H NMR (400 MHz, CD$_3$OD) δ 8.59 (d, 1H), 8.41-8.34 (m, 2H), 8.14 (s, 1H), 8.06 (s, 1H), 7.93 (d, 1H), 7.73 (d, 2H), 7.60-7.52 (m, 2H), 7.24 (d, 2H), 7.07 (t, 2H), 6.61-6.55 (m, 1H), 1.67 (s, 9H), 1.66-1.63 (m, 4H); MS (EI) for C$_{33}$H$_{30}$FN$_5$O$_3$. found 564.3 (MH+).

1-N'-(4-Fluorophenyl)-1-N-[4-[7-[1-(oxetan-3-yl)pyrazol-4-yl]quinolin-4-yl]oxyphenyl]cyclopropane-1,1-dicarboxamide (24). $^1$H NMR (400 MHz, DMSO-d$_6$) δ 10.20 (s, 1H), 10.06 (s, 1H), 8.66 (t, 2H), 8.32-8.28 (m, 2H), 8.26 (d, 1H), 7.95 (d, 1H), 7.78 (d, 2H), 7.65-7.63 (m, 2H), 7.27 (d, 2H), 7.16 (t, 2H), 6.51 (d, 1H), 5.67-5.60 (m, 1H), 4.98 (d, 4H), 1.48 (s, 4H); MS (EI) for C$_{32}$H$_{26}$FN$_5$O$_4$. found 564.2 (MH+).

1-N'-(4-Fluorophenyl)-1-N-[4-(7-pyridin-3-ylquinolin-4-yl)oxyphenyl]cyclopropane-1,1-dicarboxamide hydrochloride (25). $^1$H NMR (400 MHz, DMSO-d$_6$) δ 10.38 (s, 1H), 10.08 (s, 1H), 9.32 (s, 1H), 9.08 (d, 1H), 8.91 (d, 1H), 8.76-8.66 (m, 3H), 8.37 (d, 1H), 8.02-7.93 (m, 1H), 7.88 (d, 2H), 7.71-7.61 (m, 2H), 7.41 (d, 2H), 7.16 (t, 2H), 6.97 (d, 1H), 1.49 (br s, 4H); MS (EI) for C$_{31}$H$_{23}$FN$_4$O$_3$. found 519.1 (MH+).

1-N'-(4-Fluorophenyl)-1-N-[4-(7-pyridin-4-ylquinolin-4-yl)oxyphenyl]cyclopropane-1,1-dicarboxamide hydrochloride (26). $^1$H NMR (400 MHz, DMSO-d$_6$) δ 10.34 (s, 1H), 10.07 (s, 1H), 9.11-8.93 (m, 3H), 8.77 (d, 1H), 8.67 (d, 1H), 8.45-8.33 (m, 3H), 7.86 (d, 2H), 7.74-7.56 (m, 2H), 7.38 (d, 2H), 7.16 (t, 2H), 6.91 (d, 1H), 1.49 (d, 4H); MS (EI) for C$_{31}$H$_{23}$FN$_4$O$_3$. found 519.1 (MH+).

1-N'-(4-Fluorophenyl)-1-N-[4-(7-pyrimidin-5-ylquinolin-4-yl)oxyphenyl]cyclopropane-1,1-dicarboxamide (27). $^1$H NMR (400 MHz, DMSO-d$_6$) δ 10.21 (s, 1H), 10.05 (s, 1H), 9.36 (s, 2H), 9.27 (s, 1H), 8.77 (d, 1H), 8.50 (s, 1H), 8.45 (d, 1H), 8.12 (br d, 1H), 7.79 (br d, 2H), 7.70-7.58 (m, 2H), 7.28 (br d, 2H), 7.15 (br t, 2H), 6.65 (br d, 1H), 1.48 (s, 4H); MS (EI) for C$_{30}$H$_{22}$FN$_5$O$_3$. found 520.2 (MH+).

1-N'-(4-Fluorophenyl)-1-N-[4-(7-pyridazin-4-ylquinolin-4-yl)oxyphenyl]cyclopropane-1,1-dicarboxamide (28). $^1$H NMR (400 MHz, DMSO-d$_6$) δ 10.22 (s, 1H), 10.05 (s, 1H), 9.86 (d, 1H), 9.37 (d, 1H), 8.78 (d, 1H), 8.62 (d, 1H), 8.48 (d, 1H), 8.25 (dd, 1H), 8.19 (dd, 1H), 7.79 (d, 2H), 7.64 (dd, 2H), 7.29 (d, 2H), 7.15 (t, 2H), 6.67 (d, 1H), 1.48 (s, 4H); MS (EI) for C$_{30}$H$_{22}$FN$_5$O$_3$. found 520.2 (MH+).

1-N-[4-[7-(5,6-Dihydro-4H-pyrrolo[1,2-b]pyrazol-3-yl)quinolin-4-yl]oxyphenyl]-1-N'-(4-fluorophenyl)cyclopropane-1,1-dicarboxamide hydrochloride (29). $^1$H NMR (400 MHz, DMSO-d$_6$) δ 10.36 (s, 1H), 10.06 (s, 1H), 8.99 (d, 1H), 8.54 (d, 1H), 8.31 (s, 1H), 8.22 (m, 1H), 8.21-8.17 (m, 1H), 7.90-7.82 (m, 2H), 7.68-7.62 (m, 2H), 7.43-7.38 (m, 2H), 7.19-7.13 (m, 2H), 6.87 (d, 1H), 4.18 (t, 2H), 3.24 (t, 2H), 2.78-2.68 (m, 2H), 1.53-1.46 (m, 4H); MS (EI) for C$_{32}$H$_{26}$FN$_5$O$_3$. found 548.1 (MH+).

1-N'-(4-Fluorophenyl)-1-N-[4-[7-(2-methylpyridin-4-yl)quinolin-4-yl]oxyphenyl]cyclopropane-1,1-dicarboxamide (30). $^1$H NMR (400 MHz, DMSO-d$_6$) δ 10.23 (s, 1H), 10.07 (s, 1H), 8.76 (d, 1H), 8.59 (d, 1H), 8.48-8.39 (m, 2H), 8.08 (dd, 1H), 7.83-7.76 (m, 3H), 7.72 (d, 1H), 7.65 (dd, 2H), 7.29 (d, 2H), 7.16 (t, 2H), 6.63 (d, 1H), 2.59 (s, 3H), 1.48 (s, 4H); MS (EI) for C$_{32}$H$_{25}$FN$_4$O$_3$. found 533.1 (MH+).

1-N'-(4-Fluorophenyl)-1-N-[4-[7-(2-methoxypyridin-4-yl)quinolin-4-yl]oxyphenyl]cyclopropane-1,1-dicarboxamide hydrochloride (31). $^1$H NMR (400 MHz, DMSO-d$_6$) δ 10.37 (s, 1H), 10.06 (s, 1H), 9.09 (d, 1H), 8.73-8.58 (m, 2H), 8.44-8.30 (m, 2H), 7.88 (d, 2H), 7.72-7.62 (m, 2H), 7.51 (dd, 1H), 7.41 (d, 2H), 7.34 (s, 1H), 7.17 (t, 2H), 6.98 (d, 1H), 3.96 (s, 3H), 1.50 (d, 4H); MS (EI) for C$_{32}$H$_{25}$FN$_4$O$_4$. found 549.1 (MH+).

1-N-[4-[7-(2,6-Dimethylpyridin-4-yl)quinolin-4-yl]oxyphenyl]-1-N'-(4-fluorophenyl)cyclopropane-1,1-dicarboxamide hydrochloride (32). $^1$H NMR (400 MHz, DMSO-d$_6$) δ 10.35 (s, 1H), 10.09 (s, 1H), 9.01 (d, 1H), 8.78 (s, 1H), 8.69 (d, 1H), 8.38-8.27 (m, 3H), 7.86 (d, 2H), 7.70-7.61 (m, 2H), 7.38 (d, 2H), 7.21-7.10 (m, 2H), 6.90 (d, 1H), 2.84 (s, 6H), 1.55-1.45 (m, 4H); MS (EI) for C$_{33}$H$_{27}$FN$_4$O$_3$. found 547.1 (MH+).

1-N'-(4-Fluorophenyl)-1-N-[4-[7-(2-fluoropyridin-4-yl)quinolin-4-yl]oxyphenyl]cyclopropane-1,1-dicarboxamide hydrochloride (33). $^1$H NMR (400 MHz, DMSO-d$_6$) δ 10.26 (s, 1H), 10.06 (s, 1H), 8.86 (d, 1H), 8.56 (s, 1H), 8.52 (d, 1H), 8.42 (d, 1H), 8.21 (d, 1H), 7.93 (br d, 1H), 7.85-7.78 (m, 3H), 7.65 (dd, 2H), 7.33 (d, 2H), 7.16 (t, 2H), 6.75 (d, 1H), 1.49 (s, 4H); MS (EI) for C$_{31}$H$_{22}$F$_2$N$_4$O$_3$. found 537.4 (MH+).

1-N-[4-[7-(2-Cyanopyridin-4-yl)quinolin-4-yl]oxyphenyl]-1-N'-(4-fluorophenyl)cyclopropane-1,1-dicarboxamide hydrochloride (34). $^1$H NMR (400 MHz, DMSO-d$_6$) δ 10.34 (s, 1H), 10.07 (s, 1H), 9.02 (d, 1H), 8.95 (d, 1H), 8.71-8.61 (m, 3H), 8.39-8.25 (m, 2H), 7.87 (d, 2H), 7.66 (dd, 2H), 7.38 (d, 2H), 7.16 (t, 2H), 6.92 (d, 1H), 1.49 (br s, 4H); MS (EI) for C$_{32}$H$_{22}$FN$_5$O$_3$. found 544.1 (MH+).

1-N'-(4-Fluorophenyl)-1-N-[4-[7-[6-(trifluoromethyl)pyridin-3-yl]quinolin-4-yl]oxyphenyl]cyclopropane-1,1-dicarboxamide hydrochloride (35). $^1$H NMR (400 MHz, DMSO-d$_6$) δ 10.34 (s, 1H), 10.06 (s, 1H), 9.32 (s, 1H), 9.03 (br d, 1H), 8.67 (br d, 1H), 8.61 (br s, 2H), 8.33 (br d, 1H), 8.15 (d, 1H), 7.87 (br d, 2H), 7.69-7.63 (m, 2H), 7.39 (br d, 2H), 7.16 (br t, 2H), 6.92 (br d, 1H), 1.49 (br s, 4H); MS (EI) for C$_{32}$H$_{22}$F$_4$N$_4$O$_3$. found 587.1 (MH+).

1-N'-(4-Fluorophenyl)-1-N-[4-[7-[2-(trifluoromethyl)pyridin-4-yl]quinolin-4-yl]oxyphenyl]cyclopropane-1,1-dicarboxamide hydrochloride (36). $^1$H NMR (400 MHz, DMSO-d$_6$) δ 10.32 (s, 1H), 10.06 (s, 1H), 8.99 (dd, 2H), 8.71-8.61 (m, 2H), 8.43-8.35 (m, 2H), 8.27 (br d, 1H), 7.86 (br d, 2H), 7.65 (dd, 2H), 7.38 (d, 2H), 7.16 (t, 2H), 6.90 (d, 1H), 1.49 (s, 4H); MS (EI) for C$_{32}$H$_{22}$F$_4$N$_4$O$_3$. found 587.1 (MH+).

1-N'-(4-Fluorophenyl)-1-N-[4-[7-(6-methylpyridin-3-yl)quinolin-4-yl]oxyphenyl]cyclopropane-1,1-dicarboxamide hydrochloride (37). $^1$H NMR (400 MHz, CD$_3$OD) δ 9.35 (s, 1H), 9.08-9.00 (m, 2H), 8.87 (d, 1H), 8.61 (s, 1H), 8.41 (d, 1H), 8.15 (d, 1H), 7.87 (d, 2H), 7.57 (dd, 2H), 7.41 (d, 2H), 7.17 (d, 1H), 7.08 (t, 2H), 2.92 (s, 3H), 1.67 (s, 4H); MS (EI) for C$_{32}$H$_{25}$FN$_4$O$_3$. found 533.1 (MH+).

1-N-[4-[7-(6-Aminopyridin-3-yl)quinolin-4-yl]oxyphenyl]-1-N'-(4-fluorophenyl)cyclopropane-1,1-dicarboxamide hydrochloride (38). $^1$H NMR (400 MHz, DMSO-d$_6$) δ 10.37 (s, 1H), 10.08 (s, 1H), 9.02 (d, 1H), 8.67-8.60 (m, 2H), 8.53 (s, 2H), 8.45 (dd, 2H), 8.25 (br d, 1H), 7.88 (d, 2H), 7.69-7.62 (m, 2H), 7.39 (d, 2H), 7.24 (d, 1H), 7.18-7.12 (m, 2H), 6.91 (d, 1H), 1.53-1.46 (m, 4H); MS (EI) for C$_{31}$H$_{24}$FN$_5$O$_3$. found 534.1 (MH+).

1-N'-(4-Fluorophenyl)-1-N-[4-[7-(1H-pyrazolo[3,4-b]pyridin-5-yl)quinolin-4-yl]oxyphenyl]cyclopropane-1,1-dicarboxamide hydrochloride (39). $^1$H NMR (400 MHz, DMSO-d$_6$) δ 13.93 (br s, 1H), 10.36 (s, 1H), 10.05 (s, 1H), 9.12-9.02 (m, 2H), 8.78 (d, 1H), 8.67 (d, 1H), 8.59 (d, 1H), 8.39 (d, 1H), 8.34 (s, 1H), 7.88 (d, 2H), 7.71-7.59 (m, 2H), 7.42 (d, 2H), 7.16 (t, 2H), 6.95 (d, 1H), 1.54-1.46 (m, 4H); MS (EI) for $C_{32}H_{23}FN_6O_3$, found 559.1 (MH+).

1-N-[4-[7-(5-Cyanopyridin-3-yl)quinolin-4-yl]oxyphenyl]-1-N'-(4-fluorophenyl)cyclopropane-1,1-dicarboxamide hydrochloride (40). $^1$H NMR (400 MHz, DMSO-$d_6$) δ 10.34 (s, 1H), 10.05 (s, 1H), 9.39 (d, 1H), 9.18 (d, 1H), 9.09-9.01 (m, 1H), 8.93 (t, 1H), 8.67 (d, 1H), 8.61 (br s, 1H), 8.34 (br d, 1H), 7.87 (d, 2H), 7.69-7.63 (m, 2H), 7.39 (d, 2H), 7.20-7.11 (m, 2H), 6.96-6.90 (m, 1H), 1.52-1.45 (m, 4H); MS (EI) for $C_{32}H_{22}FN_5O_3$. found 544.0 (MH+).

1-N'-(4-Fluorophenyl)-1-N-[4-[7-(6-fluoropyridin-3-yl)quinolin-4-yl]oxyphenyl]cyclopropane-1,1-dicarboxamide hydrochloride (41). $^1$H NMR (400 MHz, DMSO-$d_6$) δ 10.37 (s, 1H), 10.08 (s, 1H), 9.05 (d, 1H), 8.80 (d, 1H), 8.66 (d, 1H), 8.58-8.51 (m, 2H), 8.31 (dd, 1H), 7.90-7.86 (m, 2H), 7.69-7.64 (m, 2H), 7.46 (dd, 1H), 7.43-7.38 (m, 2H), 7.21-7.13 (m, 2H), 6.94 (d, 1H), 1.50 (d, 4H); MS (EI) for $C_{31}H_{22}F_2N_4O_3$. found 537.0 (MH+).

1-N-[4-[7-(6-Cyanopyridin-3-yl)quinolin-4-yl]oxyphenyl]-1-N'-(4-fluorophenyl)cyclopropane-1,1-dicarboxamide hydrochloride (42). $^1$H NMR (400 MHz, DMSO-$d_6$) δ 10.35 (s, 1H), 10.09 (s, 1H), 9.30 (d, 1H), 9.03 (d, 1H), 8.69-8.62 (m, 2H), 8.59 (dd, 1H), 8.33 (d, 1H), 8.28 (d, 1H), 7.87 (d, 2H), 7.65 (dd, 2H), 7.38 (d, 2H), 7.15 (t, 2H), 6.91 (d, 1H), 1.49 (s, 4H); MS (EI) for $C_{32}H_{22}FN_5O_3$. found 544.0 (MH+).

1-N-[4-[7-(6-Cyclopropylpyridin-3-yl)quinolin-4-yl]oxyphenyl]-1-N'-(4-fluorophenyl)cyclopropane-1,1-dicarboxamide (43). $^1$H NMR (400 MHz, CDCl$_3$) δ 9.37 (s, 1H), 8.85 (d, 1H), 8.69 (d, 2H), 8.43 (d, 1H), 8.27 (s, 1H), 7.92 (dd, 1H), 7.80 (dd, 1H), 7.65 (d, 2H), 7.47 (dd, 2H), 7.29 (s, 1H), 7.19 (d, 2H), 7.06 (t, 2H), 6.56 (d, 1H), 2.17-2.06 (m, 1H), 1.77-1.72 (m, 2H), 1.69-1.65 (m, 2H), 1.13-1.03 (m, 4H); MS (EI) for $C_{34}H_{27}FN_4O_3$. found 559.1 (MH+).

1-N'-(4-Fluorophenyl)-1-N-[4-[7-(1H-pyrrolo[2,3-b]pyridin-5-yl)quinolin-4-yl]oxyphenyl]cyclopropane-1,1-dicarboxamide (44). $^1$H NMR (400 MHz, DMSO-$d_6$) δ 11.82 (br s, 1H), 10.22 (s, 1H), 10.08 (s, 1H), 8.72 (d, 2H), 8.44 (d, 1H), 8.40 (d, 1H), 8.33 (s, 1H), 8.06 (dd, 1H), 7.79 (d, 2H), 7.65 (dd, 2H), 7.56 (t, 1H), 7.28 (d, 2H), 7.16 (t, 2H), 6.61-6.55 (m, 2H), 1.48 (s, 4H); MS (EI) for $C_{33}H_{24}FN_5O_3$. found 558.1 (MH+).

1-N'-(4-Fluorophenyl)-1-N-[4-[7-(5-fluoropyridin-3-yl)quinolin-4-yl]oxyphenyl]cyclopropane-1,1-dicarboxamide (45). $^1$H NMR (400 MHz, CD$_3$OD) δ 8.91 (s, 1H), 8.71 (d, 1H), 8.61-8.51 (m, 2H), 8.33 (d, 1H), 8.16 (td, 1H), 8.03 (dd, 1H), 7.77 (d, 2H), 7.63-7.54 (m, 2H), 7.28 (d, 2H), 7.09 (t, 2H), 6.71 (d, 1H), 1.66 (s, 4H); MS (EI) for $C_{31}H_{22}F_2N_4O_3$. found 537.1 (MH+).

1-N'-(4-Fluorophenyl)-1-N-[4-[7-(5-methylpyridin-3-yl)quinolin-4-yl]oxyphenyl]cyclopropane-1,1-dicarboxamide (46). $^1$H NMR (400 MHz, DMSO-$d_6$) δ 10.28 (s, 1H), 10.13 (s, 1H), 8.95 (s, 1H), 8.79 (s, 1H), 8.55 (s, 1H), 8.47 (d, 1H), 8.41 (s, 1H), 8.19 (s, 1H), 8.09 (d, 1H), 7.85 (br d, 2H), 7.70 (dd, 2H), 7.33 (d, 2H), 7.21 (t, 2H), 6.66 (d, 1H), 2.48 (s, 3H), 1.54 (s, 4H); MS (EI) for $C_{32}H_{25}FN_4O_3$. found 533.1 (MH+).

1-N'-(4-Fluorophenyl)-1-N-[4-[7-(5-methoxypyridin-3-yl)quinolin-4-yl]oxyphenyl]cyclopropane-1,1-dicarboxamide (47). $^1$H NMR (400 MHz, CDCl$_3$) δ 9.42 (s, 1H), 8.71 (d, 1H), 8.67 (s, 1H), 8.64 (d, 1H), 8.46 (d, 1H), 8.37 (d, 1H), 8.31 (d, 1H), 7.83 (dd, 1H), 7.66 (d, 2H), 7.57-7.54 (m, 1H), 7.50-7.45 (m, 2H), 7.20 (d, 2H), 7.06 (t, 2H), 6.58 (d, 1H), 3.96 (s, 3H), 1.78-1.71 (m, 2H), 1.70-1.64 (m, 2H); MS (EI) for $C_{32}H_{25}FN_4O_4$, found 549.1 (MH+).

1-N'-(4-Fluorophenyl)-1-N-[4-[7-[5-(trifluoromethyl)pyridin-3-yl]quinolin-4-yl]oxyphenyl]cyclopropane-1,1-dicarboxamide hydrochloride (48). $^1$H NMR (400 MHz, DMSO-$d_6$) δ 10.39 (s, 1H), 10.08 (s, 1H), 9.41 (s, 1H), 9.16 (s, 1H), 9.12 (d, 1H), 8.76-8.70 (m, 3H), 8.46 (dd, 1H), 7.89 (d, 2H), 7.69-7.60 (m, 2H), 7.46-7.41 (m, 2H), 7.18-7.13 (m, 2H), 7.01 (d, 1H), 1.50 (d, 4H); MS (EI) for $C_{32}H_{22}F_4N_4O_3$. found 587.1 (MH+).

1-N'-(4-Fluorophenyl)-1-N-[4-[7-(6-pyrrolidin-1-ylpyridin-3-yl)quinolin-4-yl]oxyphenyl]cyclopropane-1,1-dicarboxamide hydrochloride (49). $^1$H NMR (400 MHz, DMSO-$d_6$) δ 10.33 (s, 1H), 10.05 (s, 1H), 8.95 (d, 1H), 8.57-8.53 (m, 2H), 8.45 (s, 1H) 8.40-8.39 (m, 1H), 8.24 (d, 1H), 7.85 (d, 2H), 7.70-7.60 (m, 2H), 7.37 (d, 2H), 7.16 (t, 3H), 6.89-6.81 (m, 1H), 3.71-3.60 (m, 4H), 2.05 (br, s, 4H), 1.48 (d, 4H); MS (EI) for $C_{35}H_{30}FN_5O_3$, found 588.1 (MH+).

1-N'-(4-Fluorophenyl)-1-N-[4-[7-(6-propan-2-yloxypyridin-3-yl)quinolin-4-yl]oxyphenyl]cyclopropane-1,1-dicarboxamide hydrochloride (50). $^1$H NMR (400 MHz, DMSO-$d_6$) δ 10.33 (s, 1H), 10.05 (s, 1H), 8.99 (br d, 1H), 8.73 (d, 1H), 8.58 (d, 1H), 8.41 (s, 1H), 8.26-8.21 (m, 2H), 7.86 (d, 2H), 7.65 (dd, 2H), 7.38 (d, 2H), 7.19-7.13 (m, 2H), 6.98 (d, 1H), 6.88 (br d, 1H), 5.38-5.32 (m, 1H), 1.49 (br d, 4H), 1.35 (d, 6H); MS (EI) for $C_{34}H_{29}FN_4O_4$. found 577.1 (MH+).

1-N'-(4-Fluorophenyl)-1-N-[4-[7-(6-hydroxypyridin-3-yl)quinolin-4-yl]oxyphenyl]cyclopropane-1,1-dicarboxamide (51). $^1$H NMR (400 MHz, DMSO-$d_6$) δ 12.00 (s, 1H), 10.20 (s, 1H), 10.06 (s, 1H), 8.68 (d, 1H), 8.31 (d, 1H), 8.18 (d, 1H), 8.07 (dd, 1H), 7.98 (s, 1H), 7.91 (dd, 1H), 7.78 (d, 2H), 7.64 (dd, 2H), 7.26 (d, 2H), 7.15 (t, 2H), 6.55 (d, 1H), 6.50 (d, 1H), 1.47 (s, 4H); MS (EI) for $C_{31}H_{23}FN_4O_4$. found 535.1 (MH+).

1-N'-(4-Fluorophenyl)-1-N-[4-[7-(2-hydroxypyridin-3-yl)quinolin-4-yl]oxyphenyl]cyclopropane-1,1-dicarboxamide (52). $^1$H NMR (400 MHz, DMSO-$d_6$) δ 11.96 (s, 1H), 10.20 (s, 1H), 10.06 (s, 1H), 8.68 (d, 1H), 8.46 (s, 1H), 8.28 (d, 1H), 8.02 (dd, 1H), 7.90 (dd, 1H), 7.78 (d, 2H), 7.65 (dd, 2H), 7.49 (d, 1H), 7.26 (d, 2H), 7.15 (t, 2H), 6.57 (d, 1H), 6.38 (t, 1H), 1.47 (s, 4H); MS (EI) for $C_{31}H_{23}FN_4O_4$. found 535.1 (MH+).

1-N-[4-[7-(3,5-Dimethyl-1,2-oxazol-4-yl)quinolin-4-yl]oxyphenyl]-1-N'-(4-fluorophenyl)cyclopropane-1,1-dicarboxamide (53). MS (EI) for $C_{31}H_{25}FN_4O_4$. found 537 (MH+).

1-N'-(4-Fluorophenyl)-1-N-[4-[7-(2-methylpyrazol-3-yl)quinolin-4-yl]oxyphenyl]cyclopropane-1,1-dicarboxamide (54). MS (EI) for $C_{30}H_{24}FN_5O_3$. found 522 (MH+).

1-N'-(4-Fluorophenyl)-1-N-[4-(7-phenylquinolin-4-yl)oxyphenyl]cyclopropane-1,1-dicarboxamide (55). $^1$H NMR (400 MHz, DMSO-$d_6$) δ 10.21 (s, 1H), 10.06 (s, 1H), 8.72 (d, 1H), 8.39 (d, 1H), 8.28 (s, 1H), 8.00 (d, 1H), 7.88 (d, 2H), 7.78 (d, 2H), 7.65 (m, 2H), 7.56 (m, 2H), 7.46 (m, 1H), 7.27 (d, 2H), 7.15 (m, 2H), 6.59 (d, 1H), 1.48 (s, 4H); MS (EI) for $C_{32}H_{24}FN_3O_3$. found: 518 (MH+).

Example 4: 1-N'-(4-Fluorophenyl)-1-N-[4-[7-(1,2-oxazol-4-yl)quinolin-4-yl]oxyphenyl]cyclopropane-1,1-dicarboxamide (57)

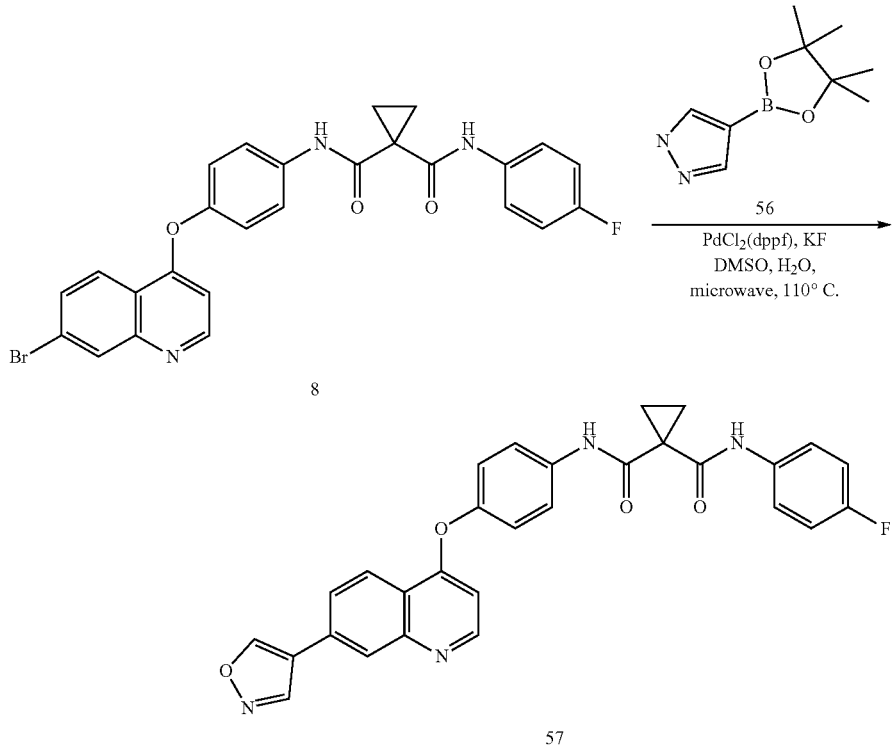

1-N'-(4-Fluorophenyl)-1-N-[4-[7-(1,2-oxazol-4-yl)quinolin-4-yl]oxyphenyl]cyclopropane-1,1-dicarboxamide (57): In a microwave reaction tube were mixed Compound 8 (200 mg, 0.38 mmol, 1 eq), Compound 56 (100 mg, 0.51 mmol, 1.3 eq), KF (35 mg, 0.60 mmol, 0.014 mL, 1.6 eq), Pd(dppf)Cl$_2$ (25 mg, 0.034 mmol, 0.09 eq), DMSO (10 mL) and water (0.6 mL). The resulting mixture was irritated in a microwave reactor for 60 min at 110° C. The reaction mixture was quenched by saturated citric acid solution and extracted with EtOAc (3×15 mL). The combined organic phases were washed with water (2×30 mL), aq saturated NaCl, dried over anhyd Na$_2$SO$_4$ and concentrated under reduced pressure. The residue was purified by Biotage combi flash (Column: Agela 4 g Flash Silica (CS), 40-60 μm amorphous silica gel, 60A; Mobile phase: gradient 45 ~ 50% EtOAc in petroleum ether; Gradient time: 30 min; Flow rate: 15 mL/min) (TLC (petroleum ether/EtOAc=1:1, R$_f$=0.6)) to give Compound 57 as a white solid (42.2 mg, 21% yield). $^1$H NMR (400 MHz, CDCl$_3$) δ 9.46 (s, 1H), 8.87 (s, 1H), 8.74 (s, 1H), 8.68 (d, 1H), 8.62 (br s, 1H), 8.41 (d, 1H), 8.21 (s, 1H), 7.63-7.72 (m, 3H), 7.47 (dd, 2H), 7.19 (d, 2H), 7.06 (t, 2H), 6.56 (d, 1H), 1.72-1.79 (m, 2H), 1.64-1.68 (m, 2H); MS (EI) for C$_{29}$H$_{21}$FN$_4$O$_4$, found 509.1 (MH+).

Example 5: 1-N'-(4-Fluorophenyl)-1-N-[4-[7-(1-piperidin-4-ylpyrazol-4-yl)quinolin-4-yl]oxyphenyl]cyclopropane-1,1-dicarboxamide Hydrochloride (60)

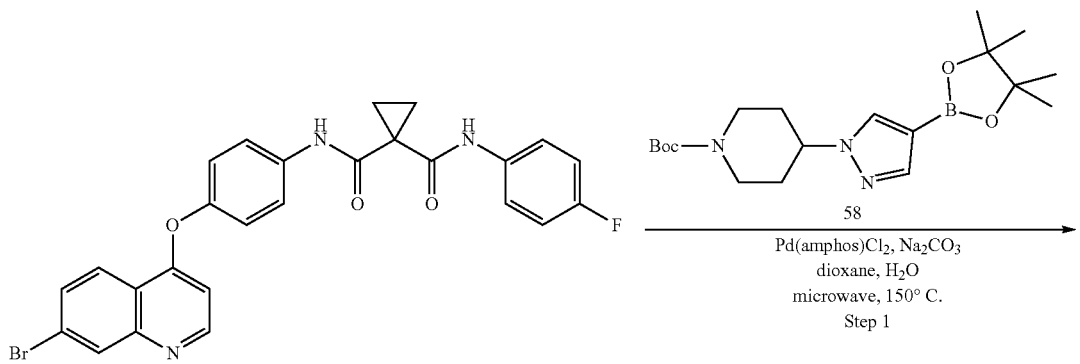

-continued

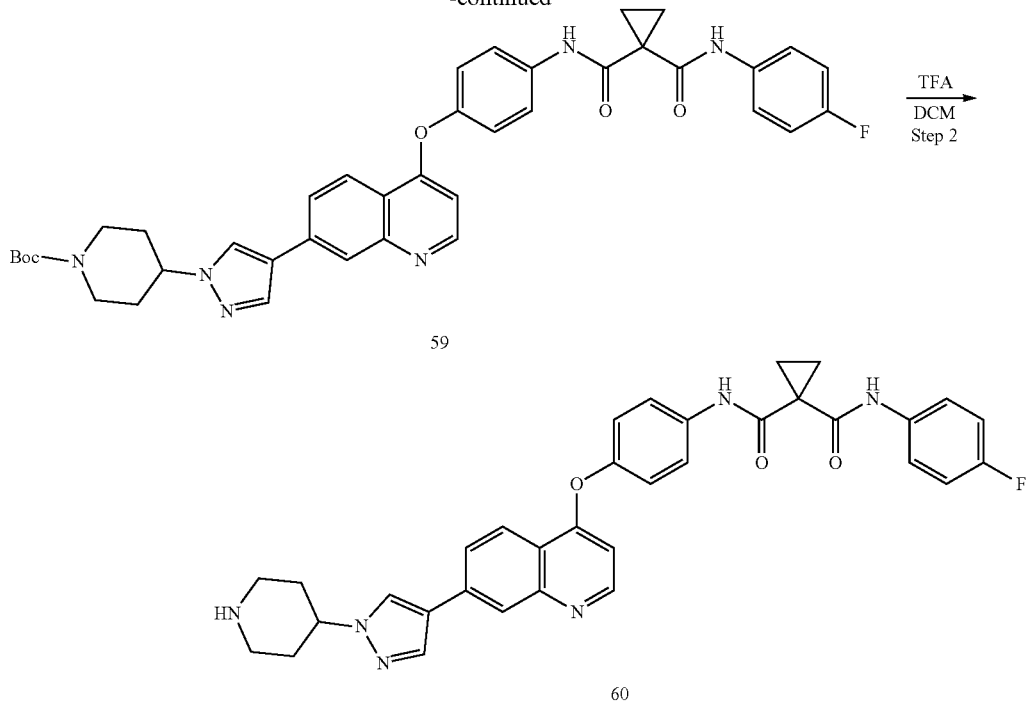

Step 1: tert-Butyl 4-(4-(4-(4-(1-((4-fluorophenyl)carbamoyl)cyclopropane-1-carboxamido)-phenoxy)quinolin-7-yl)-1H-pyrazol-1-yl)piperidine-1-carboxylate (59): To a mixture of Compound 8 (100 mg, 0.19 mmol, 1 eq) and Compound 58 (90 mg, 0.24 mmol, 1.2 eq) in dioxane (2.5 mL) and water (0.5 mL) in a microwave reaction tube was added $Na_2CO_3$ (60 mg, 0.57 mmol, 2.9 eq) and Pd(amphos)$Cl_2$ (15 mg, 0.021 mmol, 0.11 eq) in one portion at 20-25° C. under an atmosphere of nitrogen. The mixture was stirred at 150° C. for 30 min under microwave irradiation. The mixture was concentrated under reduced pressure. The residue was purified by silica gel chromatography (Petroleum ether/EtOAc) to give Compound 59 as a yellow solid (100 mg, 75% yield). MS (EI) for $C_{39}H_{39}FN_6O_5$. found 691.1 (MH+).

Step 2: 1-N'-(4-Fluorophenyl)-1-N-[4-[7-(1-piperidin-4-ylpyrazol-4-yl)quinolin-4-yl]oxyphenyl]cyclopropane-1,1-dicarboxamide hydrochloride (60): To a mixture of Compound 59 (100 mg, 0.14 mmol, 1 eq) in DCM (1.5 mL) was added TFA (0.5 mL) dropwise at 20-25° C. The mixture was stirred at 20-25° C. for 30 min. The mixture was adjusted to pH 7~8 with aq $NaHCO_3$. The aqueous phase was extracted with EtOAc (3×30 mL). The combined organic phases were washed with aq saturated NaCl (2×30 mL), dried over anhyd $Na_2SO_4$ and concentrated under vacuum. The residue was purified by Prep-HPLC (column: YMC-Actus Triart C18 150*30 mm*5 μm ([water(0.05% HCl)-MeCN]; B %: 13%-43%, 10 min) to give the HCl salt of Compound 60 as a yellow solid (30.3 mg, 34% yield). $^1$H NMR (400 MHz, $D_2O$) δ 8.64 (d, 1H), 8.44 (d, 1H), 8.35 (s, 1H), 8.13 (s, 1H), 8.05 (s, 1H), 8.00 (d, 1H), 7.52 (d, 2H), 7.25-7.27 (m, 5H), 7.06-7.08 (m, 2H), 6.91-7.04 (m, 1H), 4.56-4.63 (m, 1H), 3.55-3.59 (m, 2H), 3.16-3.22 (m, 2H), 2.34-2.43 (m, 2H), 2.17-2.26 (m, 2H), 1.54 (s, 4H).; MS (EI) for $C_{34}H_{31}FN_6O_3$. found 591.1 (MH+).

Example 6: 1-N'-(4-Fluorophenyl)-1-N'[4-[7-[1-(1-methylpiperidin-4-yl)pyrazol-4-yl]quinolin-4-yl]oxyphenyl]cyclopropane-1,1-dicarboxamide (61)

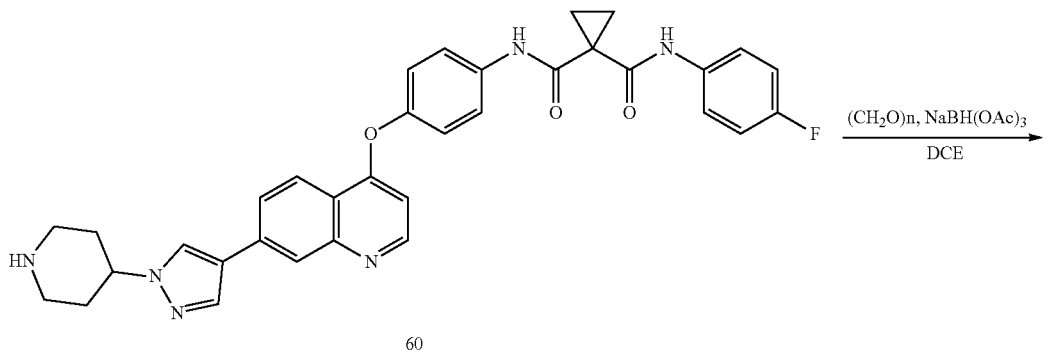

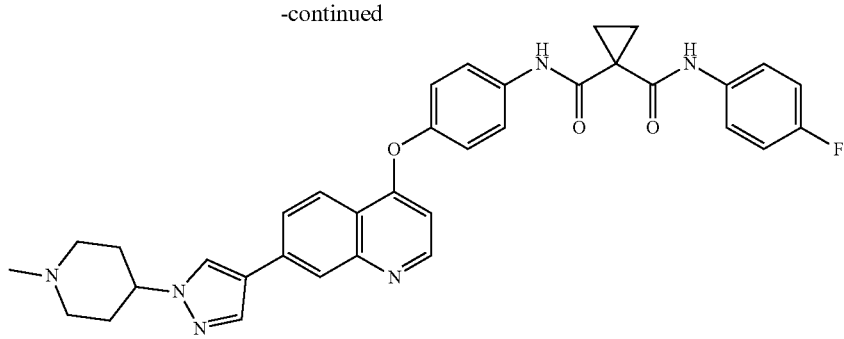

61

1-N'-(4-Fluorophenyl)-1-N-[4-[7-[1-(1-methylpiperidin-4-yl)pyrazol-4-yl]quinolin-4-yl]oxyphenyl]cyclopropane-1,1-dicarboxamide (61): To a mixture of Compound 60 (120 mg, 0.20 mmol, 1 eq) in DCE (10 mL) was added sodium triacetoxyborohydride (432 mg, 2.0 mmol, 10 eq) and paraformaldehyde (63 mg, 2.1 mmol, 10 eq) in one portion at 20-25° C. The mixture was stirred at 20-25° C. for 16 h. The mixture was poured into water (20 mL). The aqueous phase was extracted with DCM (3×20 mL). The combined organic phases were dried over anhyd $Na_2SO_4$ and concentrated under vacuum. The residue was purified by prep-HPLC(column: Boston Prime C18 150*30 mm*5 μm ([water (0.05% ammonia hydroxide v/v)-MeCN]; B %: 50%-80%, 9 min) to give Compound 61 as a white solid (26.3 mg, 21% yield). $^1$H NMR (400 MHz, $CDCl_3$) δ 9.36 (s, 1H), 8.8 (s, 1H), 8.63 (d, 1H), 8.31 (d, 1H), 8.16 (s, 1H), 8.13 (s, 1H), 7.96 (s, 1H), 7.86 (s, 1H), 7.63 (d, 2H), 7.49-7.46 (m, 2H), 7.18 (d, 2H), 7.07-7.02 (m, 2H), 6.49 (d, 1H), 4.23-4.16 (m, 1H), 3.02-3.00 (m, 2H), 2.35 (s, 3H), 2.35-2.15 (m, 6H), 1.73-1.66 (m, 4H); MS (EI) for $C_{35}H_{33}FN_6O_3$. found 605.1 (MH+).

Example 7: 1-N-[4-[7-[1-(1-Acetylpiperidin-4-yl)pyrazol-4-yl]quinolin-4-yl]oxyphenyl]-1-N'-(4-fluorophenyl)cyclopropane-1,1-dicarboxamide (62)

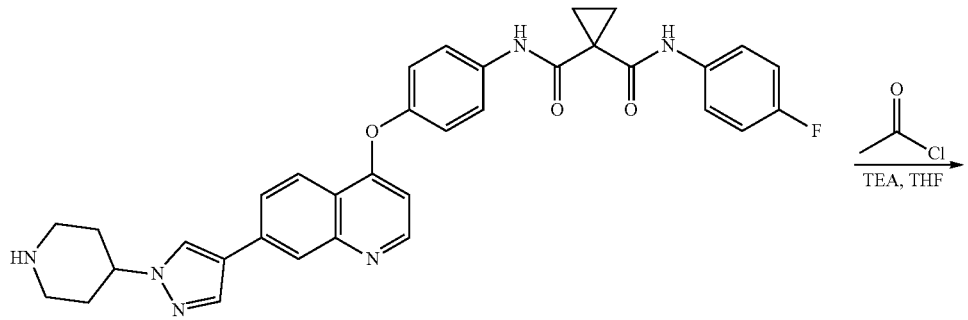

60

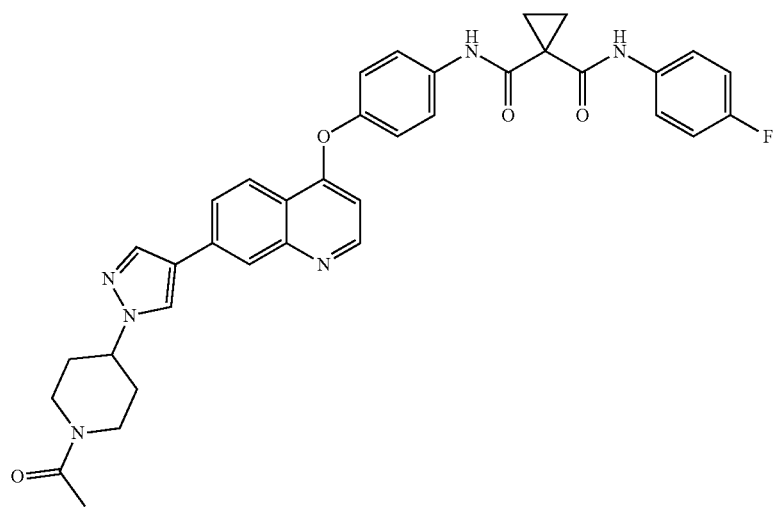

62

1-N—[4-[7-[1-(1-Acetylpiperidin-4-yl)pyrazol-4-yl]quinolin-4-yl]oxyphenyl]-1-N'-(4-fluorophenyl)cyclopropane-1,1-dicarboxamide (62): To a mixture of Compound 60 (60 mg, 0.10 mmol, 1 eq) in THF (5 mL) was added TEA (0.03 mL, 0.22 mmol, 2.1 eq) and acetyl chloride (0.03 mL 0.42 mmol, 4.1 eq) in one portion at 20-25° C. The mixture was stirred at 20-25° C. for 120 min. The mixture was poured into water (20 mL) and stirred for 15 min. The aqueous phase was extracted with EtOAc (3×30 mL). The combined organic phases were washed with aq saturated NaCl (2×30 mL), dried over anhyd $Na_2SO_4$ and concentrated under vacuum. The residue was purified by prep-HPLC(column: Venusil ASB Phenyl 250*50 mm*10 μm ([water(0.05% HCl)-MeCN]; B %: 39%-69%, 10 min) to give the HCl salt of Compound 62 as a white solid (40.3 mg, 62% yield). $^1$H NMR (400 MHz, DMSO-$d_6$) δ 10.30 (s, 1H), 10.04 (s, 1H), 8.87 (s, 1H), 8.65 (s, 1H), 8.48 (d, 1H), 8.25 (s, 1H), 8.20-8.09 (m, 2H), 7.84 (d, 2H), 7.67-7.63 (m, 2H), 7.36 (d, 2H), 7.16 (t, 2H), 6.76 (s, 1H), 4.51-4.48 (m, 2H), 3.98-3.95 (m, 2H), 2.80-2.74 (m, 1H), 2.12-1.76 (m, 7H), 1.49 (d, 4H); MS (EI) for $C_{36}H_{33}FN_6O_4$. found 633.2 (MH+).

Example 8: 1-N'-(4-Fluorophenyl)-1-N-[4-[7-(1H-triazol-5-yl)quinolin-4-yl]oxyphenyl]cyclopropane-1,1-dicarboxamide (65)

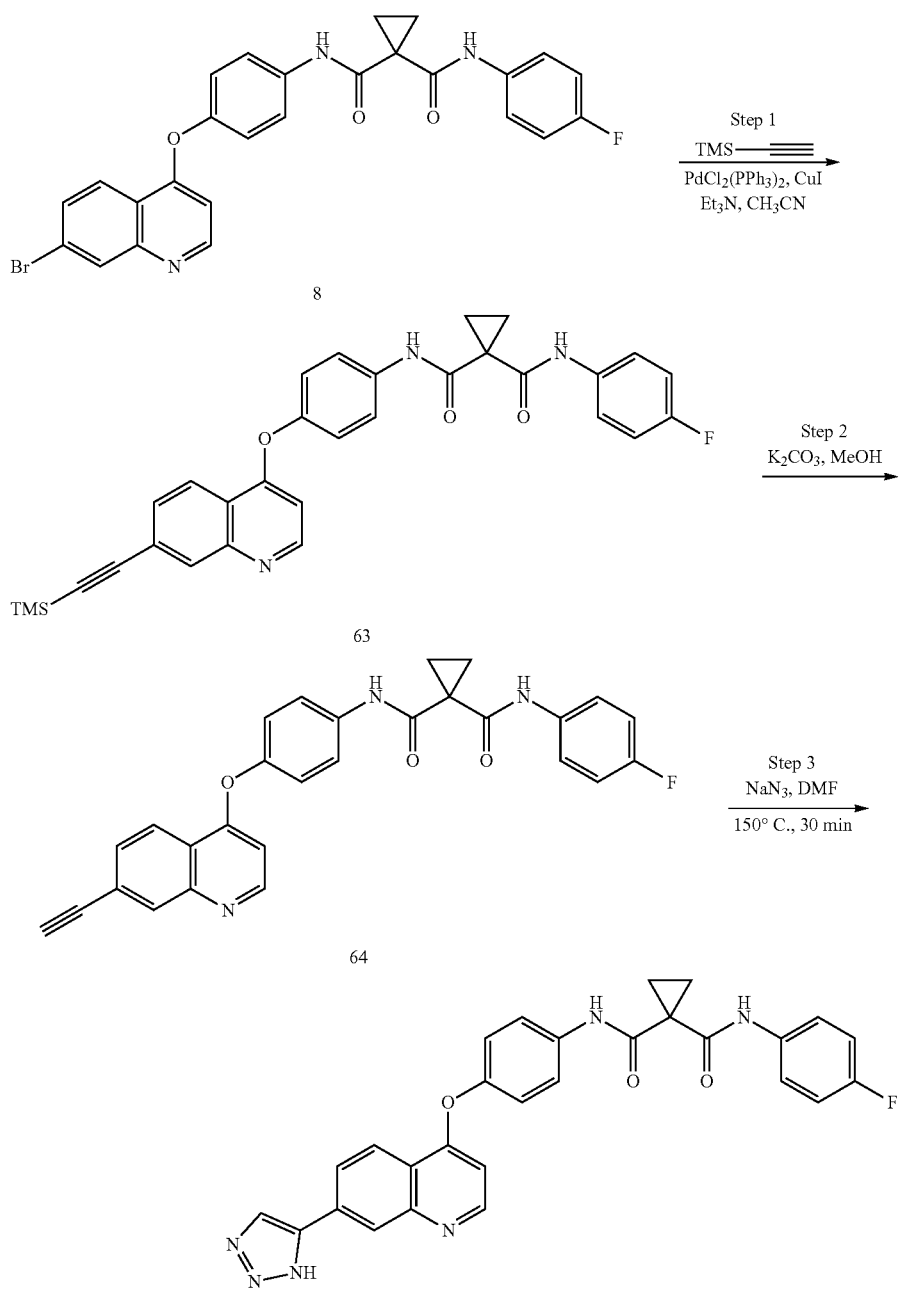

Step 1: 1-N'-(4-Fluorophenyl)-1-N-[4-[7-(2-trimethylsilylethynyl)quinolin-4-yl]oxyphenyl]cyclopropane-1,1-dicarboxamide (63): Compound 8 (100 mg, 0.19 mmol), trimethylsilylacetylene (60 mg, 0.61 mmol), CuI (2 mg, 0.01 mmol), PdCl$_2$(PPh$_3$)$_2$ (10 mg, 0.014 mmol), Et$_3$N (0.5 mL) and MeCN (3 mL) were combined in a sealed tube. The resulting mixture was stirred at 85° C. for 24 h and then cooled to room temperature. The mixture was diluted with EtOAc and filtered. The filtrate was washed with aq saturated NaHCO$_3$, concentrated, and further purified by flash column chromatography to give Compound 63 (85 mg, 79%). MS (EI) for C$_{31}$H$_{28}$FN$_3$O$_3$Si. found: 538 (MH+).

Step 2: 1-N-[4-(7-Ethynylquinolin-4-yl)oxyphenyl]-1-N'-(4-fluorophenyl)cyclopropane-1,1-dicarboxamide (64): To a solution of Compound 63 (85 mg, 0.16 mmol) in MeOH (2 mL) was added K$_2$CO$_3$ (100 mg, 0.72 mmol). The resulting mixture was stirred at room temperature for 12 h. The mixture was concentrated, extracted with EtOAc and washed with water. The organic phase was concentrated and purified by flash column chromatography to give Compound 64 (60 mg, 64%). MS (EI) for C$_{28}$H$_{20}$FN$_3$O$_3$. found: 466 (MH+).

Step 3: 1-N'-(4-Fluorophenyl)-1-N-[4-[7-(1H-triazol-5-yl)quinolin-4-yl]oxyphenyl]cyclopropane-1,1-dicarboxamide (65): A mixture of Compound 64 (50 mg, 0.11 mmol) and NaN$_3$ (140 mg, 2.1 mmol) in DMF (1.0 mL) was stirred at 150° C. for 30 min and then cooled to room temperature. The mixture was diluted with water and extracted with EtOAc. The organic phase was washed with 5% aqueous LiCl solution, concentrated and purified by flash column chromatography and prep HPLC to give Compound 65 (1.8 mg, 3.3%). MS (EI) for C$_{28}$H$_{21}$FN$_6$O$_3$. found: 509 (MH+).

Example 9: 1-N'-(4-Fluorophenyl)-1-N-[4-[7-(1,3-oxazol-2-yl)quinolin-4-yl]oxyphenyl]cyclopropane-1,1-dicarboxamide (66)

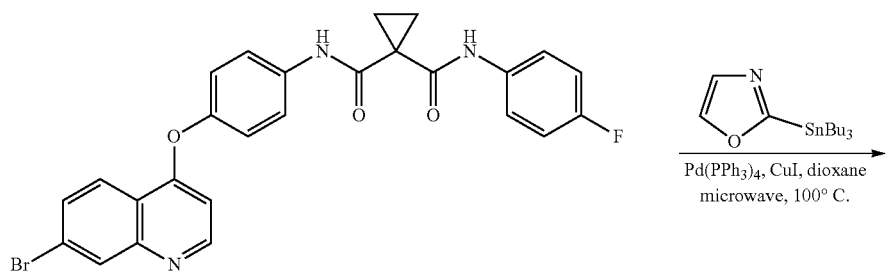

8

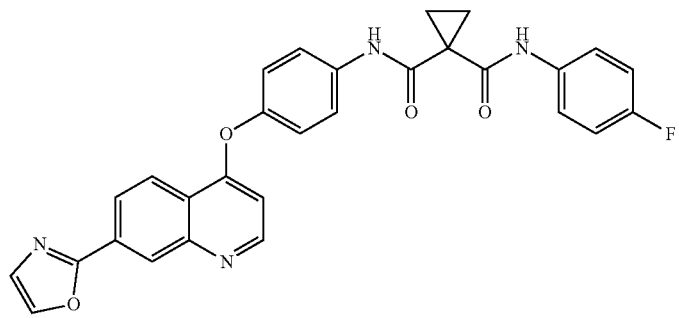

66

1-N'-(4-Fluorophenyl)-1-N-[4-[7-(1,3-oxazol-2-yl)quinolin-4-yl]oxyphenyl]cyclopropane-1,1-dicarboxamide (66): Compound 8 (50 mg, 0.096 mmol, 1 eq), tributyl(oxazol-2-yl)stannane (50 mg, 0.14 mmol, 1.45 eq), CuI (4.0 mg, 0.021 mmol, 0.22 eq) and Pd(PPh$_3$)$_4$ (23 mg, 0.020 mmol, 0.21 eq) were added to a microwave tube in dioxane (3 mL). The sealed tube was heated at 120° C. for 2 h under microwave irradiation. Aq saturated KF (30 mL) was added and the mixture was stirred at 20° C. for 1 h. NH$_3$·H$_2$O (5 mL) was added and the resulting mixture was extracted with EtOAc (3×20 mL). The combined organic extracts were washed with aq saturated NaCl (20 mL), dried over anhyd Na$_2$SO$_4$ and concentrated under reduced pressure. The resulting residue was purified by prep-TLC (SiO$_2$, Petroleum ether:EtOAc=1:3) to give Compound 66 as a white solid (17.1 mg, 35% yield). $^1$H NMR (400 MHz, DMSO-d$_6$) δ 10.23 (s, 1H), 10.07 (s, 1H), 8.77-8.76 (d, 1H), 8.55 (s, 1H), 8.48-8.46 (m, 1H), 8.36 (s, 1H), 8.25-8.22 (m, 1H), 7.80-7.78 (m, 2H), 7.67-7.63 (m, 2H), 7.51 (s, 1H), 7.30-7.28 (m, 2H), 7.18-7.13 (m, 2H), 6.65-6.64 (d, 1H), 1.48 (s, 4H); MS (EI) for C$_{29}$H$_{21}$FN$_4$O$_4$. found: 509.1 (MH+).

Example 10: 1-N'-(4-Fluorophenyl)-1-N-[4-[7-(1H-pyrazol-4-yl)quinolin-4-yl]oxyphenyl]cyclopropane-1,1-dicarboxamide (67)

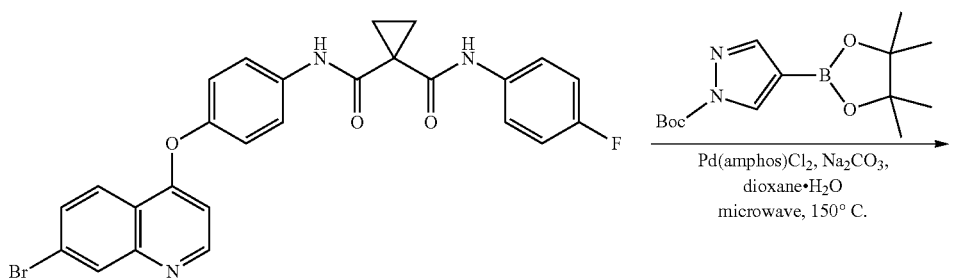

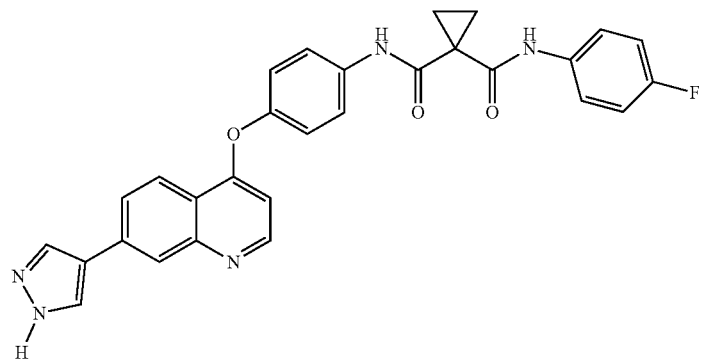

1-N'-(4-Fluorophenyl)-1-N-[4-[7-(1H-pyrazol-4-yl)quinolin-4-yl]oxyphenyl]cyclopropane-1,1-dicarboxamide (67): Compound 67 was synthesized by the same method used to synthesize Compound 10 in Example 3. $^1$H NMR (400 MHz, DMSO-d$_6$) δ 13.12 (s, 1H), 10.21 (s, 1H), 10.08 (s, 1H), 8.65 (d, 1H), 8.48 (s, 1H), 8.28 (s, 1H), 8.26-8.25 (m, 1H), 8.18 (s, 1H), 7.97-7.94 (m, 1H), 7.78 (d, 2H), 7.67-7.63 (m, 2H), 7.27 (d, 2H), 7.16 (t, 2H), 6.51 (d, 1H), 1.48 (m, 4H); MS (EI) for C$_{29}$H$_{22}$FN$_5$O$_3$. found: 508.1 (MH+).

Example 11: 1-N'-(4-Fluorophenyl)-1-N-[4-[7-(1H-pyrazol-5-yl)quinolin-4-yl]oxyphenyl]cyclopropane-1,1-dicarboxamide (68)

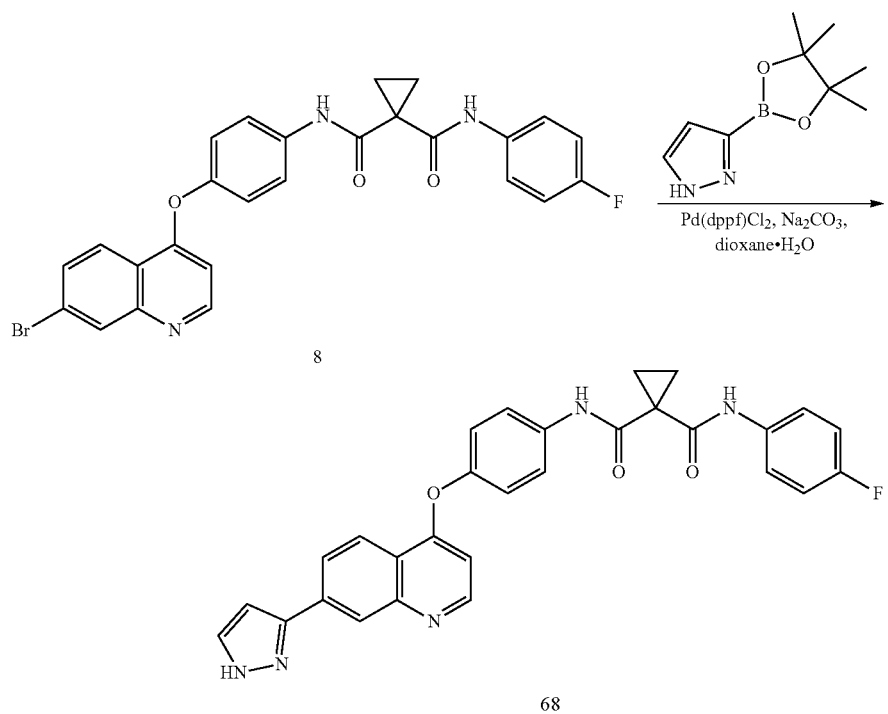

1-N'-(4-Fluorophenyl)-1-N-[4-[7-(1H-pyrazol-5-yl)quinolin-4-yl]oxyphenyl]cyclopropane-1,1-dicarboxamide (68): A mixture of Compound 8 (500 mg, 0.96 mmol, 1 eq), 3-(4,4,5,5-tetramethyl-1,3,2-dioxaborolan-2-yl)-1H-pyrazole (373 mg, 1.9 mmol, 2 eq), Na$_2$CO$_3$ (306 mg, 2.9 mmol, 3 eq), Pd(dppf)Cl$_2$ (70 mg, 0.096 mmol, 0.10 eq) in dioxane (10 mL) and water (1 mL) was degassed and purged with nitrogen three times. The mixture was then stirred at 75° C. for 12 h under an atmosphere of nitrogen. The resulting mixture was filtered, and the filtrate was added dropwise to water (50 mL). The resulting white solid was collected by filtration and subsequently triturated with MeOH (5 mL). The resulting solid was collected by filtration, washed with MeOH (3×0.5 mL) and dried under vacuum to give Compound 68 as a light-yellow solid (400 mg, 82% yield). $^1$H NMR (400 MHz, DMSO-d$_6$) δ 13.62 (s, 0.2H), 13.10 (s, 0.75H), 10.20 (s, 1H), 10.06 (s, 1H), 8.67 (d, 1H), 8.49-8.29 (m, 2H), 8.22-8.01 (m, 1H), 7.88 (s, 1H), 7.78 (br d, 2H), 7.64 (dd, 2H), 7.27 (d, 2H), 7.15 (t, 2H), 6.99 (s, 1H), 6.53 (d, 1H), 1.47 (s, 4H); MS (EI) for C$_{29}$H$_{22}$FN$_5$O$_3$. found: 508.1 (MH+).

Example 12: 1-N'-(4-Fluorophenyl)-1-N-[4-[7-(1-methylimidazol-4-yl)quinolin-4-yl]oxyphenyl]cyclopropane-1,1-dicarboxamide (69)

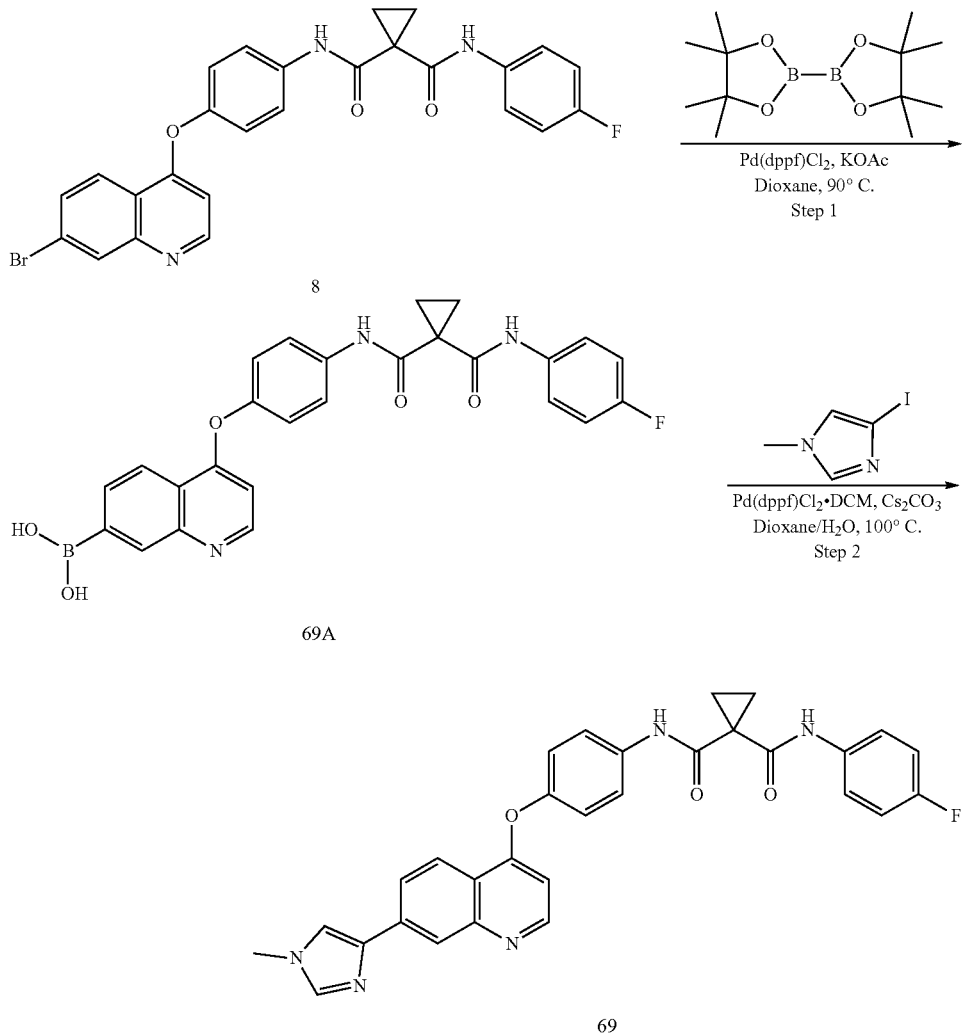

Step 1: (4-(4-(1-(((4-Fluorophenyl)carbamoyl)cyclopropane-1-carboxamido)phenoxy)quinolin-7-yl)boronic acid (69A): Compound 8 (500 mg, 0.96 mmol, 1 eq), 4,4,5,5-tetramethyl-2-(4,4,5,5-tetramethyl-1,3,2-dioxaborolan-2-yl)-1,3,2-dioxaborolane (488 mg, 1.9 mmol, 2 eq), KOAc (283 mg, 2.9 mmol, 3 eq) and Pd(dppf)Cl$_2$ (35.2 mg, 0.048 mmol, 0.05 eq) in dioxane (10 mL) was de-gassed and then heated to 90° C. for 3 h under an atmosphere of nitrogen. The reaction mixture was then poured into water (80 mL) and extracted with EtOAc (3×50 mL). The combined organic extracts were washed with aq saturated NaCl (15 mL), dried over anhyd Na$_2$SO$_4$ and concentrated in vacuo to give crude Compound 69A as a dark brown gum (400 mg, 86% yield) which was used in subsequent reactions without further purification. MS (EI) for $C_{26}H_{21}BFN_3O_5$, found: 486.3 (MH+).

Step 2: 1-N'-(4-Fluorophenyl)-1-N-[4-[7-(1-methylimidazol-4-yl)quinolin-4-yl]oxyphenyl]cyclopropane-1,1-dicarboxamide (69): Compound 69A (200 mg, 0.41 mmol, 1 eq), 4-iodo-1-methyl-imidazole (128 mg, 0.62 mol, 1.5 eq), Cs$_2$CO$_3$ (403 mg, 1.2 mmol, 3 eq) and Pd(dppf)Cl$_2$-DCM (16.8 mg, 0.021 mmol, 0.05 eq) in dioxane (6 mL) and water (0.2 mL) was de-gassed and then heated to 100° C. for 12 h under an atmosphere of nitrogen. The reaction mixture was then poured into water (30 mL) and extracted with EtOAc (3×30 mL). The combined organic extracts were washed with aq saturated NaCl (10 mL), dried over anhyd Na$_2$SO$_4$ and concentrated in vacuo. The resulting residue was purified by flash silica gel chromatography (ISCO®; 12 g SepaFlash® Silica Flash Column, Eluent of 0~5% MEOH/DCM gradient @ 30 mL/min) followed by further purification by prep-HPLC (Column: Boston Prime C18 150*30 mm*5 μm, gradient: 45-75% of acetonitrile in water (0.05% ammonia hydroxide v/v), flow rate: 25 mL/min) to give Compound 69 as a white solid (31.5 mg, 15% yield). $^1$H NMR (400 MHz, DMSO-d$_6$) δ 10.19 (s, 1H), 10.06 (br s, 1H), 8.63 (br d, 1H), 8.33 (s, 1H), 8.27 (br d, 1H), 8.05 (d, 1H), 7.89 (s, 1H), 7.81-7.70 (m, 3H), 7.68-7.60 (m, 2H), 7.25 (d, 2H), 7.15 (t, 2H), 6.49 (d, 1H), 3.73 (s, 3H), 1.47 (s, 4H); MS (EI) for $C_{30}H_{24}FN_5O_3$. found: 522.1 (MH+).

Example 13: 1-N'-(4-Fluorophenyl)-1-N-[4-[7-(1H-imidazol-5-yl)quinolin-4-yl]oxyphenyl]cyclopropane-1,1-dicarboxamide (72)
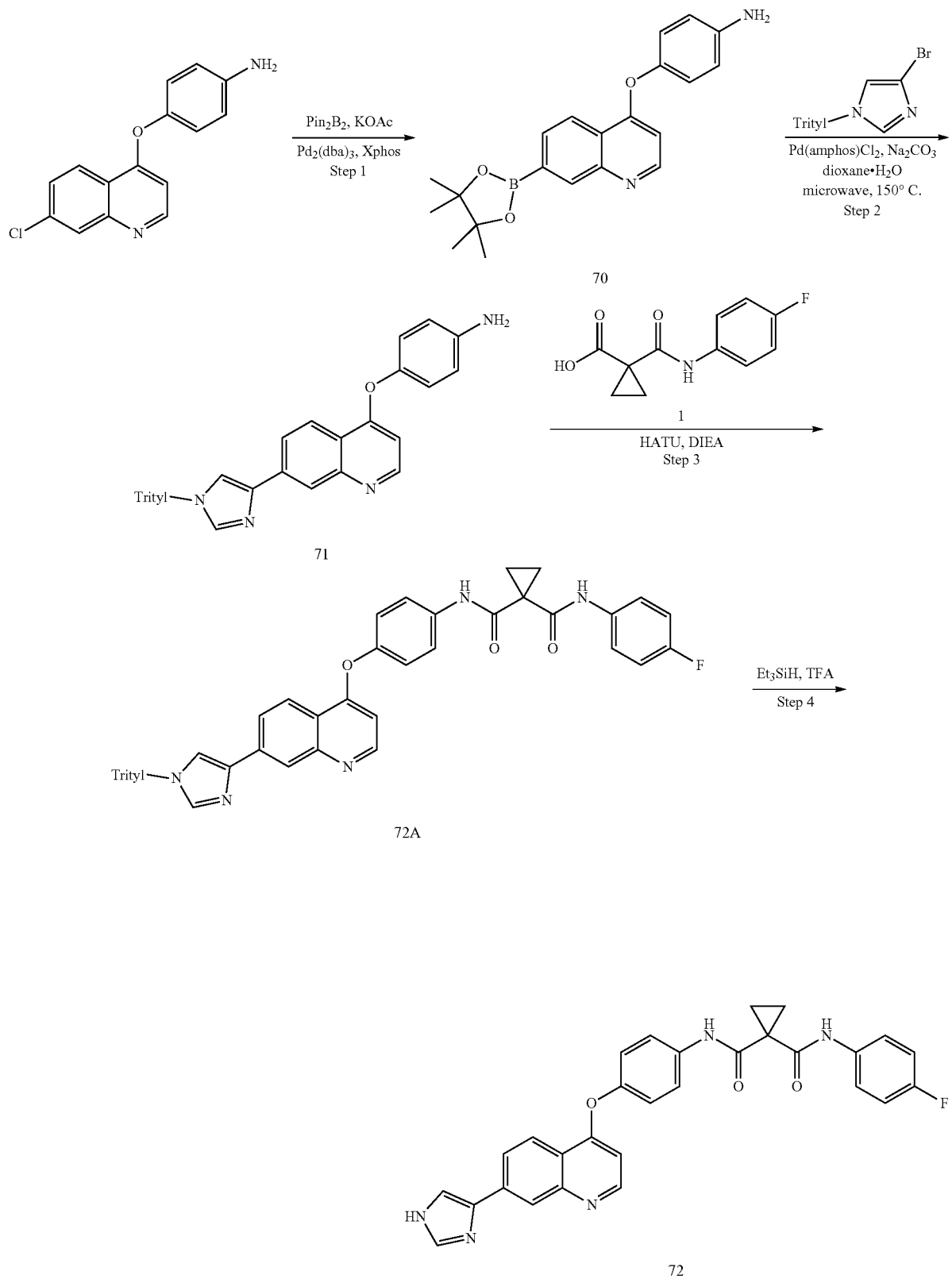

Step 1: 4-((7-(4,4,5,5-Tetramethyl-1,3,2-dioxaborolan-2-yl)quinolin-4-yl)oxy)aniline (70): In a flask were mixed 4-((7-chloroquinolin-4-yl)oxy)aniline (271 mg, 1.0 mmol), B$_2$Pin$_2$ (380 mg, 1.5 mmol), KOAc (196 mg, 2.0 mmol), Pd$_2$(dba)$_3$ (22 mg, 0.024 mmol), XPhos (23 mg, 0.05 mmol) and 1,4-dioxane (5 mL). The resulting mixture was stirred under nitrogen at 110° C. for 10 h. After cooling, the mixture was diluted with EtOAc and filtered through Celite®. Concentration gave crude Compound 70 which was used in the next step without further purification. 4-((7-chloroquinolin-4-yl)oxy)aniline can be made following the procedure of Abuza, S. et. al. (Abuzar, S.; Dubey, R.; Sharma, S. *Eur. J. Med. Chem.—Chim. Ther.* 1986, 21, 5-8).

Step 2: 4-((7-(1-trityl-1H-imidazol-4-yl)quinolin-4-yl)oxy)aniline (71): In a microwave reaction tube were mixed Compound 70 (362 mg, 1.0 mmol), 4-bromo-1-trityl-1H-imidazole (390 mg, 1.0 mmol), Na$_2$CO$_3$ (318 mg, 3.0 mmol), Pd(amphos)C12 (71 mg, 0.10 mmol), 1,4-dioxane (5 mL) and water (1.5 mL). The resulting mixture was irritated in a microwave reactor for 15 minutes at 150° C. After cooling, the mixture was extracted with EtOAc and the combined EtOAc extracts washed with aq saturated NaCl and concentrated. The crude product was purified by flash column chromatography to give Compound 71 (100 mg, 18% yield).

Step 3: N-(4-Fluorophenyl)-N-(4-((7-(1-trityl-1H-imidazol-4-yl)quinolin-4-yl)oxy)phenyl)cyclopropane-1,1-dicarboxamide (72A): To a mixture of Compound 71 (100 mg, 0.18 mmol), Compound 1 (41 mg, 0.18 mmol), and DIEA (46 mg, 0.36 mmol) in DCM (3 mL) was added HATU (103 mg, 0.27 mmol). The resulting mixture was stirred at room temperature for 10 h. The mixture was then concentrated, and the resulting residue was stirred in aq saturated NaHCO$_3$. The resulting solid was filtered, air dried and used in the next step without further purification.

Step 4: 1-N'-(4-Fluorophenyl)-1-N-[4-[7-(1H-imidazol-5-yl)quinolin-4-yl]oxyphenyl]cyclopropane-1,1-dicarboxamide (72): Crude Compound 72A was dissolved in TFA/DCM (3 mL/5 mL) and Et$_3$SiH (30 mg, 0.23 mmol) was added. The mixture was stirred at room temperature until the reaction was complete. The mixture was then concentrated, and the resulting residue was purified by prep HPLC to give Compound 72 (23 mg, 25% yield). MS (EI) for C$_{29}$H$_{22}$FN$_5$O$_3$. found: 508 (MH+).

Example 14: 1-N'-(4-Fluorophenyl)-1-N-[4-[7-(1,3,4-oxadiazol-2-yl)quinolin-4-yl]oxyphenyl]cyclopropane-1,1-dicarboxamide (73)

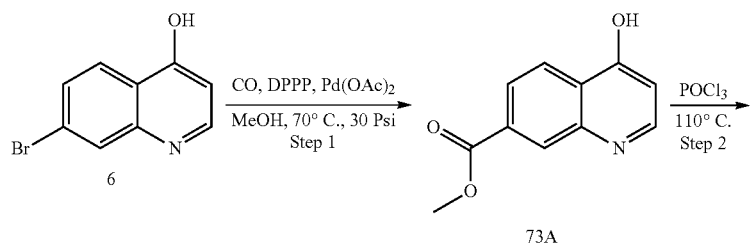

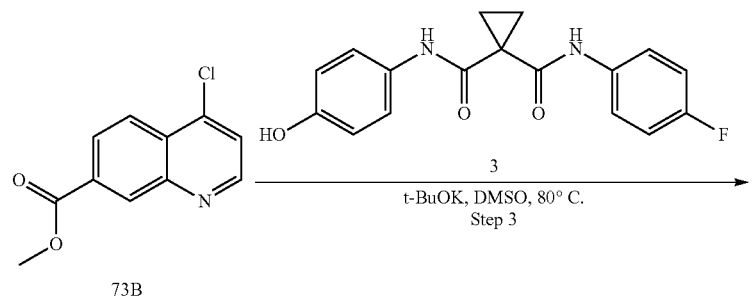

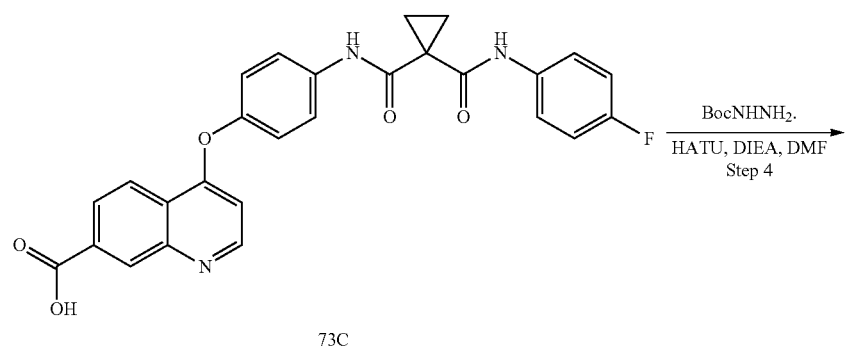

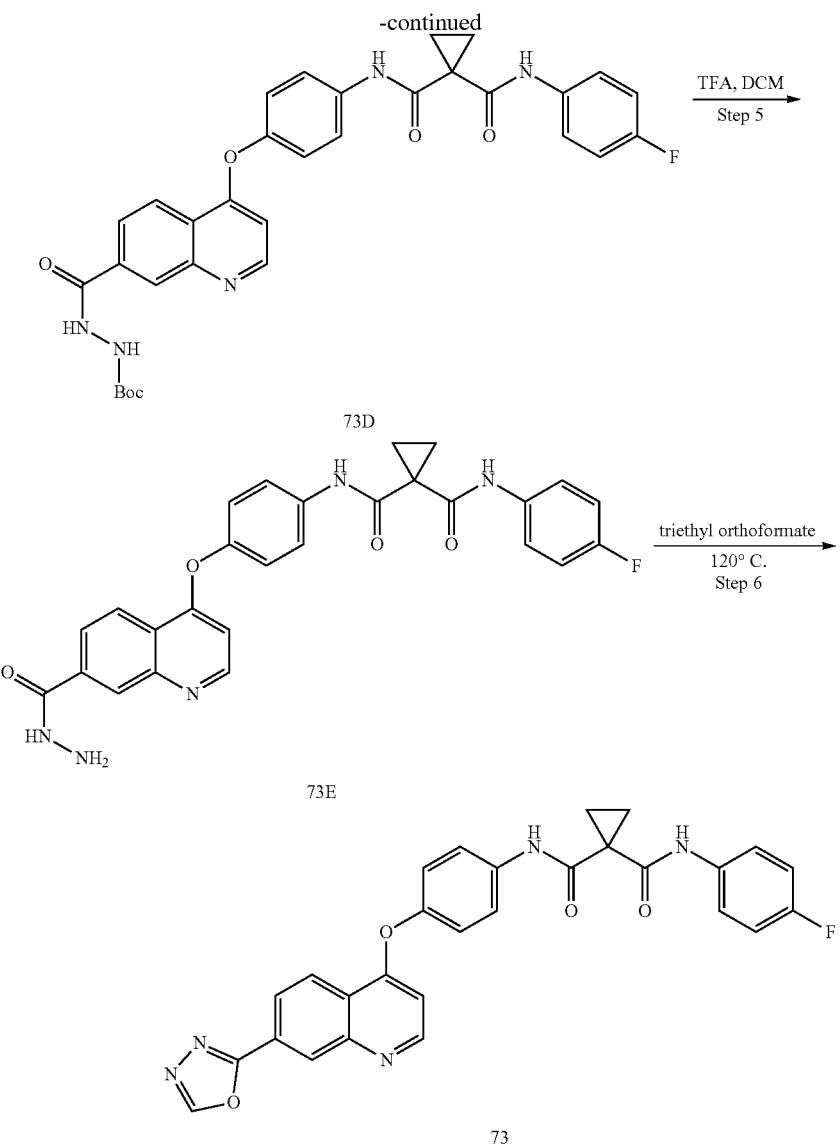

Step 1: Methyl 4-hydroxyquinoline-7-carboxylate (73A): To a round-bottom flask was added Compound 6 (5 g, 22 mmol, 1 eq), TEA (22.6 g, 223 mmol, 31.1 mL, 10 eq), MeOH (100 mL) and DMSO (20 mL). 3-Diphenylphosphanylpropyl(diphenyl)phosphane (1.84 g, 4.46 mmol, 0.2 eq) and Pd(OAc)$_2$ (1.00 g, 4.46 mmol, 0.2 eq) were added. The flask was purged with carbon monoxide twice and left under 30 psi of carbon monoxide as it was heated at 70° C. for 12 h. After removing volatile solvents under reduced pressure, water was added. The resulting precipitate was filtered. The solid was triturated with MeOH (15 mL) and filtered to give Compound 73A as a brown solid (3.5 g, 66% yield). $^1$H NMR (400 MHz, DMSO-d$_6$) δ 12.01 (br s, 1H), 8.23-8.17 (m, 2H), 8.02 (d, 1H), 7.81 (dd, 1H), 6.13 (d, 1H), 3.91 (s, 3H).

Step 2: Methyl 4-chloroquinoline-7-carboxylate (73B): Compound 73B was synthesized by a method analogous to that used to synthesize Compound 7 in Step 3 of Example 2. $^1$H NMR (400 MHz, DMSO-d$_6$) δ 8.98 (d, 1H), 8.64 (d, 1H), 8.35 (d, 1H), 8.25 (d, 1H), 7.94 (d, 1H), 3.97 (s, 3H).

Step 3: 4-(4-(1-((4-Fluorophenyl)carbamoyl)cyclopropane-1-carboxamido)phenoxy)quinoline-7-carboxylic acid (73C): To a solution of Compound 73B (360 mg, 1.6 mmol, 1 eq) in DMSO (12 mL) was added Compound 3 (510 mg, 1.6 mmol, 1 eq) and t-BuOK (510 mg, 4.6 mmol, 2.8 eq). The mixture was heated at 80° C. for 2h. Water (20 mL) was added and the resulting mixture was extracted with DCM (3×25 mL). The combined organic extracts were dried over anhyd Na$_2$SO$_4$ and concentrated in vacuo. The resulting residue was purified by flash silica gel chromatography (ISCO®; 12 g SepaFlash® Silica Flash Column, Eluent of 0~100% EtOAc/Petroleum ether gradient @30 mL/min) to give Compound 73C as a brown solid (60 mg, 6% yield). MS (EI) for C$_{27}$H$_{20}$FN$_3$O$_5$. found: 486.1 (MH+).

Step 4: tert-Butyl 2-(4-(4-(1-((4-fluorophenyl)carbamoyl)cyclopropane-1-carboxamido)phenoxy)quinoline-7-carbonyl)hydrazine-1-carboxylate (73D): To a solution of Compound 73C (60 mg, 0.12 mmol, 1 eq) in DMF (3 mL) was added tert-butyl N-aminocarbamate (49 mg, 0.37 mmol, 3 eq), HATU (56.4 mg, 0.15 mmol, 1.2 eq) and DIEA (47.9 mg, 0.37 mmol, 0.064 mL, 3 eq). The mixture was stirred at 20° C. for 15 h. Water (20 mL) was added and the resulting mixture was extracted with DCM (3×25 mL). The combined organic extracts were dried over anhyd $Na_2SO_4$ and concentrated in vacuo. The resulting residue was purified by flash silica gel chromatography (ISCO®; 12 g SepaFlash® Silica Flash Column, Eluent of 0~100% EtOAc/Petroleum ether gradient @30 mL/min) to give Compound 73D as a red solid (70 mg, 76% yield). MS (EI) for $C_{32}H_{30}FN_5O_6$. found: 600.2 (MH+).

Step 5: N-(4-Fluorophenyl)-N-(4-((7-(hydrazinecarbonyl)quinolin-4-yl)oxy)phenyl)cyclopropane-1,1-dicarboxamide (73E): To a solution of Compound 73D (70 mg, 0.12 mmol, 1 eq) in DCM (2 mL) was added TFA (133 mg, 1.2 mmol, 0.086 mL, 10 eq). The mixture was stirred at 15° C. for 4 h. The mixture was concentrated under vacuum to give the crude TFA salt of Compound 73E as a yellow oil (71 mg, 79% yield). MS (EI) for $C_{27}H_{22}FN_5O_4$. found: 500.1 (MH+).

Step 6: 1-N'-(4-Fluorophenyl)-1-N-[4-[7-(1,3,4-oxadiazol-2-yl)quinolin-4-yl]oxyphenyl]cyclopropane-1,1-dicarboxamide (73): To solution of Compound 73E (70 mg, 0.14 mmol, 1 eq) in diethoxymethoxyethane (104 mg, 0.70 mmol, 0.12 mL, 5 eq) was added PTSA (4.83 mg, 0.028 mmol, 0.2 eq). The mixture was heated at 120° C. for 1 h. The mixture was concentrated under vacuum. The resulting residue was purified by prep-TLC (petroleum ether/EtOAc=1/1) followed by trituration with MeCN/MeOH (5 mL/1 mL) to give Compound 73 as a brown solid (18.6 mg, 25% yield). $^1$H NMR (400 MHz, DMSO-$d_6$) δ 10.21 (s, 1H), 10.05 (s, 1H), 9.47 (s, 1H), 8.79 (d, 1H), 8.59 (d, 1H), 8.53 (d, 1H), 8.25 (dd, 1H), 7.78 (d, 2H), 7.66-7.58 (m, 2H), 7.29 (d, 2H), 7.14 (t, 2H), 6.68 (d, 1H), 1.46 (s, 4H); MS (EI) for $C_{28}H_{20}FN_5O_4$. found: 510.1 (MH+).

Example 15: 1-N'-(4-Fluorophenyl)-1-N-[4-[7-(1H-imidazol-2-yl)quinolin-4-yl]oxyphenyl]cyclopropane-1,1-dicarboxamide (74)

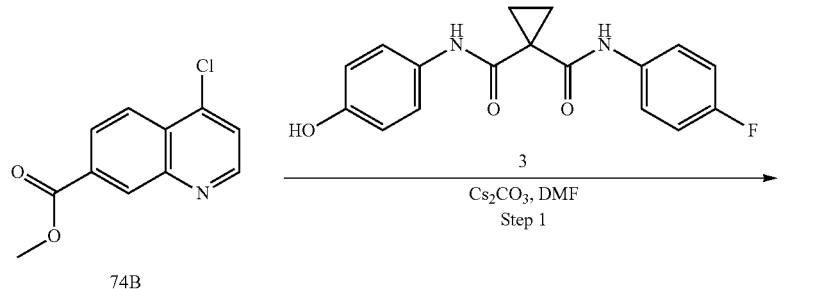

74B

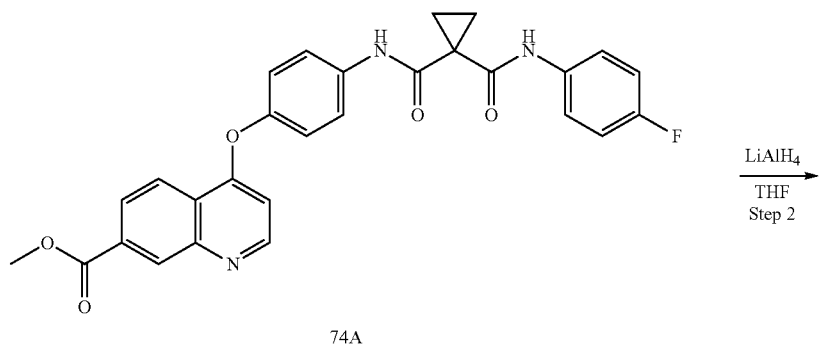

74A

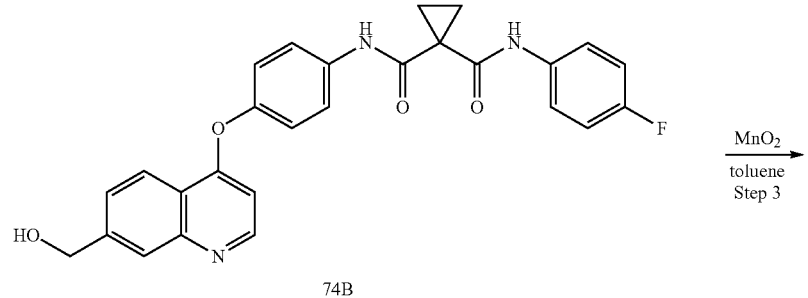

74B

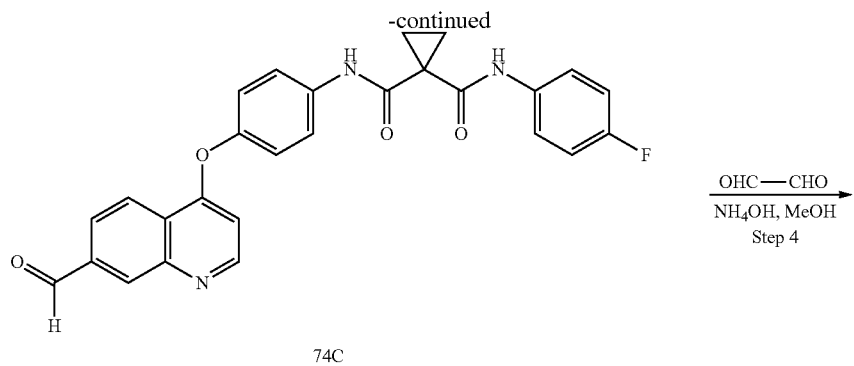

74C

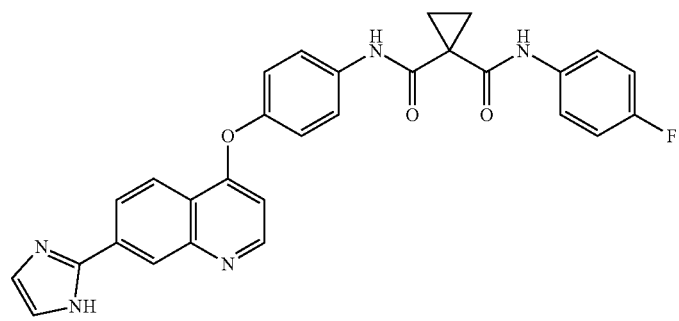 [SMILES: O=C(Nc1ccc(F)cc1)C1(C(=O)Nc2ccc(Oc3ccnc4cc(-c5ncco5)ccc34)cc2)CC1]

74

Step 1: Methyl 4-(4-(1-((4-fluorophenyl)carbamoyl)cyclopropane-1-carboxamido)phenoxy)quinoline-7-carboxylate (74A): To a solution of Compound 73B (500 mg, 2.3 mmol, 1 eq) in DMF (5 mL) was added Compound 3 (851 mg, 2.7 mmol, 1.2 eq) and $Cs_2CO_3$ (1.47 g, 4.5 mmol, 2 eq). The mixture was heated at 100° C. for 3 h. Water (20 mL) was added to the reaction mixture was extracted with DCM (3×25 mL). The combined organic extracts were dried over anhyd $Na_2SO_4$ and concentrated in vacuo. The resulting residue was purified by flash silica gel chromatography (ISCO®; 12 g SepaFlash® Silica Flash Column, Eluent of 10% DCM/MeOH ether gradient @ 30 mL/min) to give Compound 74A as brown solid (420 mg, 34% yield). MS (EI) for $C_{28}H_{22}FN_3O_5$. found: 500.1 (MH+).

Step 2: N-(4-Fluorophenyl)-N-(4-((7-(hydroxymethyl)quinolin-4-yl)oxy)phenyl)cyclopropane-1,1-dicarboxamide (74B): To a solution of $LiAlH_4$ (68.4 mg, 1.8 mmol, 3 eq) in THF (8 mL) was added Compound 74A (300 mg, 0.6 mmol, 1 eq) in THF (2 mL) at 20° C. The mixture was stirred at 25° C. for 2 h. $Na_2SO_4$ $10H_2O$ (50 mg) was added and the resulting mixture was filtered. The filtrate was dried over anhyd $Na_2SO_4$ and concentrated in vacuo to give crude Compound 74B as a brown solid (120 mg, 36% yield). $^1$H NMR (400 MHz, $CDCl_3$) δ 9.39 (s, 1H), 8.77 (br s, 1H), 8.64 (d, 1H), 8.34 (d, 1H), 8.07 (s, 1H), 7.66-7.54 (m, 3H), 7.54-7.40 (m, 1H), 7.17 (d, 2H), 7.06 (t, 2H), 6.53 (d, 1H), 4.94 (s, 2H), 3.49 (s, 1H), 1.80-1.70 (m, 4H).

Step 3: N-(4-Fluorophenyl)-N-(4-((7-formylquinolin-4-yl)oxy)phenyl)cyclopropane-1,1-dicarboxamide (74C): To a solution of Compound 74B (120 mg, 0.25 mmol, 1 eq) in DCM (5 mL) was added $MnO_2$ (221 mg, 2.55 mmol, 10 eq). The mixture was stirred at 20° C. for 3.5 h. The mixture was filtered and concentrated in vacuo to give crude Compound 74C as a brown solid (80 mg, 60% yield). MS (EI) for $C_{27}H_{20}FN_3O_5$. found: 470.1 (MH+).

Step 4: 1-N'-(4-Fluorophenyl)-1-N-[4-[7-(1H-imidazol-2-yl)quinolin-4-yl]oxyphenyl]cyclopropane-1,1-dicarboxamide (74): To a mixture of Compound 74C (80 mg, 0.17 mmol, 1 eq) in MeOH (5 mL) was added 28% $NH_3$—$H_2O$ (725 mg, 5.8 mmol, 0.80 mL, 34 eq) and GLYOXAL (49.4 mg, 0.85 mmol, 0.044 mL, 5 eq). The mixture was stirred at 60° C. for 3 h. The reaction mixture was concentrated and the resulting residue was purified by prep-HPLC (DuraShell 150*25 mm*5 µm ([water (0.05% ammonia hydroxide v/v)-MeCN]; B %: 30%-70%, 10 min) to give Compound 74 as an off-white solid (40.3 mg, 44% yield). $^1$H NMR (400 MHz, DMSO-$d_6$) δ 12.88 (br s, 1H), 10.22 (s, 1H), 10.07 (s, 1H), 8.70 (d, 1H), 8.57 (s, 1H), 8.41-8.35 (m, 1H), 8.32-8.25 (m, 1H), 7.79 (d, 2H), 7.65 (dd, 2H), 7.37 (s, 1H), 7.29 (d, 2H), 7.16 (t, 3H), 6.56 (d, 1H), 1.48 (s, 4H); MS (EI) for $C_{29}H_{22}FN_5O_3$. found: 508.0 (MH+).

Example 16: 1-N'-(4-Fluorophenyl)-1-N-[4-[7-(1-methylimidazol-2-yl)quinolin-4-yl]oxyphenyl]cyclopropane-1,1-dicarboxamide (75)

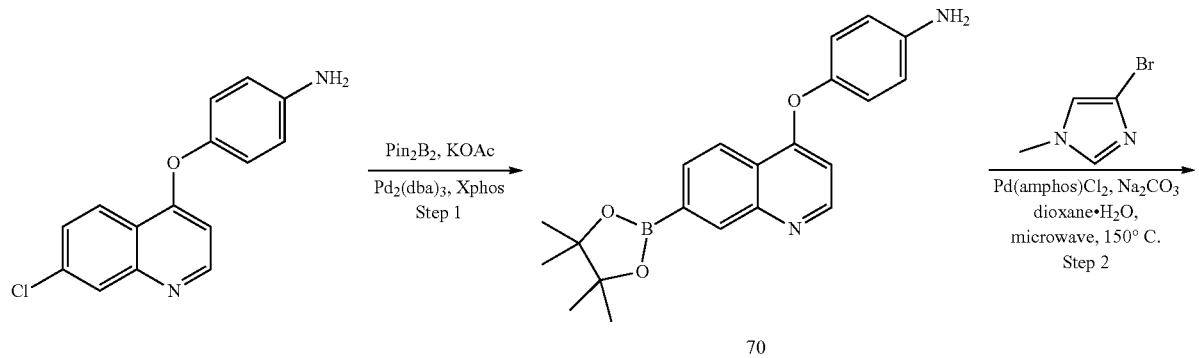

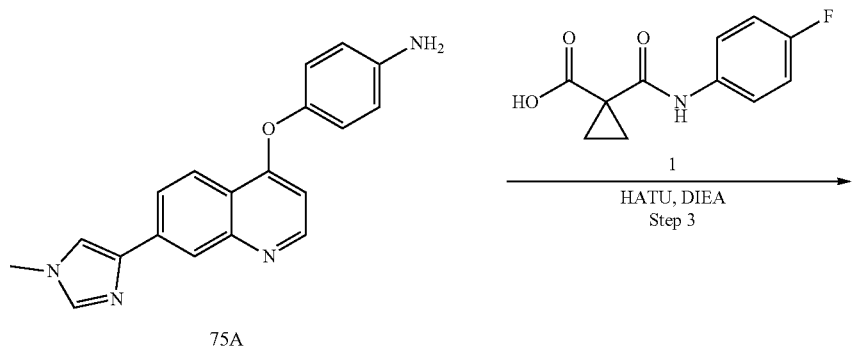

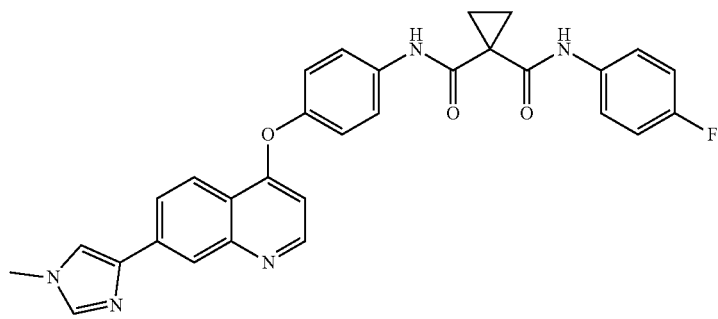

1-N'-(4-Fluorophenyl)-1-N-[4-[7-(1-methylimidazol-2-yl)quinolin-4-yl]oxyphenyl]cyclopropane-1,1-dicarboxamide (75): Compound 75 was synthesized in 2 steps starting from Compound 70 and 2-bromo-1-methyl-1H-imidazole by the same method used to synthesize Compound 72A in 2 steps from Compound 70 and 4-bromo-1-trityl-1H-imidazole in Example 13. MS (EI) for $C_{30}H_{24}FN_5O_3$. found: 522 (MH+).

Example 17: N-(4-Fluorophenyl)-N-(4-((7-iodo-6-methoxyquinolin-4-yl)oxy)phenyl)cyclopropane-1,1-dicarboxamide (76D)

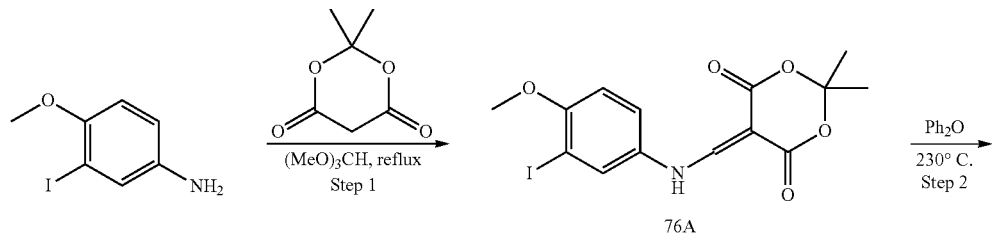

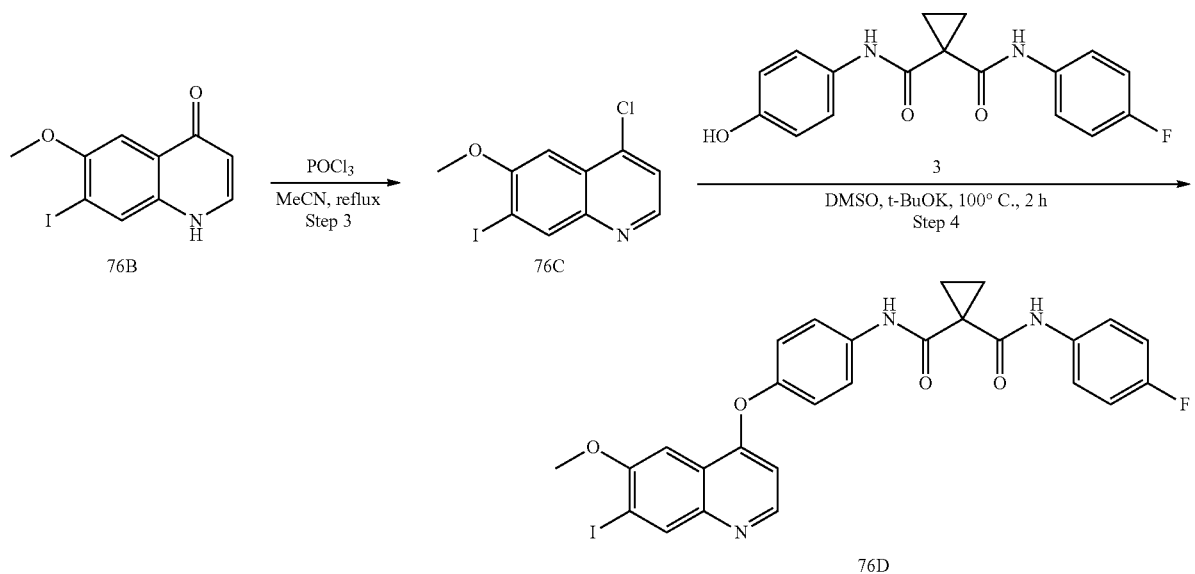

N-(4-Fluorophenyl)-N-(4-((7-iodo-6-methoxyquinolin-4-yl)oxy)phenyl)cyclopropane-1,1-dicarboxamide (76D): Compound 76D was synthesized in 4 steps starting from 3-iodo-4-methoxyaniline by the same method used to synthesize Compound 8 in Example 2 in 4 steps from 3-bromoaniline. MS (EI) for $C_{27}H_{21}FIN_3O_4$. found: 597.9 (MH+).

Example 18: 1-N'-(4-Fluorophenyl)-1-N-[4-[6-methoxy-7-(1-methylpyrazol-4-yl)quinolin-4-yl]oxyphenyl]cyclopropane-1,1-dicarboxamide (76)

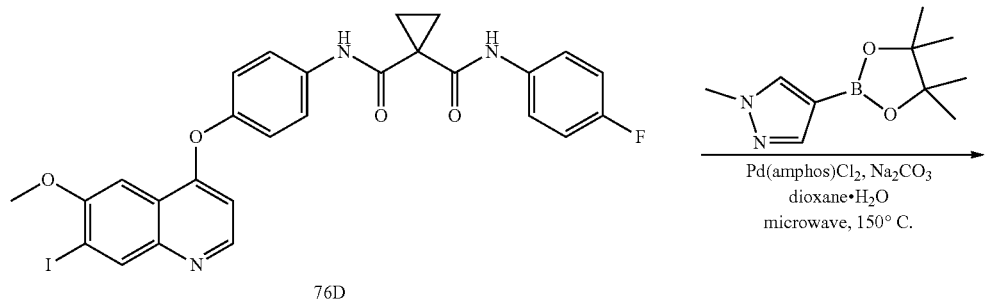

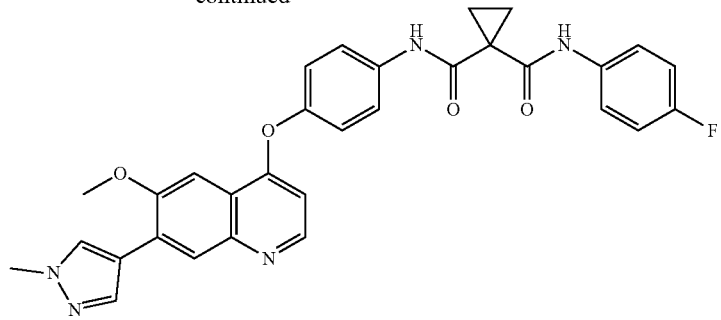

1-N'-(4-Fluorophenyl)-1-N-[4-[6-methoxy-7-(1-methylpyrazol-4-yl)quinolin-4-yl]oxyphenyl]cyclopropane-1,1-dicarboxamide (76): Compound 76 was synthesized by the same method used to synthesize Compound 10 in Example 3. $^1$H NMR (400 MHz, CDCl$_3$) δ 10.19 (s, 1H), 10.05 (s, 1H), 8.51 (d, 1H), 8.34 (s, 1H), 8.23 (s, 1H), 8.12 (s, 1H), 7.78 (d, 2H), 7.67-7.60 (m, 3H), 7.30-7.22 (m, 2H), 7.15 (t, 2H), 6.48 (d, 1H), 4.04 (s, 3H), 3.92 (s, 3H), 1.48 (s, 4H); MS (EI) for $C_{31}H_{26}FN_5O_4$. found: 522.0 (MH+).

Example 19: Methyl 7-bromo-4-(4-(1-((4-fluorophenyl)carbamoyl)cyclopropane-1-carboxamido)phenoxy)quinoline-6-carboxylate (77D)

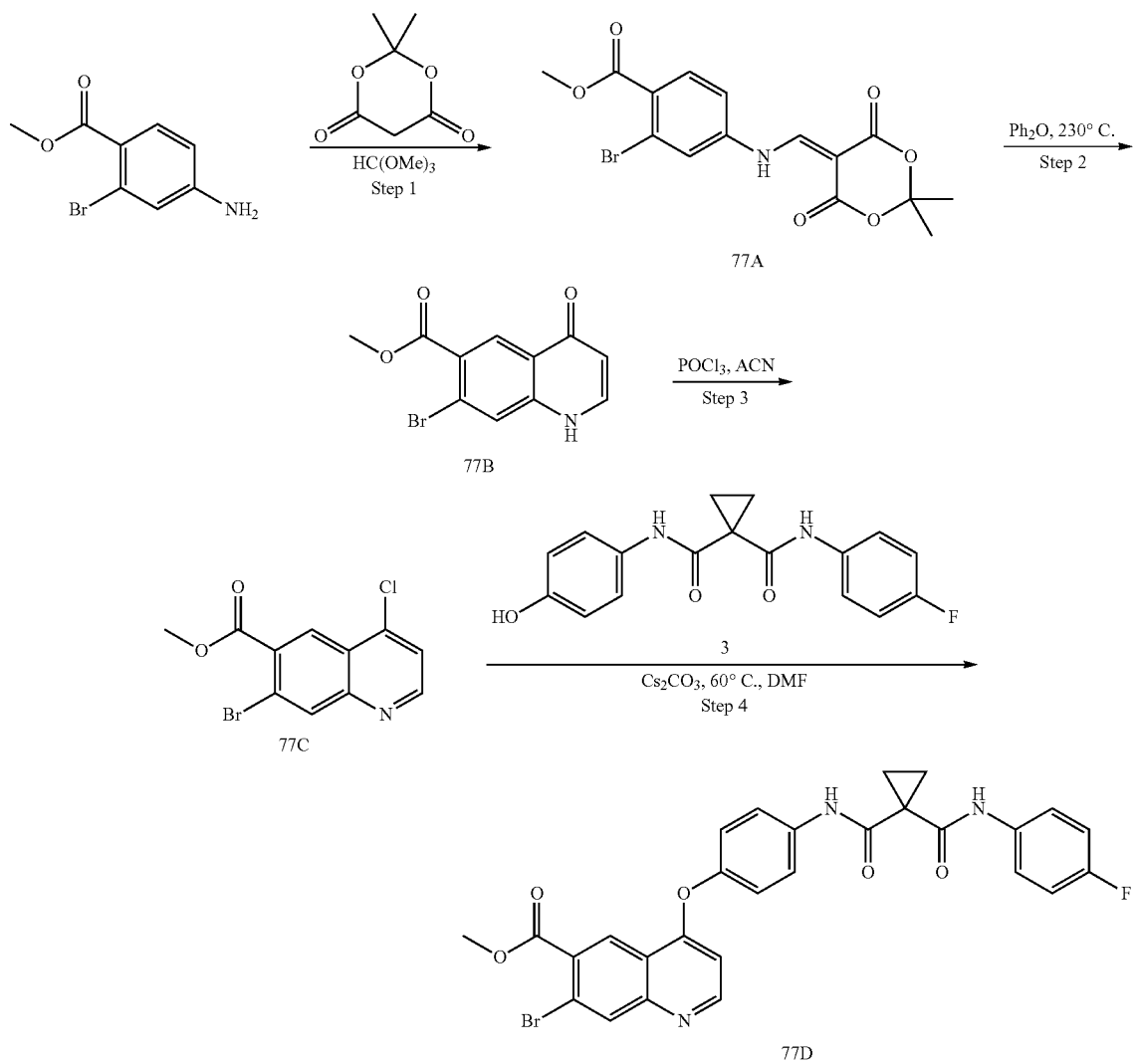

Methyl 7-bromo-4-(4-(1-((4-fluorophenyl)carbamoyl)cyclopropane-1-carboxamido)phenoxy)quinoline-6-carboxylate (77D): Compound 77D was synthesized in 4 steps starting from methyl 4-amino-2-bromobenzoate in a manner similar to that used to synthesize Compound 8 in Example 2 in 4 steps from 3-bromoaniline. In a variation of Step 4, Cs$_2$CO$_3$ replaces t-BuOK, DMF replaced DMSO and the reaction was ran at the lower temperature of 60° C. MS (EI) for C$_{28}$H21BrFN$_3$O$_5$. found: 579.9 (MH+).

Example 20: N-(4-((7-Bromo-6-(methylcarbamoyl)quinolin-4-yl)oxy)phenyl)-N-(4-fluorophenyl)cyclopropane-1,1-dicarboxamide (77E)

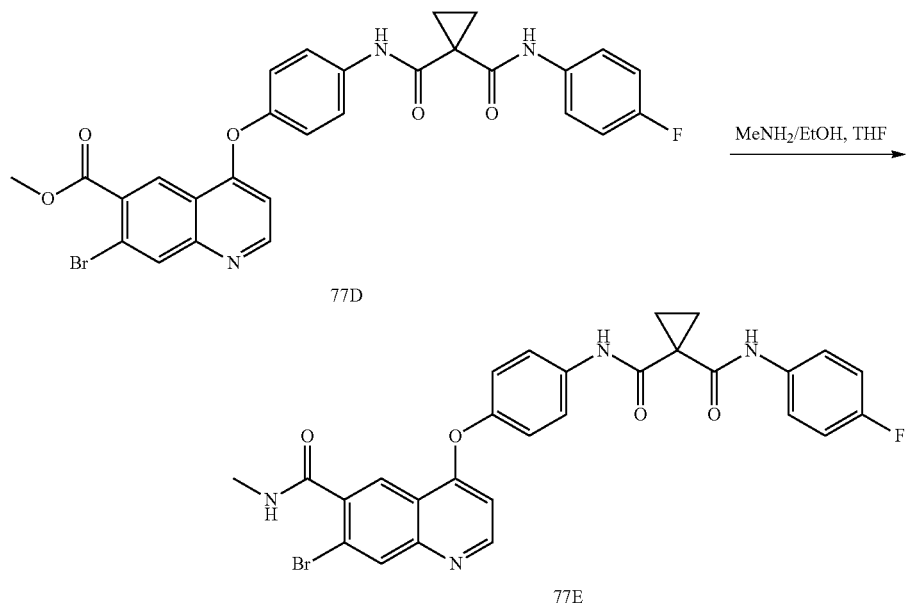

N-(4-((7-Bromo-6-(methylcarbamoyl)quinolin-4-yl)oxy)phenyl)-N-(4-fluorophenyl)cyclopropane-1,1-dicarboxamide (77E): To a mixture of Compound 77D (250 mg, 0.41 mmol, 1 eq) in THF (5 mL) was added 25% MeNH$_2$ in EtOH (255 mg, 2.0 mmol, 5 eq) at 25° C., followed by heating at 60° C. with stirring for 36 h. The resulting reaction mixture was allowed to cool and then concentrated. The resulting residue was purified by flash chromatography on silica gel (EtOAc in petroleum ether=0~80%) to give Compound 77E as a yellow solid (100 mg, 40% yield). MS (EI) for C$_{28}$H$_{22}$BrFN$_4$O$_4$. found: 579.0 (MH+).

Example 21: 1-N'-(4-Fluorophenyl)-1-N-[4-[6-(methylcarbamoyl)-7-(1-methylpyrazol-4-yl)quinolin-4-yl]oxyphenyl]cyclopropane-1,1-dicarboxamide hydrochloride (77)

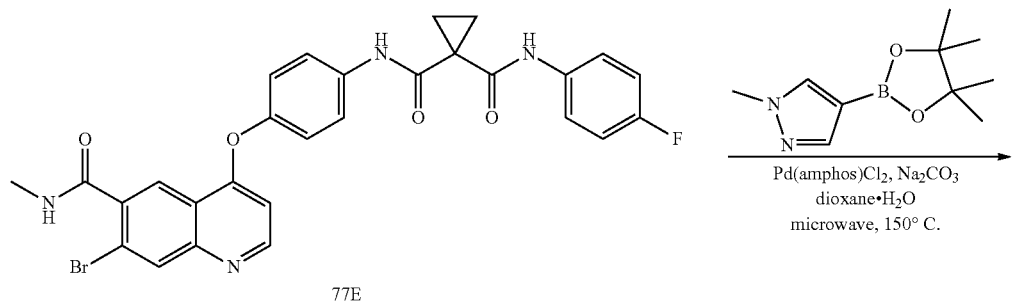

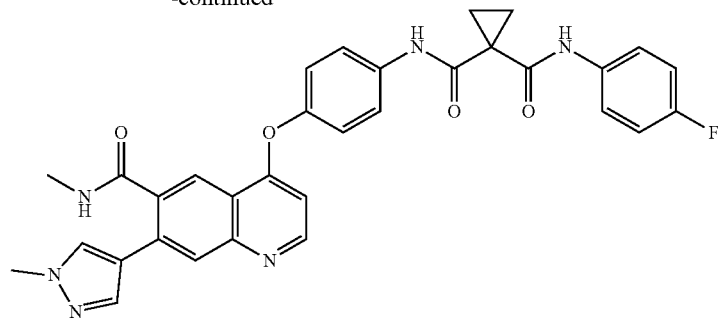

77

1-N'-(4-Fluorophenyl)-1-N-[4-[6-(methylcarbamoyl)-7-(1-methylpyrazol-4-yl)quinolin-4-yl]oxyphenyl]cyclopropane-1,1-dicarboxamide hydrochloride (77): Compound 77 was synthesized by the same method used to synthesize Compound 10 in Example 3. $^1$H NMR (400 MHz, DMSO-$d_6$) δ 10.32 (s, 1H), 10.04 (s, 1H), 8.93 (d, 1H), 8.68-8.62 (m, 1H), 8.35 (s, 1H), 8.24 (s, 1H), 8.09 (s, 1H), 7.85 (d, 2H), 7.80 (s, 1H), 7.65 (dd, 2H), 7.34 (d, 2H), 7.16 (t, 2H), 6.82 (d, 1H), 3.93 (s, 3H), 2.81 (d, 3H), 1.48 (d, 4H); MS (EI) for $C_{32}H_{27}FN_6O_4$. found: 579.1 (MH+).

Example 22: Methyl 7-bromo-4-(4-(1-((4-fluorophenyl)carbamoyl)cyclopropane-1-carboxamido)phenoxy)quinoline-6-carboxylate (78D)

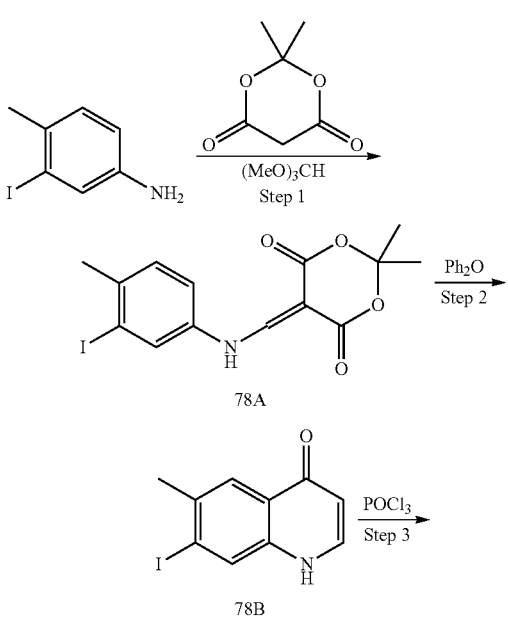

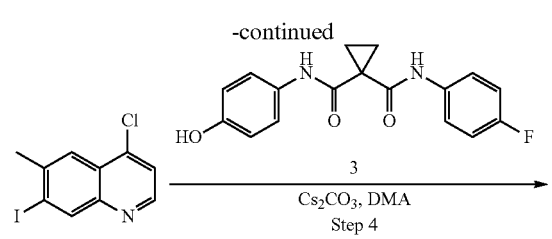

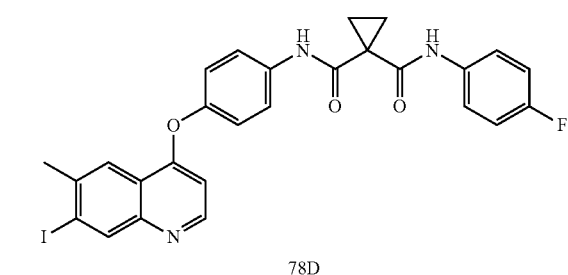

78D

Methyl 7-bromo-4-(4-(1-((4-fluorophenyl)carbamoyl)cyclopropane-1-carboxamido)phenoxy)quinoline-6-carboxylate (77D): Compound 78D was synthesized in 4 steps starting from 3-iodo-4-methylaniline in a manner similar to that used to synthesize Compound 8 in 4 steps from 3-bromoaniline in Example 2. In a variation of Step 4, $Cs_2CO_3$ replaces t-BuOK, DMA replaces DMSO and the reaction was ran at the lower temperature of 80° C. $^1$H NMR (400 MHz, DMSO-$d_6$) δ 10.20 (s, 1H), 10.05 (s, 1H), 8.61 (d, 1H), 8.54 (s, 1H), 8.23 (s, 1H), 7.77 (d, 2H), 7.67-7.61 (m, 2H), 7.28-7.22 (m, 2H), 7.17-7.13 (m, 2H), 6.56 (d, 1H), 2.60 (s, 3H), 1.47 (s, 4H); MS (EI) for $C_{27}H_{21}FIN_3O_3$. found: 581.8 (MH+).

Example 23: 1-N'-(4-Fluorophenyl)-1-N-[4-[6-methyl-7-(1-methylpyrazol-4-yl)quinolin-4-yl]oxyphenyl]cyclopropane-1,1-dicarboxamide (78)

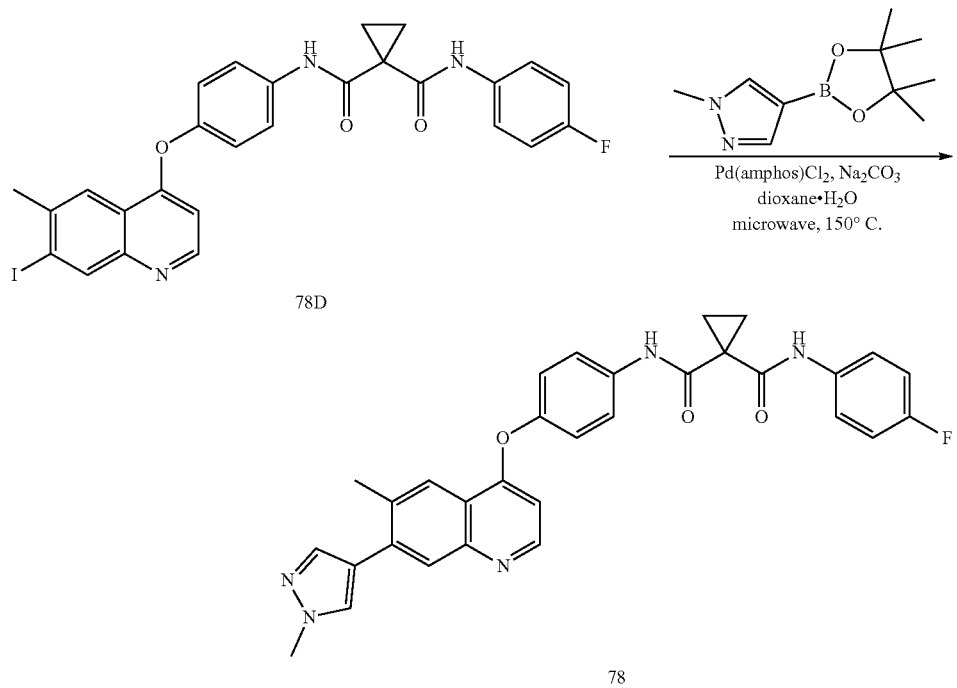

1-N'-(4-Fluorophenyl)-1-N-[4-[6-methyl-7-(1-methylpyrazol-4-yl)quinolin-4-yl]oxyphenyl]cyclopropane-1,1-dicarboxamide (78): Compound 78 was synthesized by the same method used to synthesize Compound 10 in Example 3. $^1$H NMR (400 MHz, CDCl$_3$) δ 9.50 (s, 1H), 8.89 (s, 1H), 8.58 (d, 1H), 8.18 (s, 1H), 8.04 (s, 1H), 7.76 (s, 1H), 7.61-7.64 (m, 3H), 7.45-7.47 (m, 2H), 7.04-7.06 (m, 2H), 7.15-7.18 (m, 2H), 6.49 (d, 1H), 4.00 (s, 3H), 2.61 (s, 3H), 1.64-1.73 (s, 4H); MS (EI) for $C_{31}H_{26}FN_5O_3$. found: 536.1 (MH+).

Example 24: 1-N'-(4-Fluorophenyl)-1-N-[4-[7-(1-methylsulfonylpyrazol-4-yl)quinolin-4-yl]oxyphenyl]cyclopropane-1,1-dicarboxamide hydrochloride (79)

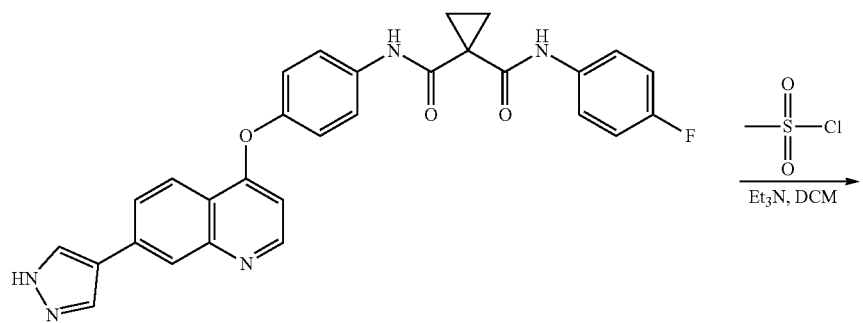

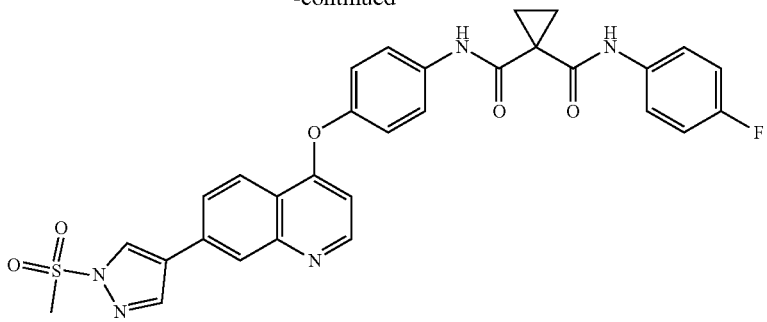

79

1-N'-(4-Fluorophenyl)-1-N-[4-[7-(1-methylsulfonylpyrazol-4-yl)quinolin-4-yl]oxyphenyl]cyclopropane-1,1-dicarboxamide hydrochloride (79): To a solution of Compound 67 (65 mg, 0.13 mmol, 1 eq) in DCM (2 mL) was added TEA (0.47 mol, 0.065 mL, 3.6 eq) and methanesulfonyl chloride (0.22 mmol, 0.017 mL, 1.7 eq) at 0° C. The reaction mixture was stirred at 27-32° C. for 5 h. The reaction was concentrated, and the resulting residue diluted with water (10 mL) and extracted with EtOAc (2×15 mL). The combined organic extracts were washed with aq saturated NaCl (20 mL), dried over anhyd $Na_2SO_4$ and concentrated. The resulting residue was purified by silica gel column chromatography (EtOAc/Petroleum ether) followed by further purification by prep-HPLC (column: YMC-Actus Triart C18 150*30 mm*5 μm ([water (0.05% HCl)-MeCN]; B %: 37%-67%, 10 min) to give the HCl salt of Compound 79 as a light yellow solid (19.8 mg, 24% yield).

$^1$H NMR (400 MHz, DMSO-$d_6$) δ 10.33 (s, 1H), 10.05 (s, 1H), 9.16 (s, 1H), 8.96 (d, 1H), 8.71 (s, 1H), 8.57 (d, 1H), 8.49 (s, 1H), 8.40-8.33 (m, 1H), 7.85 (d, 2H), 7.68-7.57 (m, 2H), 7.38 (d, 2H), 7.15 (t, 2H), 6.87 (d, 1H), 3.67 (s, 3H), 1.49 (d, 4H); MS (EI) for $C_{30}H_{24}FN_5O_5S$. found: 586.3 (MH+).

Example 25: 1-((4-((7-(1-Methyl-1H-pyrazol-4-yl)quinolin-4-yl)oxy)phenyl)carbamoyl)-cyclopropane-1-carboxylic acid (80D)

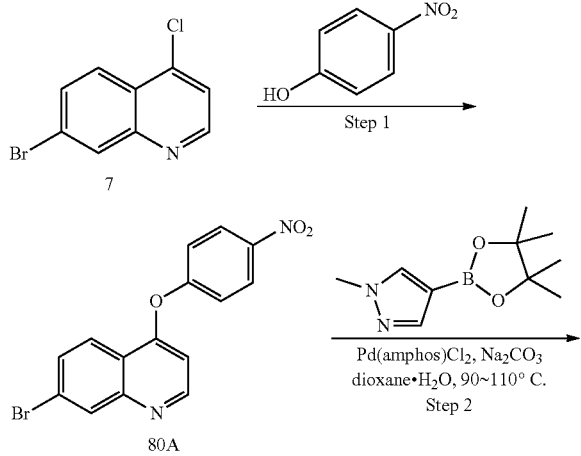

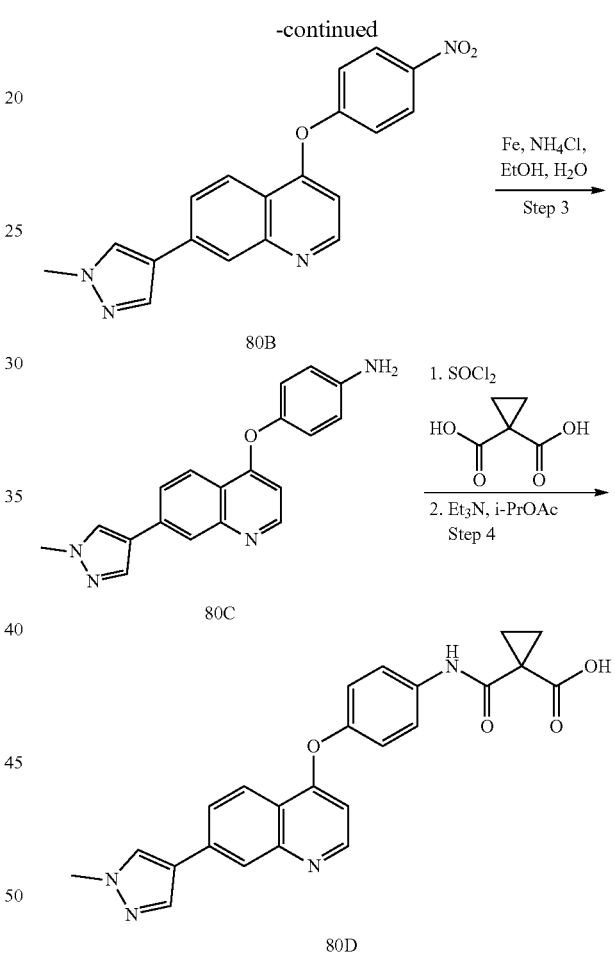

Step 1: 7-Bromo-4-(4-nitrophenoxy)quinoline (80A): A mixture of Compound 7 (5.0 g, 20.6 mmol, 1 eq) and 4-nitrophenol (3.44 g, 24.7 mmol, 1.2 eq) in $Ph_2O$ (50 mL) was stirred for 24 h at 140° C. After cooling to room temperature, the resulting precipitate was collected by filtration and washed with petroleum ether (3×20 mL). The resulting solid was suspended in petroleum ether (100 mL) and stirred for 10 min, filtered and dried to give Compound 80A as a white solid (7.20 g, 81% yield). $^1$H NMR (400 MHz, DMSO-$d_6$) δ 9.00-8.93 (m, 1H), 8.47-8.38 (m, 3H), 8.34-8.26 (m, 1H), 7.99-7.92 (m, 1H), 7.64-7.57 (m, 2H), 7.14-7.09 (m, 1H); MS (EI) for $C_{15}H_9BrN_2O_3$. found: 344.8 (MH+).

Step 2: 7-(1-Methyl-1H-pyrazol-4-yl)-4-(4-nitrophenoxy) quinoline (80B): To a mixture of Compound 80A (6.70 g, 15.53 mmol, 1 eq), 1-methyl-4-(4,4,5,5-tetramethyl-1,3,2-dioxaborolan-2-yl)pyrazole (3.88 g, 18.6 mmol, 1.2 eq) and $Na_2CO_3$ (4.94 g, 46.6 mmol, 3 eq) in 1,4-dioxane (90 mL) and water (15 mL) was added Pd(amphos)$Cl_2$ (1.32 g, 1.9 mmol, 1.32 mL, 0.12 eq) at 25° C. under an atmosphere of nitrogen. The resulting mixture was stirred for 1 h at 90-110° C. under nitrogen. After cooling, the mixture was concentrated, and the resulting residue was suspended in water (150 mL) and extracted with EtOAc (2×60 mL) and DCM (2×60 mL). The combined organic extracts were dried over anhyd $Na_2SO_4$ and concentrated. The resulting residue was purified by flash column chromatography on silica gel (MeOH in DCM=0~5%) to give Compound 80B as a red solid (4.20 g, 55% yield). MS (EI) for $C_{19}H_{14}N_4O_3$. found: 347.0 (MH+).

Step 3: 4-((7-(1-Methyl-1H-pyrazol-4-yl)quinolin-4-yl) oxy)aniline (80C): To a mixture of Compound 80B (4.20 g, 8.5 mmol, 1 eq) and $NH_4Cl$ (6.81 g, 127 mmol, 15 eq) in EtOH (80 mL) and water (20 mL) was added iron (4.74 g, 85 mmol, 10 eq) at 25° C. The resulting mixture was stirred for 1 h at 70° C. After cooling, the mixture was filtered and the filtrate was concentrated under reduced pressure. The resulting residue was suspended in water (50 mL) and EtOAc (20 mL) and stirred for 10 min. The resulting precipitate was collected by filtration to give Compound 80C as a yellow solid (1.30 g, 46% yield) which was used in subsequent reactions without further purification. MS (EI) for $C_{19}H_{16}N_4O$. found: 316.9 (MH+).

Step 4: 1-((4-((7-(1-Methyl-1H-pyrazol-4-yl)quinolin-4-yl)oxy)phenyl)carbamoyl)-cyclopropane-1-carboxylic acid (80D): To a mixture of cyclopropane-1,1-dicarboxylic acid (905 mg, 6.6 mmol, 2 eq) in isopropyl acetate (5 mL) was added $SOCl_2$ (825 mg, 6.9 mmol, 0.50 mL, 2.1 eq) at 25° C. and the mixture was stirred for 4 h at 25° C. This mixture was added to a mixture of Compound 80C (1.10 g, 3.3 mmol, 1.0 eq) and triethylamine (702 mg, 6.9 mmol, 0.96 mL, 2.1 eq) in isopropyl acetate (20 mL). The resulting mixture was stirred for 2 h at 25° C. The reaction was quenched with aq NaOH (5N, 10 mL) and the resulting phases were separated. The organic phase was extracted with aq 5 N NaOH. The combined basic extracts were washed with heptane (15 mL) and subsequently acidified with aq 30% HCl solution to give a slurry. The resulting precipitate was collected by filtration, diluted with DCM (80 mL) and water (50 mL), basified with 1 N NaOH solution till pH=8 and washed with DCM (3×30 mL). The aqueous phase was acidified with aq HCl (5 M) till pH=3. The resulting precipitate was filtered and dried to give Compound 80D as a light-yellow solid (500 mg, 35% yield). MS (EI) for $C_{24}H_{20}N_4O_4$. found: 429.0 (MH+).

Example 26: 1-(5-Fluoro-2-methyl-2,3-dihydroindole-1-carbonyl)-N-[4-[7-(1-methylpyrazol-4-yl)quinolin-4-yl]oxyphenyl]cyclopropane-1-carboxamide (80)

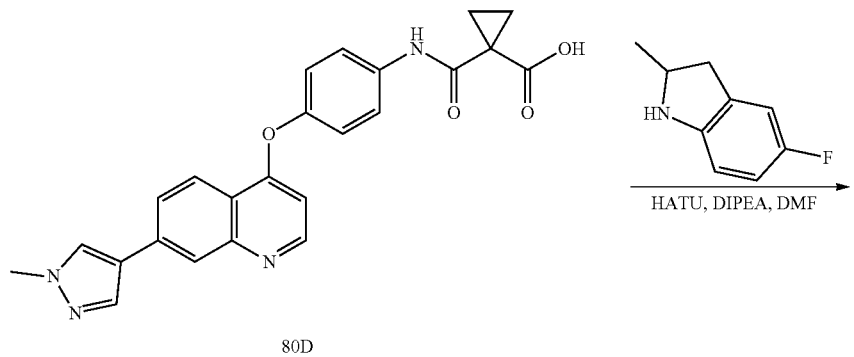

80D

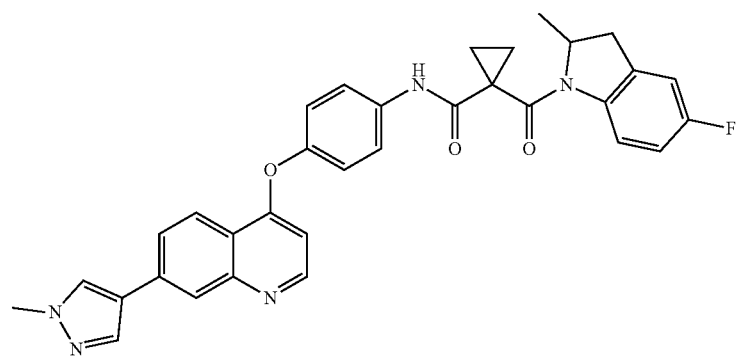 [SMILES: CC1Cc2cc(F)ccc2N1C(=O)C1(C(=O)Nc2ccc(Oc3ccnc4cc(-c5cnn(C)c5)ccc34)cc2)CC1]

80

1-(5-Fluoro-2-methyl-2,3-dihydroindole-1-carbonyl)-N-[4-[7-(1-methylpyrazol-4-yl)quinolin-4-yl]oxyphenyl]cyclopropane-1-carboxamide (80): To a solution of Compound 80D (80 mg, 0.19 mmol, 1 eq) in DMF (2 mL) was added HATU (85.2 mg, 0.22 mmol, 1.2 eq) and DIEA (72.4 mg, 0.56 mmol, 0.098 mL, 3 eq) and the resulting mixture was stirred at 20° C. for 30 min. 5-fluoro-2-methyl-indoline (33.9 mg, 0.22 mmol, 1.2 eq) was added stirring was continued at 20° C. for 12 h. The reaction mixture was poured into water (30 mL) and extracted with DCM (3×20 mL). The combined organic extracts were washed with aq saturated NaCl (10 mL) and concentrated. The resulting residue was purified by prep-HPLC (Column: Boston Prime C18 150*30 mm*5 μm, gradient: 47-67% of acetonitrile in water (0.05% ammonia hydroxide v/v), flow rate: 25 mL/min) to give Compound 80 as an off-white solid (27.5 mg, 26% yield). $^1$H NMR (400 MHz, CDCl$_3$) δ 8.62 (d, 1H), 8.32 (d, 1H), 8.25 (br s, 1H), 8.16 (d, 1H), 7.94 (s, 1H), 7.80 (s, 1H), 7.71 (dd, 1H), 7.57 (br d, 2H), 7.15 (d, 2H), 6.99-6.89 (m, 2H), 6.48 (d, 1H), 4.94 (quin, 1H), 4.00 (s, 3H), 3.35 (br dd, 1H), 2.63 (br d, 1H), 1.65-1.62 (m, 2H), 1.50-1.44 (m, 1H), 1.36-1.26 (m, 4H); MS (EI) for C$_{33}$H$_{28}$FN$_5$O$_3$. found: 562.4 (MH+).

The following compounds were prepared in a method analogous to that used to synthesize Compound 80 from Compound 80D in Example 26, replacing the 5-fluoro-2-methyl-indoline with the appropriate commercially available amine or aniline:

1-(5-Fluoro-2,3-dihydroindole-1-carbonyl)-N-[4-[7-(1-methylpyrazol-4-yl)quinolin-4-yl]oxyphenyl]cyclopropane-1-carboxamide (81): $^1$H NMR (400 MHz, CDCl$_3$) δ 8.63 (d, 1H), 8.32 (d, 1H), 8.16 (d, 1H), 8.12-7.98 (m, 2H), 7.95 (s, 1H), 7.80 (s, 1H), 7.71 (dd, 1H), 7.60 (d, 2H), 7.19-7.12 (m, 2H), 6.97-6.90 (m, 2H), 6.47 (d, 1H), 4.28 (t, 2H), 4.01 (s, 3H), 3.20 (t, 2H), 1.66 (br d, 2H), 1.42 (br d, 2H); MS (EI) for C$_{32}$H$_{26}$FN$_5$O$_3$. found: 548.4 (MH+).

1-N'-(4-Fluoro-2,6-dimethylphenyl)-1-N-[4-[7-(1-methylpyrazol-4-yl)quinolin-4-yl]oxyphenyl]cyclopropane-1,1-dicarboxamide (82): $^1$H NMR (400 MHz, CDCl$_3$) δ 10.61 (s, 1H), 8.64 (d, 1H), 8.34 (d, 1H), 8.16 (d, 1H), 7.95 (s, 1H), 7.81 (s, 1H), 7.72 (dd, 1H), 7.67 (d, 2H), 7.27-7.25 (m, 1H), 7.17 (d, 2H), 6.84 (d, 2H), 6.50 (d, 1H), 4.01 (s, 3H), 2.24 (s, 6H), 1.96-1.91 (m, 2H), 1.61-1.59 (m, 2H); MS (EI) for C$_{32}$H$_{28}$FN$_5$O$_3$. found: 550.1 (MH+).

1-N'-(4-Fluorophenyl)-1-N'-methyl-1-N-[4-[7-(1-methylpyrazol-4-yl)quinolin-4-yl]oxyphenyl]cyclopropane-1,1-dicarboxamide (82A): $^1$H NMR (400 MHz, CDCl$_3$) δ 8.65 (d, 1H), 8.41 (s, 1H), 8.34 (d, 1H), 8.17 (d, 1H), 7.96 (s, 1H), 7.81 (s, 1H), 7.73 (dd, 1H), 7.57 (d, 2H), 7.22-7.06 (m, 6H), 6.51 (d, 1H), 4.01 (s, 3H), 3.39 (s, 3H), 1.39-1.32 (m, 2H), 1.16-1.10 (m, 2H); MS (EI) for C$_{31}$H$_{26}$FN$_5$O$_3$. found: 536.1 (MH+).

Example 27: 1-N'-(4-Fluorophenyl)-1-N-[4-(7-pyrrolidin-3-ylquinolin-4-yl)oxyphenyl]cyclopropane-1,1-dicarboxamide (83)

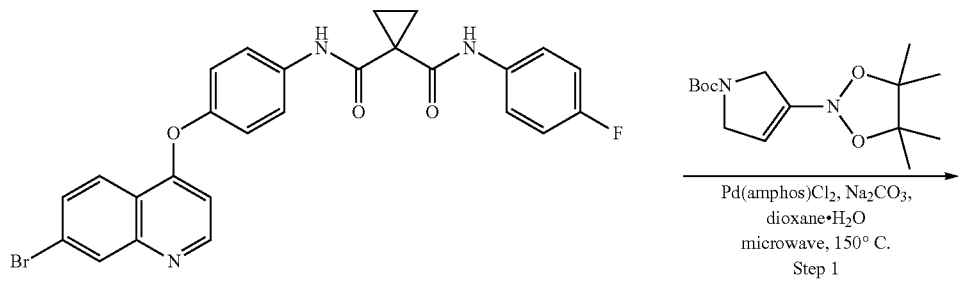

8

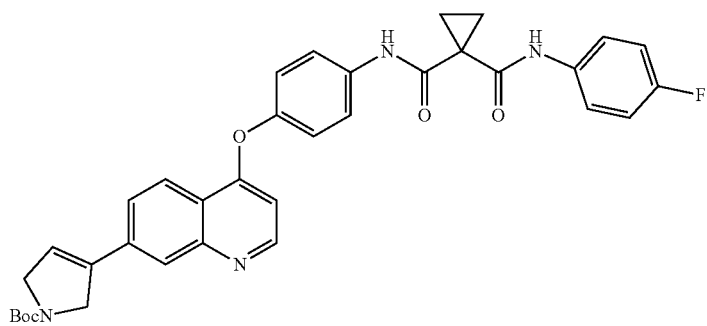

83A

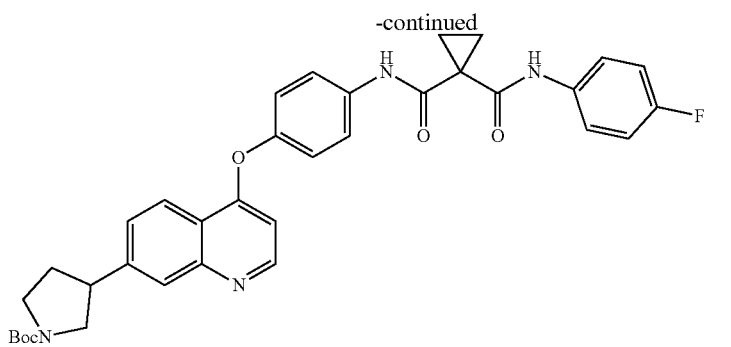

83B

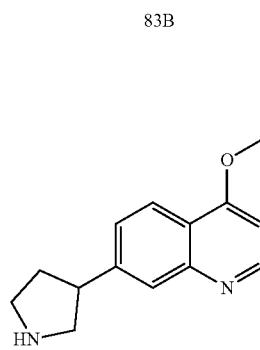

83

Step 1: tert-Butyl 3-(4-(4-(1-((4-fluorophenyl)carbamoyl)cyclopropane-1-carboxamido)phenoxy)quinolin-7-yl)-2,5-dihydro-1H-pyrrole-1-carboxylate (83A): Compound 83A was synthesized by the same method used to synthesize Compound 10 in Example 3. MS (EI) for $C_{35}H_{33}FN_4O_5$. found: 609.4 (MH+).

Step 2: tert-Butyl 3-(4-(4-(1-((4-fluorophenyl)carbamoyl)cyclopropane-1-carboxamido)phenoxy)quinolin-7-yl)pyrrolidine-1-carboxylate (83B): To a solution of Compound 83A (180 mg, 0.30 mmol, 1 eq) in MeOH (5 mL) was added 10% Pd/C (20 mg) under nitrogen. The suspension was degassed under vacuum and purged with hydrogen several times. The mixture was stirred under hydrogen (15 psi) at 20-25° C. for 16 h. The reaction mixture was filtered and concentrated in vacuo to give Compound 83B as a dark brown solid (130 mg, 72% yield). MS (EI) for $C_{35}H_{35}FN_4O_5$. found: 611.4 (MH+).

Step 3: 1-N'-(4-Fluorophenyl)-1-N-[4-(7-pyrrolidin-3-yl)quinolin-4-yl)oxyphenyl]cyclopropane-1,1-dicarboxamide (83): To a solution of Compound 83B (130 mg, 0.21 mmol, 1 eq) in DCM (3 mL) was added TFA (1 mL) dropwise at 20-25° C. The mixture was stirred at 20-25° C. for 30 min. The mixture was concentrated under reduced pressure and the resulting residue was purified by Prep-HPLC (column: Phenomenex Gemini-NX 150*30 mm*5 μm ([water(0.04% NH$_3$H$_2$O+10 mM NH$_4$HCO$_3$)-MeCN]; B %: 47%-77%, 8 min) to give Compound 83 as a yellow solid (15 mg, 14% yield). $^1$H NMR (400 MHz, CDCl$_3$) δ 9.34 (s, 1H), 8.78 (s, 1H), 8.63 (d, 1H), 8.28 (d, 1H), 7.91 (s, 1H), 7.62 (d, 2H), 7.49-7.47 (m, 3H), 7.16 (d, 2H), 7.06 (d, 2H), 6.51-6.48 (m, 1H), 3.47-3.44 (m, 2H), 3.24-2.98 (m, 3H), 2.39-2.31 (m, 1H), 2.03-2.01 (m, 1H), 1.68-1.65 (m, 4H); MS (EI) for $C_{30}H_{27}FN_4O_3$. found: 511.2 (MH+).

Example 28: 1-(Difluoromethyl)-3-(4,4,5,5-tetramethyl-1,3,2-dioxaborolan-2-yl)-1H-pyrazole (84A)

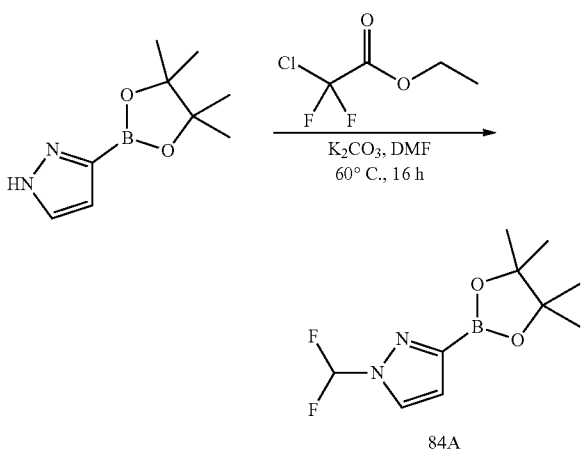

84A 1-(Difluoromethyl)-3-(4,4,5,5-tetramethyl-1,3,2-dioxaborolan-2-yl)-1H-pyrazole (84A): To a solution of 3-(4,4,5,5-tetramethyl-1,3,2-dioxaborolan-2-yl)-1H-pyrazole (500 mg, 2.6 mmol, 1 eq) in DMF (3 mL) was added K$_2$CO$_3$ (712 mg, 5.2 mmol, 2 eq) and ethyl 2-chloro-2,2-difluoro-acetate (490 mg, 3.1 mmol, 0.39 mL, 1.2 eq). The mixture was stirred at 60° C. for 16 h. The reaction mixture was concentrated, and the resulting residue was triturated with MeCN at 20° C. for 30 min. The resulting solid was filtered, and the filtrate was concentrated to give Compound 84A as a yellow oil (500 mg, 80% yield) which was used in subsequent reactions without further purification.

Example 29: 1-N-[4-[7-[1-(Difluoromethyl)pyrazol-3-yl]quinolin-4-yl]oxyphenyl]-1-N'-(4-fluorophenyl)cyclopropane-1,1-dicarboxamide (84)

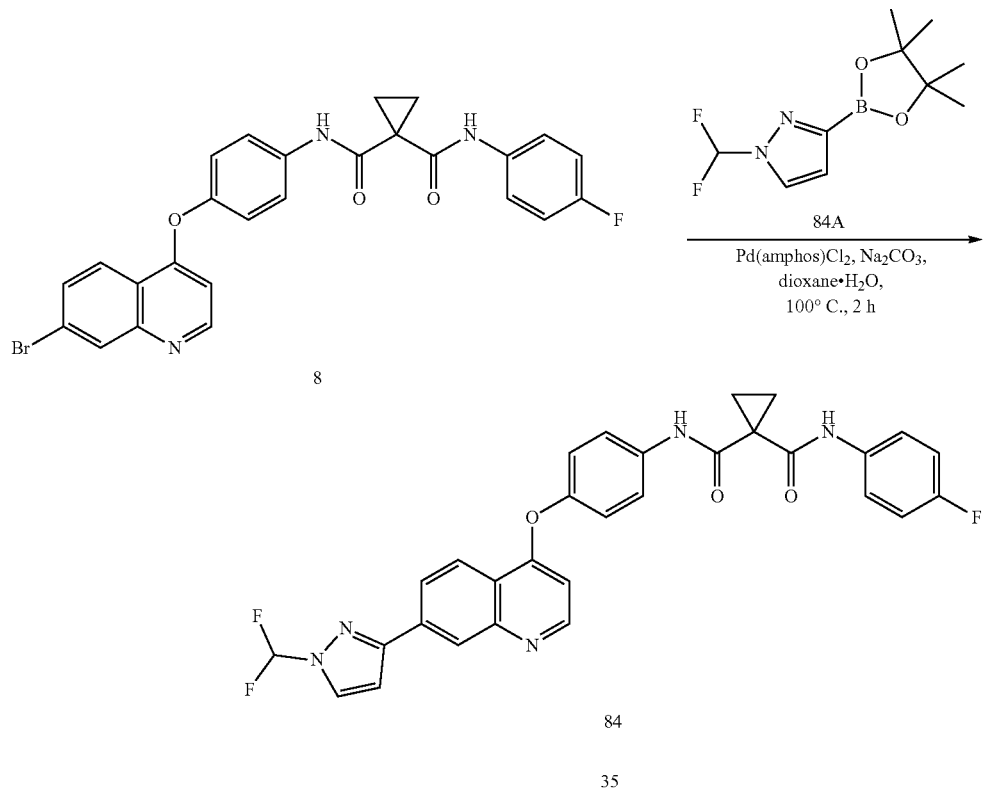

1-N-[4-[7-[1-(Difluoromethyl)pyrazol-3-yl]quinolin-4-yl]oxyphenyl]-1-N'-(4-fluorophenyl)cyclopropane-1,1-dicarboxamide (84): Compound 84 was synthesized using a variation of the method used to synthesize Compound 10 in Example 3 without microwave irradiation. $^1$H NMR (400 MHz, CD$_3$OD) δ 8.65 (d, 1H), 8.50-8.43 (m, 2H), 8.23 (dd, 1H), 8.18 (d, 1H), 7.75 (d, 2H), 7.60-7.54 (m, 2H), 7.46 (t, 1H), 7.26 (d, 2H), 7.13 (d, 1H), 7.08 (t, 2H), 6.66 (d, 1H), 1.73-1.58 (m, 4H); MS (EI) for C$_{30}$H$_{22}$F$_3$N$_5$O$_3$. found 558.0 (MH+).

Example 30: 1-N'-(4-Fluorophenyl)-1-N-[4-(7-pyridin-2-ylquinolin-4-yl)oxyphenyl]cyclopropane-1,1-dicarboxamide hydrochloride (85)

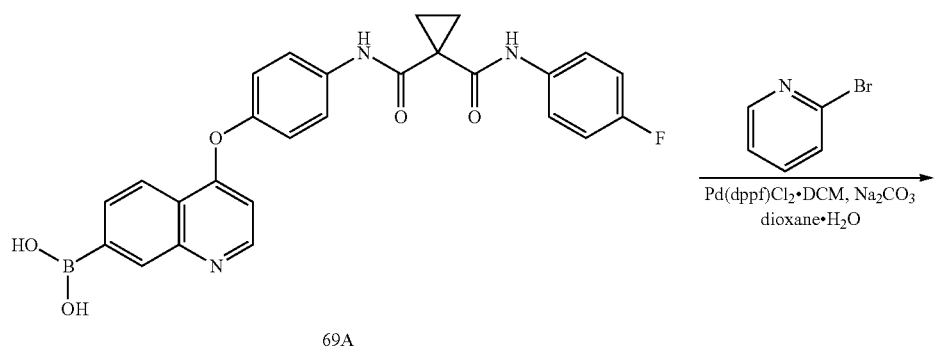

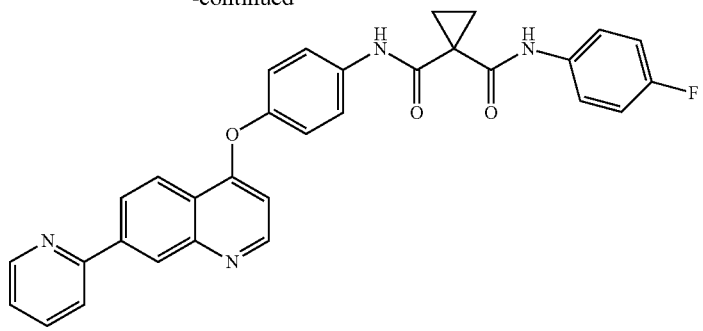

85

1-N'-(4-Fluorophenyl)-1-N-[4-(7-pyridin-2-ylquinolin-4-yl)oxyphenyl]cyclopropane-1,1-dicarboxamide hydrochloride (85): To a mixture of 2-bromopyridine (70 mg, 0.44 mmol, 0.042 mL, 1 eq) and Compound 69A (300 mg, 0.62 mmol, 1.4 eq) in dioxane (5 mL) and water (1 mL) was added Pd(dppf)Cl$_2$-DCM (20 mg, 0.02 mmol, 0.055 eq) and Na$_2$CO$_3$ (140 mg, 1.3 mmol, 3.0 eq). The mixture was stirred at 100° C. for 6 h under an atmosphere of nitrogen. The reaction mixture was diluted with water (20 mL) and extracted with EtOAc (2×30 mL). The combined organic extracts were washed with aq saturated NaCl (50 mL), dried over anhyd Na$_2$SO$_4$ and concentrated. The resulting residue was purified by column chromatography (SiO$_2$, 4% MeOH in DCM) followed by subsequent purification by prep-HPLC (column: Venusil ASB Phenyl 250*50 mm*10 μm ([water (0.05% HCl)-MeCN]; B %: 41%-68%, 9 min) to give the hydrochloride salt of Compound 85 as a yellow solid (132 mg, 54% yield). $^1$H NMR (400 MHz, DMSO-d$_6$) δ 10.37 (s, 1H), 10.07 (s, 1H), 9.14-8.98 (m, 2H), 8.90-8.81 (m, 1H), 8.73-8.62 (m, 2H), 8.27 (d, 1H), 8.16-8.01 (m, 1H), 7.89 (d, 2H), 7.69-7.61 (m, 2H), 7.60-7.54 (m, 1H), 7.46-7.39 (m, 2H), 7.21-7.09 (m, 2H), 6.97 (d, 1H), 1.50 (d, 4H); MS (EI) for C$_{31}$H$_{23}$FN$_4$O$_3$. found 519.2 (MH+).

Example 31: 1-N'-(4-Fluorophenyl)-1-N-[4-[7-(2-methyltriazol-4-yl)quinolin-4-yl]oxyphenyl]cyclopropane-1,1-dicarboxamide (86)

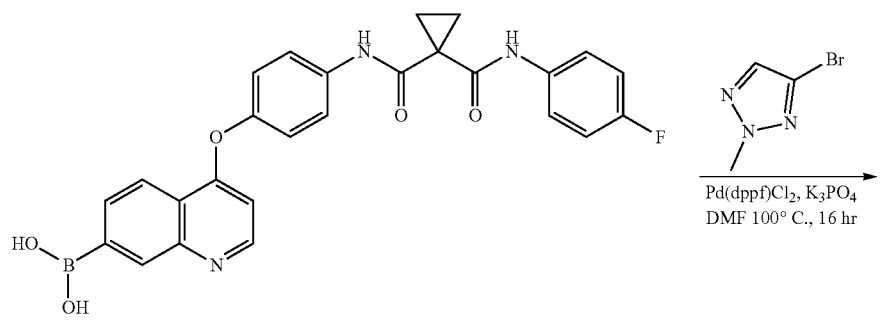

69A

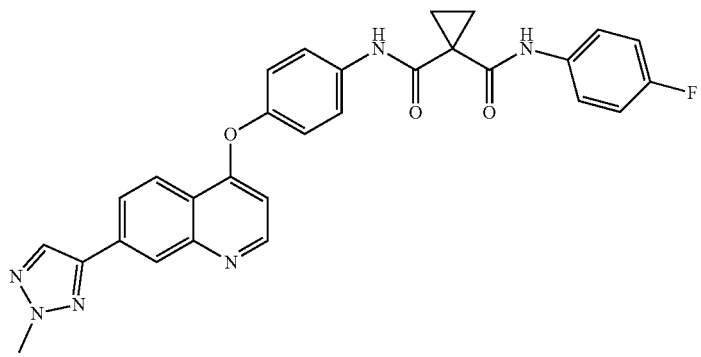

86

1-N'-(4-Fluorophenyl)-1-N-[4-[7-(2-methyltriazol-4-yl)quinolin-4-yl]oxyphenyl]cyclopropane-1,1-dicarboxamide (86): To a mixture of 4-bromo-2-methyl-triazole (60 mg, 0.37 mmol, 1 eq) and Compound 69A (180 mg, 0.37 mmol, 1.00 eq) in DMF (5 mL) was added $K_3PO_4$ (240 mg, 1.1 mmol, 3.05 eq) and Pd(dppf)$Cl_2$ (30 mg, 0.041 mmol, 0.11 eq) in one portion at 15-20° C. under an atmosphere of nitrogen. The mixture was stirred at 100° C. for 16 h. The reaction mixture was poured into water (50 mL) and stirred for 15 min. The resulting aqueous mixture was extracted with EtOAc (3×50 mL). The combined organic extracts were washed with aq saturated NaCl (2×50 mL), dried with anhyd $Na_2SO_4$ and concentrated in vacuo. The resulting residue was purified by prep-HPLC (column: Phenomenex Gemini-NX 150*30 mm*5 μm ([water(0.04% $NH_3H_2O$+10 mM $NH_4HCO_3$)-MeCN]; B %: 59%-69%, 8 min) to give Compound 86 as a white solid (16.1 mg, 8% yield). $^1$H NMR (400 MHz, DMSO-$d_6$) δ 10.21 (s, 1H), 10.06 (s, 1H), 8.71 (d, 1H), 8.51 (s, 1H), 8.48 (s, 1H), 8.40 (d, 1H), 8.15-8.13 (m, 1H), 7.79 (d, 2H), 7.65 (dd, 2H), 7.28 (d, 2H), 7.16 (t, 2H), 6.58 (d, 1H), 4.27 (s, 3H), 1.48 (s, 4H); MS (EI) for $C_{29}H_{23}FN_6O_3$, found 523.2 (MH+).

Example 32: 1-N'-(4-Fluorophenyl)-1-N-[4-[7-(4-methylimidazol-1-yl)quinolin-4-yl]oxyphenyl]cyclopropane-1,1-dicarboxamide (87)

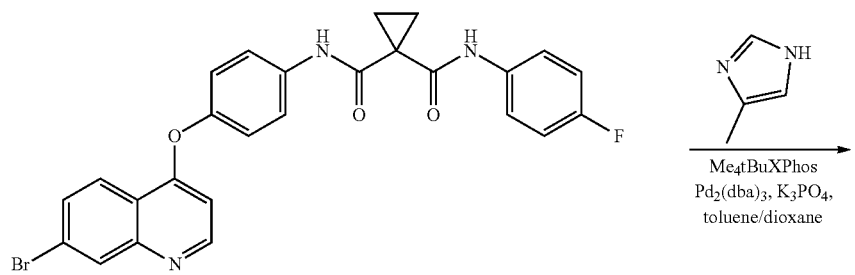

8

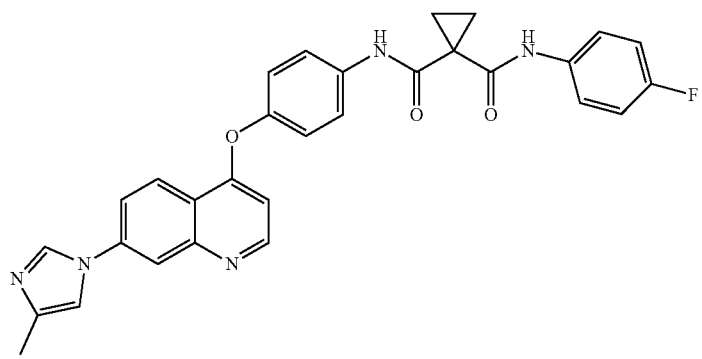

87

1-N'-(4-Fluorophenyl)-1-N-[4-[7-(4-methylimidazol-1-yl)quinolin-4-yl]oxyphenyl]cyclopropane-1,1-dicarboxamide (87): Compound 8 (100 mg, 0.19 mmol, 1 eq), 4-methyl-1H-imidazole (20.0 mg, 0.24 mmol, 1.3 eq), Pd₂(dba)₃ (4.0 mg, 0.004 mmol, 0.02 eq), Me₄tBuXPhos (6.0 mg, 0.012 mmol, 0.06 eq) and K₃PO₄ (82 mg, 0.39 mmol, 2.0 eq) in toluene (5 mL) and dioxane (1 mL) was de-gassed and then heated to 120° C. for 2 h under an atmosphere of nitrogen. The reaction mixture was quenched water (10 mL) and extracted with EtOAc (3×10 mL). The combined organic extracts were washed with aq saturated NaCl (30 mL), dried over anhyd Na₂SO₄ and concentrated under reduced pressure. The resulting residue was purified by flash silica gel chromatography (ISCO®; 12 g SepaFlash® Silica Flash Column, Eluent of 0~6% MeOH/DCM @ 20 mL/min) to give Compound 87 as a yellow solid (79.5 mg, 78% yield). ¹H NMR (400 MHz, DMSO-d₆) δ 10.21 (s, 1H), 10.06 (s, 1H), 8.72 (d, 1H), 8.47-8.33 (m, 2H), 8.23 (d, 1H), 7.99 (m, 1H), 7.79 (d, 2H), 7.73 (s, 1H), 7.64 (m, 2H), 7.28 (d, 2H), 7.15 (t, 2H), 6.57 (d, 1H), 2.21 (s, 3H), 1.48 (s, 4H); MS (EI) for C₃₀H₂₄FN₅O₃. found 522.1 (MH+).

Example 33: 1-N'-(4-Fluorophenyl)-1-N-[4-[7-[oxolan-3-yl]quinolin-4-yl]oxyphenyl]cyclopropane-1,1-dicarboxamide, enantiomer 1 (88) and enantiomer 2 (89)

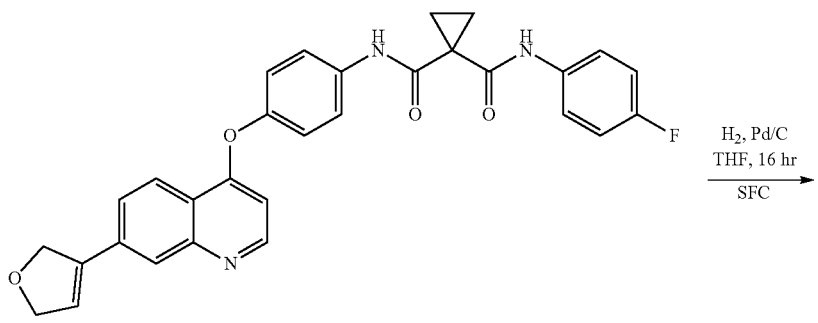

95

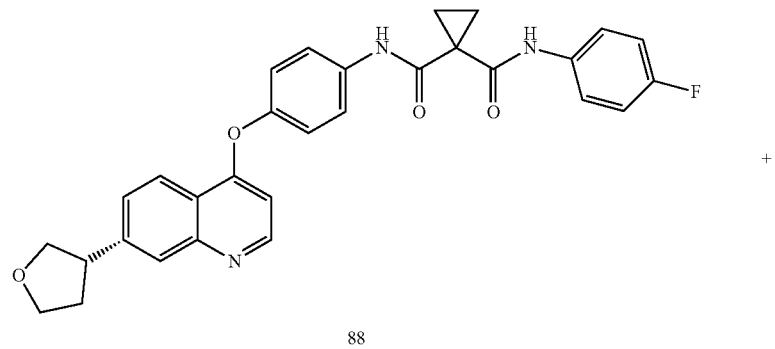

88

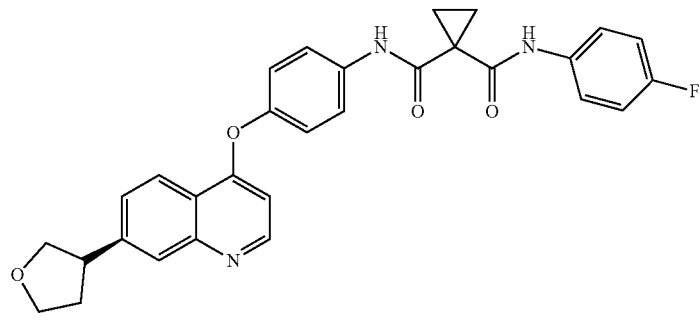

89

1-N'-(4-Fluorophenyl)-1-N-[4-[7-[oxolan-3-yl]quinolin-4-yl]oxyphenyl]cyclopropane-1,1-dicarboxamide, enantiomer 1 (88) and enantiomer 2 (89): To a solution of Compound 95 (90 mg, 0.18 mmol, 1 eq) in THF (50 mL) was added 10% Pd/C (100 mg, 0.18 mmol, 1eq) under an atmosphere of nitrogen. The suspension was degassed under vacuum and purged with hydrogen several times. The mixture was stirred under hydrogen (15 psi) at 20-25° C. for 3 h. The reaction mixture was filtered and the filtrate was concentrated. The resulting residue was purified by prep-HPLC (column: Phenomenex Gemini-NX 150*30 mm*5 um ([water(0.04% NH$_3$H$_2$O+10 mM NH$_4$HCO$_3$)-MeCN]; B %: 47%-77%, 8 min) and subsequently purified by SFC (column: DAICEL CHIRALPAK AS-H (250 mm*30 mm*5 μm) ([0.1% NH$_3$·H$_2$O EtOH]; B %: 40%-40%, min) to give the separated enantiomers, Compound 88 (7.3 mg, 8% yield) and Compound 89 (11.1 mg, 12% yield) as white solids. Stereochemistry has been tentatively assigned; absolute stereochemistry has not been determined at this time. Compound 88: $^1$H NMR (400 MHz, CDCl$_3$) δ 9.38 (s, 1H), 8.65 (s, 2H), 8.34 (d, 1H), 7.97 (s, 1H), 7.64 (d, 2H), 7.48-7.45 (m, 3H), 7.17 (d, 2H), 7.06 (d, 2H), 6.54 (d, 1H), 4.27-4.15 (m, 2H), 3.87-3.99 (m, 2H), 3.85-3.65 (m, 1H), 2.50-2.47 (m, 1H), 2.18-2.16 (m, 1H), 1.76-1.73 (m, 2H), 1.67-1.64 (m, 2H); MS (EI) for C$_{30}$H$_{26}$FN$_3$O$_4$. found: 512.0 (MH+). Compound 89: $^1$H NMR (400 MHz, CDCl$_3$) δ 9.40 (s, 1H), 8.67 (s, 1H), 8.65 (s, 1H), 8.33 (d, 1H), 7.97 (s, 1H), 7.64 (d, 2H), 7.48-7.45 (m, 3H), 7.17 (d, 2H), 7.06 (d, 2H), 6.54 (d, 1H), 4.28-4.15 (m, 2H), 3.99-3.87 (m, 2H), 3.85-3.65 (m, 1H), 2.53-2.48 (m, 1H), 2.19-2.12 (m, 1H), 1.75-1.73 (m, 2H), 1.67-1.64 (m, 2H); MS (EI) for C$_{30}$H$_{26}$FN$_3$O$_4$. found: 511.9 (MH+).

Example 34: 1-N-[4-[7-(3-Amino-1H-pyrazol-4-yl)quinolin-4-C$_3$ yl]oxyphenyl]-1-N'-(4-fluorophenyl)cyclopropane-1,1-dicarboxamide (90)

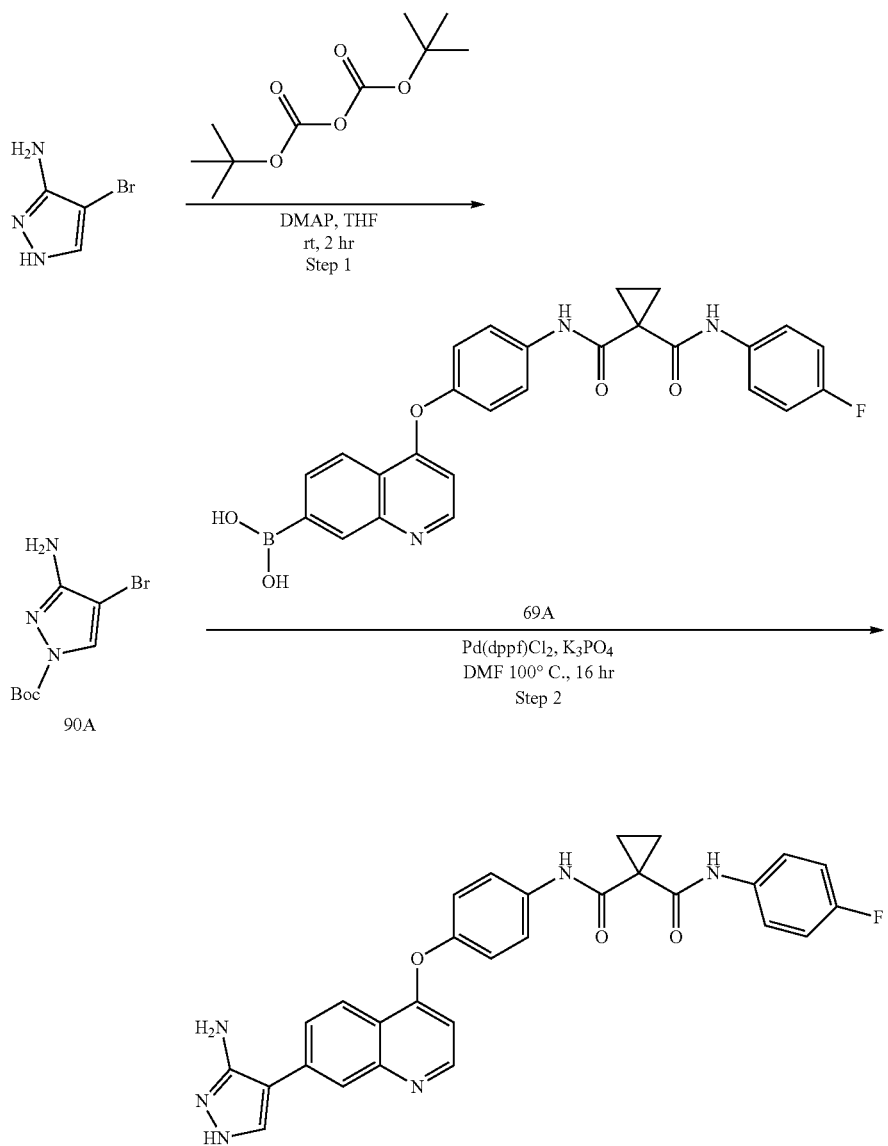

90

Step 1: tert-Butyl 3-amino-4-bromo-1H-pyrazole-1-carboxylate (90A): To a mixture of 4-bromo-1H-pyrazol-3-amine (200 mg, 1.2 mmol, 1 eq) and tert-butoxycarbonyl tert-butyl carbonate (324 mg, 1.5 mmol, 1.2 eq) in THF (5 mL) was added DMAP (40 mg, 0.33 mmol, 0.26 eq) in one portion at 15-20° C. under an atmosphere of nitrogen. The mixture was stirred at 15-20° C. for 120 min. The reaction mixture was poured into water (50 mL) and extracted with DCM (3×50 mL). The combined organic extracts were dried over anhyd $Na_2SO_4$ and concentrated in vacuo. The resulting residue was purified by silica gel chromatography (Petroleum ether/EtOAc=5/1) to give Compound 90A as a white solid (170 mg, 52% yield). $^1$H NMR (400 MHz, $CDCl_3$) δ 7.87 (s, 1H), 4.16 (s, 2H), 1.61 (s, 9H); MS (EI) for $C_8H_{12}BrN_3O_2$. found 163.6 (MH+(−Boc)).

Step 2: 1-N-[4-[7-(3-Amino-1H-pyrazol-4-yl)quinolin-4-yl]oxyphenyl]-1-N'-(4-fluorophenyl)cyclopropane-1,1-dicarboxamide (90): To a mixture of Compound 69A (80 mg, 0.16 mmol, 1 eq) and Compound 90A (52 mg, 0.20 mmol, 1.2 eq) in dioxane (5 mL) and water (1 mL) was added Pd(dppf)$Cl_2$ (12 mg, 0.016 mmol, 0.10 eq) and $K_2CO_3$ (46 mg, 0.33 mmol, 2.0 eq) in one portion at 15-20° C. under an atmosphere of nitrogen. The mixture was stirred at 100° C. for 16 hr. The reaction mixture was concentrated under reduced pressure and then poured into water (50 mL). The resulting aqueous mixture was extracted with EtOAc (3×50 mL). The combined organic extracts were washed with aq saturated NaCl (2×20 mL), dried over anhyd $Na_2SO_4$ and concentrated in vacuo. The resulting residue was purified by silica gel chromatography (DCM/MeOH=10/1) to give Compound 90 as a brown solid (15.2 mg, 15% yield). $^1$H NMR (400 MHz, DMSO-$d_6$) δ 11.94 (s, 1H), 10.19 (s, 1H), 10.06 (s, 1H), 8.63 (d, 1H), 8.23 (s, 1H), 7.87-8.16 (m, 3H), 7.77 (d, 2H), 7.65 (t, 2H), 7.25 (d, 2H), 7.16 (t, 2H), 6.48 (d, 1H), 5.44 (s, 1H), 4.79 (s, 1H), 1.48 (s, 4H); MS (EI) for $C_{29}H_{23}FN_6O_3$. found 523.0 (MH+).

Example 35: 1-N'-(4-Fluorophenyl)-1-N-[4-[7-(3-methylpyrazol-1-yl) quinolin-4-yl]oxyphenyl]cyclopropane-1,1-dicarboxamide (91)

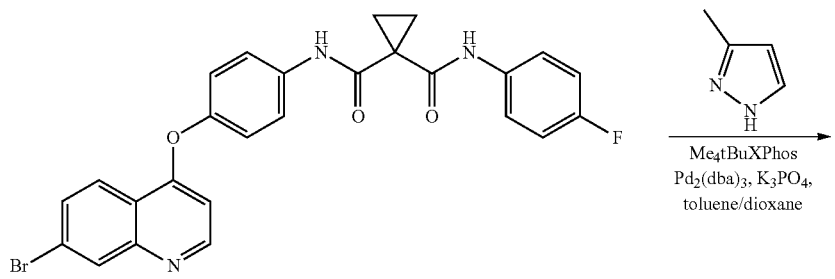

8

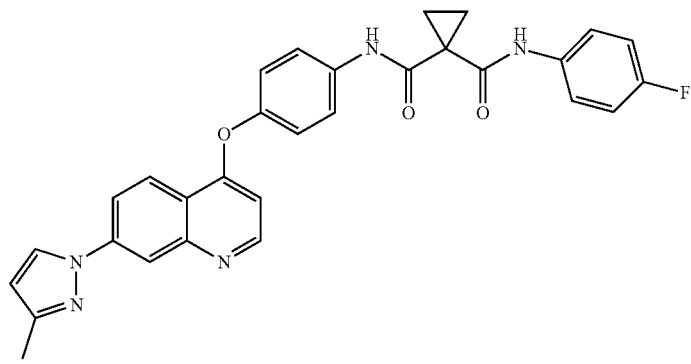

91

1-N'-(4-Fluorophenyl)-1-N-[4-[7-(3-methylpyrazol-1-yl)quinolin-4-yl]oxyphenyl]cyclopropane-1,1-dicarboxamide (91): Compound 91 was synthesized by the same method used to synthesize Compound 87 in Example 32, replacing the 4-methyl-1H-imidazole in Example 32 with 3-methyl-1H-pyrazole. $^1$H NMR (400 MHz, DMSO-$d_6$) δ 10.22 (s, 1H), 10.08 (s, 1H), 8.71-8.66 (m, 2H), 8.40 (d, 1H), 8.36 (d, 1H), 8.23-8.19 (m, 1H), 7.79 (d, 2H), 7.67-7.61 (m, 2H), 7.28 (d, 2H), 7.15 (t, 2H), 6.53 (d, 1H), 6.44 (d, 1H), 2.33 (s, 3H), 1.48 (s, 4H); MS (EI) for $C_{30}H_{24}FN_5O_3$. found 522.5 (MH+).

Example 36: tert-Butyl 3-(4-(4-(1-((4-fluorophenyl)carbamoyl)cyclopropane-1-carboxamido)phenoxy)quinolin-7-yl)-2,5-dihydro-1H-pyrrole-1-carboxylate (92A)

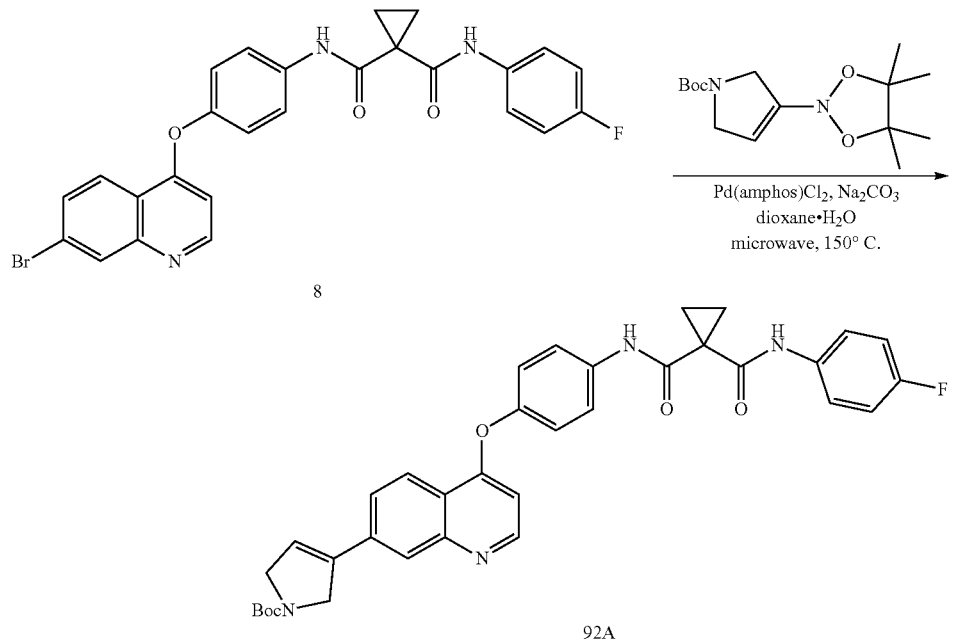

tert-Butyl 3-(4-(4-(1-((4-fluorophenyl)carbamoyl)cyclopropane-1-carboxamido)phenoxy)quinolin-7-yl)-2,5-dihydro-1H-pyrrole-1-carboxylate: Compound 92A was synthesized by the same method used to synthesize Compound 10 in Example 3. MS (EI) for $C_{35}H_{33}FN_4O_5$. found: 609.4 (MH+).

Example 37: 1-N-[4-[7-(1-Acetylpyrrolidin-3-yl)quinolin-4-yl]oxyphenyl]-1-N'-(4-fluorophenyl)cyclopropane-1,1-dicarboxamide (92)

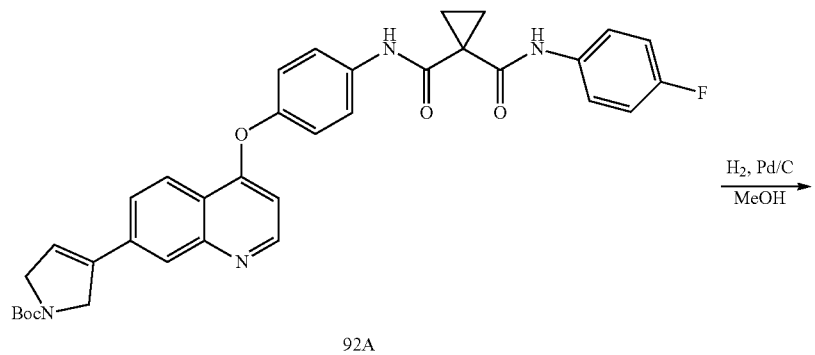

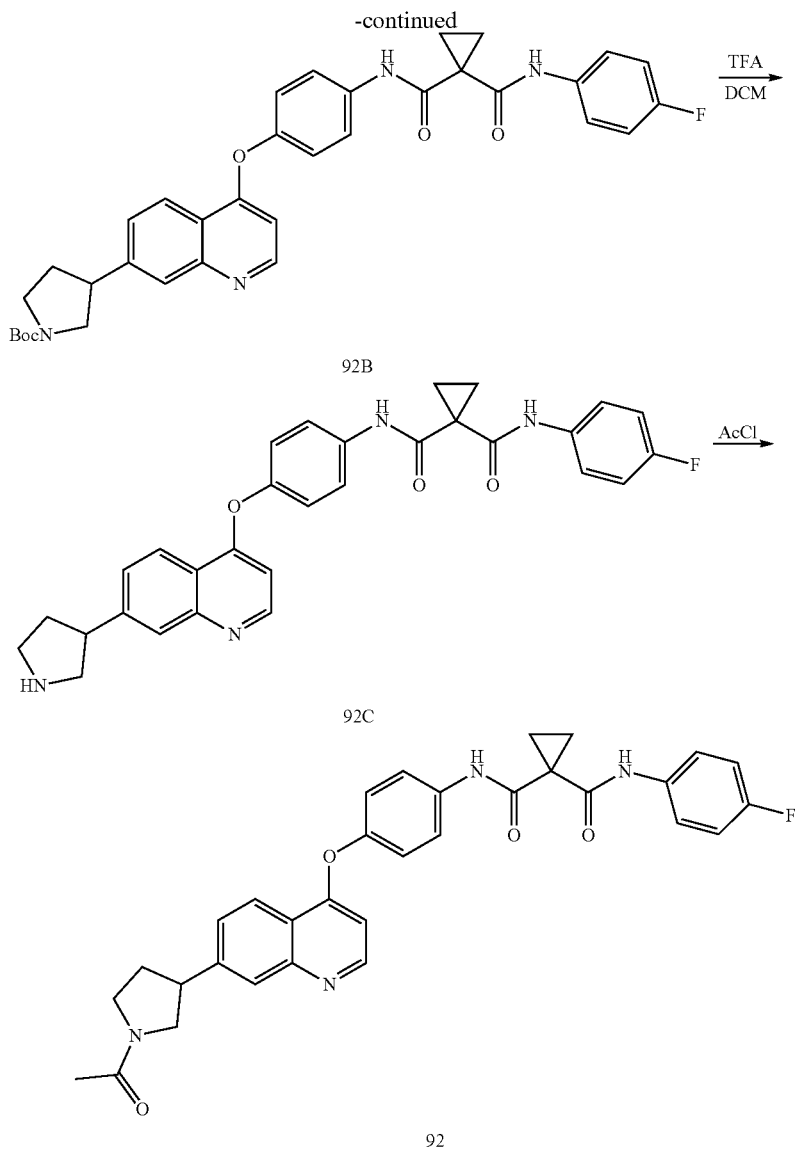

Step 1: tert-Butyl 3-(4-(4-(1-((4-fluorophenyl)carbamoyl)cyclopropane-1-carboxamido)phenoxy)quinolin-7-yl)pyrrolidine-1-carboxylate (92B): To a solution of Compound 92A (180 mg, 0.30 mmol, 1 eq) in MeOH (5 mL) was added 10% Pd/C (20 mg) under an atmosphere of nitrogen. The suspension was degassed under vacuum and purged with hydrogen several times. The mixture was stirred under hydrogen (15 psi) at 20-25° C. for 16 h. The reaction mixture was filtered, and the filtrate concentrated under vacuum to give crude Compound 92B as a dark brown solid (130 mg, 72% yield) which was used in subsequent reactions without further purification. MS (EI) for $C_{35}H_{35}FN_4O_5$. found 611.4 (MH+).

Step 2: N-(4-Fluorophenyl)-N-(4-((7-(pyrrolidin-3-yl)quinolin-4-yl)oxy)phenyl)cyclopropane-1,1-dicarboxamide (92C): To a solution of Compound 92B (400 mg, 0.66 mmol, 1 eq) in DCM (3 mL) was added TFA (1 mL) dropwise at 20-25° C. The mixture was stirred at 20-25° C. for 30 min. The reaction mixture was adjusted to pH 7~8 with aq NaHCO$_3$ solution. The resulting aqueous mixture was extracted with EtOAc (3×30 mL). The combined organic extracts were washed with aq saturated NaCl (2×30 mL), dried over anhyd Na$_2$SO$_4$ and concentrated in vacuo to give crude Compound 92C as a yellow solid (320 mg, 96% yield) which was used in subsequent reactions without further purification. $^1$H NMR (400 MHz, CDCl$_3$) δ 9.34 (s, 1H), 8.78 (s, 1H), 8.63 (d, 1H), 8.28 (d, 1H), 7.91 (s, 1H), 7.62 (d, 2H), 7.49-7.47 (m, 3H), 7.16 (d, 2H), 7.06 (d, 2H), 6.51-6.48 (m, 1H), 3.47-3.44 (m, 2H), 3.24-2.98 (m, 3H), 2.39-2.31 (m, 1H), 2.03-2.01 (m, 1H), 1.68-1.65 (m, 4H); MS (EI) for $C_{30}H_{27}FN_4O_3$. found 511.2 (MH+).

Step 3: 1-N-[4-[7-(1-Acetylpyrrolidin-3-yl)quinolin-4-yl]oxyphenyl]-1-N'-(4-fluorophenyl)cyclopropane-1,1-dicarboxamide (92): To a mixture of Compound 92C (80 mg, 0.16 mmol, 1 eq) in DCM (5 mL) was added acetyl chloride (30.8 mg, 0.39 mmol, 0.028 mL, 2.5 eq) and TEA (0.40 mmol, 0.056 mL, 2.6 eq) in one portion at 20-25° C. under an atmosphere of nitrogen. The mixture was stirred at 15-20° C. for 16 h. The reaction mixture was diluted in water (30 mL) and adjusted to pH 9~10 with aq NaHCO$_3$ solution. The resulting aqueous mixture was extracted with EtOAc (2×30 mL). The combined organic extracts were washed with aq saturated NaCl (2×30 mL), dried over anhyd $Na_2SO_4$ and concentrated in vacuo. The resulting residue was purified by silica gel chromatography (DCM/MeOH=10/1) followed by further purification by SFC (condition: column: DAICEL CHIRALCEL OJ(250 mm*30 mm*10 μm) ([0.1% $NH_3 \cdot H_2O$ EtOH]; B %: 35%-35%, min)) to give Compound 92 as a yellow solid (23.5 mg, 27% yield). $^1$H NMR (400 MHz, DMSO-$d_6$) δ 10.20 (s, 1H), 10.06 (s, 1H), 8.67 (dd, 1H), 8.28 (dd, 1H), 7.91 (d, 1H), 7.78 (d, 2H), 7.70-7.60 (m, 3H), 7.24 (d, 2H), 7.16 (t, 2H), 6.55 (d, 1H), 4.10-3.87 (m, 2H), 3.75-3.50 (m, 5H), 2.01 (s, 3H), 1.48 (s, 4H); MS (EI) for $C_{32}H_{29}FN_4O_4$. found 553.1 (MH+).

Example 38: 1-N'-(4-Fluorophenyl)-1-N-[4-[7-(1-methylsulfonylpyrrolidin-3-yl)quinolin-4-yl]oxyphenyl]cyclopropane-1,1-dicarboxamide (93)

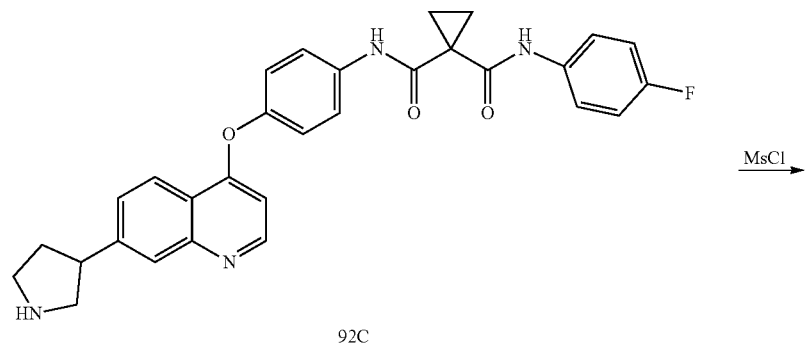

92C

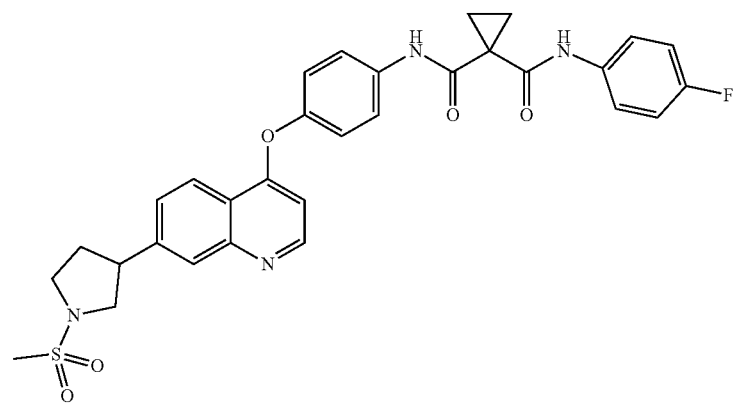 [SMILES: CS(=O)(=O)N1CCC(c2ccc3c(Oc4ccc(NC(=O)C5(C(=O)Nc6ccc(F)cc6)CC5)cc4)ccnc3c2)C1]

93

1-N'-(4-Fluorophenyl)-1-N-[4-[7-(1-methylsulfonylpyrrolidin-3-yl)quinolin-4-yl]oxyphenyl]cyclopropane-1,1-dicarboxamide (93): To a mixture of Compound 92C (80 mg, 0.16 mmol, 1 eq) and DIEA (40 mg, 0.31 mmol, 2.0 eq) in THF (5 mL) was added methanesulfonyl chloride (480 mg, 4.2 mmol, 26.7 eq) in one portion at 20-25° C. The mixture was stirred at 20-25° C. for 3 h. The resulting mixture was diluted with water (30 mL) and adjusted to pH 9~10 by aq NaHCO₃ solution. The resulting aqueous mixture was extracted with EtOAc (2×30 mL). The combined organic extracts were washed with aq saturated NaCl (2×30 mL), dried over anhyd Na₂SO₄ and concentrated in vacuo. The resulting residue was purified by silica gel chromatography (DCM/MeOH=10/1) followed by further purification by SFC (condition: column: DAICEL CHIRALCEL OD(250 mm*30 mm*10 μm) ([0.1% NH₃H₂O EtOH]; B %: 50%-50%, min) to give Compound 93 as a white solid (30.2 mg, 31% yield). ¹H NMR (400 MHz, DMSO-d₆) δ 10.20 (s, 1H), 10.06 (s, 1H), 8.68 (d, 1H), 8.28 (d, 1H), 7.96 (s, 1H), 7.78 (d, 2H), 7.72-7.59 (m, 3H), 7.24 (d, 2H), 7.16 (t, 2H), 6.56 (d, 1H), 3.92-3.78 (m, 1H), 3.75-3.38 (m, 5H), 3.01 (s, 3H), 2.26-2.06 (m, 1H), 1.48 (s, 4H); MS (EI) for C₃₁H₂₉FN₄O₅S. found 589.0 (MH+).

Example 39: 1-N-[4-[7-[1-(Fluoromethyl)pyrazol-4-yl]quinolin-4-yl]oxyphenyl]-1-N'-(4-fluorophenyl)cyclopropane-1,1-dicarboxamide hydrochloride (94)

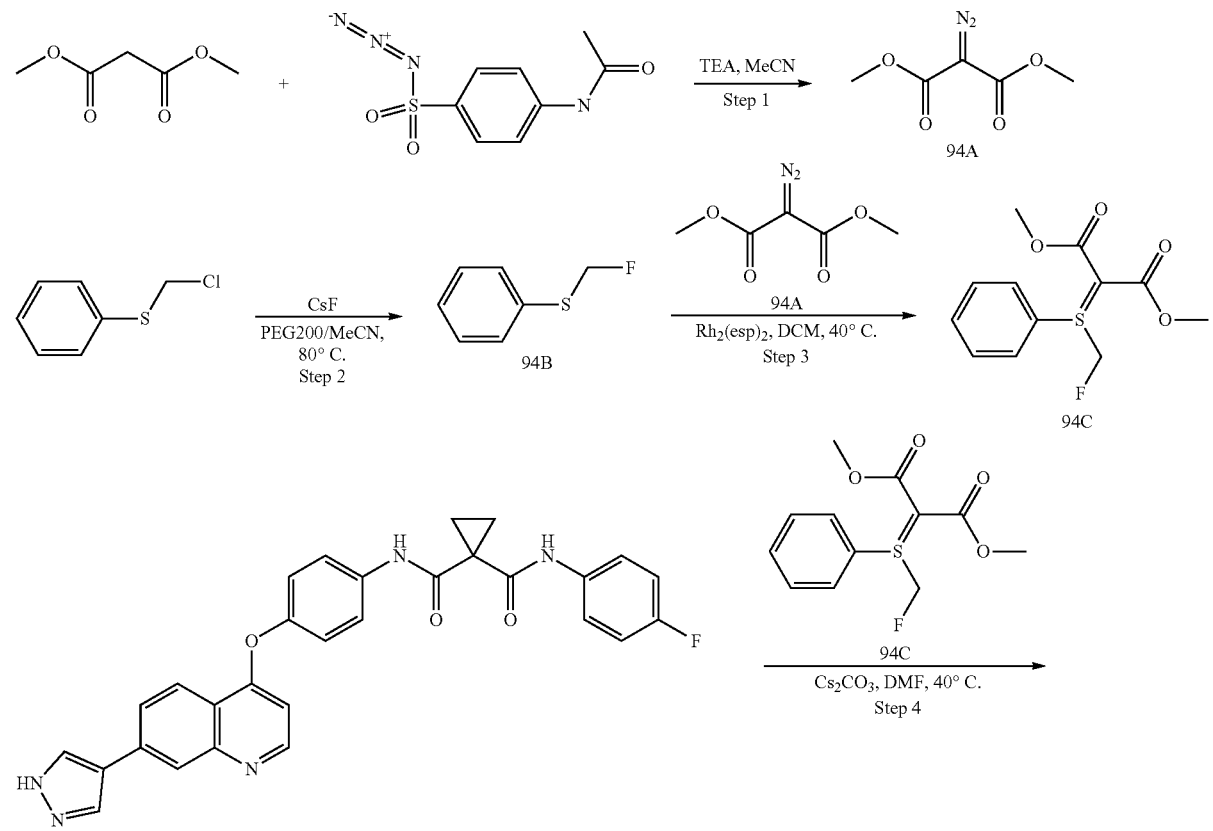

67

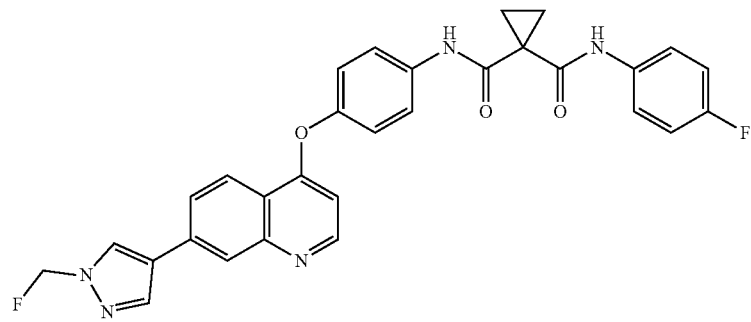 [SMILES: O=C(Nc1ccc(F)cc1)C1(C(=O)Nc2ccc(Oc3ccnc4cc(-c5cnn(CF)c5)ccc34)cc2)CC1]

94

Step 1: Dimethyl 2-diazomalonate (94A): Dimethyl propanedioate (1 g, 7.6 mmol, 0.87 mL, 1 eq) was dissolved in MeCN (3 mL) and stirred vigorously at 10° C. To this solution was added N-(4-azidosulfonylphenyl) acetamide (1.82 g, 7.6 mmol, 1 eq) and the solution was cooled in an ice-salt bath to −15° C. TEA (842 mg, 8.3 mmol, 1.16 mL, 1.1 eq) was added to the solution dropwise and the reaction was allowed to warm to 10° C. and stirred at 10° C. for 12 h. The precipitate that had formed was filtered, washed with 10 mL of cold methyl tertiary butyl ether and triturated with petroleum ether (10 mL) to give Compound 94A as a yellow oil (1 g, 84% yield) which was used in subsequent reactions without further purification. $^1$H NMR (400 MHz, CDCl$_3$) δ 3.83 (s, 6H).

Step 2: (Fluoromethyl)(phenyl)sulfane (94B): A mixture of chloromethylsulfanylbenzene (1 g, 6.3 mmol, 1 eq) and CsF (1.91 g, 12.6 mmol, 0.46 mL, 2 eq) in PEG-200 (2 mL) and MeCN (4 mL) was stirred under an atmosphere of nitrogen at 80° C. for 2 h. The mixture was cooled to room temperature then concentrated in vacuo. Water (20 mL) and petroleum ether (30 mL) were added. The phases were separated, and the organic phase was washed with water (5×40 mL), dried over anhyd Na$_2$SO$_4$ and concentrated in vacuo. The resulting residue was purified by silica gel column chromatography (petroleum ether) to give Compound 94B as a yellow oil (700 mg, 78% yield). $^1$H NMR (400 MHz, CDCl$_3$) δ 7.55-7.49 (m, 2H), 7.39-7.29 (m, 3H), 5.75 (d, 2H).

Step 3: Dimethyl 2-((fluoromethyl)(phenyl)-14-sulfaneylidene)malonate (94C): Compound 94B (400 mg, 2.81 mmol, 1 eq), Rh$_2$(esp)$_2$ (10.7 mg, 0.014 mmol, 0.005 eq) and DCM (10 mL) were placed into an oven-dried Schlenk tube that was equipped with a stirring bar under an atmosphere of nitrogen. Compound 94A (445 mg, 2.8 mmol, 1 eq) was added slowly. The tube was quickly sealed with a rubber stopper and the reaction was stirred at 40° C. for 16 h. The mixture was cooled to room temperature. The reaction mixture was then concentrated in vacuo and purified by flash silica gel chromatography (ISCO®; 12 g SepaFlash® Silica Flash Column, Eluent of 0~40% EtOAc/Petroleum ether gradient @ 30 mL/min) to give Compound 94C as a white solid (300 mg, 39% yield). $^1$H NMR (400 MHz, CDCl$_3$) δ 7.69-7.63 (m, 2H), 7.59-7.51 (m, 3H), 6.43 (dd, 1H), 5.88 (dd, 1H), 3.73 (s, 6H); MS (EI) for C$_{12}$H$_{13}$FO$_4$S. found 272.8 (MH+).

Step 4: 1-N-[4-[7-[1-(Fluoromethyl)pyrazol-4-yl]quinolin-4-yl]oxyphenyl]-1-N'-(4-fluorophenyl)cyclopropane-1,1-dicarboxamide hydrochloride (94): Compound 67 (70 mg, 0.14 mmol, 1 eq), Cs$_2$CO$_3$ (90 mg, 0.28 mmol, 2 eq), and Compound 93C (45 mg, 0.16 mmol, 1.2 eq) were placed into an oven-dried Schlenk tube equipped with a stirring bar under an atmosphere of nitrogen. The tube was quickly sealed with a rubber stopper and DMF (5 mL) was added. The reaction was stirred at 40° C. for 12 h. The resulting reaction mixture was cooled to room temperature and distilled water (20 mL) and DCM (30 mL) were added. The phases were separated, and the organic phase was extracted with DCM (3×25 mL). The combined organic extracts were washed with aq saturated NaCl (15 mL), dried over anhyd Na$_2$SO$_4$ and concentrated in vacuo. The resulting residue was purified by prep-HPLC (Column: Venusil ASB Phenyl 250*50*10 μm, gradient: 36-66% of acetonitrile in water (0.05% HCl), flow rate: 25 mL/min) to give the HCl salt of Compound 94 as a yellow solid (69.1 mg, 90% yield). $^1$H NMR (400 MHz, DMSO-d$_6$) δ 10.35 (s, 1H), 10.05 (s, 1H), 8.97 (d, 1H), 8.90 (s, 1H), 8.58 (d, 1H), 8.41 (d, 2H), 8.24 (d, 1H), 7.87 (d, 2H), 7.65 (dd, 2H), 7.39 (d, 2H), 7.16 (t, 2H), 6.87 (d, 1H), 6.26 (d, 2H), 1.53-1.46 (m, 4H); MS (EI) for C$_{30}$H$_{23}$F$_2$N$_5$O$_3$. found 540.0 (MH+).

Example 40: 1-N-[4-[7-(2,5-Dihydrofuran-3-yl)quinolin-4-yl]oxyphenyl]-1-N'-(4-fluorophenyl)cyclopropane-1,1-dicarboxamide hydrochloride (95)

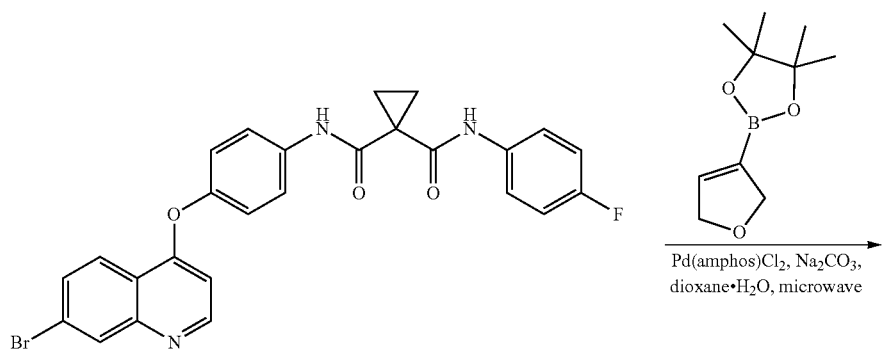

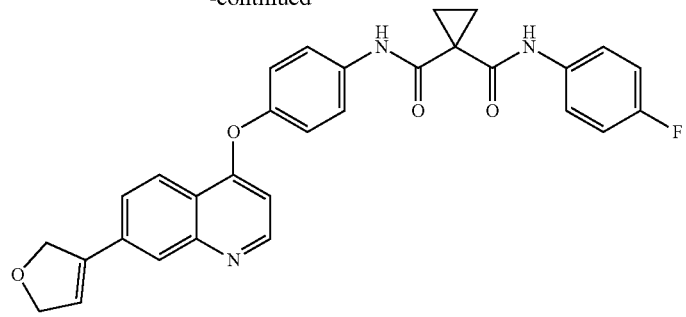

95

1-N-[4-[7-(2,5-Dihydrofuran-3-yl)quinolin-4-yl]oxyphenyl]-1-N'-(4-fluorophenyl)cyclopropane-1,1-dicarboxamide hydrochloride (95): Compound 95 was synthesized by the same method used to synthesize Compound 10 in Example 3. $^1$H NMR (400 MHz, DMSO-$d_6$) δ 10.31 (s, 1H), 10.04 (s, 1H), 8.94 (d, 1H), 8.49 (d, 1H), 8.15 (d, 1H), 7.91 (s, 1H), 7.84 (d, 2H), 7.64 (m, 2H), 7.36 (d, 2H), 7.15 (m, 2H), 7.01 (s, 1H), 6.85 (d, 1H), 5.06 (br d, 2H), 4.85 (br s, 2H), 1.48 (br d, 4H); MS (EI) for $C_{30}H_{24}FN_3O_4$, found 510.0 (MH+).

Example 41: 1-N'-(4-Fluorophenyl)-1-N-[4-[7-(4-methylpyrazol-1-yl)quinolin-4-yl]oxyphenyl]cyclopropane-1,1-dicarboxamide (96)

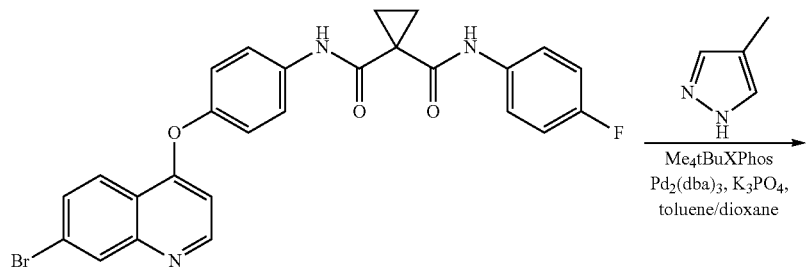

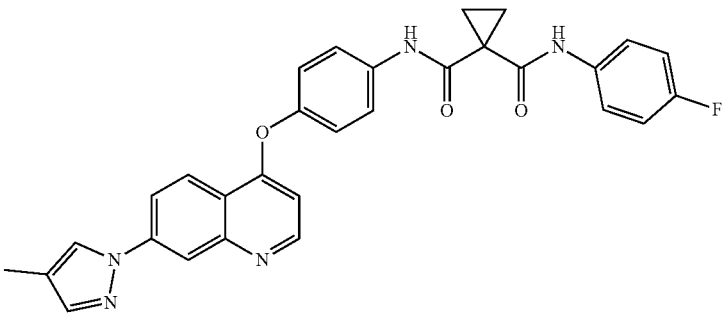

96

1-N'-(4-Fluorophenyl)-1-N-[4-[7-(4-methylpyrazol-1-yl)quinolin-4-yl]oxyphenyl]cyclopropane-1,1-dicarboxamide (96): Compound 96 was synthesized by the same method used to synthesize Compound 87 in Example 32, replacing the 4-methyl-1H-imidazole in Example 32 with 4-methyl-1H-pyrazole. $^1$H NMR (400 MHz, DMSO-$d_6$) δ 10.22 (s, 1H), 10.07 (s, 1H), 8.70 (d, 1H), 8.57 (s, 1H), 8.41 (d, 1H), 8.34 (d, 1H), 8.20 (dd, 1H), 7.79 (d, 2H), 7.68 (s, 1H), 7.65 (dd, 2H), 7.28 (d, 2H), 7.15 (t, 2H), 6.54 (d, 1H), 2.14 (s, 3H), 1.48 (s, 4H); MS (EI) for $C_{30}H_{24}FN_5O_3$. found 522.0 (MH+).

Example 42: 1-N-[4-[7-(2-Aminopyridin-4-yl)quinolin-4-yl]oxyphenyl]-1-N'-(4-fluorophenyl)cyclopropane-1,1-dicarboxamide hydrochloride (97)

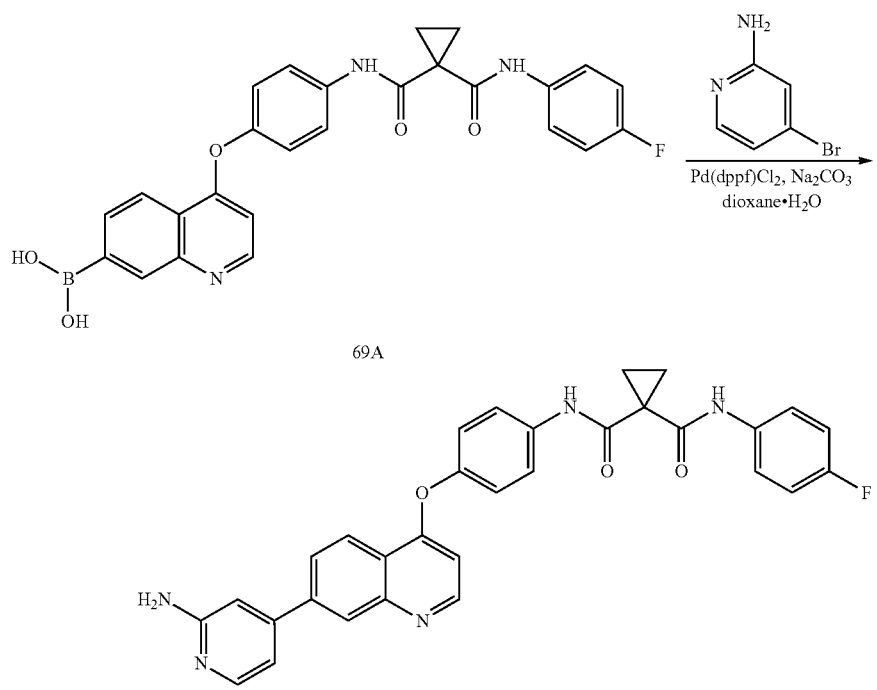

1-N-[4-[7-(2-Aminopyridin-4-yl)quinolin-4-yl]oxyphenyl]-1-N'-(4-fluorophenyl)cyclopropane-1,1-dicarboxamide hydrochloride (97): To a mixture of Compound 69A (120 mg, 0.25 mmol, 1 eq) and 4-bromopyridin-2-amine (86 mg, 0.50 mmol, 2.0 eq) in dioxane (5 mL) and water (1 mL) was added $Na_2CO_3$ (80 mg, 0.75 mmol, 3.0 eq) and Pd(dppf)Cl$_2$ (20 mg, 0.027 mmol, 0.11 eq) in one portion at 15-20° C. under an atmosphere of nitrogen. The mixture was stirred at 80° C. for 16 h. The reaction mixture was concentrated under reduced pressure and the resulting residue was purified by silica gel chromatography (DCM/MeOH=10/1) followed by further purification by prep-HPLC (column: Venusil ASB Phenyl 250*50 mm*10p m ([water(0.05% HCl)-MeCN]; B %: 35%-65%, 9 min) to give the HCl salt of Compound 97 as a yellow solid (19.5 mg, 15% yield). $^1$H NMR (400 MHz, DMSO-$d_6$) δ 10.31 (s, 1H), 10.06 (s, 1H), 8.94 (d, 1H), 8.62 (d, 1H), 8.54 (s, 1H), 8.23 (br s, 2H), 8.17-8.09 (m, 2H), 7.84 (d, 2H), 7.66 (dd, 2H), 7.46-7.40 (m, 2H), 7.35 (d, 2H), 7.17 (t, 2H), 6.84 (d, 1H), 1.49 (d, 4H); MS (EI) for $C_{31}H_{24}FN_5O_3$, found 534.1 (MH+).

Example 43: 1-N-[4-[7-(1-Cyclopropylpyrazol-3-yl)quinolin-4-yl]oxyphenyl]-1-N'-(4-fluorophenyl)cyclopropane-1,1-dicarboxamide (98)

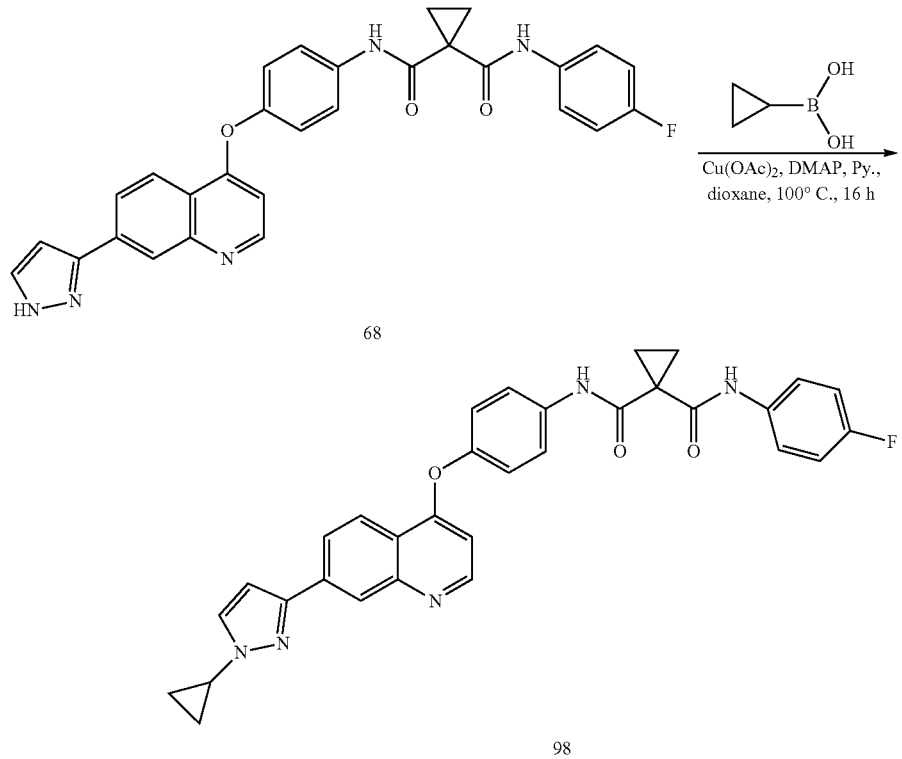

1-N-[4-[7-(1-Cyclopropylpyrazol-3-yl)quinolin-4-yl]oxyphenyl]-1-N'-(4-fluorophenyl)cyclopropane-1,1-dicarboxamide (98): To a solution of Compound 68 (150 mg, 0.30 mmol, 1 eq) in dioxane (5 mL) was added Cu(OAc)$_2$ (53.7 mg, 0.30 mmol, 1 eq), DMAP (108 mg, 0.9 mmol, 3 eq), cyclopropylboronic acid (35.5 mg, 0.41 mmol, 1.4 eq) and pyridine (28.0 mg, 0.35 mmol, 0.028 mL, 1.2 eq). The resulting mixture was stirred at 100° C. for 16 h and then poured into NH$_3$—H$_2$O (10 mL). The resulting aqueous mixture was extracted with EtOAc (3×5 mL). The combined organic extracts were washed with aq saturated NaCl (5 mL), dried over anhyd Na$_2$SO$_4$ and concentrated in vacuo. The resulting residue was purified by column chromatography (ISCO®; 4 g SepaFlash® Silica Flash Column, Eluent of 0~4% MeOH/DCM@ 20 mL/min) with subsequent purification (Xtimate C18 150*25 mm*5 μm ([water(10 mM NH$_4$·HCO$_3$)-MeCN]; B %: 56%-86%, 11 min)) to give Compound 98 as an off-white solid (94.9 mg, 58% yield). $^1$H NMR (400 MHz, DMSO-d$_6$) δ 10.32-9.97 (m, 2H), 8.67 (d, 1H), 8.37 (s, 1H), 8.32 (d, 1H), 8.14 (dd, 1H), 7.91 (d, 1H), 7.78 (d, 2H), 7.69-7.61 (m, 2H), 7.27 (d, 2H), 7.15 (t, 2H), 6.96 (d, 1H), 6.53 (d, 1H), 3.89-3.76 (m, 1H), 1.52-1.44 (m, 4H), 1.18-1.12 (m, 2H), 1.06-1.00 (m, 2H); MS (EI) for C$_{32}$H$_{26}$FN$_5$O$_3$. found 548.1 (MH+).

Example 44: 1-N'-(4-Fluorophenyl)-1-N-[4-[7-(5-methyl-1H-pyrazol-3-yl)quinolin-4-yl]oxyphenyl]cyclopropane-1,1-dicarboxamide hydrochloride (99)

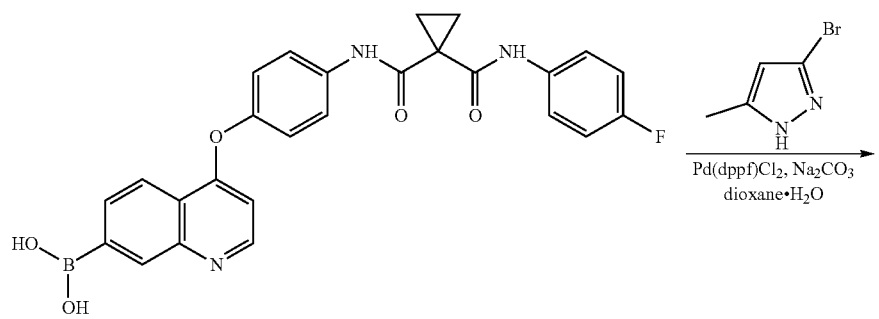

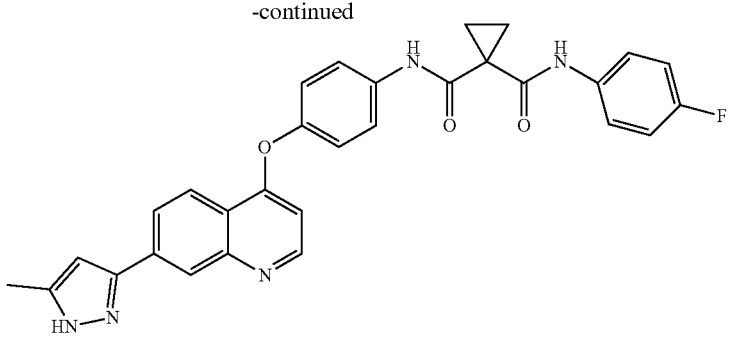

99

1-N'-(4-Fluorophenyl)-1-N-[4-[7-(5-methyl-1H-pyrazol-3-yl)quinolin-4-yl]oxyphenyl]cyclopropane-1,1-dicarboxamide hydrochloride (99): Compound 99 was synthesized by the same method used to synthesize Compound 97 in Example 42, replacing the 4-bromopyridin-2-amine in Example 42 with 3-bromo-5-methyl-1H-pyrazole. $^1$H NMR (400 MHz, DMSO-d$_6$) δ 10.36 (s, 1H), 10.06 (s, 1H), 9.02 (d, 1H), 8.64-8.55 (m, 2H), 8.43-8.34 (m, 1H), 7.87 (d, 2H), 7.70-7.58 (m, 2H), 7.41 (d, 2H), 7.16 (t, 2H), 6.91 (d, 1H), 6.76 (s, 1H), 2.34 (s, 3H), 1.49 (d, 4H); MS (EI) for C$_{30}$H$_{24}$FN$_5$O$_3$. found 522.1 (MH+).

The following compounds were prepared in a method analogous to that used to synthesize Compound 99 from Compound 69A in Example 44:

1-N'-(4-Fluorophenyl)-1-N-[4-[7-[5-(trifluoromethyl)-1H-pyrazol-3-yl]quinolin-4-yl]oxyphenyl]cyclopropane-1,1-dicarboxamide hydrochloride (100): 3-Bromo-5-methyl-1H-pyrazole was replaced with 3-bromo-5-(trifluoromethyl)-1H-pyrazole. $^1$H NMR (400 MHz, DMSO-d$_6$) δ 14.55 (s, 1H), 10.37-10.26 (m, 1H), 10.09 (s, 1H), 8.83 (d, 1H), 8.59 (s, 1H), 8.55-8.44 (m, 1H), 8.20 (d, 1H), 7.82 (d, 2H), 7.66 (dd, 2H), 7.54 (s, 1H), 7.40-7.32 (m, 2H), 7.16 (t, 2H), 6.79-6.65 (m, 1H), 1.49 (s, 4H); MS (EI) for C$_{30}$H$_{21}$F$_4$N$_5$O$_3$, found 576.1 (MH+).

1-N-[4-[7-(1,5-Dimethylpyrazol-3-yl)quinolin-4-yl]oxyphenyl]-1-N'-(4-fluorophenyl)cyclopropane-1,1-dicarboxamide hydrochloride (101): 3-Bromo-5-methyl-1H-pyrazole was replaced with 3-bromo-1,5-dimethyl-1H-pyrazole. $^1$H NMR (400 MHz, DMSO-d$_6$) δ 10.39 (s, 1H), 10.10 (s, 1H), 9.00 (d, 1H), 8.62 (s, 1H), 8.57 (d, 1H), 8.34 (d, 1H), 7.88 (d, 2H), 7.66 (dd, 2H), 7.40 (d, 2H), 7.15 (t, 2H), 6.88 (d, 1H), 6.78 (s, 1H), 3.86 (s, 3H), 2.35 (s, 3H), 1.49 (s, 4H); MS (EI) for C$_{31}$H$_{26}$FN$_5$O$_3$. found 536.1 (MH+).

Example 45: 1-N-[4-[7-[1-(Fluoromethyl)pyrazol-3-yl]quinolin-4-yl]oxyphenyl]-1-N'-(4-fluorophenyl)cyclopropane-1,1-dicarboxamide (102) and 1-N-[4-[7-[2-(Fluoromethyl)pyrazol-3-yl]quinolin-4-yl]oxyphenyl]-1-N'-(4-fluorophenyl)cyclopropane-1,1-dicarboxamide (103)

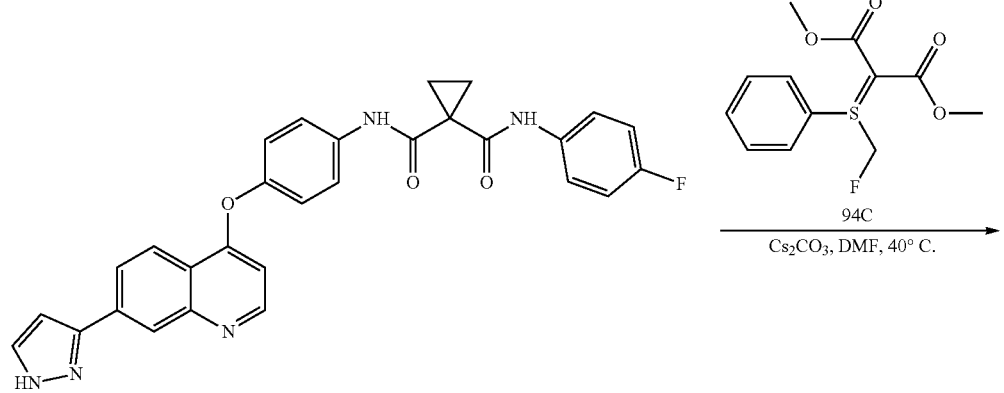

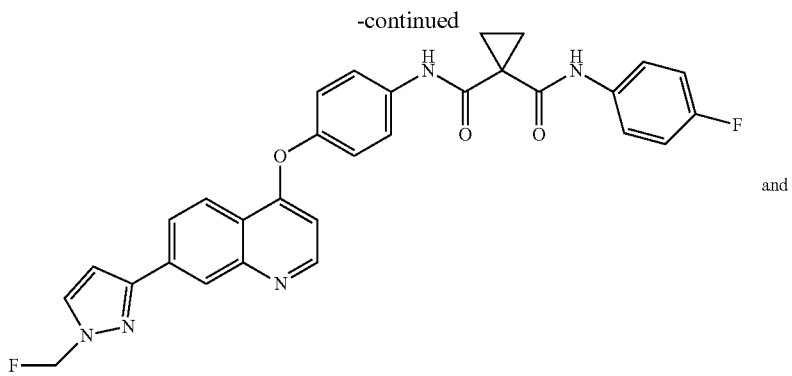

102

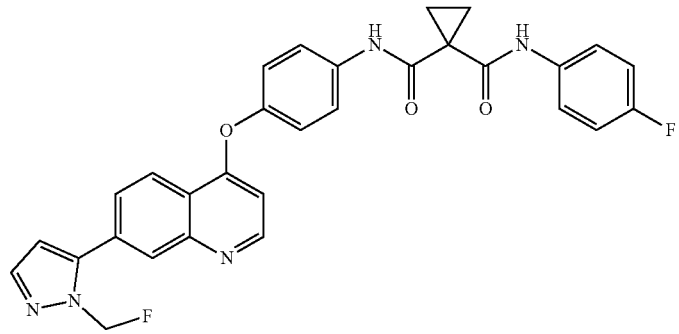

103

1-N-[4-[7-[1-(Fluoromethyl)pyrazol-3-yl]quinolin-4-yl]oxyphenyl]-1-N'-(4-fluorophenyl)cyclopropane-1,1-dicarboxamide (102) and 1-N-[4-[7-[2-(Fluoromethyl)pyrazol-3-yl]quinolin-4-yl]oxyphenyl]-1-N'-(4-fluorophenyl)cyclopropane-1,1-dicarboxamide (103): Compounds 102 and 103 were synthesized by the same method used to synthesize Compound 94 from Compound 67 in Step 4 in Example 39. 1-N-[4-[7-[1-(Fluoromethyl)pyrazol-3-yl]quinolin-4-yl]oxyphenyl]-1-N'-(4-fluorophenyl)cyclopropane-1,1-dicarboxamide (102): $^1$H NMR (400 MHz, CDCl$_3$) δ 9.40 (s, 1H), 8.85 (s, 1H), 8.67 (d, 1H), 8.47-8.36 (m, 2H), 8.22 (dd, 1H), 7.75 (d, 1H), 7.65 (d, 2H), 7.52-7.45 (m, 2H), 7.20 (d, 2H), 7.10-7.00 (m, 2H), 6.90 (d, 1H), 6.54 (d, 1H), 6.12 (d, 2H), 1.78-1.61 (m, 4H); MS (EI) for C$_{30}$H$_{23}$F$_2$N$_5$O$_3$, found 540.0 (MH+). 1-N-[4-[7-[2-(Fluoromethyl)pyrazol-3-yl]quinolin-4-yl]oxyphenyl]-1-N'-(4-fluorophenyl)cyclopropane-1,1-dicarboxamide (103): $^1$H NMR (400 MHz, CDCl$_3$) δ 9.50 (br s, 1H), 8.74 (d, 1H), 8.62 (br s, 1H), 8.48 (d, 1H), 8.28 (s, 1H), 7.78-7.72 (m, 2H), 7.67 (d, 2H), 7.48 (dd, 2H), 7.21 (d, 2H), 7.07 (t, 2H), 6.66-6.59 (m, 2H), 6.14 (d, 2H), 1.80-1.74 (m, 2H), 1.69-1.65 (m, 2H); MS (EI) for C$_{30}$H$_{23}$F$_2$N$_5$O$_3$. found 540.1 (MH+).

Example 46: 1-N'-(4-Fluorophenyl)-1-N-[4-(7-pyrazolo[1,5-a]pyridin-2-ylquinolin-4-yl)oxyphenyl]cyclopropane-1,1-dicarboxamide (104)

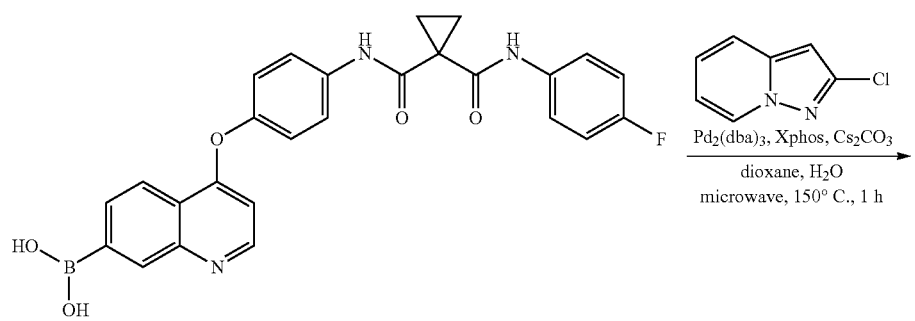

69A

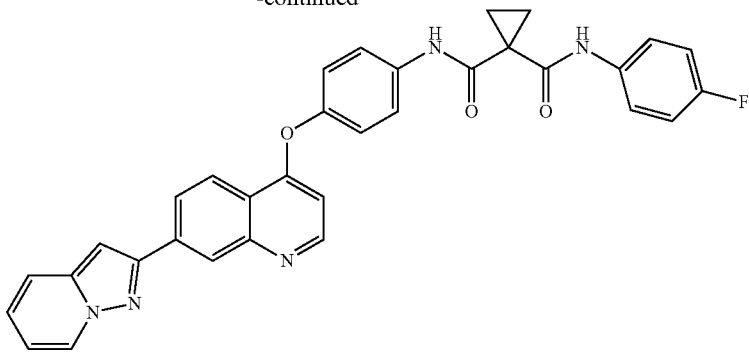

104

1-N'-(4-Fluorophenyl)-1-N-[4-(7-pyrazolo[1,5-a]pyridin-2-yl)quinolin-4-yl)oxyphenyl]cyclopropane-1,1-dicarboxamide (104): A mixture of Compound 69A (200 mg, 0.41 mmol, 1 eq), 2-chloropyrazolo[1,5-a]pyridine (62.9 mg, 0.41 mmol, 1 eq), $Pd_2(dba)_3$ (18.9 mg, 0.020 mmol, 0.05 eq), XPhos (19.6 mg, 0.041 mmol, 0.1 eq), and $Cs_2CO_3$ (403 mg, 1.2 mmol, 3 eq) in dioxane (2 mL) and water (0.2 mL) was stirred under microwave irradiation at 150° C. for 1 h. The reaction mixture was poured into water (20 mL) and extracted with EtOAc (3×20 mL). The combined organic extracts were washed with aq saturated Na Cl (10 mL), dried over anhyd $Na_2SO_4$ and concentrated in vacuo. The resulting residue was purified by prep-HPLC (Column: Phenomenex Gemini-NX 150*30 mm*5 μm, gradient: 55-85% of acetonitrile in water (0.04% $NH_3 \cdot H_2O$+10 mM $NH_4HCO_3$), flow rate: 30 mL/min) followed by further purification by flash silica gel chromatography (ISCO®; 12 g SepaFlash® Silica Flash Column, Eluent of 0~5% MEOH/DCM gradient @ 30 mL/min) to give Compound 104 as a yellow solid (26.9 mg, 11% yield). $^1$H NMR (400 MHz, $CDCl_3$) δ 9.30 (s, 1H), 8.75 (s, 1H), 8.70 (d, 1H), 8.63 (s, 1H), 8.54 (d, 1H), 8.48-8.41 (m, 1H), 8.35-8.29 (m, 1H), 7.66 (d, 2H), 7.59 (d, 1H), 7.52-7.47 (m, 2H), 7.22 (d, 2H), 7.17-7.12 (m, 1H), 7.10-7.04 (m, 2H), 7.02 (s, 1H), 6.83-6.77 (m, 1H), 6.57 (d, 1H), 1.78-1.66 (m, 4H); MS (EI) for $C_{33}H_{24}FN_5O_3$. found 558.1 (MH+).

Example 47: N-(2,5-Difluoro-4-((7-iodo-6-methylquinolin-4-yl)oxy)phenyl)-N-(4-fluorophenyl)cyclopropane-1,1-dicarboxamide (105C)

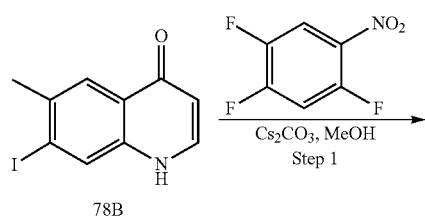

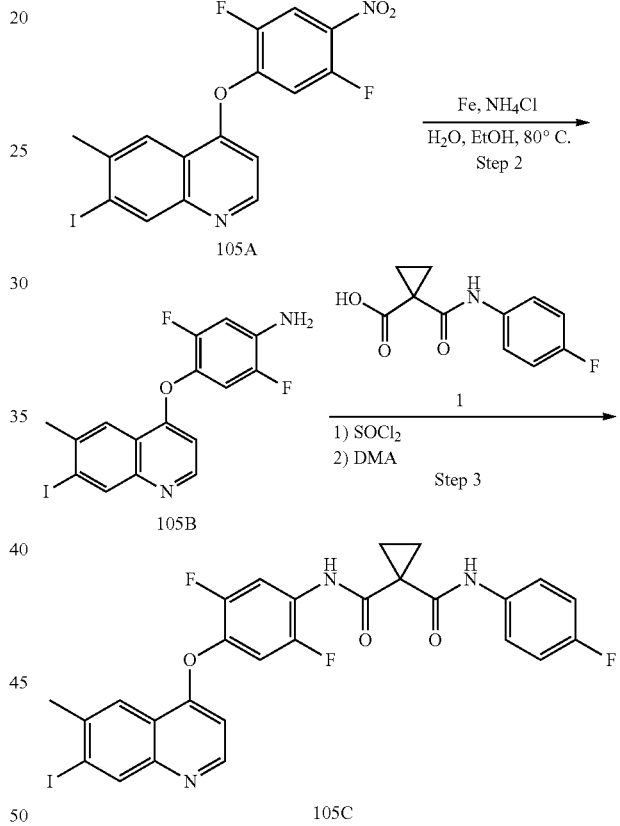

Step 1: 4-(2,5-Difluoro-4-nitrophenoxy)-7-iodo-6-methylquinoline (105A): To a solution of Compound 78B (500 mg, 1.8 mmol, 1 eq) and 1,2,4-trifluoro-5-nitro-benzene (310 mg, 1.8 mmol, 0.20 mL, 1 eq) in MeCN (8 mL) was added $Cs_2CO_3$ (1.14 g, 3.5 mmol, 2.0 eq.). The mixture was stirred at 10° C. for 12 h. The reaction mixture was diluted with EtOAc (20 mL), filtered and concentrated under reduced pressure. The resulting residue was purified by silica gel column chromatography (PE/EtOAc=1/0 to 1/1) to Compound 105A as a light-yellow solid (250 mg, 32% yield). $^1$H NMR (400 MHz, $CDCl_3$) δ 8.68 (d, 1H), 8.65 (s, 1H), 8.02 (dd, 1H), 7.95 (s, 1H), 7.03 (dd, 1H), 6.67 (d, 1H), 2.59 (s, 3H); MS (EI) for $C_{16}H_9F_2IN_2O_3$. found 442.8 (MH+).

Step 2: 2,5-Difluoro-4-((7-iodo-6-methylquinolin-4-yl)oxy)aniline (105B): To a solution of Compound 105A (200 mg, 0.45 mmol, 1 eq.) in EtOH (2 mL) and water (0.5 mL) was added Fe (126.3 mg, 2.3 mmol, 5.0 eq) and NH$_4$Cl (242 mg, 4.5 mmol, 10 eq). The mixture was stirred at 80° C. for 12 h. The reaction mixture was filtered, and the resulting filter cake was washed with MeOH (3×20 mL). The filtrate was concentrated under reduced pressure to give Compound 105B as a light-yellow oil (184 mg, 99% yield) which was used in subsequent reactions without further purification. MS (EI) for C$_{16}$H$_{11}$F$_2$IN$_2$O. found 412.9 (MH+).

Step 3: N-(2,5-Difluoro-4-((7-iodo-6-methylquinolin-4-yl)oxy)phenyl)-N-(4-fluorophenyl)cyclopropane-1,1-dicarboxamide (105C): A solution of Compound 1 (300 mg, 1.3 mmol, 1 eq) in SOCl$_2$ (3 mL) was stirred at 75° C. for 2 h. The reaction mixture was concentrated under reduced pressure to give the crude acid chloride. To a solution of this crude acid chloride and Compound 105B (184 mg, 0.45 mmol, 1 eq) in DMA (2 mL) was added TEA (90.3 mg, 0.89 mmol, 0.12 mL, 2.0 eq). The mixture was stirred at 10° C. for 2 h. Water (20 mL) was added and the resulting mixture was extracted with EtOAc (3×20 mL). The combined organic extracts were washed with water (10 mL), aq saturated NaCl (10 mL), dried over Na$_2$SO$_4$ and concentrated under reduced pressure. The resulting residue was purified by prep-TLC (DCM/MeOH=9/1) to give Compound 105C as a light-yellow solid (260 mg, 94% yield). MS (EI) for C$_{27}$H$_{19}$F$_3$IN$_3$O$_3$. found 617.9 (MH+).

Example 48: 1-N'-[2,5-Difluoro-4-[6-methyl-7-(1-methylpyrazol-4-yl)quinolin-4-yl]oxyphenyl]-1-N-(4-fluorophenyl)cyclopropane-1,1-dicarboxamide hydrochloride (105)

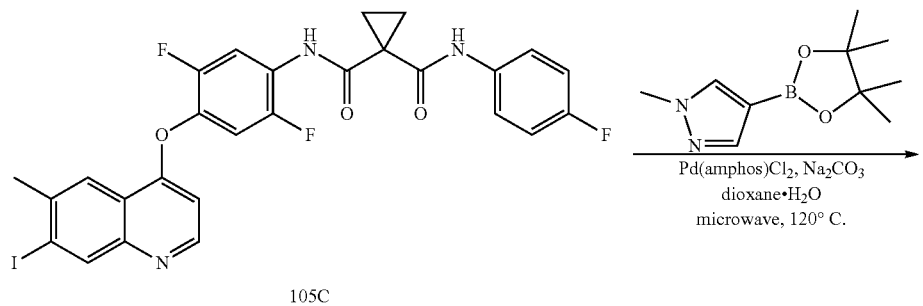

105C

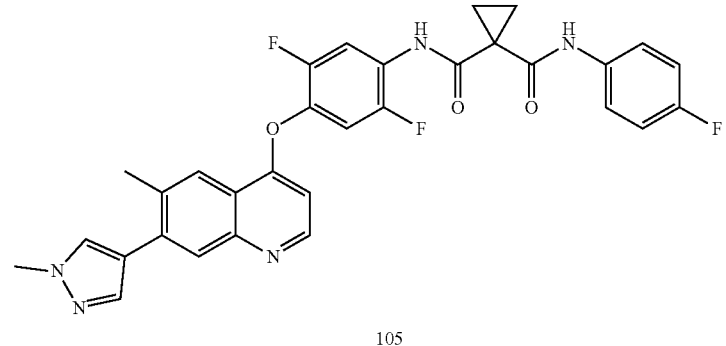

105

1-N'-[2,5-Difluoro-4-[6-methyl-7-(1-methylpyrazol-4-yl)quinolin-4-yl]oxyphenyl]-1-N-(4-fluorophenyl)cyclopropane-1,1-dicarboxamide hydrochloride (105): Compound 105 was synthesized by the same method used to synthesize Compound 10 in Example 3. $^1$H NMR (400 MHz, DMSO-$d_6$) δ 11.37 (br s, 1H), 9.79 (s, 1H), 9.01 (br d, 1H), 8.45 (s, 1H), 8.36-8.25 (m, 3H), 7.94 (s, 1H), 7.83 (br dd, 1H), 7.61 (br dd, 2H), 7.20 (br t, 2H), 7.13 (br d, 1H), 3.97 (s, 3H), 2.70 (s, 3H), 1.73 (br s, 2H), 1.67-1.59 (m, 2H); MS (EI) for $C_{31}H_{24}F_3N_5O_3$. found 572.2 (MH+).

Example 49: 1-N'-(4-Fluorophenyl)-1-N-[4-[6-methyl-7-(1H-pyrazol-4-$C_3$ yl)quinolin-4-yl]oxyphenyl]cyclopropane-1,1-dicarboxamide (106)

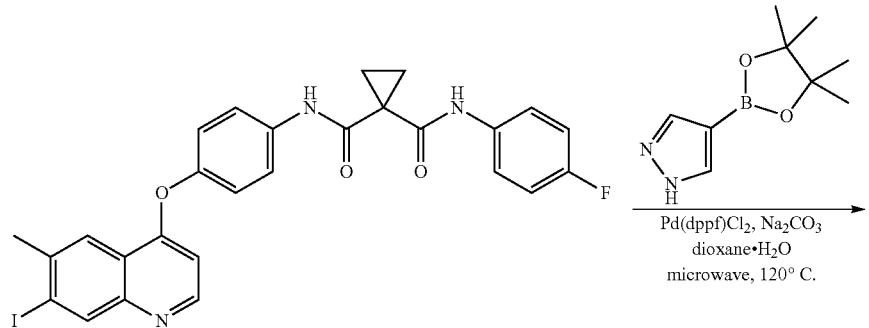

78D

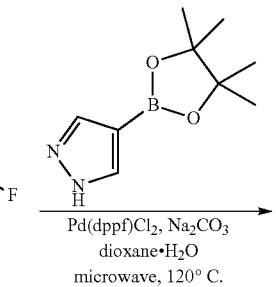

Pd(dppf)Cl$_2$, Na$_2$CO$_3$
dioxane•H$_2$O
microwave, 120° C.

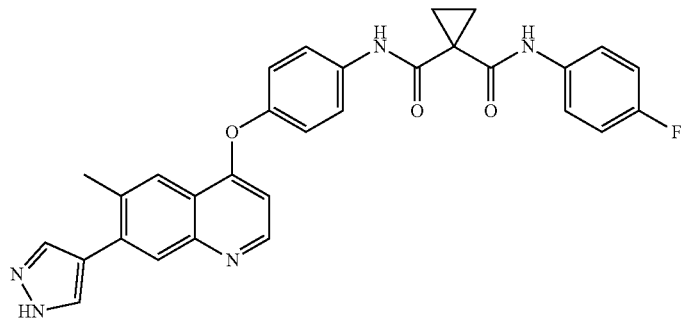

106

1-N'-(4-Fluorophenyl)-1-N-[4-[6-methyl-7-(1H-pyrazol-4-yl)quinolin-4-yl]oxyphenyl]cyclopropane-1,1-dicarboxamide (106): To a solution of Compound 78D (200 mg, 0.34 mmol, 1 eq) and 4-(4,4,5,5-tetramethyl-1,3,2-dioxaborolan-2-yl)-1H-pyrazole (100 mg, 0.52 mmol, 1.5 eq) in dioxane (2 mL) and water (0.5 mL) were added Na$_2$CO$_3$ (109 mg, 1.0 mmol, 3.0 eq) and Pd(dppf)Cl$_2$ (25.2 mg, 0.034 mmol, 0.1 eq). The mixture was stirred at 120° C. for 15 min under microwave irradiation. Water (30 mL) was added and the resulting mixture was extracted with EtOAc (3×30 mL). The combined EtOAc extracts were washed with water (10 mL), aq saturated NaCl (10 mL), dried over anhyd Na$_2$SO$_4$ and concentrated under reduced pressure. The resulting residue was purified by silica gel column chromatography (DCM/MeOH=1/0 to 10/1) to give Compound 106 as an off-white solid (101.5 mg, 56% yield). $^1$H NMR (400 MHz, DMSO-$d_6$) δ 13.14 (br s, 1H), 10.21 (s, 1H), 10.08 (s, 1H), 8.61 (d, 1H), 8.29-8.12 (m, 2H), 8.04 (s, 1H), 7.94 (s, 1H), 7.78 (br d, 2H), 7.67-7.63 (m, 2H), 7.25 (d, 2H), 7.16 (t, 2H), 6.50 (d, 1H), 2.62 (s, 3H), 1.48 (s, 4H); MS (EI) for $C_{30}H_{24}FN_5O_3$. found 522.1 (MH+).

The following compounds were prepared in a method analogous to that used to synthesize Compound 106 from Compound 78B in Example 49:

1-N'-(4-Fluorophenyl)-1-N-[4-[6-methyl-7-(1H-pyrazol-3-yl)quinolin-4-yl]oxyphenyl]cyclopropane-1,1-dicarboxamide (107): 4-(4,4,5,5-tetramethyl-1,3,2-dioxaborolan-2-yl)-1H-pyrazole was replaced with 3-(4,4,5,5-tetramethyl-1,3,2-dioxaborolan-2-yl)-1H-pyrazole. $^1$H NMR (400 MHz, CDCl$_3$) δ 9.54 (s, 1H), 8.94 (s, 1H), 8.60 (d, 1H), 8.30 (s, 1H), 8.21 (s, 1H), 7.72 (d, 1H), 7.58 (d, 2H), 7.51-7.45 (m, 2H), 7.12-7.01 (m, 4H), 6.63 (d, 1H), 6.47 (d, 1H), 2.65 (s, 3H), 1.75-1.64 (m, 4H); MS (EI) for $C_{30}H_{24}FN_5O_3$. found 522.1 (MH+).

1-N'-(4-Fluorophenyl)-1-N-[4-[6-methyl-7-(1-methylpyrazol-3-yl)quinolin-4-yl]oxyphenyl]cyclopropane-1,1-dicarboxamide (108): 4-(4,4,5,5-tetramethyl-1,3,2-dioxaborolan-2-yl)-1H-pyrazole was replaced with 1-methyl-3-(4,4,5,5-tetramethyl-1,3,2-dioxaborolan-2-yl)pyrazole. $^1$H NMR (400 MHz, CDCl$_3$) δ 9.30 (s, 1H), 8.92 (s, 1H), 8.61 (d, 1H), 8.25 (s, 1H), 8.19 (s, 1H), 7.63 (d, 2H), 7.52-7.43 (m, 3H), 7.23-7.16 (m, 2H), 7.06 (t, 2H), 6.55 (d, 1H), 6.50 (d, 1H), 4.02 (s, 3H), 2.71 (s, 3H), 1.74-1.68 (m, 4H); MS (EI) for $C_{31}H_{26}FN_5O_3$. found 536.1 (MH+).

Example 50: 1-N'-(4-Fluorophenyl)-1-N-[4-[7-(1-oxidopyridin-1-ium-3-yl)quinolin-4-yl]oxyphenyl]cyclopropane-1,1-dicarboxamide (109)

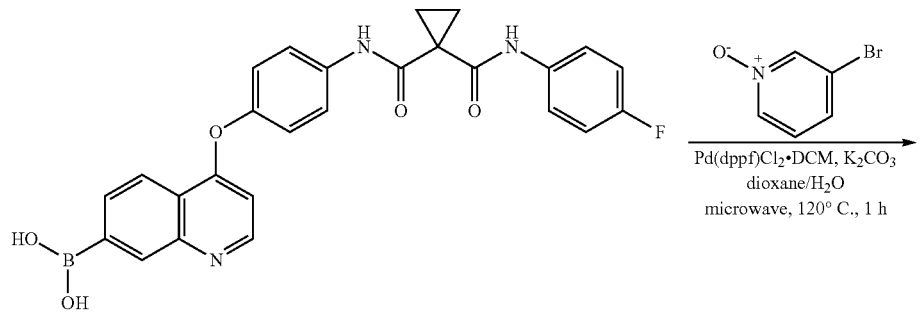

69A

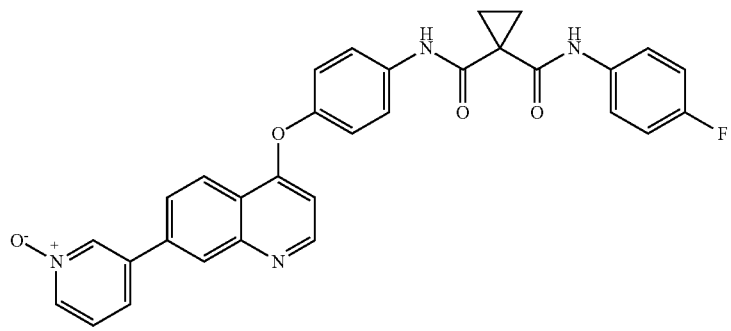

109

1-N'-(4-Fluorophenyl)-1-N-[4-[7-(1-oxidopyridin-1-ium-3-yl)quinolin-4-yl]oxyphenyl]cyclopropane-1,1-dicarboxamide (109): Compound 69A (200 mg, 0.41 mmol, 1 eq), 3-bromo-1-oxido-pyridin-1-ium (108 mg, 0.62 mmol, 1.5 eq), $K_2CO_3$ (171 mg, 1.2 mmol, 3 eq) and Pd(dppf)Cl$_2$·DCM (33.7 mg, 0.041 mmol, 0.1 eq) were combined in dioxane (3 mL) and water (0.3 mL) and heated at 120° C. for 1 h under microwave irradiation. The reaction mixture was poured into water (20 mL) and the resulting mixture was extracted with DCM (3×20 mL). The combined organic extracts were washed with aq saturated NaCl (10 mL), dried over anhyd $Na_2SO_4$ and concentrated in vacuo. The resulting residue was purified by flash silica gel chromatography (ISCO®; 12 g SepaFlash® Silica Flash Column, Eluent of 0~10% MEOH/DCM gradient @ 30 mL/min) followed by further purification by prep-HPLC (Column: Waters Xbridge BEH C18 150*25 mm*5 μm, gradient: 27-57% of acetonitrile in water (10 mM $NH_4HCO_3$), flow rate: 30 mL/min) to give Compound 109 as a white solid (61.1 mg, 28% yield). $^1$H NMR (400 MHz, DMSO-d$_6$) δ 10.22 (s, 1H), 10.06 (s, 1H), 8.79 (s, 1H), 8.75 (d, 1H), 8.44-8.38 (m, 2H), 8.30 (d, 1H), 8.06-8.00 (m, 1H), 7.87 (d, 1H), 7.79 (d, 2H), 7.68-7.61 (m, 2H), 7.60-7.54 (m, 1H), 7.28 (d, 2H), 7.19-7.11 (m, 2H), 6.63 (d, 1H), 1.47 (s, 4H); MS (EI) for $C_{31}H_{23}FN_4O_4$, found 535.1 (MH+).

Example 51: N-(4-Fluorophenyl)-N-(2,3,5-trifluoro-4-((7-iodo-6-C$_3$ methylquinolin-4-yl)oxy)phenyl)cyclopropane-1,1-dicarboxamide (110C)

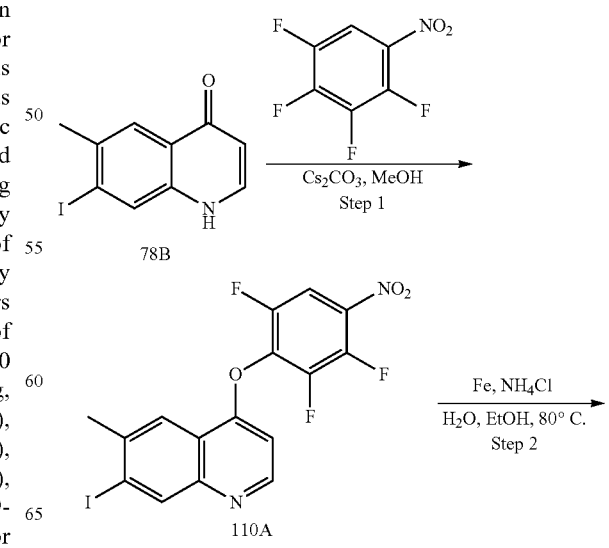

231

-continued

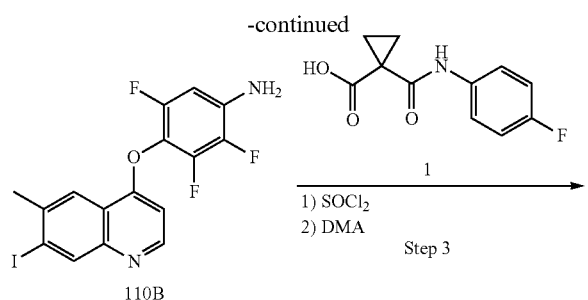

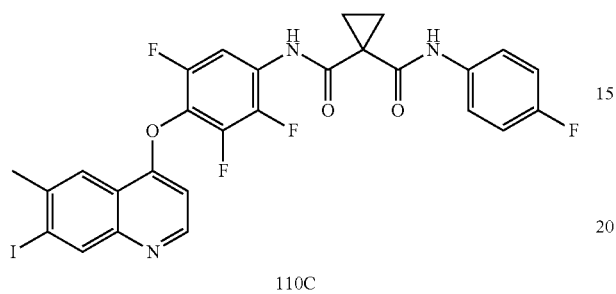

N-(4-Fluorophenyl)-N-(2,3,5-trifluoro-4-((7-iodo-6-methylquinolin-4-yl)oxy)phenyl)cyclopropane-1,1-dicarboxamide (110C): Compound 110C was synthesized from Compound 78B using the same three step sequence used to synthesize Compound 105C from Compound 78B in Example 47. $^1$H NMR (400 MHz, CDCl$_3$) δ 10.96 (s, 1H), 8.67 (s, 1H), 8.63 (d, 1H), 8.22-8.17 (m, 2H), 8.07 (s, 1H), 7.49-7.47 (m, 2H), 7.09-7.04 (m, 2H), 6.51 (d, 1H), 2.67 (s, 3H), 1.90-1.87 (m, 2H), 1.69-1.67 (m, 2H); MS (EI) for C$_{27}$H$_{18}$F$_4$IN$_3$O$_3$. found 635.9 (MH+).

Example 52: 1-N-(4-Fluorophenyl)-1-N'-[2,3,5-trifluoro-4-[6-methyl-7-(1-methylpyrazol-4-yl)quinolin-4-yl]oxyphenyl]cyclopropane-1,1-dicarboxamide hydrochloride (110)

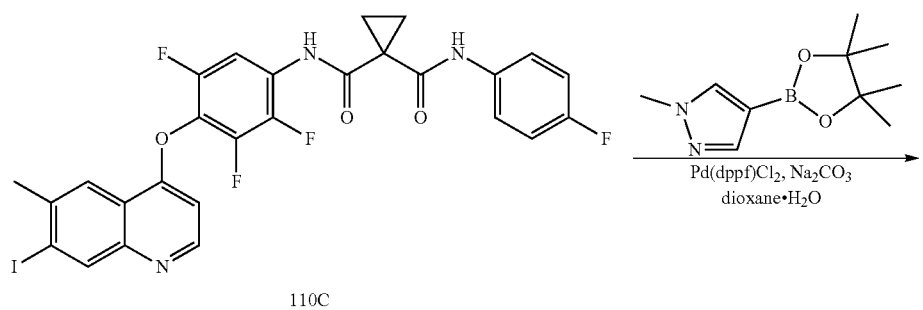

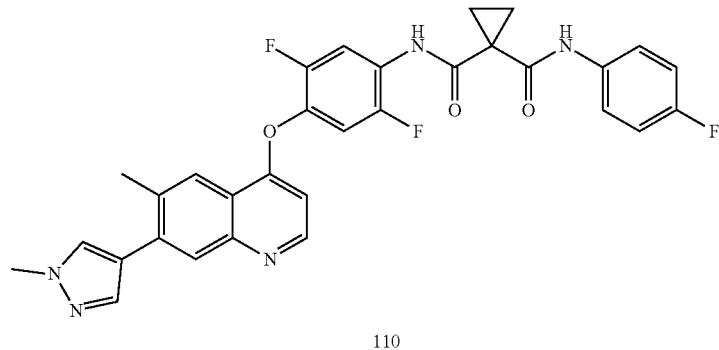

1-N-(4-Fluorophenyl)-1-N'-[2,3,5-trifluoro-4-[6-methyl-7-(1-methylpyrazol-4-yl)quinolin-4-yl]oxyphenyl]cyclopropane-1,1-dicarboxamide hydrochloride (110): To a solution of 1-methyl-4-(4,4,5,5-tetramethyl-1,3,2-dioxaborolan-2-yl)pyrazole (196 mg, 0.94 mmol, 2 eq) and Compound 110C (300 mg, 0.47 mmol, 1 eq) in dioxane (10 mL) and water (0.5 mL) was added Na$_2$CO$_3$ (150 mg, 1.4 mmol, 3 eq) and Pd(dppf)Cl$_2$ (346 mg, 0.47 mmol, 1 eq) under an atmosphere of nitrogen. The mixture was stirred at 100° C. for 12 h. The reaction mixture was extracted with DCM (3×20 mL). The combined organic extracts were washed with aq saturated NaCl (10 mL) and concentrated in vacuo. The resulting residue was purified by prep-HPLC (Column: Venusil ASB Phenyl 150*30 mm*5 μm, gradient: 50-80% of acetonitrile in water (0.05% HCl), flow rate: 25 mL/min) to give the HCl salt of Compound 110 as a yellow solid (104.4 mg, 38% yield). $^1$H NMR (400 MHz, DMSO-d$_6$) δ 11.44 (s, 1H), 9.76 (s, 1H), 8.95-8.87 (m, 1H), 8.37 (s, 1H), 8.29-8.25 (m, 1H), 8.14-8.07 (m, 2H), 7.92 (s, 1H), 7.61-7.58 (m, 2H), 7.23-7.13 (m, 3H), 3.95 (s, 3H), 2.67 (s, 3H), 1.72-1.69 (m, 2H), 1.61-1.58 (m, 2H); MS (EI) for C$_{31}$H$_{23}$F$_4$N$_5$O$_3$. found 590.1 (MH+).

Example 53: 1-N'-(4-Fluorophenyl)-1-N-[4-[7-[2-(4-methylpiperazin-1-yl)pyridin-4-yl]quinolin-4-yl]oxyphenyl]cyclopropane-1,1-dicarboxamide hydrochloride (111)

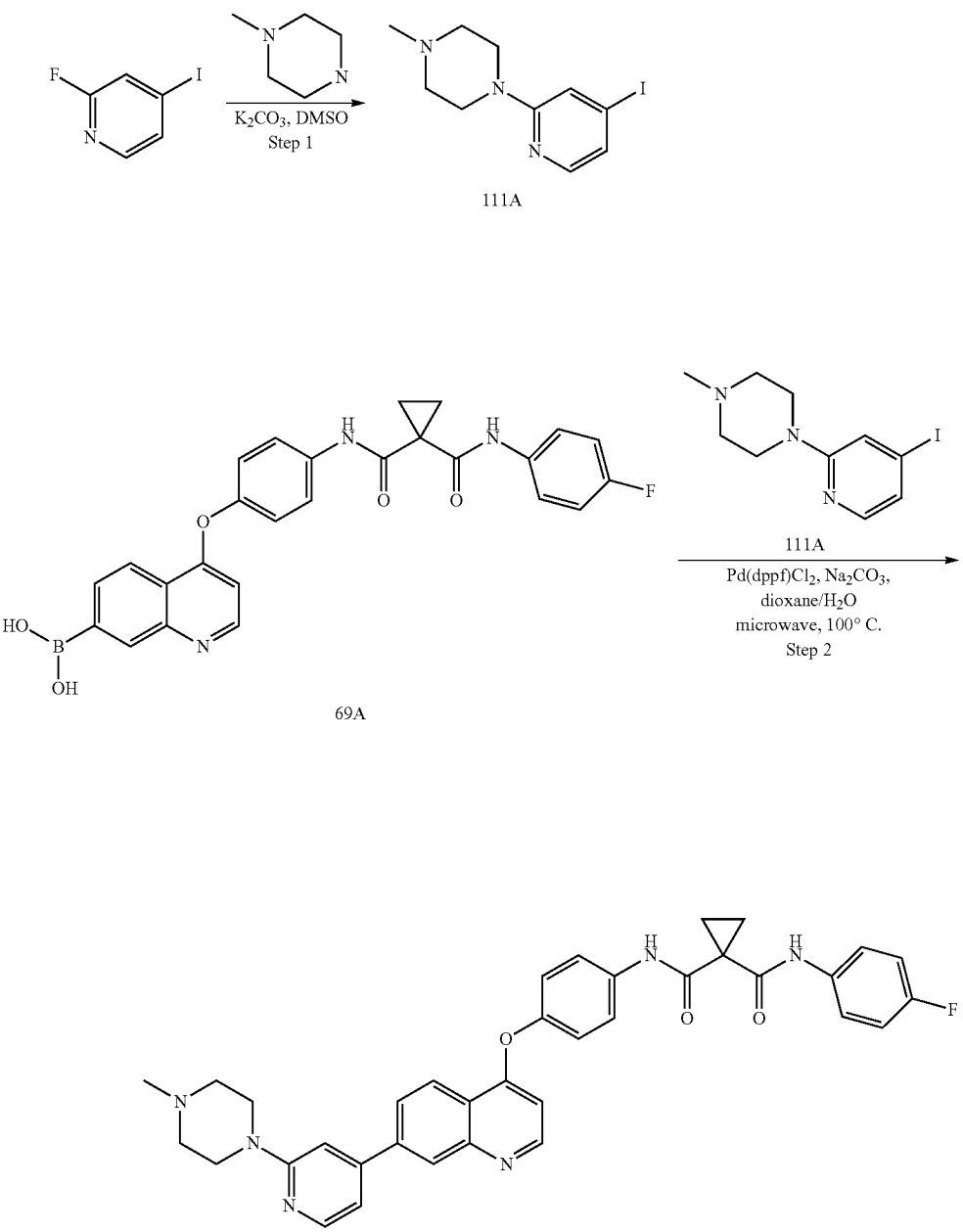

Step 1: 1-(4-Iodopyridin-2-yl)-4-methylpiperazine (111A): To a solution of 2-fluoro-4-iodo-pyridine (1 g, 4.5 mmol, 1 eq) in DMSO (4 mL) was added K$_2$CO$_3$ (1.24 g, 9.0 mmol, 2 eq) and 1-methylpiperazine (674 mg, 6.7 mmol, 0.75 mL, 1.5 eq). The resulting mixture was stirred at 60° C. for 12 h. The mixture was cooled, poured into water (50 mL) and extracted with EtOAc (2×50 mL). The combined organic extracts were washed with aq saturated NaCl (10 mL), dried over anhyd Na$_2$SO$_4$ and concentrated. The resulting residue was triturated with petroleum ether (20 mL) to give crude Compound 111A as a light-yellow solid (900 mg, 66% yield). $^1$H NMR (400 MHz, DMSO-d$_6$) δ 7.80 (d, 1H), 7.21 (s, 1H), 6.98 (m, 1H), 3.48-3.45 (m, 4H), 2.37-2.34 (m, 4H), 2.20 (s, 3H); MS (EI) for C$_{10}$H$_{14}$IN$_3$, found 303.9 (MH+).

Step 2: 1-N'-(4-Fluorophenyl)-1-N-[4-[7-[2-(4-methylpiperazin-1-yl)pyridin-4-yl]quinolin-4-yl]oxyphenyl]cyclopropane-1,1-dicarboxamide hydrochloride (111): Compound 111 was synthesized from Compound 69A and Compound 111A using a variation of the procedure used to synthesize Compound 110 in Example 52 from Compound 110C and 1-methyl-4-(4,4,5,5-tetramethyl-1,3,2-dioxaborolan-2-yl)pyrazole. In this example, the reaction was carried out at 100° C. under microwave irradiation for 0.5 h. $^1$H NMR (400 MHz, DMSO-d$_6$) δ 11.55 (s, 1H), 10.41 (s, 1H), 10.11 (s, 1H), 9.11 (d, 1H), 8.76 (s, 1H), 8.69 (d, 1H), 8.42 (d, 1H), 8.34 (d, 1H), 7.89 (d, 2H), 7.68-7.64 (m, 3H), 7.42 (d, 2H), 7.31 (d, 1H), 7.15 (t, 2H), 6.99 (d, 1H), 4.66 (d, 2H), 3.59-3.53 (m, 4H), 3.25-3.10 (m, 2H), 2.80 (d, 3H), 1.50 (s, 4H); MS (EI) for C$_{36}$H$_{33}$FN$_6$O$_3$. found 617.1 (MH+).

Example 54: N-(2-Chloro-5-fluoro-4-((7-iodo-6-methylquinolin-4-yl)oxy)phenyl)-N-(4-fluorophenyl) cyclopropane-1,1-dicarboxamide (112C)

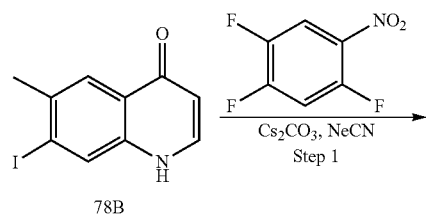

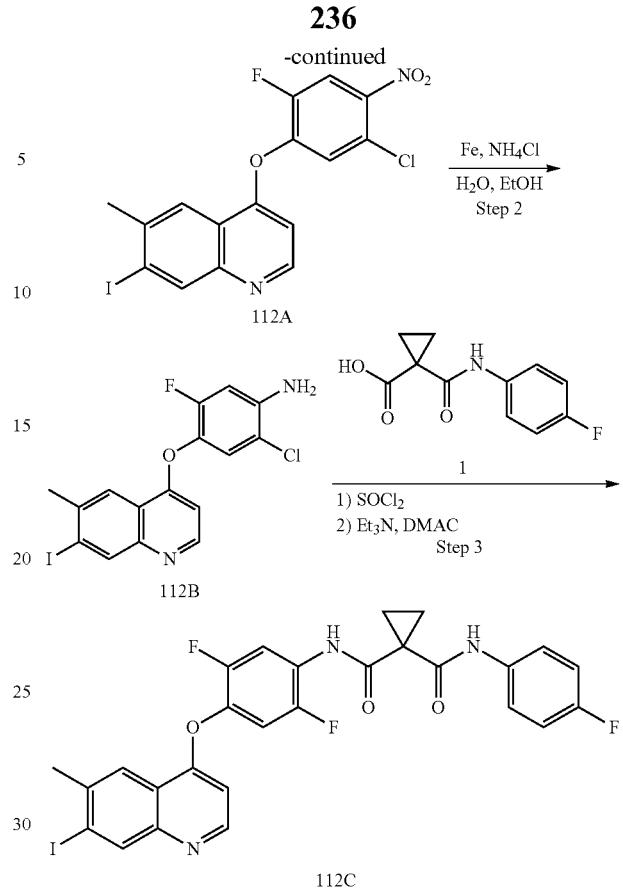

N-(2-Chloro-5-fluoro-4-((7-iodo-6-methylquinolin-4-yl)oxy)phenyl)-N-(4-fluorophenyl)cyclopropane-1,1-dicarboxamide (112C): Compound 112C was synthesized from Compound 78B using the same three step sequence used to synthesize Compound 105C from Compound 78B in Example 47. MS (EI) for C$_{27}$H$_{19}$ClF$_2$IN$_3$O$_3$. found 633.9 (MH+).

Example 55: 1-N'-[2-Chloro-5-fluoro-4-[6-methyl-7-(1-methylpyrazol-4-yl)quinolin-4-yl]oxyphenyl]-1-N-(4-fluorophenyl)cyclopropane-1,1-dicarboxamide hydrochloride (112)

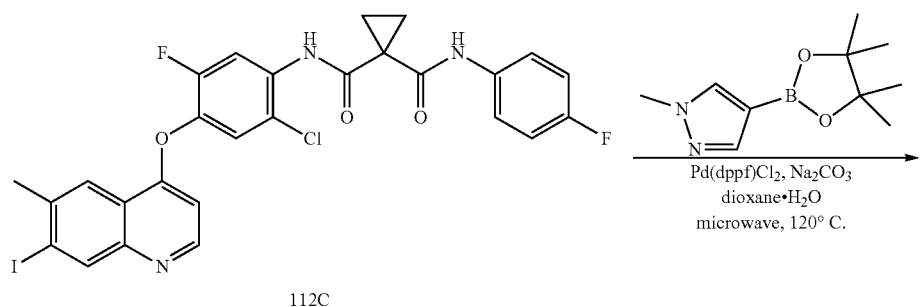

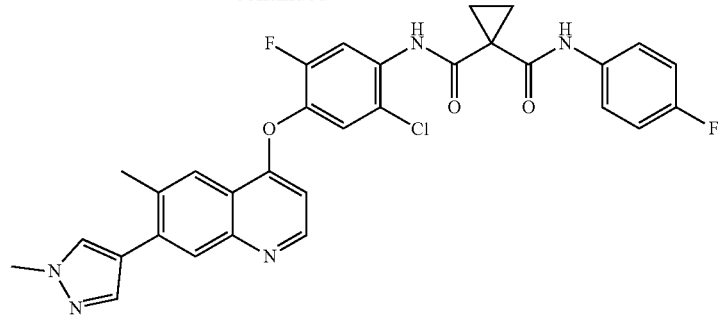 [SMILES: Cc1cc2c(Oc3c(F)cc(NC(=O)C4(C(=O)Nc5ccc(F)cc5)CC4)c(F)c3F)ccnc2cc1-c1cnn(C)c1]

112

1-N'-[2-Chloro-5-fluoro-4-[6-methyl-7-(1-methylpyrazol-4-yl)quinolin-4-yl]oxyphenyl]-1-N-(4-fluorophenyl)cyclopropane-1,1-dicarboxamide hydrochloride (112): Compound 112 was synthesized from Compound 112C and 1-methyl-4-(4,4,5,5-tetramethyl-1,3,2-dioxaborolan-2-yl)pyrazole using a variation of the procedure used to synthesize Compound 110 in Example 52 from Compound 110C and 1-methyl-4-(4,4,5,5-tetramethyl-1,3,2-dioxaborolan-2-yl)pyrazole. In this example, the reaction was carried out at 120° C. under microwave irradiation for 20 min. $^1$H NMR (400 MHz, DMSO-$d_6$) δ 11.73 (s, 1H), 9.71 (s, 1H), 8.98 (d, 1H), 8.46-8.40 (m, 2H), 8.31 (s, 1H), 8.23 (s, 1H), 8.00 (d, 1H), 7.94 (s, 1H), 7.62-7.57 (m, 2H), 7.21 (t, 2H), 7.14-7.10 (m, 1H), 3.97 (s, 3H), 2.70 (s, 3H), 1.84-1.78 (m, 2H), 1.71-1.65 (m, 2H); MS (EI) for $C_{31}H_{24}ClF_2N_5O_3$. found 588.0 (MH+).

Example 56: N-(4-((7-Bromoquinolin-4-yl)oxy)-3-fluorophenyl)-N-(4-fluorophenyl)cyclopropane-1,1-dicarboxamide (113A)

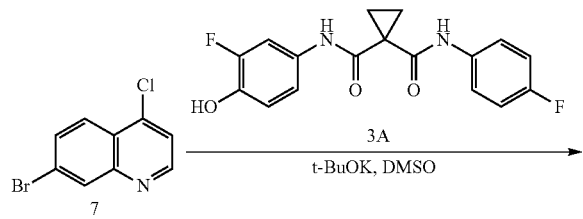

-continued

113A

N-(4-((7-Bromoquinolin-4-yl)oxy)-3-fluorophenyl)-N-(4-fluorophenyl)cyclopropane-1,1-dicarboxamide (113A): Compound 113A was synthesized from Compound 7 and Compound 3A using the same procedure used to synthesize Compound 8 from Compound 7 and Compound 3 in Step 4 of Example 2. MS (EI) for $C_{26}H_{18}BrF_2N_3O_3$. found 538.0 (MH+).

Example 57: 1-N-(4-Fluorophenyl)-1-N'-[3-fluoro-4-(7-pyridin-3-ylquinolin-4-yl)oxyphenyl]cyclopropane-1,1-dicarboxamide hydrochloride (113)

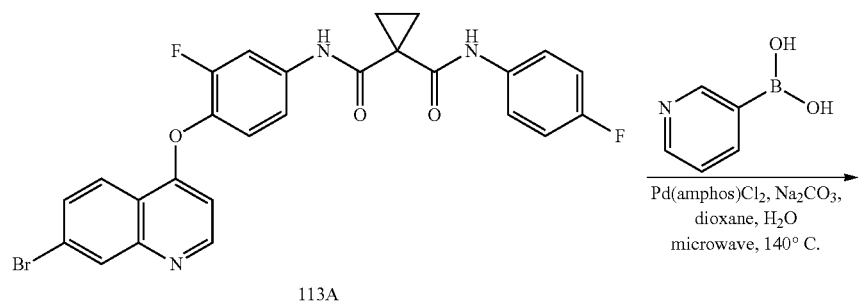

113A

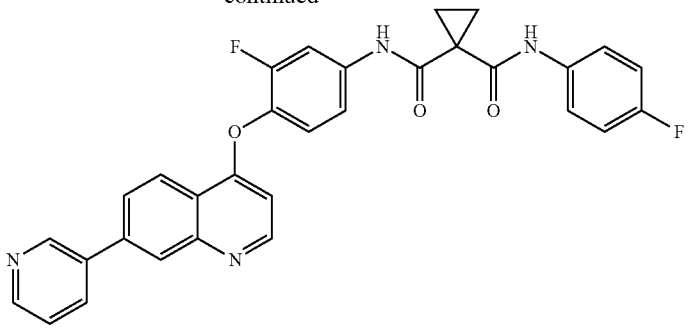

113

1-N-(4-Fluorophenyl)-1-N'-[3-fluoro-4-(7-pyridin-3-ylquinolin-4-yl)oxyphenyl]cyclopropane-1,1-dicarboxamide hydrochloride (113): Compound 113 was synthesized from Compound 113A by the same method used to synthesize Compound 10 from Compound 8 in Example 3. $^1$H NMR (400 MHz, DMSO-d$_6$) δ 10.60 (s, 1H), 10.09 (s, 1H), 9.41 (d, 1H), 9.12 (d, 1H), 8.97 (d, 1H), 8.88 (br d, 1H), 8.77 (s, 1H), 8.73 (d, 1H), 8.41 (dd, 1H), 8.11 (dd, 1H), 8.02 (dd, 1H), 7.69-7.56 (m, 4H), 7.15 (t, 2H), 7.09 (d, 1H), 1.50 (br d, 4H); MS (EI) for C$_{31}$H$_{22}$F$_2$N$_4$O$_3$. found 537.0 (MH+).

Example 58: 1-N'-(4-Fluorophenyl)-1-N-[4-(7-pyrimidin-4-ylquinolin-4-yl)oxyphenyl]cyclopropane-1,1-dicarboxamide (114)

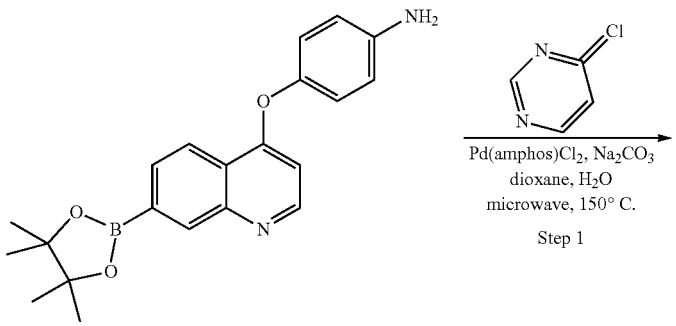

70

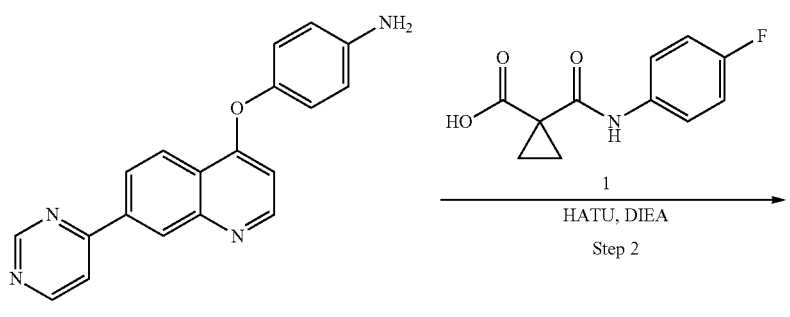

114A

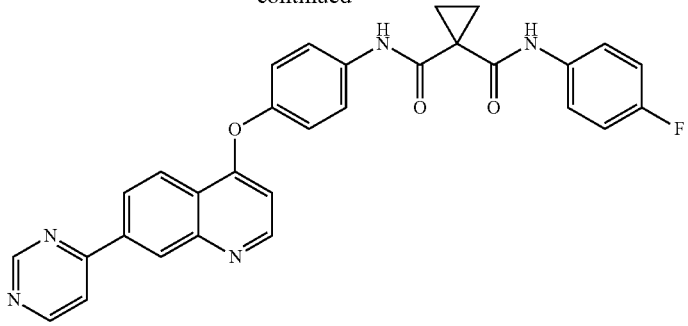

114

1-N'-(4-Fluorophenyl)-1-N-[4-(7-pyrimidin-4-ylquinolin-4-yl)oxyphenyl]cyclopropane-1,1-dicarboxamide (114): Compound 114 was synthesized from Compound 70 in two steps using the same procedures used to synthesize Compound 72A from Compound 70 in Steps 2 and 3 of Example 13. $^1$H NMR (400 MHz, DMSO-d$_6$) δ 10.21 (s, 1H), 10.05 (s, 1H), 9.36 (s, 1H), 8.97 (d, 1H), 8.88 (s, 1H), 8.78 (d, 1H), 8.48 (s, 2H), 8.37 (d, 1H), 7.79 (d, 2H), 7.64 (m, 2H), 7.29 (d, 2H), 7.13 (m, 2H), 6.66 (d, 1H), 1.48 (s, 4H); MS (EI) for $C_{30}H_{22}N_5O_3$, found 520 (MH+).

Example 59: N-(4-((7-Bromoquinolin-4-yl)oxy)-2,5-difluorophenyl)-N-(4-fluorophenyl)cyclopropane-1,1-dicarboxamide (115C)

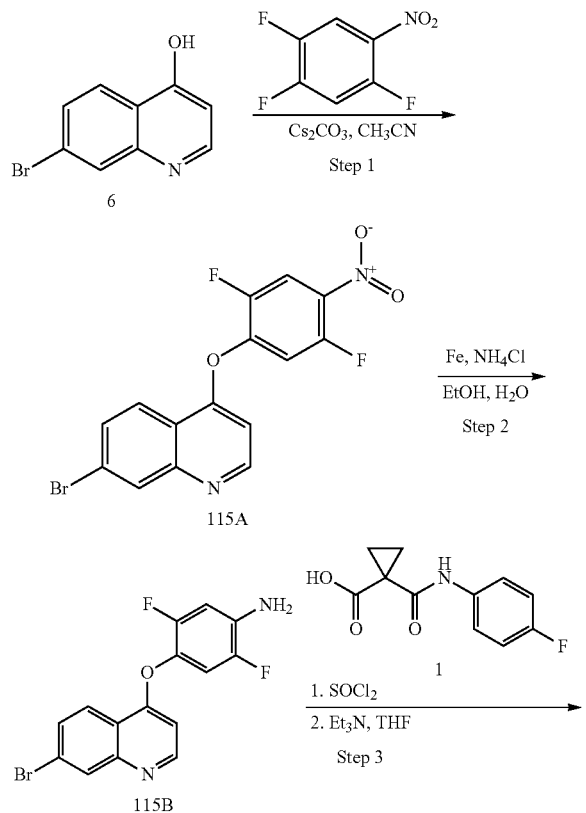

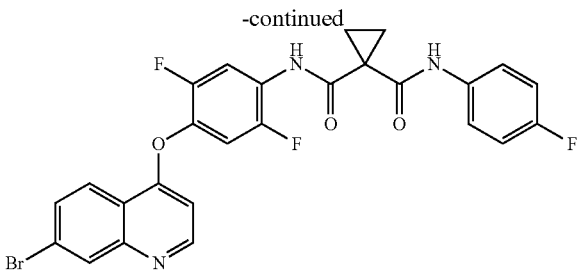

115C

Step 1: 7-Bromo-4-(2,5-difluoro-4-nitrophenoxy)quinoline (115A): To a mixture of 1,2,4-trifluoro-5-nitro-benzene (1.0 g, 5.7 mmol, 0.66 mL, 1.5 eq) and Cs$_2$CO$_3$ (2.5 g, 7.6 mmol, 2 eq) in MeCN (20 mL) was added Compound 6 (900 mg, 3.8 mmol, 1 eq) at 15° C. The resulting mixture was stirred for 3 h at 15° C., then diluted with water (50 mL) and extracted with EtOAc (3×30 mL). The combined organic extracts were dried over anhyd Na$_2$SO$_4$ and concentrated. The resulting residue was purified by flash column chromatography on silica gel (EtOAc in petroleum ether=0~30%) to give Compound 115A as an off-white solid (590 mg, 38% yield). $^1$H NMR (400 MHz, CDCl$_3$) δ 8.82 (d, 1H), 8.36 (d, 1H), 8.13-8.05 (m, 2H), 7.73 (dd, 1H), 7.15 (dd, 1H), 6.74 (d, 1H); MS (EI) for $C_{15}H_7BrF_2N_2O_3$. found 382.9 (MH+).

Step 2: 4-((7-Bromoquinolin-4-yl)oxy)-2,5-difluoroaniline (115B). To a mixture of Compound 115A (540 mg, 1.4 mmol, 1 eq) and NH$_4$Cl (1.1 g, 20 mmol, 15 eq) in EtOH (8 mL) and water (2 mL) was added iron (752 mg, 13.5 mmol, 10 eq) at 15° C. The resulting mixture was then heated to 70° C. and stirred for 2 h. After allowing the reaction mixture to cool, it was filtered. The filtrate was concentrated under reduced pressure and the resulting residue was suspended in water (50 mL) and EtOAc (50 mL) and then the pH was adjusted to ~8 with aq saturated NaHCO$_3$. The phases were separated, and the aqueous phase was extracted with EtOAc (2×30 mL). The combined organic extracts were dried over anhyd Na$_2$SO$_4$, filtered and concentrated to give crude Compound 115B as a brown solid (450 mg, 86% yield) which was used in subsequent reactions without further purification. MS (EI) for $C_{15}H_9BrF_2N_2O$. found 350.9 (MH+).

Step 3: N-(4-((7-Bromoquinolin-4-yl)oxy)-2,5-difluorophenyl)-N-(4-fluorophenyl)cyclopropane-1,1-dicarboxamide (115C). A mixture of Compound 1 (300 mg, 1.3 mmol, 1 eq) and SOCl$_2$ (2.28 g, 19.2 mmol, 1.4 mL, 15 eq) was stirred for 1 h at 80° C.

The reaction mixture was concentrated under reduced pressure to give the acid chloride of Compound 1 (300 mg, 1.1 mmol). This acid chloride (206 mg, 0.85 mmol, 1.2 eq) was added to a mixture of Compound 115B (250 mg, 0.71 mmol, 1 eq) and TEA (216 mg, 2.1 mmol, 0.30 mL, 3 eq) in THF (10 mL) and the resulting mixture was stirred for 2 h at 15° C. The reaction mixture was quenched with aq NaHCO$_3$(50 mL) and extracted with EtOAc (3×30 mL). The combined organic extracts were dried over anhyd Na$_2$SO$_4$, filtered and concentrated. The resulting residue was purified by flash column chromatography on silica gel (EtOAc in petroleum ether=0~60%) to give Compound 115C as a light-yellow solid (300 mg, 72% yield). MS (EI) for C$_2$O$_6$H$_{17}$BrF$_3$N$_3$O$_3$. found 558.0 (MH+).

Example 60: 1-N'-[2,5-Difluoro-4-(7-pyridin-3-ylquinolin-4-yl)oxyphenyl]-1-N-(4-fluorophenyl)cyclopropane-1,1-dicarboxamide (115)

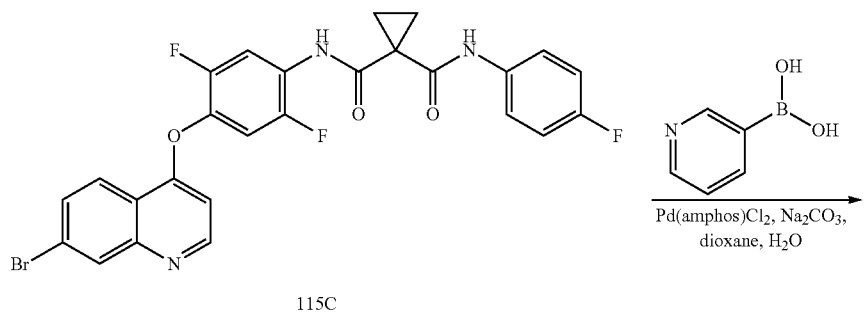

115C

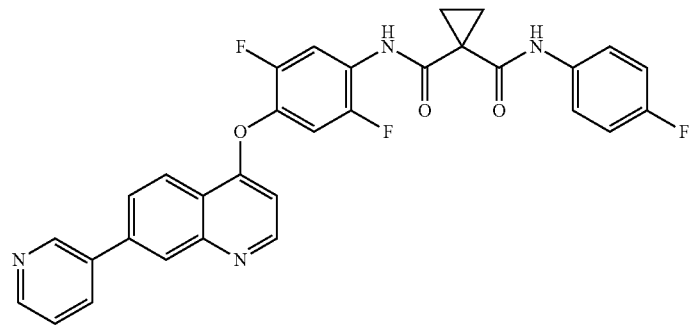 [SMILES: O=C(Nc1ccc(F)cc1)C1(C(=O)Nc2cc(F)c(Oc3ccnc4cc(-c5cccnc5)ccc34)cc2F)CC1]

115

1-N'-[2,5-Difluoro-4-(7-pyridin-3-ylquinolin-4-yl)oxyphenyl]-1-N-(4-fluorophenyl)cyclopropane-1,1-dicarboxamide (115): Compound 115 was synthesized from Compound 115C by the same method used to synthesize Compound 10 from Compound 8 in Example 3. ¹H NMR (400 MHz, CDCl₃) δ 10.19 (s, 1H), 9.03 (d, 1H), 8.75 (d, 1H), 8.68 (dd, 1H), 8.46 (d, 1H), 8.38 (dd, 1H), 8.33 (d, 1H), 8.25 (s, 1H), 8.09-8.04 (m, 1H), 7.85 (dd, 8.4 Hz, 1H), 7.50-7.43 (m, 3H), 7.13 (dd, 1H), 7.09-7.03 (m, 2H), 6.57 (dd, 1H), 1.87-1.80 (m, 2H), 1.71-1.65 (m, 2H); MS (EI) for $C_{31}H_{21}F_3N_4O_3$. found 555.3 (MH+).

Example 61: 1-N'-(4-Fluorophenyl)-1-N-[4-[7-(1,3-thiazol-5-yl)quinolin-4-yl]oxyphenyl]cyclopropane-1,1-dicarboxamide (116)

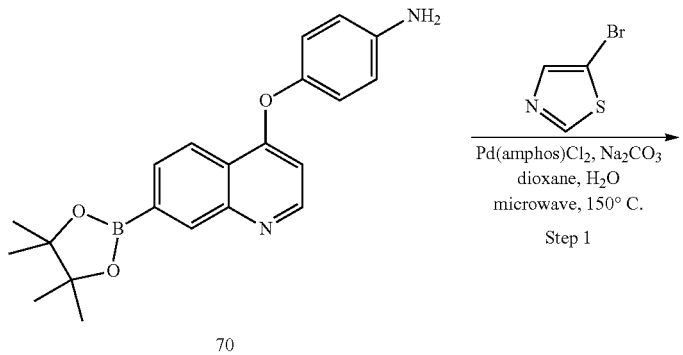

70

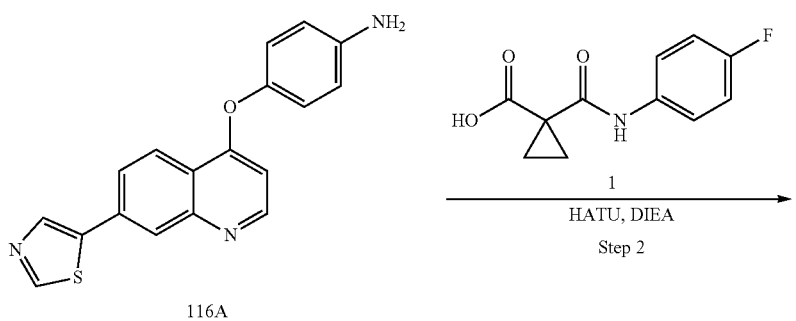

116A

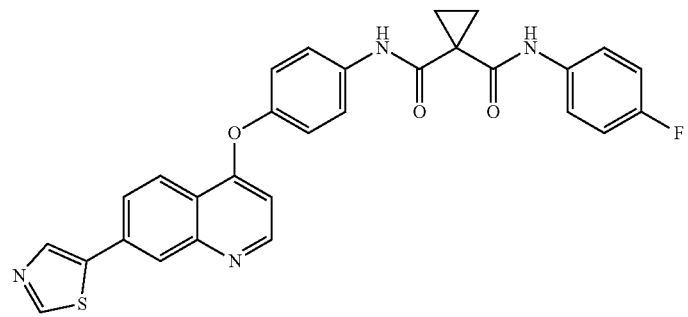 [SMILES: O=C(Nc1ccc(F)cc1)C1(C(=O)Nc2ccc(Oc3ccnc4cc(-c5cncs5)ccc34)cc2)CC1]

116

1-N'-(4-Fluorophenyl)-1-N-[4-[7-(1,3-thiazol-5-yl)quinolin-4-yl]oxyphenyl]cyclopropane-1,1-dicarboxamide (116): Compound 116 was synthesized from Compound 70 in two steps using the same procedures used to synthesize Compound 72A from Compound 70 in Steps 2 and 3 of Example 13. $^1$H NMR (400 MHz, DMSO-d$_6$) δ 10.21 (s, 1H), 10.05 (s, 1H), 9.21 (s, 1H), 8.72 (d, 1H), 8.60 (s, 1H), 8.37 (d, 1H), 8.29 (s, 1H), 8.00 (d, 1H), 7.78 (d, 2H), 7.63 (m, 2H), 7.27 (t, 2H), 7.15 (m, 2H), 6.58 (d, 1H), 1.47 (s, 4H); MS (EI) for C$_{29}$H$_{21}$FN$_4$O$_3$S. found 525 (MH+).

Example 62: 1-N'-(4-Fluorophenyl)-1-N-[4-[7-(1-methyl-2-oxopyridin-4-yl)quinolin-4-yl]oxyphenyl]cyclopropane-1,1-dicarboxamide hydrochloride (117)

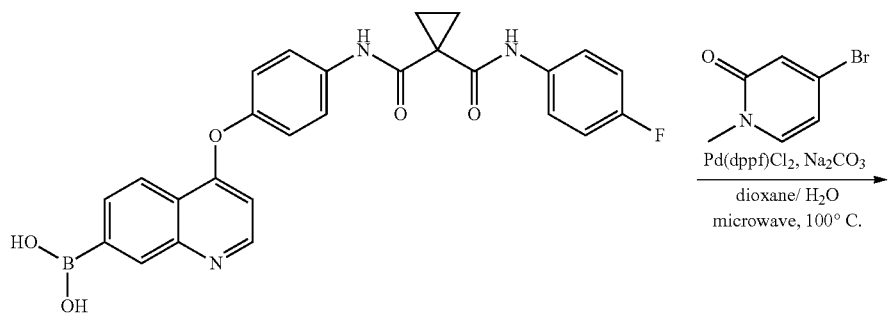

69A

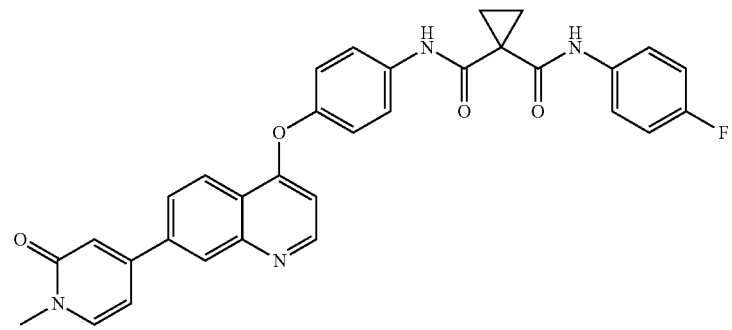 [SMILES: Cn1ccc(-c2ccc3c(Oc4ccc(NC(=O)C5(C(=O)Nc6ccc(F)cc6)CC5)cc4)ccnc3c2)cc1=O]

117

1-N'-(4-Fluorophenyl)-1-N-[4-[7-(1-methyl-2-oxopyridin-4-yl)quinolin-4-yl]oxyphenyl]cyclopropane-1,1-dicarboxamide hydrochloride (117): To a solution of Compound 69A (200 mg, 0.41 mmol, 1 eq) and 4-bromo-1-methylpyridin-2-one (155 mg, 0.82 mmol, 2 eq) in dioxane (3 mL) and water (0.2 mL) was added $Na_2CO_3$ (131 mg, 1.2 mmol, 3 eq) and Pd(dppf)$Cl_2$ (30.2 mg, 0.041 mmol, 0.1 eq) under an atmosphere of nitrogen. The mixture was stirred at 100° C. for 0.5 hours under microwave irradiation. The reaction mixture was extracted with DCM (3×20 mL). The combined organic extracts were washed with aq saturated NaCl (10 mL), dried over anhyd $Na_2SO_4$ and concentrated under reduced pressure. The resulting residue was purified by prep-HPLC (Column: Venusil ASB Phenyl 150*30 mm*5 μm, gradient: 26-56% of acetonitrile in water(0.05% HCl), flow rate: 25 mL/min) to give the HCl salt of Compound 117 as a yellow solid (79.7 mg, 35% yield). $^1$H NMR (400 MHz, DMSO-$d_6$) δ 10.34 (s, 1H), 10.05 (s, 1H), 9.05 (d, 1H), 8.61 (d, 1H), 8.51 (d, 1H), 8.23 (dd, 1H), 7.93 (d, 1H), 7.86 (d, 2H), 7.69-7.61 (m, 2H), 7.38 (d, 2H), 7.16 (t, 2H), 6.94 (d, 1H), 6.90 (d, 1H), 6.72 (dd, 1H), 3.51 (s, 3H), 1.49 (m, 4H); MS (EI) for $C_{32}H_{25}FN_4O_4$. found 549.1 (MH+).

Example 63: 1-N'-[4-[7-[1-(Difluoromethyl)pyrazol-4-yl]quinolin-4-yl]oxy-2,5-difluorophenyl]-1-N-(4-fluorophenyl)cyclopropane-1,1-dicarboxamide (118)

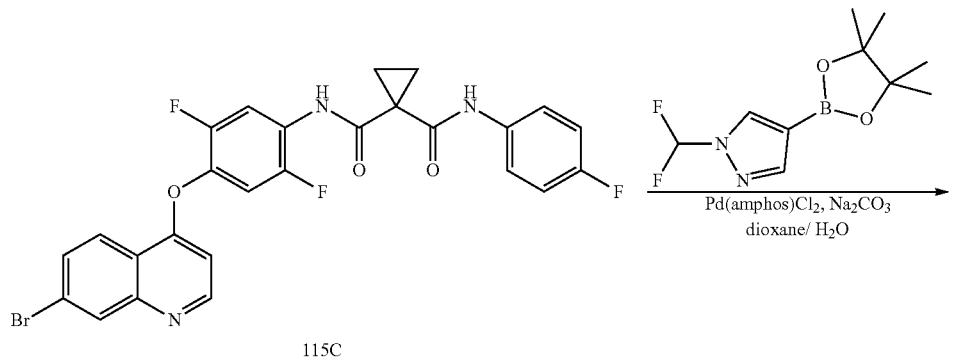

115C

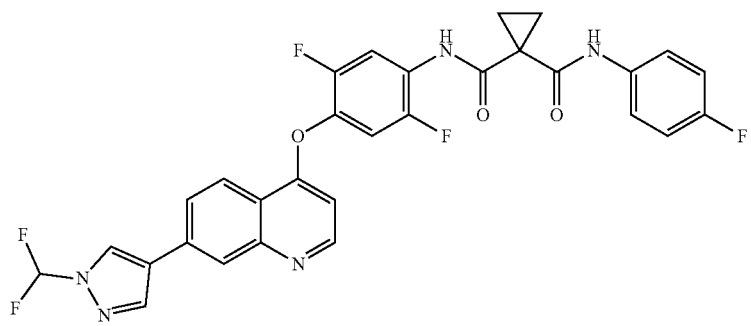 [SMILES: O=C(Nc1ccc(F)cc1)C1(C(=O)Nc2cc(F)c(Oc3ccnc4cc(-c5cnn(C(F)F)c5)ccc34)cc2F)CC1]

118

1-N'-[4-[7-[1-(Difluoromethyl)pyrazol-4-yl]quinolin-4-yl]oxy-2,5-difluorophenyl]-1-N-(4-fluorophenyl)cyclopropane-1,1-dicarboxamide (118): Compound 118 was synthesized from Compound 115C using a variation of the method used to synthesize Compound 10 from Compound 8 in Example 3. In this example the reaction mixture was heated to 80° C. for 2 h without microwave irradiation. $^1$H NMR (400 MHz, DMSO-d$_6$) δ 11.14 (s, 1H), 9.78 (s, 1H), 9.02 (s, 1H), 8.73 (d, 1H), 8.55 (s, 1H), 8.41 (d, 1H), 8.34 (d, 1H), 8.18 (dd, 1H), 8.06 (dd, 1H), 7.89 (t, 1H), 7.73 (dd, 1H), 7.60 (dd, 2H), 7.19 (t, 2H), 6.68 (d, 1H), 1.71-1.57 (m, 4H); MS (EI) for $C_{30}H_{20}F_5N_5O_3$. found 594.1 (MH+).

Example 64: 1-N'-(4-Fluorophenyl)-1-N-[4-[7-(1-methyl-6-oxopyridin-3-yl)quinolin-4-yl]oxyphenyl]cyclopropane-1,1-dicarboxamide hydrochloride (119)

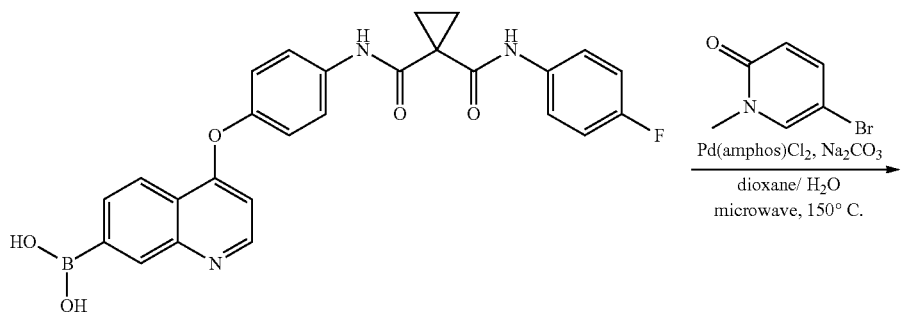

69A

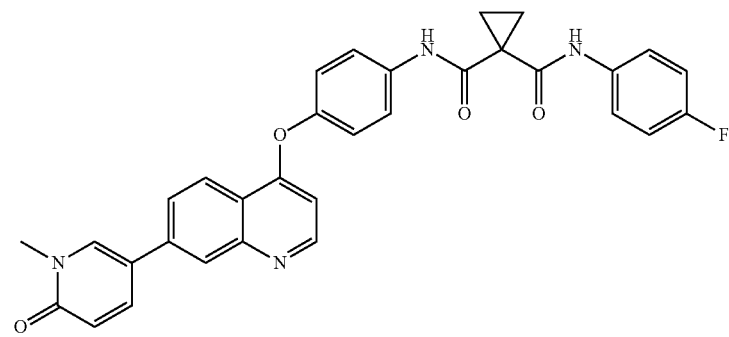 [SMILES: Cn1cc(-c2ccc3c(Oc4ccc(NC(=O)C5(C(=O)Nc6ccc(F)cc6)CC5)cc4)ccnc3c2)ccc1=O]

119

1-N'-(4-Fluorophenyl)-1-N-[4-[7-(1-methyl-6-oxopyridin-3-yl)quinolin-4-yl]oxyphenyl]cyclopropane-1,1-dicarboxamide hydrochloride (119): To a solution of 5-bromo-1-methyl-pyridin-2-one (116 mg, 0.62 mmol, 2 eq,) and Compound 69A (150 mg, 0.31 mmol, 1 eq) in dioxane (3 mL) and water (0.5 mL) was added Na$_2$CO$_3$ (98 mg, 0.93 mol, 3 eq) and Pd(amphos)Cl$_2$ (21.9 mg, 0.03 mmol, 0.022 mL, 0.1 eq) under an atmosphere of nitrogen. The mixture was stirred at 150° C. for 20 min under microwave irradiation. The reaction mixture was extracted with DCM (3×20 mL). The combined organic extracts were washed with aq saturated NaCl (10 mL) and concentrated in vacuo. The resulting residue was purified by prep-HPLC (Column: Venusil ASB Phenyl 150*30 mm*5p m, gradient: 35-65% of acetonitrile in water (0.05% HCl), flow rate: 30 mL/min) to give the HCl salt of Compound 119 as a yellow solid (60.6 mg, 36% yield). $^1$H NMR (400 MHz, DMSO-d$_6$) δ 10.35 (s, 1H), 10.05 (s, 1H), 8.99 (d, 1H), 8.60-8.55 (m, 2H), 8.36 (s, 1H), 8.23 (br d, 1H), 8.01 (dd, 1H), 7.87 (br d, 2H), 7.64 (dd, 2H), 7.40 (br d, 2H), 7.15 (t, 2H), 6.89 (d, 1H), 6.63 (d, 1H), 3.59 (s, 3H), 1.49 (br d, 4H); MS (EI) for C$_{32}$H$_{25}$FN$_4$O$_4$. found 594.2 (MH+).

Example 65: 1-N'-(4-Fluorophenyl)-1-N-[4-[7-(1H-imidazol-2-yl)-6-methylquinolin-4-yl]oxyphenyl]cyclopropane-1,1-dicarboxamide (120)

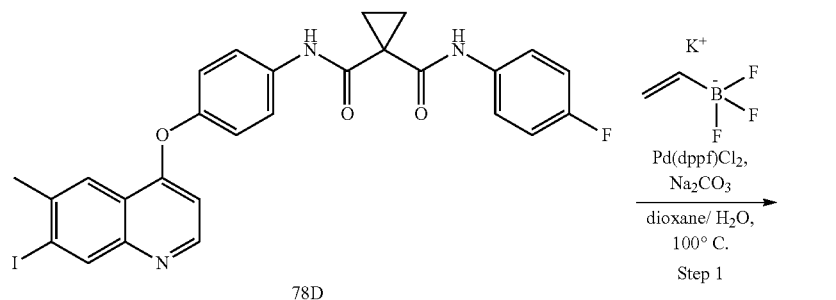

78D

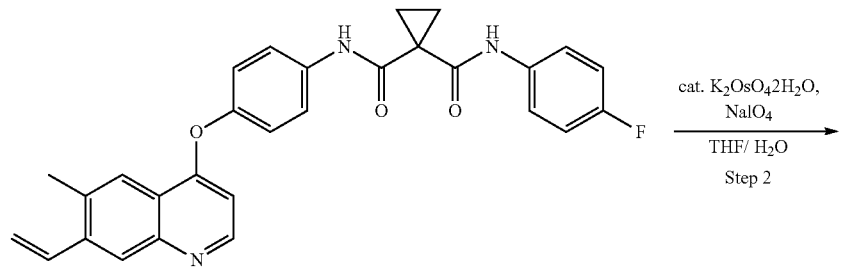

120A

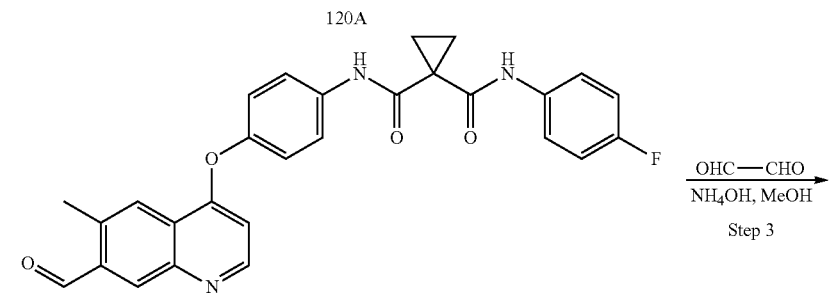

122E

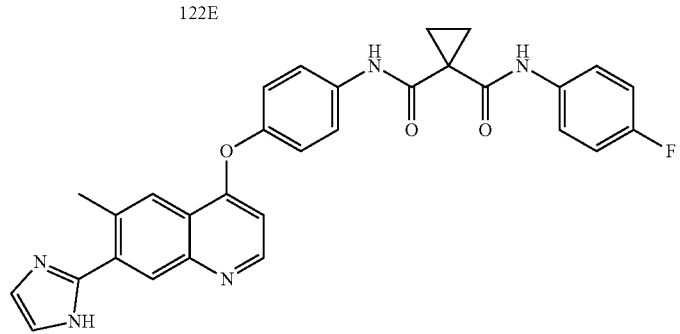

120

Step 1: N-(4-Fluorophenyl)-N-(4-((6-methyl-7-vinylquinolin-4-yl)oxy)phenyl)cyclopropane-1,1-dicarboxamide (120A): A mixture of potassium trifluoro(vinyl)borate (131 mg, 0.98 mmol, 1 eq), Compound 78D (570 mg, 0.98 mmol, 1 eq), $K_2CO_3$ (406 mg, 2.9 mmol, 3 eq) and $Pd(dppf)Cl_2$ (71.7 mg, 0.098 mmol, 0.1 eq) in dioxane (10 mL) and water (2 mL) was de-gassed and then heated to 100° C. with stirring for 3 h under an atmosphere of nitrogen. The reaction mixture was extracted with DCM (2×50 mL). The combined organic extracts were washed with aq saturated NaCl (10 mL) dried with anhyd $Na_2SO_4$ and concentrated in vacuo. The resulting residue was purified by silica gel chromatography (ISCO®; 12 g SepaFlash® Silica Flash Column, Eluent of 0~50% EtOAc/petroleum ether gradient @ 35 mL/min) to give Compound 120A as a brown solid (389 mg, 82% yield). MS (EI) for $C_{29}H_{24}FN_3O_3$. found 482.0 (MH+).

Step 2: N-(4-Fluorophenyl)-N-(4-((7-formyl-6-methylquinolin-4-yl)oxy)phenyl)cyclopropane-1,1-dicarboxamide (120B): To a stirred solution of Compound 120A (370 mg, 0.77 mmol, 1 eq) in THF (10 mL) and water (2 mL) was added $K_2OsO_4·2H_2O$ (28.3 mg, 0.077 mmol, 0.1 eq) at 0° C. and the resulting mixture was stirred at 0° C. for 15 min. $NaIO_4$ (657 mg, 3.1 mmol, 0.17 mL, 4 eq) was added and the mixture was stirred at 20° C. for 12 h. Water (50 mL) was added and the mixture was extracted with EtOAc (3×30 mL). The combined organic extracts were separated, dried over anhyd $Na_2SO_4$ and concentrated in vacuo. The resulting residue was purified by flash silica gel chromatography (ISCO®; 12 g SepaFlash® Silica Flash Column, Eluent of 50~80% EtOAc/petroleum ether gradient @ 35 mL/min) to give Compound 120B as a brown solid (300 mg, 81% yield). MS (EI) for $C_{28}H_{22}FN_3O_4$. found 484.0 (MH+).

Step 3: 1-N'-(4-Fluorophenyl)-1-N-[4-[7-(1H-imidazol-2-yl)-6-methylquinolin-4-yl]oxyphenyl]cyclopropane-1,1-dicarboxamide (120): To a mixture of Compound 120B (300 mg, 0.60 mmol, 1 eq) in MeOH (3 mL) was added oxoaldehyde (174 mg, 3.0 mmol, 0.16 mL, 5 eq) and $NH_3·H_2O$ (2.73 g, 21.8 mmol, 3 mL, 36.5 eq). The mixture was stirred at 60° C. for 5 h. The mixture was concentrated under vacuum and the resulting residue purified by prep-HPLC (Column: YMC Triart C18 150*25 mm*5 μm, gradient: 46-76% of acetonitrile in water (10 mM $NH_4HCO_3$), flow rate: 30 mL/min) to give Compound 120 as a light yellow solid (45.9 mg, 14% yield). $^1H$ NMR (400 MHz, DMSO-$d_6$) δ 12.71-12.52 (m, 1H), 10.37-9.90 (m, 2H), 8.64 (d, 1H), 8.27 (s, 1H), 8.19 (s, 1H), 7.78 (d, 2H), 7.68-7.60 (m, 2H), 7.30-7.23 (m, 3H), 7.20-7.10 (m, 3H), 6.54 (d, 1H), 2.79 (s, 3H), 1.48 (s, 4H); MS (EI) for $C_{30}H_{24}FN_5O_3$. found 522.1 (MH+).

Example 66: 1-N'-[2,5-Difluoro-4-[7-(1H-imidazol-2-yl)-6-methylquinolin-4-yl]oxyphenyl]-1-N-(4-fluorophenyl)cyclopropane-1,1-dicarboxamide (121)

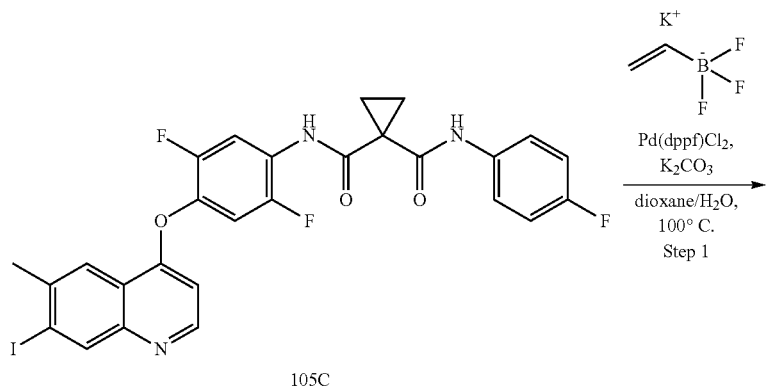

105C

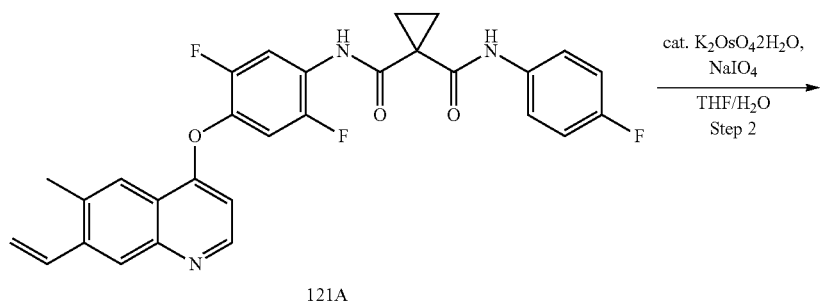

121A

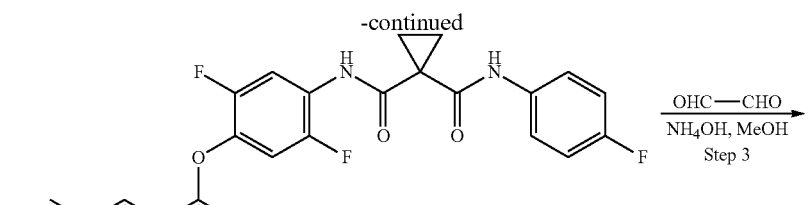

121B

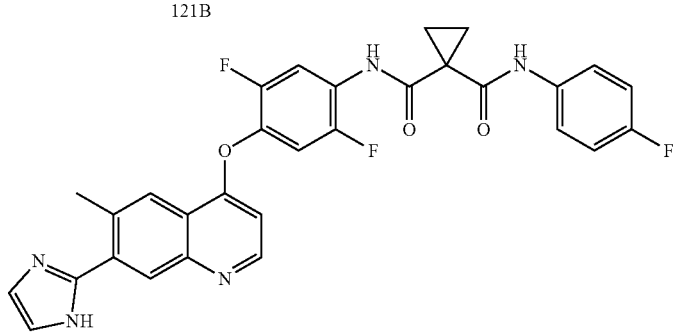

121

11-N'-[2,5-Difluoro-4-[7-(1H-imidazol-2-yl)-6-methylquinolin-4-yl]oxyphenyl]-1-N-(4-fluorophenyl)cyclopropane-1,1-dicarboxamide (121): Compound 121 was synthesized from Compound 105C using a variation of the three step process used to synthesize Compound 120 from Compound 78D in Example 65. The $Na_2CO_3$ in the first step was replaced with $K_2CO_3$. $^1H$ NMR (400 MHz, DMSO-$d_6$) δ 12.64 (s, 1H), 11.14 (s, 1H), 9.78 (s, 1H), 8.68 (d, 1H), 8.30 (s, 1H), 8.20 (s, 1H), 8.20-8.14 (m, 1H), 7.75-7.66 (m, 1H), 7.63-7.57 (m, 2H), 7.34 (s, 1H), 7.23-7.14 (m, 3H), 6.67 (d, 1H), 2.80 (s, 3H), 1.72-1.55 (m, 4H); MS (EI) for $C_{30}H_{22}F_3N_5O_3$. found 558.2 (MH+).

Example 67: N-(3-Fluoro-4-((7-iodo-6-methylquinolin-4-yl)oxy)phenyl)-N-(4-fluorophenyl)cyclopropane-1,1-dicarboxamide (122C)

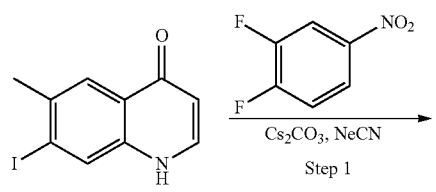

78B

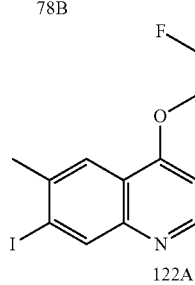

122A

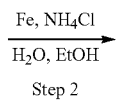

122B

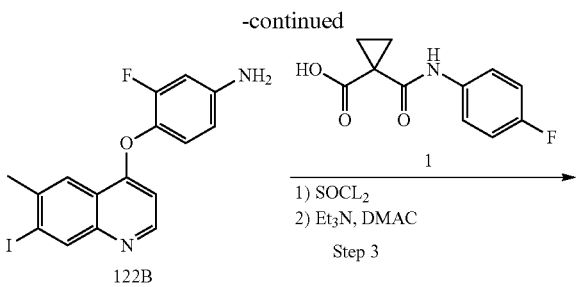

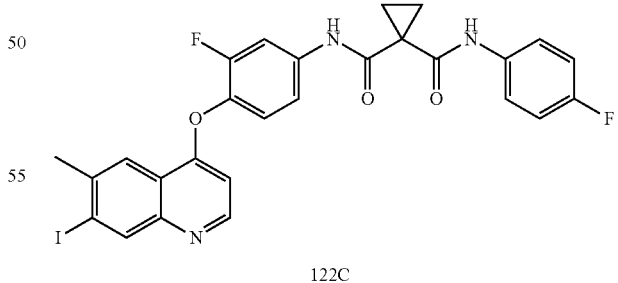

122C

N-(3-Fluoro-4-((7-iodo-6-methylquinolin-4-yl)oxy)phenyl)-N-(4-fluorophenyl)cyclopropane-1,1-dicarboxamide (122C): Compound 122C was synthesized from Compound 78B using the same three step sequence used to synthesize Compound 105C from Compound 78B in Example 47. MS (EI) for $C_{27}H_{20}F_2IN_3O_3$. found 600.0 (MH+).

Example 68: 1-N'-[3-Fluoro-4-[7-(1H-imidazol-2-yl)-6-methylquinolin-4-yl]oxyphenyl]-1-N-(4-fluorophenyl)cyclopropane-1,1-dicarboxamide (122)
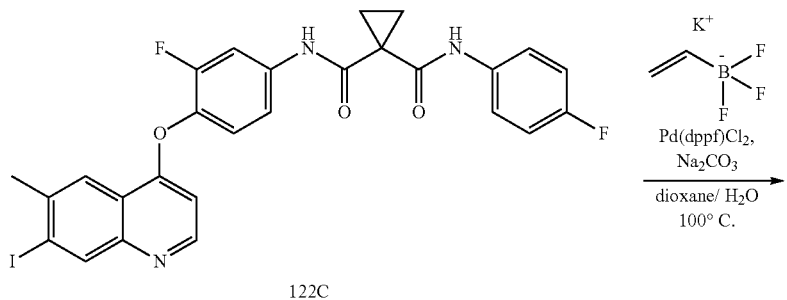
122C
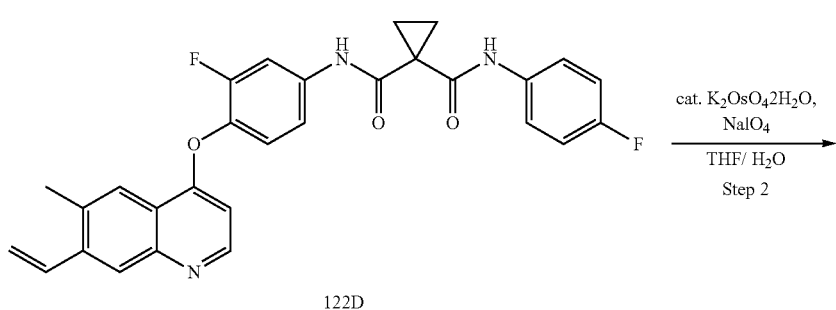
122D
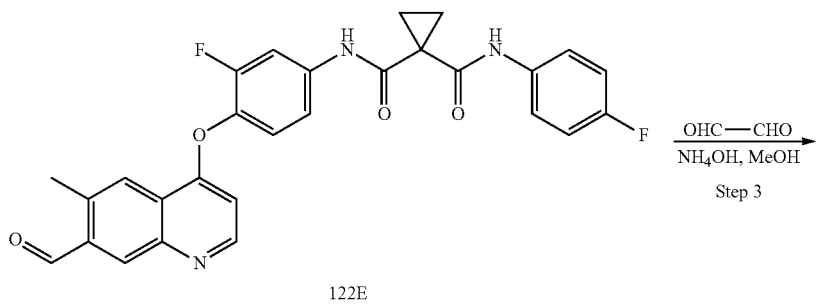
122E
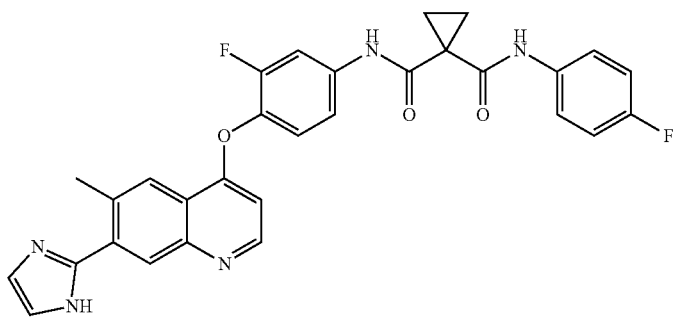 [SMILES: Cc1cc2c(Oc3ccc(NC(=O)C4(C(=O)Nc5ccc(F)cc5)CC4)cc3F)ccnc2cc1-c1ncc[nH]1]
122

1-N'-[3-Fluoro-4-[7-(1H-imidazol-2-yl)-6-methylquinolin-4-yl]oxyphenyl]-1-N-(4-fluorophenyl)cyclopropane-1,1-dicarboxamide (122): Compound 122 was synthesized from Compound 105C using the same three step process used to synthesize Compound 120 from Compound 78D in Example 65. $^1$H NMR (400 MHz, DMSO-$d_6$) δ 12.64 (br s, 1H), 10.41 (s, 1H), 10.2 (s, 1H), 8.66 (d, 1H), 8.28 (s, 1H), 8.22 (s, 1H), 7.92 (dd, 1H), 7.71-7.60 (m, 2H), 7.56-7.50 (m, 1H), 7.49-7.42 (m, 1H), 7.34 (s, 1H), 7.20-7.11 (m, 3H), 6.55 (d, 1H), 2.79 (s, 3H), 1.47 (d, 4H); MS (EI) for $C_{30}H_{23}F_2N_5O_3$. found 540.1 (MH+).

Example 69: 1-N'-[4-[7-[1-(Difluoromethyl)pyrazol-4-yl]quinolin-4-yl]oxy-3-fluorophenyl]-1-N-(4-fluorophenyl)cyclopropane-1,1-dicarboxamide hydrochloride (123)

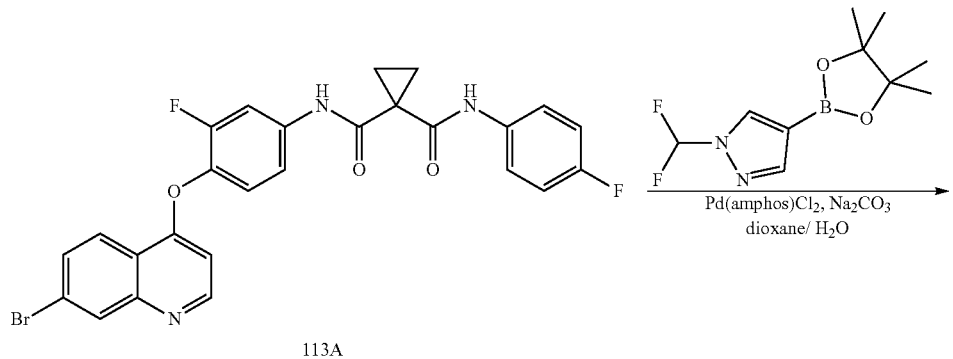

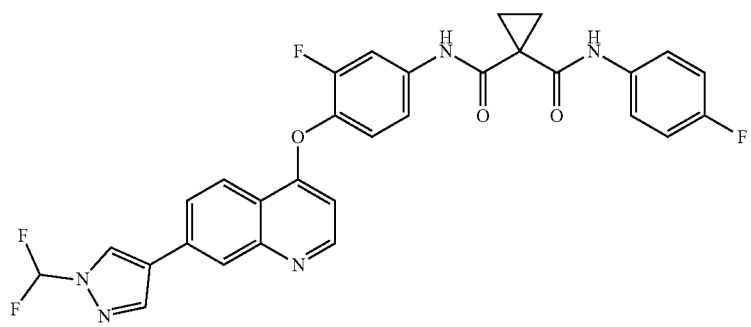 [SMILES: O=C(Nc1ccc(F)cc1)C1(C(=O)Nc2ccc(Oc3ccnc4cc(-c5cnn(C(F)F)c5)ccc34)c(F)c2)CC1]

1-N'-[4-[7-[1-(Difluoromethyl)pyrazol-4-yl]quinolin-4-yl]oxy-3-fluorophenyl]-1-N-(4-fluorophenyl)cyclopropane-1,1-dicarboxamide hydrochloride (123): Compound 123 was synthesized from Compound 113A using a variation of the method used to synthesize Compound 10 from Compound 8 in Example 3. In this example the reaction mixture was heated to 80° C. for 3 h without microwave irradiation. $^1$H NMR (400 MHz, DMSO-$d_6$) δ 10.49 (s, 1H), 10.01 (s, 1H), 9.10 (s, 1H), 8.93 (d, 1H), 8.57-8.51 (m, 2H), 8.42 (d, 1H), 8.24 (d, 1H), 7.97 (dd, Hz, 1H), 7.93 (t, 1H), 7.68-7.62 (m, 2H), 7.61-7.51 (m, 2H), 7.20-7.13 (m, 2H), 6.88 (m, 1H), 1.52-1.46 (m, 4H); MS (EI) for $C_{30}H_{21}F_4N_5O_3$. found 576.1 (MH+).

Example 70: 1-N-[4-[7-(5,6-Dihydro-4H-pyrrolo[1,2-b]pyrazol-2-yl)quinolin-4-yl]oxyphenyl]-1-N'-(4-fluorophenyl)cyclopropane-1,1-dicarboxamide hydrochloride (124)

1-N-[4-[7-(5,6-Dihydro-4H-pyrrolo[1,2-b]pyrazol-2-yl)quinolin-4-yl]oxyphenyl]-1-N'-(4-fluorophenyl)cyclopropane-1,1-dicarboxamide hydrochloride (124): To a solution of Compound 64 (450 mg, 0.97 mmol, 1 eq) in xylene (15 mL) was added Compound 124A (1 g, 7.9 mmol, 8.2 eq) and the mixture was stirred at 140° C. for 120 h. The reaction mixture was diluted with EtOAc, washed with water, aq saturated NaCl, dried over anhyd $Na_2SO_4$ and concentrated under reduced pressure. The resulting residue was purified by prep-HPLC (column: Venusil ASB Phenyl 150*30 mm*5 μm ([water(0.05% HCl)-MeCN]; B %: 40%-70%, 9 min) to give the HCl salt of Compound 124 as a yellow solid (59.6 mg, 11% yield). $^1$H NMR (400 MHz, DMSO-$d_6$) δ 10.36 (s, 1H), 10.06 (s, 1H), 8.99 (br d, 1H), 8.67-8.52 (m, 2H), 8.37 (br d, 1H), 7.87 (br d, 2H), 7.65 (br dd, 2H), 7.40 (br d, 2H), 7.15 (br t, 2H), 6.88 (d, 1H), 6.77 (s, 1H), 4.29-4.10 (m, 2H), 2.93 (br t, 2H), 2.64-2.56 (m, 2H), 1.49 (br s, 4H); MS (EI) for $C_{32}H_{26}FN_5O_3$. found 548.1 (MH+).

Example 71: N-(4-Fluorophenyl)-N-(4-hydroxyphenyl)-N-methylcyclopropane-1,1-dicarboxamide (125)

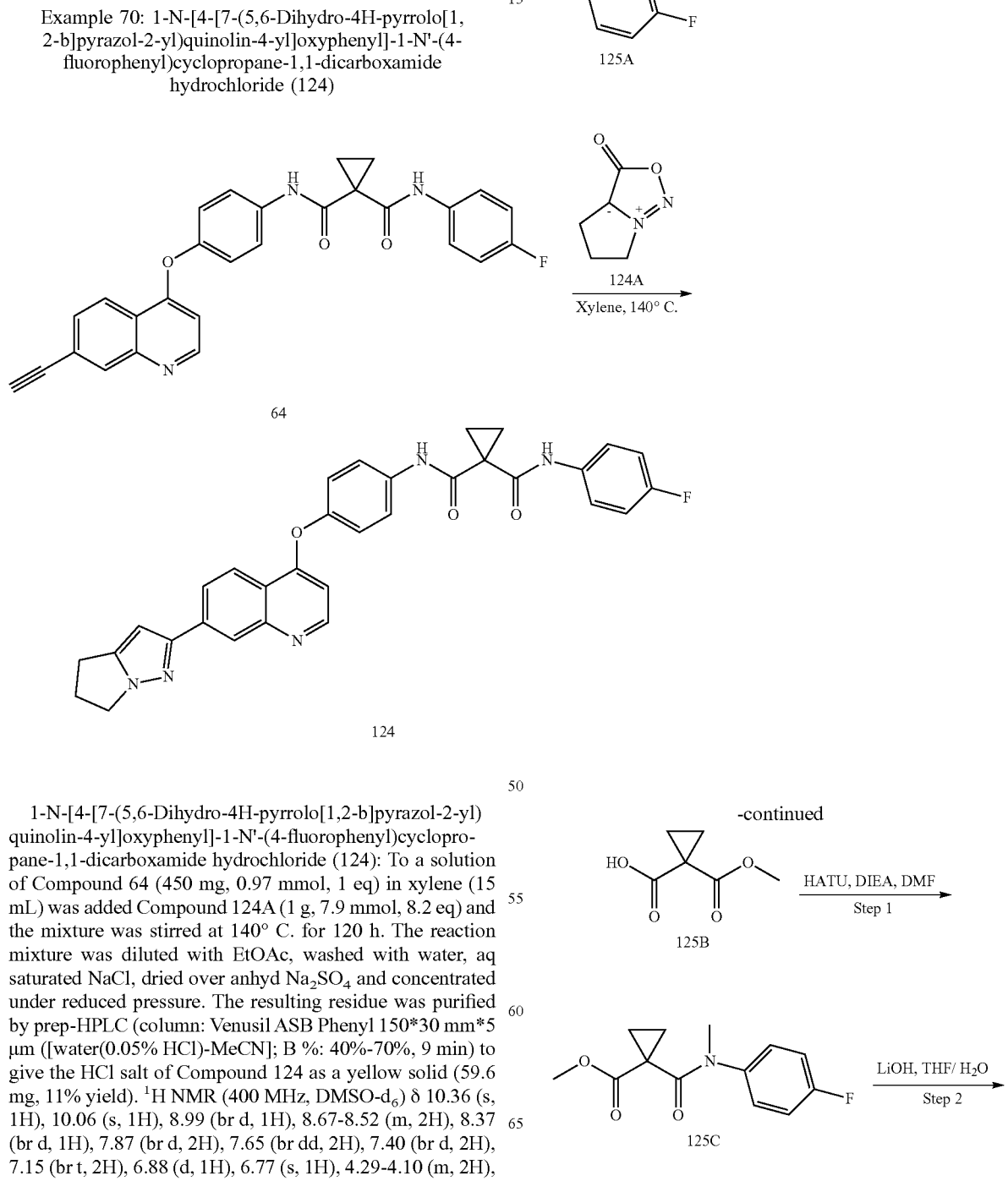

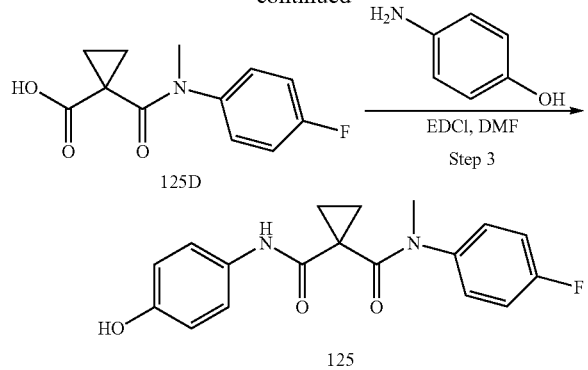

Step 1: Methyl 1-((4-fluorophenyl)(methyl)carbamoyl) cyclopropane-1-carboxylate (125C): HATU (73 g, 192.0 mmol, 1.2 eq) was added to a solution of Compound 125A (20 g, 160 mmol, 19.2 mL, 1 eq), Compound 125B (23 g, 160 mmol, 1 eq) and DIEA (59 g, 456 mmol, 79.5 mL, 2.9 eq) in DMF (100 mL). The reaction mixture was stirred at 10-20° C. for 17 h. The mixture was diluted with water (500 mL) and extracted with EtOAc (2×500 mL). The combined organic extracts were washed with aq saturated NaCl (3×100 mL), dried over anhyd $Na_2SO_4$ and concentrated under vacuum to give crude Compound 125C as a brown oil (85 g) which was used subsequent reactions without further purification. MS (EI) for $C_{13}H_{14}FNO_3$. found 251.9 (MH+).

Step 2: 1-((4-Fluorophenyl)(methyl)carbamoyl)cyclopropane-1-carboxylic acid (125D): To a solution of Compound 125C (40 g, 79.6 mmol, 1 eq) in THF (200 mL) and water (40 mL) was added LiOH·$H_2O$ (6.68 g, 159 mmol, 2 eq). The mixture was stirred at 50° C. for 6 h. The mixture was concentrated under vacuum to remove the organic solvents. The resulting aqueous mixture was washed with EtOAc (300 mL) and then acidified to pH 4-5 with aq 12 M HCl. The resulting precipitate was collected by filtration and dried under vacuum to give Compound 125D as a yellow solid (9.0 g, 47% yield). $^1$H NMR (400 MHz, DMSO-$d_6$) δ 12.53 (br s, 1H), 7.35 (br d, 2H), 7.23-7.19 (m, 2H), 3.13 (s, 3H), 1.20 (br s, 2H), 0.96 (br s, 2H); MS (EI) for $C_{12}H_{12}FNO_3$. found 237.8 (MH+).

Step 3: N-(4-Fluorophenyl)-N-(4-hydroxyphenyl)-N-methylcyclopropane-1,1-dicarboxamide (125): EDCI (1.94 g, 10.1 mmol, 1.2 eq) was added to a solution of Compound 125D (2 g, 8.4 mmol, 1 eq) and 4-aminophenol (920 mg, 8.4 mmol, 1.3 mL, 1 eq) in DMF (20 mL). The reaction mixture was stirred at 25° C. for 12 h. The mixture was poured into aq NaHCO$_3$(50 mL). The resulting precipitate was filtered and washed with water (0.5 L). The solid was then dissolved in EtOAc (1 L), dried over anhyd $Na_2SO_4$ and concentrated under vacuum to give crude Compound 125 as a yellow solid (1.7 g, 61% yield) which was used in subsequent reactions without further purification. $^1$H NMR (400 MHz, DMSO-$d_6$) δ 9.14 (s, 2H), 7.36-7.24 (m, 2H), 7.17-6.96 (m, 4H), 6.61 (d, 2H), 3.21 (s, 3H), 1.34-1.28 (m, 2H), 1.17 (br d, 2H); MS (EI) for $C_{18}H_{17}FN_2O_3$. found 329.0 (MH+).

Example 72: 1-N-[4-[7-[1-(Difluoromethyl)pyrazol-4-yl]quinolin-4-yl]oxyphenyl]-1-N'-(4-fluorophenyl)-1-N'-methylcyclopropane-1,1-dicarboxamide (126)

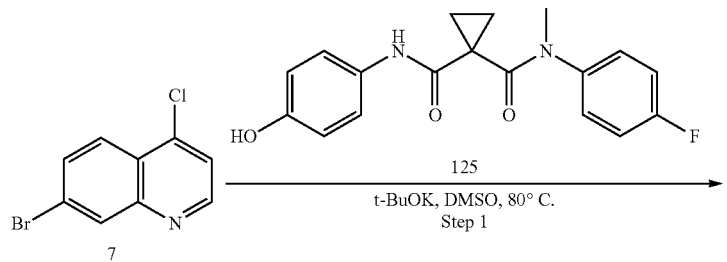

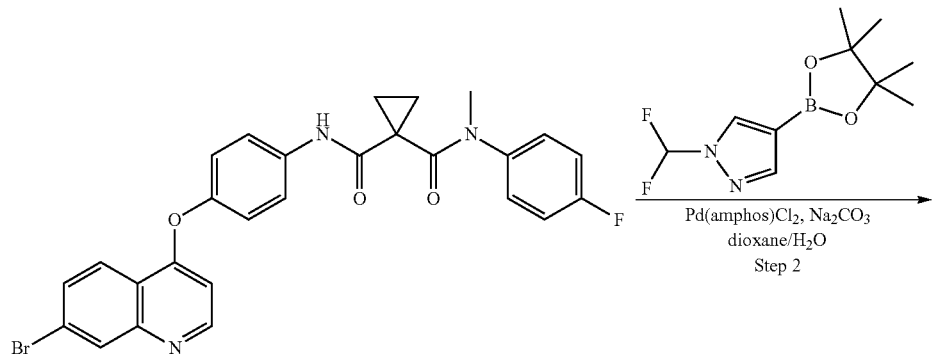

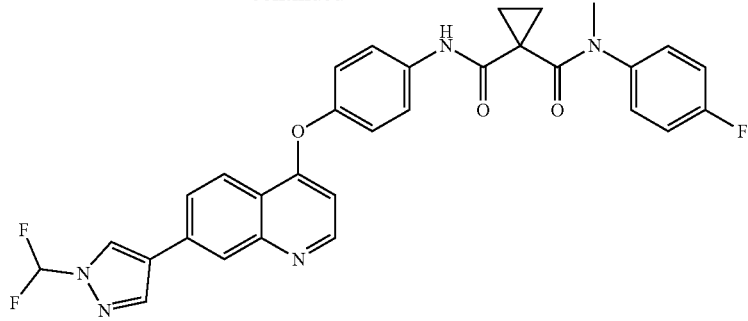 [SMILES: CN(C(=O)C1(C(=O)Nc2ccc(Oc3ccnc4cc(-c5cnn(C(F)F)c5)ccc34)cc2)CC1)c1ccc(F)cc1]

126

Step 1: N-(4-((7-Bromoquinolin-4-yl)oxy)phenyl)-N-(4-fluorophenyl)-N-methylcyclopropane-1,1-dicarboxamide (126A): Compound 7 (199 mg, 0.82 mmol, 0.9 eq) was added to the mixture of t-BuOK (206 mg, 1.8 mmol, 2 eq) and Compound 125 (300 mg, 0.91 mmol, 1 eq) in DMSO (1 mL). The resulting mixture was heated and stirred at 80° C. for 12 h then poured into water (30 mL). The resulting precipitate was filtered, washed with water, dissolved in EtOAc (100 mL), dried over anhyd $Na_2SO_4$ and concentrated under vacuum to give crude Compound 126A as a brown solid which was used in subsequent reactions without further purification. $^1$H NMR (400 MHz, DMSO-$d_6$) δ 9.71 (br s, 1H), 8.71 (d, 1H), 8.31-8.21 (m, 2H), 7.85-7.76 (m, 1H), 7.47 (br s, 2H), 7.29 (br s, 2H), 7.19 (br d, 2H), 7.10 (br t, 2H), 6.60 (d, 1H), 3.24 (s, 3H), 1.44-1.37 (m, 2H), 1.23 (br s, 2H).; MS (EI) for $C_{27}H_{21}BrFN_3O_3$. found 536.0 (MH+).

Step 2: 1-N-[4-[7-[1-(Difluoromethyl)pyrazol-4-yl]quinolin-4-yl]oxyphenyl]-1-N'-(4-fluorophenyl)-1-N'-methyl-cyclopropane-1,1-dicarboxamide (126): To a mixture of Compound 126A (200 mg, 0.37 mmol, 1 eq), 1-(difluoromethyl)-4-(4,4,5,5-tetramethyl-1,3,2-dioxaborolan-2-yl)pyrazole (137 mg, 0.56 mmol, 1.5 eq) and $Na_2CO_3$ (119 mg, 1.1 mmol, 3 eq) in dioxane (3 mL) and water (1 mL) was added Pd(amphos)Cl$_2$ (31.8 mg, 0.045 mmol, 0.032 mL, 0.12 eq) at 25° C. under an atmosphere of nitrogen. The mixture was then heated to 90° C. with stirring for 12 h under nitrogen. The reaction mixture was concentrated, diluted with water (20 mL) and extracted with EtOAc (2×30 mL). The combined organic extracts were washed with aq saturated NaCl (50 mL), dried over anhyd $Na_2SO_4$ and concentrated. The resulting residue was purified by flash silica gel chromatography (ISCO®; 4 g SepaFlash® Silica Flash Column, Eluent of 30~100% EtOAc/Petroleum ether gradient @ 30 mL/min) to give Compound 126 as a white solid (88 mg, 41% yield). $^1$H NMR (400 MHz, DMSO-$d_6$) δ 9.69 (br s, 1H), 9.01 (s, 1H), 8.70 (d, 1H), 8.54 (s, 1H), 8.39 (s, 1H), 8.33 (d, 1H), 8.07-8.00 (m, 1H), 7.92-7.73 (m, 1H), 7.48 (br s, 2H), 7.36-7.28 (m, 2H), 7.20 (d, 2H), 7.11 (br t, 2H), 6.54 (d, 1H), 3.25 (s, 3H), 1.45-1.38 (m, 2H), 1.24 (br s, 2H); MS (EI) for $C_{31}H_{24}F_3N_5O_3$. found 572.1 (MH+).

BIOLOGICAL EXAMPLES

Example A: Kinase Assays

Kinase activity and compound inhibition were investigated using the $^{33}$P-Phosphoryl transfer radiometric kinase assay, performed using the KinaseProfiler™ service of Eurofins Pharma Discovery Services UK Limited. Dose-response experiments were performed using nine compound concentrations in a 96-well microtiter plate. For each assay, all compounds were prepared to a 50× final assay concentration (50 μM) in 100% DMSO, then diluted in a half-log series, with the final top concentration at 1 μM. This working stock of the compound was added to the assay well as the first component in the reaction, followed by the remaining components as detailed in the following assay protocols below. The positive control wells (100% kinase activity) contain all components of the reaction including 2% DMSO (control for solvent effects), except the compound of interest. Blank wells contain all components of the reaction, with the reference inhibitor, staurosporine. This reference compound was used to abolish kinase activity and generated the 0% kinase activity base-line. $IC_{50}$ values were calculated by nonlinear regression analysis using the sigmoidal dose-response (variable slope) curve fit on XLFit version 5.3 (ID Business Solutions).

Example B: Human AXL Kinase Assay

Human Axl (residues H473-A894 with Q764R, 161 nM) was incubated with 8 mM MOPS pH 7.0, 0.2 mM EDTA, 250 μM KKSRGDYMTMQIG, 10 mM magnesium acetate, and 10 μM [γ-$^{33}$P-ATP]. The reaction was initiated by the addition of the Mg/ATP mix. After incubation for 40 minutes at room temperature, the reaction was stopped by the addition of phosphoric acid to a concentration of 0.5%. A reaction aliquot of 10 μL was then spotted onto a P30 filtermat and washed four times for 4 minutes in 0.425% phosphoric acid and once in methanol prior to drying and scintillation counting. Incorporated $^{33}$P was measured using the Wallac Microbeta scintillation counter (Perkin Elmer).

Example C: Human KDR Kinase Assay

Human KDR (residues K790-V1356, 55 nM) was incubated with 8 mM MOPS pH 7.0, 0.2 mM EDTA, 0.33 mg/mL myelin basic protein, 10 mM magnesium acetate, and 10 μM [γ-$^{33}$P-ATP]. The reaction was initiated by the addition of the Mg/ATP mix. After incubation for 40 minutes at room temperature, the reaction was stopped by the addition of phosphoric acid to a concentration of 0.5%. A reaction aliquot of 10 μL was then spotted onto a P30 filtermat and washed four times for 4 minutes in 0.425% phosphoric acid and once in methanol prior to drying and scintillation counting. Incorporated $^{33}$P was measured using the Wallac Microbeta scintillation counter (Perkin Elmer).

Example D: Human Mer Kinase Assay

Human Mer (residues R557-E882 with H628Q and R794A, 0.7 nM) was incubated with 8 mM MOPS pH 7.0, 0.2 mM EDTA, 30 mM NaCl, 250 µM GGMEDIYFEFMGGKKK, 10 mM magnesium acetate and 10 µM [γ-$^{33}$P-ATP]. The reaction was initiated by the addition of the Mg/ATP mix. After incubation for 40 minutes at room temperature, the reaction was stopped by the addition of phosphoric acid to a concentration of 0.5%. A reaction aliquot of 10 µL was then spotted onto a P30 filtermat and washed four times for 4 minutes in 0.425% phosphoric acid and once in methanol prior to drying and scintillation counting. Incorporated $^{33}$P was measured using the Wallac Microbeta scintillation counter (Perkin Elmer).

Example E: Human Met Kinase Assay

Human Met (residues R974-S1390 with A1209G and V1290L, 3.4 nM) was incubated with 8 mM MOPS pH 7.0, 0.2 mM EDTA, 250 µM KKKGQEEEYVFIE, 1 mM sodium orthovanadate, 5 mM sodium-6-glycerophosphate, 10 mM magnesium acetate, and 10 µM [γ-$^{33}$P-ATP]. The reaction was initiated by the addition of the Mg/ATP mix. After incubation for 40 minutes at room temperature, the reaction was stopped by the addition of phosphoric acid to a concentration of 0.5%. A reaction aliquot of 10 µL was then spotted onto a P30 filtermat and washed four times for 4 minutes in 0.425% phosphoric acid and once in methanol prior to drying and scintillation counting. Incorporated $^{33}$P was measured using the Wallac Microbeta scintillation counter (Perkin Elmer).

Activity data obtained for the Example compounds using the kinase assays in Examples A, B, C, D and E is provided in Table 2 (A: $IC_{50} \leq 10$ nM; B: 10 nM$<IC50 \leq 100$ nM; C: 100 nM$<IC_{50} \leq 1000$ nM; D: $IC_{50}>1000$ nM).

TABLE 2

Biochemical activity of selected compounds of the invention

| Compound No. | Axl IC$_{50}$ (nM) | Mer IC$_{50}$ (nM) | c-Met IC$_{50}$ (nM) | KDR IC$_{50}$ (nM) |
|---|---|---|---|---|
| 10 | A | A | B | B |
| 11 | A | A | A | B |
| 12 | B | A | B | B |
| 13 | B | A | A | B |
| 14 | A | A | A | B |
| 15 | A | A | A | B |
| 16 | B | A | B | B |
| 17 | B | A | A | B |
| 18 | A | A | A | A |
| 19 | A | A | A | B |
| 20 | A | A | A | B |
| 22 | B | A | A | B |
| 23 | B | A | B | B |
| 24 | A | A | A | B |
| 25 | B | A | A | B |
| 26 | B | A | A | B |
| 27 | A | A | A | A |
| 28 | B | A | A | B |
| 53 | C | B | B | B |
| 54 | B | A | A | B |
| 57 | A | A | A | B |
| 60 | A | A | A | B |
| 61 | A | A | A | B |
| 62 | A | A | A | B |
| 63 | C | C | B | C |
| 64 | B | B | A | B |
| 65 | C | C | C | C |
| 66 | B | A | A | B |
| 67 | A | A | A | B |
| 68 | B | A | A | B |
| 69 | A | A | A | B |
| 72 | A | A | A | B |
| 73 | B | A | A | B |
| 74 | A | A | A | B |

TABLE 2-continued

Biochemical activity of selected compounds of the invention

| Compound No. | Axl IC$_{50}$ (nM) | Mer IC$_{50}$ (nM) | c-Met IC$_{50}$ (nM) | KDR IC$_{50}$ (nM) |
|---|---|---|---|---|
| 75 | B | A | A | B |
| 76 | A | A | A | B |
| 77 | B | A | A | B |
| 78 | A | A | A | B |
| 79 | A | A | A | B |
| 80 | B | C | B | C |
| 81 | A | B | A | B |
| 82 | B | A | B | B |
| 82A | C | C | C | C |
| 83 | B | A | A | B |
| 84 | B | A | B | B |
| 85 | B | A | B | B |
| 86 | A | A | A | B |

Example F: AXL Autophosphorylation ELISA in A-172 Cells

A-172 glioblastoma cells (ATCC #CRL-1620) were seeded at 2.5×10$^5$ cells/well onto 24-well plates (Greiner #662165), in DMEM (Thermo Fisher #11995-040) containing 10% FBS (Thermo Fisher #26140-079), 1% MEM NEAA (Thermo Fisher #11140-050), 1% GlutaMax (Thermo Fisher #35050-061) and 1% Penicillin Streptomycin (Thermo Fisher #15140-122). A-172 cells were incubated at 37° C., 5% CO$_2$ for 24 h and then starved for 24 h in serum-free medium. Test compounds were serially diluted to produce an 8-point dose curve in fresh serum-free medium to a final concentration of 0.3% DMSO (vehicle) and added to the cells and incubated for 1 h. Cells were then stimulated with 1 µg/mL recombinant human Gas6 (R&D Systems #885-GSB-500) for 15 min, washed with cold PBS and immediately lysed with 150 µL of cold 1× lysis buffer [20 mM Tris, 137 mM sodium chloride, 2 mM EDTA, 10% glycerol, 1% NP-40 alternative, 1 mM activated sodium orthovanadate, 1 mM PefaBloc SC (Sigma-Aldrich #11429868001), protease/phosphatase inhibitor tablet (Thermo Fisher #A32959)]. Lysates were collected and 100 µL/well added into the human phospho-AXL DuoSet IC ELISA (R&D Systems #DYC2228-2). Assay was performed according to manufacturer's instructions and sample phospho-AXL concentrations were extrapolated using human phospho-AXL control (R&D Systems #841645) as a standard. Positive control wells (100% activity) contained Gas6-stimulated, DMSO-treated cell lysates. Negative control wells (0% activity) contained Gas6-stimulated, reference inhibitor-treated cell lysates. IC$_{50}$ values were calculated by nonlinear regression analysis using a 4-parameter logistic curve fit in ActivityBase XE (IDBS).

Example G: Met Autophosphorylation ELISA in PC-3 Cells

PC-3 prostate cancer cells (ATCC #CRL-1435) were seeded at 4×10$^4$ cells/well onto 24-well plates (Greiner #662165), in DMEM (Thermo Fisher #11995-040) containing 10% FBS (Thermo Fisher #26140-079), 1% MEM NEAA (Thermo Fisher #11140-050), 1% GlutaMax (Thermo Fisher #35050-061), and 1% Penicillin Streptomycin (Thermo Fisher #15140-122). PC-3 cells were incubated at 37° C., 5% CO$_2$ for 24 h and then starved for 3 h in serum-free medium. Test compounds were serially diluted to produce an 8-point dose curve in fresh serum-free medium to a final concentration of 0.3% DMSO (vehicle) and added to the cells and incubated for 1 h. Cells were then stimulated with 100 ng/mL recombinant human HGF (R&D Systems #294-HG-250) for 10 min, washed with cold PBS and immediately lysed with 130 µL of cold 1× lysis buffer [20 mM Tris, 137 mM sodium chloride, 2 mM EDTA, 10% glycerol, 1% NP-40 alternative, 1 mM activated sodium orthovanadate, 1 mM PefaBloc SC (Sigma-Aldrich #11429868001), protease/phosphatase inhibitor tablet (Thermo Fisher #A32959)]. Lysates were clarified by centrifugation and 100 µL/well added into the PathScan phospho-Met (panTyr) Sandwich ELISA (Cell Signaling Technology #7333). Assay was performed according to manufacturer's instructions. Positive control wells (100% activity) contained HGF-stimulated, DMSO-treated cell lysates. Negative control wells (0% activity) contained HGF-stimulated, reference inhibitor-treated cell lysates. $IC_{50}$ values were calculated by nonlinear regression analysis using a 4-parameter logistic curve fit in ActivityBase XE (IDBS).

Example H: KDR Autophosphorylation ELISA in HUVEC Cells

Human umbilical vein endothelial cells or HUVEC (Lonza #C2519A) were seeded at $2\times10^4$ cells/well onto 96-well plates (Corning #3904), in EGM-2 growth medium (Lonza #CC-3162) containing 1% Penicillin Streptomycin (Thermo Fisher #15140-122). HUVEC cells were incubated at 37° C., 5% $CO_2$ for 24 h and then starved for 24 h in serum-free EBM-2 basal medium (Lonza #CC-3156) containing 1% Penicillin Streptomycin. Test compounds were serially diluted to produce an 8-point dose curve in fresh serum-free medium to a final concentration of 0.3% DMSO (vehicle) and added to the cells and incubated for 1 h. Cells were then stimulated with 100 ng/mL recombinant human VEGF165 (R&D Systems #293-VE-500) for 5 min, washed with cold PBS, and immediately lysed with 130 µL of cold 1× lysis buffer [20 mM Tris, 137 mM sodium chloride, 2 mM EDTA, 10% glycerol, 1% NP-40 alternative, 1 mM activated sodium orthovanadate, 1 mM PefaBloc SC (Sigma-Aldrich #11429868001), protease/phosphatase inhibitor tablet (Thermo Fisher #A32959)]. Lysates were collected and 100 µL/well added into the human phospho-KDR DuoSet IC ELISA (R&D Systems #DYC1766-2). Assay was performed according to manufacturer's instructions and sample phospho-KDR concentrations were extrapolated using human phospho-KDR control (R&D Systems #841421) as a standard. Positive control wells (100% activity) contained VEGF165-stimulated, DMSO-treated cell lysates. Negative control wells (0% activity) contained non-stimulated cell lysates. $IC_{50}$ values were calculated by nonlinear regression analysis using a 4-parameter logistic curve fit in ActivityBase XE (IDBS).

Example I: Mer Autophosphorylation ELISA in Transient Transfected 293A Cells 293A cells (Thermo Fisher #R70507) were seeded at $1.5\times10^6$ cells/well onto 100 mm dish (Greiner #664169), in DMEM (Thermo Fisher #11995-040) containing 10% FBS (Thermo Fisher #26140-079), 1% MEM NEAA (Thermo Fisher #11140-050), 1% GlutaMax (Thermo Fisher #35050-061), and 1% Penicillin Streptomycin (Thermo Fisher #15140-122). 293A cells were incubated at 37° C., 5% $CO_2$ for 24 h and then transfected with 6 µg MERTK DNA (Genecopoeia #EX-Z8208-M02) using TransIT LT1 transfection reagent (Mirus-Bio #MIR2305). After 24 h incubation, the transfected 293A cells were seeded at $1\times10^5$ cells/well onto 96-well plates (Corning #3904) in DMEM growth medium overnight. Test compounds were serially diluted to produce an 8-point dose curve in fresh serum-free medium to a final concentration of 0.3% DMSO (vehicle) and added to the cells and incubated for 1 h. Cells were then immediately lysed with 150 µL of cold 1× lysis buffer [20 mM Tris, 137 mM sodium chloride, 2 mM EDTA, 10% glycerol, 1% NP-40 alternative, 1 mM activated sodium orthovanadate, 1 mM PefaBloc SC (Sigma-Aldrich #11429868001), protease/phosphatase inhibitor tablet (Thermo Fisher #A32959)]. Lysates were clarified by centrifugation and 50 µL/well added into the human phospho-Mer DuoSet IC ELISA (R&D Systems #DYC2579-2). Assay was performed according to manufacturer's instructions and sample phospho-Mer concentrations were extrapolated using human phospho-Mer control (R&D Systems #841793) as a standard. Positive control wells (100% activity) contained DMSO-treated cell lysates. Negative control wells (0% activity) contained reference inhibitor-treated cell lysates. $IC_{50}$ values were calculated by nonlinear regression analysis using a 4-parameter logistic curve fit in ActivityBase XE (IDBS).

Compounds of the present disclosure, as exemplified herein, showed $IC_{50}$ values in the following ranges: A: $IC_{50} \leq 10$ nM; B: 10 nM $< IC_{50} \leq 100$ nM; C: 100 nM $< IC_{50} \leq 300$ nM; D: $IC_{50} > 300$ nM. "NT" means not tested Activity data obtained for the Example compounds using cell based kinase assays in Examples F, G, H and I is provided in Table 3.

TABLE 3

Cellular activity of selected compounds of the invention

| Compound No. | Axl $IC_{50}$ (nM) | Mer $IC_{50}$ (nM) | c-Met $IC_{50}$ (nM) | KDR $IC_{50}$ (nM) |
|---|---|---|---|---|
| 10 | A | A | B | B |
| 11 | A | A | A | A |
| 12 | B | C | B | B |
| 13 | A | B | B | A |
| 14 | A | A | A | B |
| 15 | A | A | B | B |
| 16 | B | B | B | A |
| 17 | B | B | B | A |
| 18 | A | A | A | A |
| 19 | A | A | B | B |
| 20 | A | A | B | A |
| 21 | A | B | B | A |
| 22 | B | A | B | B |
| 23 | B | B | B | B |
| 24 | A | A | A | A |
| 25 | B | B | B | A |
| 26 | A | B | A | A |
| 27 | B | B | B | B |
| 28 | A | B | A | B |
| 29 | B | B | B | B |
| 30 | B | B | B | B |
| 31 | B | B | B | B |
| 32 | NT | NT | B | NT |
| 33 | B | B | B | B |
| 34 | B | B | B | B |
| 35 | NT | NT | C | NT |
| 36 | NT | NT | C | NT |
| 37 | C | NT | B | B |
| 38 | B | B | B | B |
| 39 | B | B | B | B |
| 40 | B | B | B | B |
| 41 | B | B | B | B |
| 42 | B | B | B | B |
| 43 | C | NT | C | B |
| 44 | NT | NT | C | NT |

TABLE 3-continued

Cellular activity of selected compounds of the invention

| Compound No. | Axl IC$_{50}$ (nM) | Mer IC$_{50}$ (nM) | c-Met IC$_{50}$ (nM) | KDR IC$_{50}$ (nM) |
|---|---|---|---|---|
| 45 | B | B | C | C |
| 46 | D | C | C | B |
| 47 | B | B | C | C |
| 48 | NT | NT | C | NT |
| 49 | C | NT | C | NT |
| 50 | C | C | C | NT |
| 51 | A | B | A | A |
| 52 | C | C | B | B |
| 53 | C | NT | C | C |
| 54 | B | B | B | B |
| 55 | C | C | C | B |
| 57 | A | B | B | B |
| 60 | A | B | B | B |
| 61 | A | A | B | B |
| 62 | A | A | B | A |
| 63 | D | NT | D | D |
| 64 | D | NT | C | C |
| 65 | D | NT | D | D |
| 66 | B | B | B | B |
| 67 | A | A | A | A |
| 68 | A | B | B | A |
| 69 | A | B | A | A |
| 72 | B | A | A | A |
| 73 | B | B | B | B |
| 74 | B | B | A | A |
| 75 | B | B | B | B |
| 76 | A | A | B | B |
| 77 | B | B | B | B |
| 78 | B | B | A | B |
| 79 | A | B | B | A |
| 80 | B | D | C | D |
| 81 | B | C | B | D |
| 82 | B | B | C | D |
| 82A | D | NT | D | D |
| 83 | C | C | B | C |
| 84 | B | B | B | B |
| 85 | B | B | B | B |
| 86 | B | B | B | A |
| 87 | A | B | B | A |
| 88 | D | NT | B | D |
| 89 | D | NT | B | D |
| 90 | B | B | B | B |
| 91 | C | C | B | C |
| 92 | B | B | B | C |
| 93 | C | C | B | D |
| 94 | A | B | B | A |
| 95 | B | B | B | A |
| 96 | C | B | B | B |
| 97 | B | A | B | B |
| 98 | B | C | B | B |
| 99 | B | B | B | A |
| 100 | NT | NT | C | NT |
| 101 | B | B | B | B |
| 102 | B | B | B | A |
| 104 | C | C | C | B |
| 105 | B | B | B | B |
| 106 | B | NT | B | A |
| 107 | B | B | C | B |
| 108 | B | C | C | B |
| 109 | A | B | B | A |
| 110 | B | B | B | C |
| 111 | B | B | C | B |
| 112 | B | B | B | D |
| 113 | B | B | B | A |
| 114 | B | B | B | A |
| 115 | A | B | B | A |
| 116 | B | B | B | A |
| 117 | A | B | B | A |
| 118 | A | B | B | B |
| 119 | A | B | B | A |
| 120 | B | B | B | NT |
| 121 | A | B | B | B |
| 122 | B | B | B | B |
| 123 | A | B | B | A |
| 124 | B | B | B | B |
| 126 | NT | NT | D | NT |

Example J: Pharmacokinetic Studies

Pharmacokinetic properties of select compounds were assessed in male Sprague-Dawley rats.

The non-GLP study was designed to investigate the pharmacokinetics of chosen compounds in plasma following an intravenous or oral dose administration to male Sprague Dawley rats.

Two groups of male Sprague-Dawley rats (three animals per group) received either an intravenous or oral (gavage) dose of compound at target dose levels of 3 mg/kg. Animals were observed for any clinically relevant abnormalities during dosing and at each sample collection period.

Animals in the PO group were fasted overnight prior to dose administration. Food was returned following the collection of the 4-hour blood sample. Water was not withheld.

Immediately prior to dosing, the body weight of each animal was recorded. Doses (rounded to the nearest 0.001 mL) were calculated based on the pretreatment body weight (kg) and a dose volume of 2.5 mL/kg for intravenous administration and 5 mL/kg for oral administration. Intravenous formulations were administered via a jugular vein cannula. Immediately after dosing, the cannula was flushed with saline and the line was tied off. The oral dose was administered via a ball-tipped feeding needle. Dosing syringe volumes for administration were second-person verified prior to dosing and that volume along with the results for the concentration verification analysis were used to calculate the actual dose administered. Dosing syringes were weighed immediately prior to and immediately after dosing each animal as a gravimetric check.

Serial blood samples (approximately 200 µL per sample) were collected from each animal at 0.083 (IV dosing only), 0.25, 0.5, 1, 2, 4, 6 (PO dosing only), 8, 24, 32, 48, and 72 hours after dosing. Blood samples were collected into tubes containing K$_2$EDTA via the non-dosing jugular-vein cannula (JVC), which was flushed with an approximately equal volume of saline following each collection.

Blood samples were stored on wet ice until processed to plasma by centrifugation (3500 rpm at 5° C. for 10 minutes) within 1 hour of collection. Plasma samples were transferred into matrix tubes and then stored in a −80° C. freezer.

Plasma samples and dose formulation samples were analyzed for the compounds of interest using liquid chromatography-tandem mass spectrometry (LC-MS/MS) methods. Pharmacokinetic parameter estimates were calculated from the individual animal plasma concentration-time data using the actual dose based on the analysis of the dosing formulations, nominal sampling times (all collections were within an acceptable range of target), and non-compartmental methods. The concentration-time data were analyzed to fit either an intravenous—bolus (IV) plasma analysis model (201) or extravascular (PO) dosing plasma analysis model (200) using the software WinNonlin Phoenix version 6.3 (Pharsight). The single-dose pharmacokinetic parameters assessed include, as appropriate: $C_{max}$ (observed peak or maximum concentration); $T_{max}$ (observed time of peak concentration); $T_{1/2}$ (terminal half-life); $V_z$ (volume of distribution based on the terminal phase); $V_{ss}$ (volume of distribution at steady state); $AUC_{INF}$ (area under the concentration-time curve computed from time zero to infinity); $AUC_{last}$ (area under the concentration-time curve computed from time zero to the time of the last quantifiable concentration); $C_0$ (back-extrapolated concentration at time zero); CL (total body clearance); Vz/F (volume of distribution for extravascular administration based on the terminal phase); CL/F (total body clearance for extravascular administration); F % (bioavailability); and $MRT_{last}$ (mean residence time).

Areas-under-the-plasma concentration-time curves (AUC) were estimated using the linear-log trapezoidal rule. The area through the time $(T_{last})$ of the last observable concentration $(C_{last})$ is reported as $AUC_{last}$. AUC extrapolated to infinity, $(AUC_{INF})$ was estimated by adding $AUC_{last}$ and the ratio of $C_{last}/\lambda_z$, where $\lambda_z$ is the terminal rate constant. Apparent terminal half-life $(T_{1/2})$ was calculated as $\ln(2)/\lambda_z$ and determined using the slope of the log-linear terminal phase of the concentration-time curve, defined by a minimum of three plasma concentration-time points. Half-lives are reported if the correlation for the regression line, as measured by r squared, is ≥0.9 when rounded. After IV administration, volume of distribution (Vz) was calculated as $Dose/\lambda_z*AUC_{INF-obs}$, clearance (CL) was calculated as $Dose/AUC_{INF-obs}$ and volume of distribution at steady state $(V_{ss})$ was estimated as $MRT_{INF}*CL$. Mean residence time (MRT) from the time of dosing to the time of the last measurable concentration was calculated as $AUMC_{last}/AUC_{last}$. For model 200 the bioavailability (i.e. fraction of total dose that reaches the systemic circulation) cannot be calculated. Consequently, volume and clearance for this model is Vz/F or CL/F, respectively; where F is defined as bioavailability (i.e. fraction of total dose that reaches the systemic circulation; (Average $AUC_{last-po}$/Average $AUC_{last-iv}$)*[$Dose_{IV}/Dose_{PO}$]*100).

OTHER EMBODIMENTS

The foregoing disclosure has been described in some detail by way of illustration and example, for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive.

The scope of the invention should, therefore, be determined not with reference to the above description, but should instead be determined with reference to the following appended claims, along with the full scope of equivalents to which such claims are entitled.

The invention claimed is:
1. A compound of Formula (Ia):

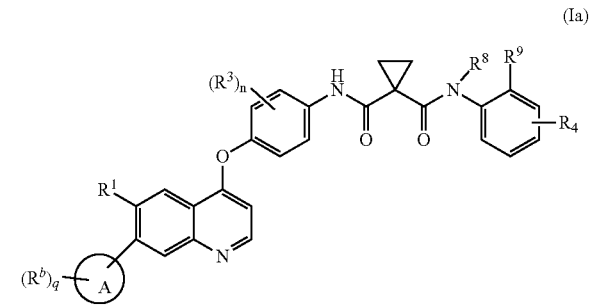

(Ia)

or a pharmaceutically acceptable salt thereof, wherein:
ring A is phenyl, pyrazolyl, imidazolyl, isoxazolyl, oxazolyl, triazolyl, oxadiazolyl, pyridyl, pyrimidinyl, pyrazinyl, pyridazinyl, furanyl, thiazolyl, tetrahydrofuranyl, pyrrolidinyl, dihydrofuranyl, pyrrolopyrazolyl, 5,6-dihydro-4H-pyrrolo[1,2-b]pyrazole-3-yl, or pyrazolopyridinyl;

$R^1$ is —H, $C_{1-6}$ alkyl, $C_{1-6}$ alkoxy, halo, or $C_{1-6}$ alkyl-NHC(O)—;

each $R^3$ is independently selected from the group consisting of —H, halo, —OH, —CN, optionally substituted $(C_1-C_6)$ alkyl, $(C_1-C_6)$ alkoxy, $(C_1-C_6)$ haloalkoxy, —NH$_2$, —NH $(C_1-C_6)$ alkyl, —N$(C_1-C_6$ alkyl$)_2$, and $(C_3-C_6)$ cycloalkyl, wherein the $(C_1-C_6)$ alkoxy, —NH $(C_1-C_6)$ alkyl, —N$(C_1-C_6$ alkyl$)_2$, and $(C_3-C_6)$ cycloalkyl of $R^3$ are each optionally substituted with 1, 2, or 3 independently selected $R^g$ substituents;

$R^4$ is $C_{1-6}$ alkyl or halo;
$R^8$ is —H or $C_{1-6}$ alkyl;
$R^9$ is —H;
or $R^8$ and $R^9$ together with the atoms to which they are attached form fused 5-10 membered heteroaryl or fused 5-10 membered heterocycloalkyl, each of which is optionally substituted with 1 or 2 independently selected $R^g$ substituents and wherein the 5-10 membered heteroaryl or 5-10 membered heterocycloalkyl has 0-2 additional heteroatoms as ring members selected from N and S;

each $R^b$ is independently $C_{1-6}$ alkyl, $C_{1-6}$ alkoxy, CN, halo, OH, oxo, NH$_2$, HO—$C_{1-6}$ alkyl-, $C_{1-6}$ haloalkyl, $C_{1-6}$ haloalkoxy, $C_{3-6}$ cycloalkyl, $C_{3-6}$ cycloalkyl-$C_{1-4}$alkyl-, 4-6 membered heterocycloalkyl, 4-6 membered heterocycloalkyl-$C_{1-4}$ alkyl-, $C_{1-6}$ alkyl-SO$_2$—, $C_{1-6}$ alkyl-C(O)—, —NH—$(C_1-C_6)$ alkyl, —N $((C_1-C_6)$ alkyl$)_2$, phenyl, 5-6 membered heteroaryl, or 5-6 membered heteroaryl-$C_{1-4}$ alkyl-, wherein the $C_{1-6}$ alkyl, $C_{3-6}$ cycloalkyl, $C_{3-6}$ cycloalkyl-$C_{1-4}$alkyl-, 4-6 membered heterocycloalkyl, 4-6 membered heterocycloalkyl-$C_{1-4}$alkyl-, phenyl, 5-6 membered heteroaryl, and 5-6 membered heteroaryl-$C_{1-4}$ alkyl- are each optionally substituted with 1 or 2 independently selected $R^g$ substituents;

each $R^g$ is independently selected from the group consisting of halo, —OH, —CN, —COOH, —COO—$(C_1-C_4)$ alkyl, $C_{1-6}$ alkyl-C(O)—, —NH$_2$, —NH—$(C_1-C_6)$ alkyl, —N $((C_1-C_6)$ alkyl$)_2$, —$(C_1-C_6)$ alkyl, $(C_1-C_6)$ alkoxy, $(C_1-C_6)$ alkylthio, $(C_1-C_6)$ haloalkyl, (C₁-C₆) haloalkoxy, phenyl, 5-6 membered heteroaryl, 4-6 membered heterocycloalkyl, and (C₃-C₆) cycloalkyl;

the ring nitrogen atom on the quinoline in Formula (Ia) is optionally oxidized;

the subscript n is an integer of 1, 2, 3, or 4;

the subscript m is an integer of 1, 2, or 3; and the subscript q is an integer of 0, 1, 2, or 3.

2. The compound of claim 1, having Formula (Ib) or (Ic):

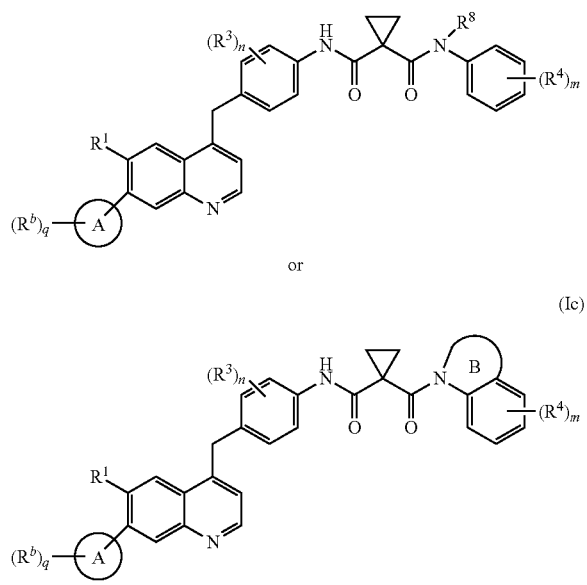

(Ib)

or (Ic)

or a pharmaceutically acceptable salt thereof, wherein, ring B is fused 5-6 membered heteroaryl or fused 5-7 membered heterocycloalkyl; and the subscript m is an integer of 1, 2, or 3.

3. The compound of claim 2, having Formula (Ia-1), (Ia-2), or (Ia-3):

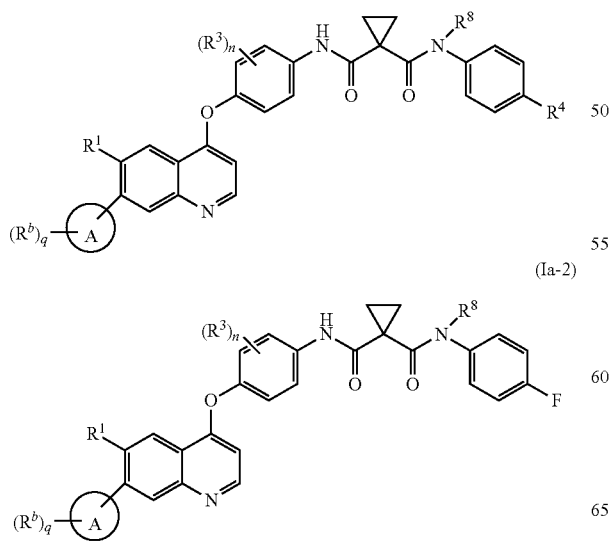

(Ia-1)

(Ia-2)

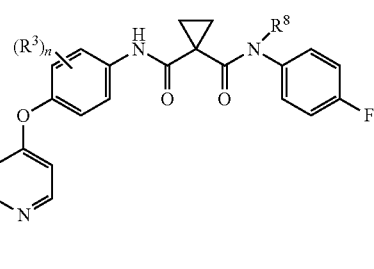

(Ia-3)

or a pharmaceutically acceptable salt thereof.

4. The compound of claim 1, or a pharmaceutically acceptable salt thereof, wherein R³ is —H or halo.

5. The compound of claim 1, or a pharmaceutically acceptable salt thereof, wherein Ring A is 1-pyrazolyl, 3-pyrazolyl, 4-pyrazolyl, 5-pyrazolyl, 1-imidazolyl, 2-imidazolyl, 4-imidazolyl, 5-imidazolyl, 4-isoxazolyl, 2-oxazolyl, 3-triazolyl, 5-triazolyl, 2-oxadiazolyl, 2-pyridyl, 3-pyridyl, 4-pyridyl, 4-pyrimidinyl, 5-pyrimidinyl, 4-pyridazinyl, 5-thiazolyl, 5,6-dihydro-4H-pyrrolo[1,2-b]pyrazole-3-yl, or 1H-pyrazolo[3,4-b]pyridine-5-yl.

6. The compound of claim 1, or a pharmaceutically acceptable salt thereof, wherein each R^b is independently selected from the group consisting of methyl, ethyl, isopropyl, tert-butyl, hydroxyethyl, fluoromethyl, difluoromethyl, trifluoromethyl, trifluoroethyl, difluoroethyl, fluoroethyl, piperidyl, N-morpholinoethyl, methylsulfonyl, N-methylpiperidyl, cyclopropyl, N-acetylpiperidyl, oxetanyl, methoxyethyl, amino, acetyl, methoxy, isopropoxy, fluoro, cyano, pyrrolidinyl, hydroxyl, and oxo.

7. The compound of claim 1, or a pharmaceutically acceptable salt thereof, wherein

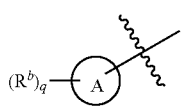

is selected from the group consisting of

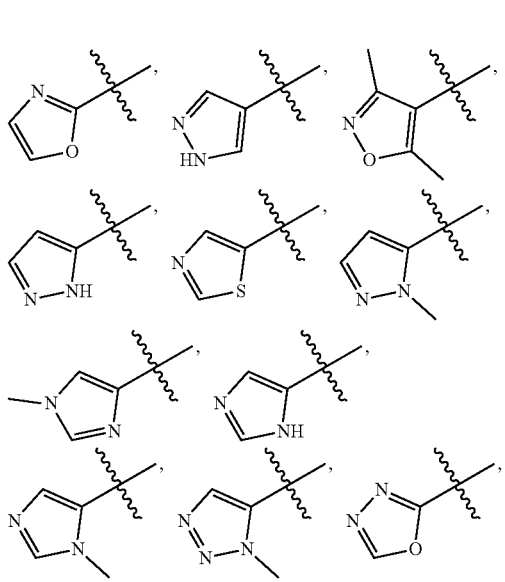

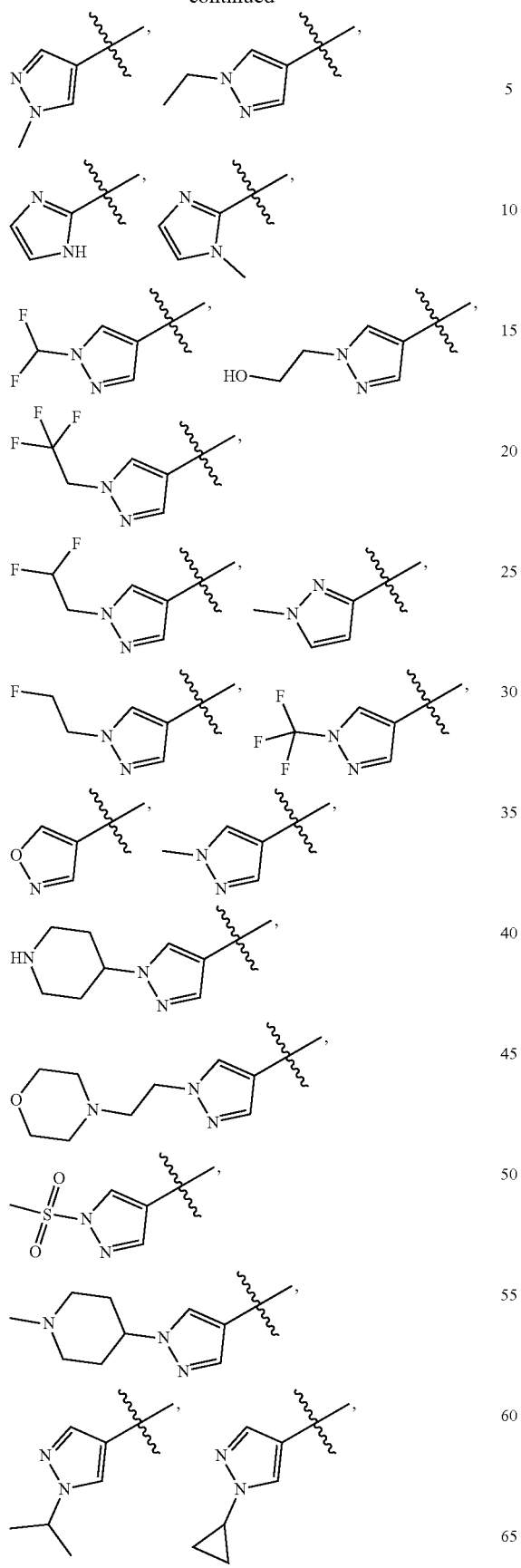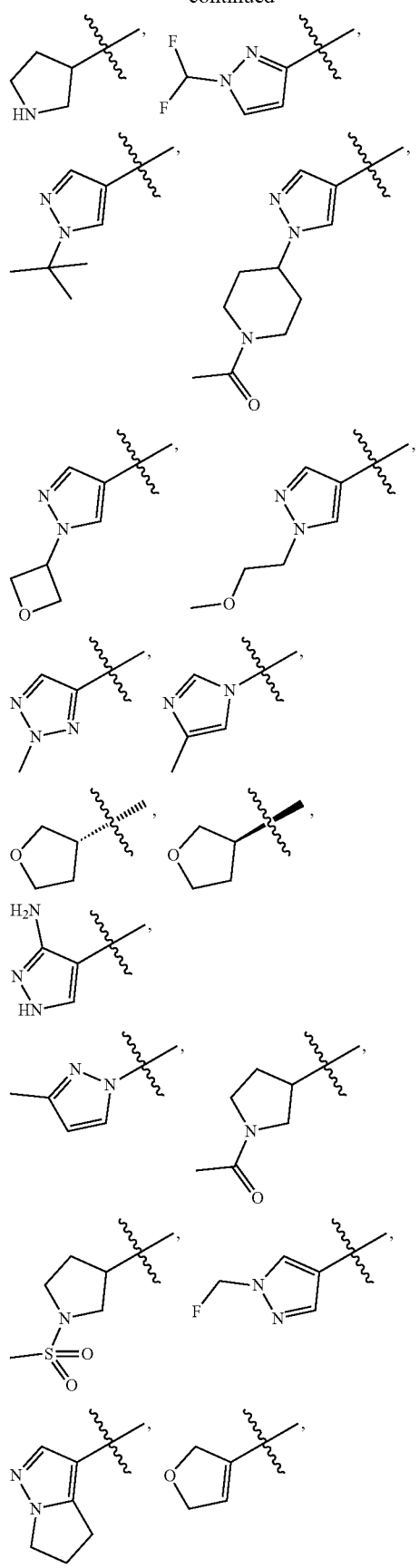

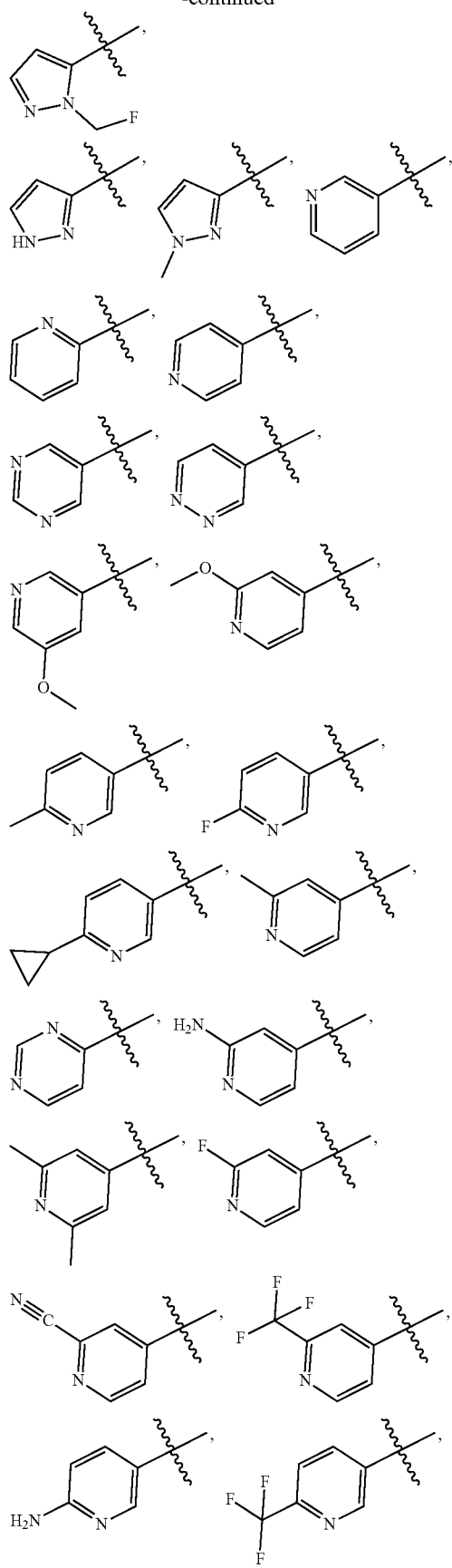
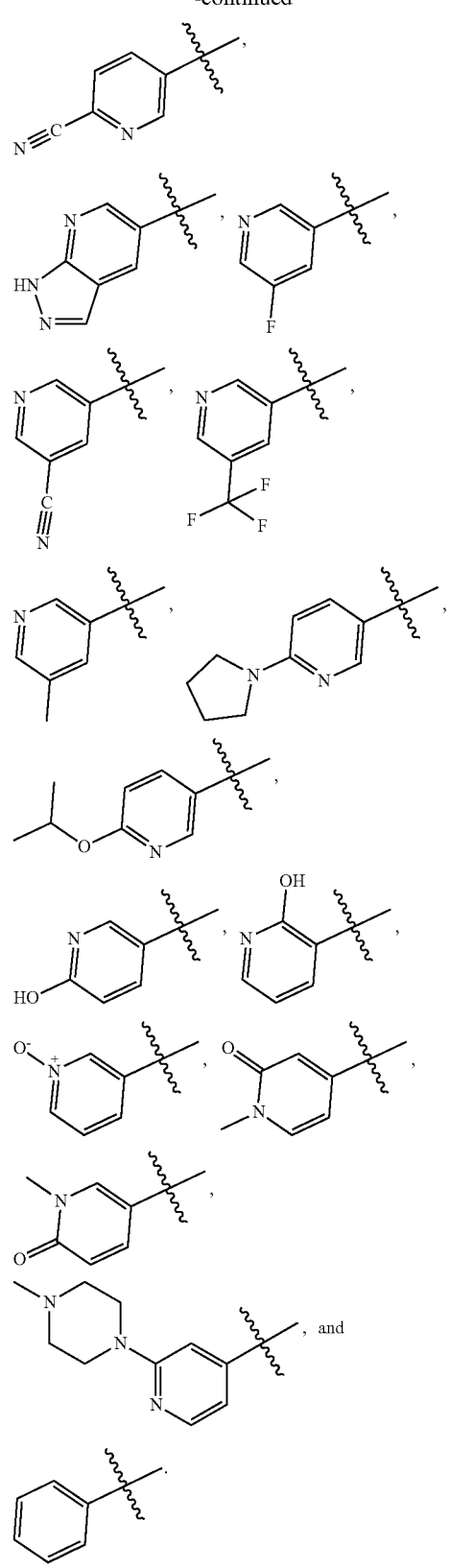
8. The compound of claim 1, or a pharmaceutically acceptable salt thereof, wherein the compound is a compound of Formula IIa or Formula IIb:

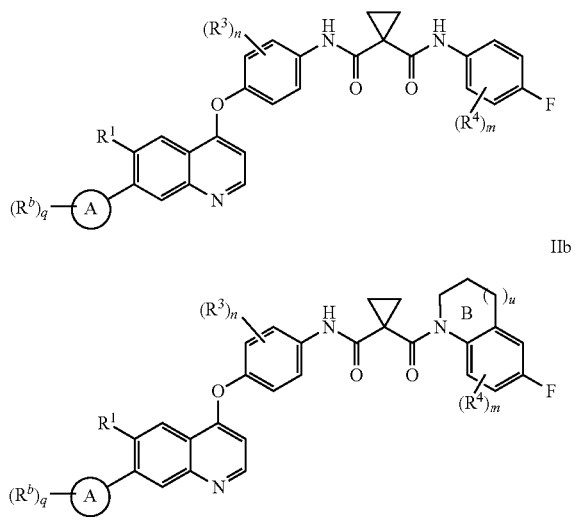

or a pharmaceutically acceptable salt thereof, wherein the subscript u is 0 or 1;
the subscript m is 1 or 2; and
Ring B is optionally substituted with 1 or 2 substituents independently selected from halo, oxo, and ($C_1$-$C_6$) alkyl.

9. A compound selected from:

1-N'-(4-fluorophenyl)-1-N-[4-[7-[1-(2-methoxyethyl)pyrazol-4-yl]quinolin-4-yl]oxyphenyl]cyclopropane-1,1-dicarboxamide;

1-N'-(4-fluorophenyl)-1-N-[4-[7-(1-methylpyrazol-4-yl)quinolin-4-yl]oxyphenyl]cyclopropane-1,1-dicarboxamide;

1-N'-(4-fluorophenyl)-1-N-[4-[7-[1-(trifluoromethyl)pyrazol-4-yl]quinolin-4-yl]oxyphenyl]cyclopropane-1,1-dicarboxamide;

1-N-[4-[7-[1-(difluoromethyl)pyrazol-4-yl]quinolin-4-yl]oxyphenyl]-1-N'-(4-fluorophenyl)cyclopropane-1,1-dicarboxamide;

1-N-[4-[7-[1-(2-fluoroethyl)pyrazol-4-yl]quinolin-4-yl]oxyphenyl]-1-N'-(4-fluorophenyl)cyclopropane-1,1-dicarboxamide;

1-N-[4-[7-[1-(2,2-difluoroethyl)pyrazol-4-yl]quinolin-4-yl]oxyphenyl]-1-N'-(4-fluorophenyl)cyclopropane-1,1-dicarboxamide;

1-N'-(4-fluorophenyl)-1-N-[4-[7-[1-(2,2,2-trifluoroethyl)pyrazol-4-yl]quinolin-4-yl]oxyphenyl]cyclopropane-1,1-dicarboxamide;

1-N'-(4-fluorophenyl)-1-N-[4-[7-(1-methylpyrazol-3-yl)quinolin-4-yl]oxyphenyl]cyclopropane-1,1-dicarboxamide;

1-N'-(4-fluorophenyl)-1-N-[4-[7-[1-(2-hydroxyethyl)pyrazol-4-yl]quinolin-4-yl]oxyphenyl]cyclopropane-1,1-dicarboxamide;

1-N'-(4-fluorophenyl)-1-N-[4-[7-[1-(2-morpholin-4-yl-ethyl)pyrazol-4-yl]quinolin-4-yl]oxyphenyl]cyclopropane-1,1-dicarboxamide;

1-N-[4-[7-(1-ethylpyrazol-4-yl)quinolin-4-yl]oxyphenyl]-1-N'-(4-fluorophenyl)cyclopropane-1,1-dicarboxamide;

1-N'-(4-fluorophenyl)-1-N-[4-[7-(1-propan-2-ylpyrazol-4-yl)quinolin-4-yl]oxyphenyl]cyclopropane-1,1-dicarboxamide;

1-N-[4-[7-(1-cyclopropylpyrazol-4-yl)quinolin-4-yl]oxyphenyl]-1-N'-(4-fluorophenyl)cyclopropane-1,1-dicarboxamide;

1-N-[4-[7-(1-tert-butylpyrazol-4-yl)quinolin-4-yl]oxyphenyl]-1-N'-(4-fluorophenyl)cyclopropane-1,1-dicarboxamide;

1-N'-(4-fluorophenyl)-1-N-[4-[7-[1-(oxetan-3-yl)pyrazol-4-yl]quinolin-4-yl]oxyphenyl]cyclopropane-1,1-dicarboxamide;

1-N'-(4-fluorophenyl)-1-N-[4-(7-pyridin-3-ylquinolin-4-yl)oxyphenyl]cyclopropane-1,1-dicarboxamide;

1-N'-(4-fluorophenyl)-1-N-[4-(7-pyridin-4-ylquinolin-4-yl)oxyphenyl]cyclopropane-1,1-dicarboxamide;

1-N'-(4-fluorophenyl)-1-N-[4-(7-pyrimidin-5-ylquinolin-4-yl)oxyphenyl]cyclopropane-1,1-dicarboxamide;

1-N'-(4-fluorophenyl)-1-N-[4-(7-pyridazin-4-ylquinolin-4-yl)oxyphenyl]cyclopropane-1,1-dicarboxamide 1-N-[4-[7-(5,6-dihydro-4H-pyrrolo[1,2-b]pyrazol-3-yl)quinolin-4-yl]oxyphenyl]-1-N'-(4-fluorophenyl)cyclopropane-1,1-dicarboxamide;

1-N'-(4-fluorophenyl)-1-N-[4-[7-(2-methylpyridin-4-yl)quinolin-4-yl]oxyphenyl]cyclopropane-1,1-dicarboxamide;

1-N'-(4-fluorophenyl)-1-N-[4-[7-(2-methoxypyridin-4-yl)quinolin-4-yl]oxyphenyl]cyclopropane-1, 1-dicarboxamide;

1-N-[4-[7-(2,6-dimethylpyridin-4-yl)quinolin-4-yl]oxyphenyl]-1-N'-(4-fluorophenyl)cyclopropane-1,1-dicarboxamide;

1-N'-(4-fluorophenyl)-1-N-[4-[7-(2-fluoropyridin-4-yl)quinolin-4-yl]oxyphenyl]cyclopropane-1,1-dicarboxamide;

1-N-[4-[7-(2-cyanopyridin-4-yl)quinolin-4-yl]oxyphenyl]-1-N'-(4-fluorophenyl)cyclopropane-1,1-dicarboxamide;

1-N'-(4-fluorophenyl)-1-N-[4-[7-[6-(trifluoromethyl)pyridin-3-yl]quinolin-4-yl]oxyphenyl]cyclopropane-1,1-dicarboxamide;

1-N'-(4-fluorophenyl)-1-N-[4-[7-[2-(trifluoromethyl)pyridin-4-yl]quinolin-4-yl]oxyphenyl]cyclopropane-1,1-dicarboxamide;

1-N'-(4-fluorophenyl)-1-N-[4-[7-(6-methylpyridin-3-yl)quinolin-4-yl]oxyphenyl]cyclopropane-1,1-dicarboxamide;

1-N-[4-[7-(6-aminopyridin-3-yl)quinolin-4-yl]oxyphenyl]-1-N'-(4-fluorophenyl)cyclopropane-1,1-dicarboxamide;

1-N'-(4-fluorophenyl)-1-N-[4-[7-(1H-pyrazolo[3,4-b]pyridin-5-yl)quinolin-4-yl]oxyphenyl]cyclopropane-1,1-dicarboxamide;

1-N-[4-[7-(5-cyanopyridin-3-yl)quinolin-4-yl]oxyphenyl]-1-N'-(4-fluorophenyl)cyclopropane-1,1-dicarboxamide;

1-N'-(4-fluorophenyl)-1-N-[4-[7-(6-fluoropyridin-3-yl)quinolin-4-yl]oxyphenyl]cyclopropane-1,1-dicarboxamide;

1-N-[4-[7-(6-cyanopyridin-3-yl)quinolin-4-yl]oxyphenyl]-1-N'-(4-fluorophenyl)cyclopropane-1,1-dicarboxamide;

1-N-[4-[7-(6-cyclopropylpyridin-3-yl)quinolin-4-yl]oxyphenyl]-1-N'-(4-fluorophenyl)cyclopropane-1,1-dicarboxamide;

1-N'-(4-fluorophenyl)-1-N-[4-[7-(1H-pyrrolo[2,3-b]pyridin-5-yl)quinolin-4-yl]oxyphenyl]cyclopropane-1,1-dicarboxamide;

1-N'-(4-fluorophenyl)-1-N-[4-[7-(5-fluoropyridin-3-yl)quinolin-4-yl]oxyphenyl]cyclopropane-1,1-dicarboxamide;
1-N'-(4-fluorophenyl)-1-N-[4-[7-(5-methylpyridin-3-yl)quinolin-4-yl]oxyphenyl]cyclopropane-1,1-dicarboxamide;
1-N'-(4-fluorophenyl)-1-N-[4-[7-(5-methoxypyridin-3-yl)quinolin-4-yl]oxyphenyl]cyclopropane-1,1-dicarboxamide;
1-N'-(4-fluorophenyl)-1-N-[4-[7-[5-(trifluoromethyl)pyridin-3-yl]quinolin-4-yl]oxyphenyl]cyclopropane-1,1-dicarboxamide;
1-N'-(4-fluorophenyl)-1-N-[4-[7-(6-pyrrolidin-1-ylpyridin-3-yl)quinolin-4-yl]oxyphenyl]cyclopropane-1,1-dicarboxamide;
1-N'-(4-fluorophenyl)-1-N-[4-[7-(6-propan-2-yloxypyridin-3-yl)quinolin-4-yl]oxyphenyl]cyclopropane-1,1-dicarboxamide;
1-N'-(4-fluorophenyl)-1-N-[4-[7-(6-hydroxypyridin-3-yl)quinolin-4-yl]oxyphenyl]cyclopropane-1,1-dicarboxamide;
1-N'-(4-fluorophenyl)-1-N-[4-[7-(2-hydroxypyridin-3-yl)quinolin-4-yl]oxyphenyl]cyclopropane-1,1-dicarboxamide;
1-N-[4-[7-(3,5-dimethyl-1,2-oxazol-4-yl)quinolin-4-yl]oxyphenyl]-1-N'-(4-fluorophenyl)cyclopropane-1,1-dicarboxamide;
1-N'-(4-fluorophenyl)-1-N-[4-[7-(2-methylpyrazol-3-yl)quinolin-4-yl]oxyphenyl]cyclopropane-1,1-dicarboxamide;
1-N'-(4-fluorophenyl)-1-N-[4-(7-phenylquinolin-4-yl)oxyphenyl]cyclopropane-1,1-dicarboxamide;
1-N'-(4-fluorophenyl)-1-N-[4-[7-(1,2-oxazol-4-yl)quinolin-4-yl]oxyphenyl]cyclopropane-1,1-dicarboxamide;
1-N'-(4-fluorophenyl)-1-N-[4-[7-(1-piperidin-4-ylpyrazol-4-yl)quinolin-4-yl]oxyphenyl]cyclopropane-1,1-dicarboxamide;
1-N'-(4-fluorophenyl)-1-N-[4-[7-[1-(1-methylpiperidin-4-yl)pyrazol-4-yl]quinolin-4-yl]oxyphenyl]cyclopropane-1,1-dicarboxamide;
1-N-[4-[7-[1-(1-acetylpiperidin-4-yl)pyrazol-4-yl]quinolin-4-yl]oxyphenyl]-1-N'-(4-fluorophenyl)cyclopropane-1,1-dicarboxamide;
1-N'-(4-fluorophenyl)-1-N-[4-[7-(2-trimethylsilylethynyl)quinolin-4-yl]oxyphenyl]cyclopropane-1,1-dicarboxamide;
1-N-[4-(7-ethynylquinolin-4-yl)oxyphenyl]-1-N'-(4-fluorophenyl)cyclopropane-1,1-dicarboxamide;
1-N'-(4-fluorophenyl)-1-N-[4-[7-(1H-triazol-5-yl)quinolin-4-yl]oxyphenyl]cyclopropane-1,1-dicarboxamide;
1-N'-(4-fluorophenyl)-1-N-[4-[7-(1,3-oxazol-2-yl)quinolin-4-yl]oxyphenyl]cyclopropane-1,1-dicarboxamide;
1-N'-(4-fluorophenyl)-1-N-[4-[7-(1H-pyrazol-4-yl)quinolin-4-yl]oxyphenyl]cyclopropane-1,1-dicarboxamide;
1-N'-(4-fluorophenyl)-1-N-[4-[7-(1H-pyrazol-5-yl)quinolin-4-yl]oxyphenyl]cyclopropane-1,1-dicarboxamide;
1-N'-(4-fluorophenyl)-1-N-[4-[7-(1-methylimidazol-4-yl)quinolin-4-yl]oxyphenyl]cyclopropane-1,1-dicarboxamide;
1-N'-(4-fluorophenyl)-1-N-[4-[7-(1H-imidazol-5-yl)quinolin-4-yl]oxyphenyl]cyclopropane-1,1-dicarboxamide;
1-N'-(4-fluorophenyl)-1-N-[4-[7-(1,3,4-oxadiazol-2-yl)quinolin-4-yl]oxyphenyl]cyclopropane-1,1-dicarboxamide;
1-N'-(4-fluorophenyl)-1-N-[4-[7-(1H-imidazol-2-yl)quinolin-4-yl]oxyphenyl]cyclopropane-1,1-dicarboxamide;
1-N'-(4-fluorophenyl)-1-N-[4-[7-(1-methylimidazol-2-yl)quinolin-4-yl]oxyphenyl]cyclopropane-1,1-dicarboxamide;
1-N'-(4-fluorophenyl)-1-N-[4-[6-methoxy-7-(1-methylpyrazol-4-yl)quinolin-4-yl]oxyphenyl]cyclopropane-1,1-dicarboxamide;
1-N'-(4-fluorophenyl)-1-N-[4-[6-(methylcarbamoyl)-7-(1-methylpyrazol-4-yl)quinolin-4-yl]oxyphenyl]cyclopropane-1,1-dicarboxamide;
1-N'-(4-fluorophenyl)-1-N-[4-[6-methyl-7-(1-methylpyrazol-4-yl)quinolin-4-yl]oxyphenyl]cyclopropane-1,1-dicarboxamide;
1-N'-(4-fluorophenyl)-1-N-[4-[7-(1-methylsulfonylpyrazol-4-yl)quinolin-4-yl]oxyphenyl]cyclopropane-1,1-dicarboxamide;
1-(5-fluoro-2-methyl-2,3-dihydroindole-1-carbonyl)-N-[4-[7-(1-methylpyrazol-4-yl)quinolin-4-yl]oxyphenyl]cyclopropane-1-carboxamide;
1-(5-fluoro-2,3-dihydroindole-1-carbonyl)-N-[4-[7-(1-methylpyrazol-4-yl)quinolin-4-yl]oxyphenyl]cyclopropane-1-carboxamide;
1-N'-(4-fluoro-2,6-dimethylphenyl)-1-N-[4-[7-(1-methylpyrazol-4-yl)quinolin-4-yl]oxyphenyl]cyclopropane-1,1-dicarboxamide;
1-N'-(4-fluorophenyl)-1-N'-methyl-1-N-[4-[7-(1-methylpyrazol-4-yl)quinolin-4-yl]oxyphenyl]cyclopropane-1,1-dicarboxamide;
1-N'-(4-fluorophenyl)-1-N-[4-(7-pyrrolidin-3-ylquinolin-4-yl)oxyphenyl]cyclopropane-1,1-dicarboxamide;
1-N-[4-[7-[1-(difluoromethyl)pyrazol-3-yl]quinolin-4-yl]oxyphenyl]-1-N'-(4-fluorophenyl)cyclopropane-1,1-dicarboxamide;
1-N'-(4-fluorophenyl)-1-N-[4-(7-pyridin-2-ylquinolin-4-yl)oxyphenyl]cyclopropane-1,1-dicarboxamide;
1-N'-(4-fluorophenyl)-1-N-[4-[7-(2-methyltriazol-4-yl)quinolin-4-yl]oxyphenyl]cyclopropane-1,1-dicarboxamide;
1-N'-(4-fluorophenyl)-1-N-[4-[7-(4-methylimidazol-1-yl)quinolin-4-yl]oxyphenyl]cyclopropane-1,1-dicarboxamide;
1-N'-(4-fluorophenyl)-1-N-[4-[7-[rac-(3R)-oxolan-3-yl]quinolin-4-yl]oxyphenyl]cyclopropane-1,1-dicarboxamide;
1-N'-(4-fluorophenyl)-1-N-[4-[7-[(3R)-oxolan-3-yl]quinolin-4-yl]oxyphenyl]cyclopropane-1,1-dicarboxamide;
1-N-[4-[7-(3-amino-1H-pyrazol-4-yl)quinolin-4-yl]oxyphenyl]-1-N'-(4-fluorophenyl)cyclopropane-1,1-dicarboxamide;
1-N'-(4-fluorophenyl)-1-N-[4-[7-(3-methylpyrazol-1-yl)quinolin-4-yl]oxyphenyl]cyclopropane-1,1-dicarboxamide;
1-N-[4-[7-(1-acetylpyrrolidin-3-yl)quinolin-4-yl]oxyphenyl]-1-N'-(4-fluorophenyl)cyclopropane-1,1-dicarboxamide;
1-N'-(4-fluorophenyl)-1-N-[4-[7-(1-methylsulfonylpyrrolidin-3-yl)quinolin-4-yl]oxyphenyl]cyclopropane-1,1-dicarboxamide;
1-N-[4-[7-[1-(fluoromethyl)pyrazol-4-yl]quinolin-4-yl]oxyphenyl]-1-N'-(4-fluorophenyl)cyclopropane-1,1-dicarboxamide;
1-N-[4-[7-(2,5-dihydrofuran-3-yl)quinolin-4-yl]oxyphenyl]-1-N'-(4-fluorophenyl)cyclopropane-1,1-dicarboxamide;

1-N'-(4-fluorophenyl)-1-N-[4-[7-(4-methylpyrazol-1-yl)quinolin-4-yl]oxyphenyl]cyclopropane-1,1-dicarboxamide;

1-N-[4-[7-(2-aminopyridin-4-yl)quinolin-4-yl]oxyphenyl]-1-N'-(4-fluorophenyl)cyclopropane-1,1-dicarboxamide;

1-N-[4-[7-(1-cyclopropylpyrazol-3-yl)quinolin-4-yl]oxyphenyl]-1-N'-(4-fluorophenyl)cyclopropane-1,1-dicarboxamide;

1-N'-(4-fluorophenyl)-1-N-[4-[7-(5-methyl-1H-pyrazol-3-yl)quinolin-4-yl]oxyphenyl]cyclopropane-1,1-dicarboxamide;

1-N'-(4-fluorophenyl)-1-N-[4-[7-[5-(trifluoromethyl)-1H-pyrazol-3-yl]quinolin-4-yl]oxyphenyl]cyclopropane-1,1-dicarboxamide;

1-N-[4-[7-(1,5-dimethylpyrazol-3-yl)quinolin-4-yl]oxyphenyl]-1-N'-(4-fluorophenyl)cyclopropane-1,1-dicarboxamide;

1-N-[4-[7-[1-(fluoromethyl)pyrazol-3-yl]quinolin-4-yl]oxyphenyl]-1-N'-(4-fluorophenyl)cyclopropane-1,1-dicarboxamide;

1-N-[4-[7-[2-(fluoromethyl)pyrazol-3-yl]quinolin-4-yl]oxyphenyl]-1-N'-(4-fluorophenyl)cyclopropane-1,1-dicarboxamide;

1-N'-(4-fluorophenyl)-1-N-[4-(7-pyrazolo[1,5-a]pyridin-2-ylquinolin-4-yl)oxyphenyl]cyclopropane-1,1-dicarboxamide;

1-N'-[2,5-difluoro-4-[6-methyl-7-(1-methylpyrazol-4-yl)quinolin-4-yl]oxyphenyl]-1-N-(4-fluorophenyl)cyclopropane-1,1-dicarboxamide;

1-N'-(4-fluorophenyl)-1-N-[4-[6-methyl-7-(1H-pyrazol-4-yl)quinolin-4-yl]oxyphenyl]cyclopropane-1,1-dicarboxamide;

1-N'-(4-fluorophenyl)-1-N-[4-[6-methyl-7-(1H-pyrazol-3-yl)quinolin-4-yl]oxyphenyl]cyclopropane-1,1-dicarboxamide;

1-N'-(4-fluorophenyl)-1-N-[4-[6-methyl-7-(1-methylpyrazol-3-yl)quinolin-4-yl]oxyphenyl]cyclopropane-1,1-dicarboxamide;

1-N'-(4-fluorophenyl)-1-N-[4-[7-(1-oxidopyridin-1-ium-3-yl)quinolin-4-yl]oxyphenyl]cyclopropane-1,1-dicarboxamide;

1-N-(4-fluorophenyl)-1-N'-[2,3,5-trifluoro-4-[6-methyl-7-(1-methylpyrazol-4-yl)quinolin-4-yl]oxyphenyl]cyclopropane-1,1-di carboxamide;

1-N'-(4-fluorophenyl)-1-N-[4-[7-[2-(4-methylpiperazin-1-yl) pyridin-4-yl]quinolin-4-yl]oxyphenyl]cyclopropane-1,1-dicarboxamide;

1-N'-[2-chloro-5-fluoro-4-[6-methyl-7-(1-methylpyrazol-4-yl)quinolin-4-yl]oxyphenyl]-1-N-(4-fluorophenyl)cyclopropane-1,1-dicarboxamide;

1-N-(4-fluorophenyl)-1-N'-[3-fluoro-4-(7-pyridin-3-ylquinolin-4-yl)oxyphenyl]cyclopropane-1,1-dicarboxamide;

1-N'-(4-fluorophenyl)-1-N-[4-(7-pyrimidin-4-ylquinolin-4-yl)oxyphenyl]cyclopropane-1,1-dicarboxamide;

1-N'-[2,5-difluoro-4-(7-pyridin-3-ylquinolin-4-yl)oxyphenyl]-1-N-(4-fluorophenyl)cyclopropane-1,1-dicarboxamide;

1-N'-(4-fluorophenyl)-1-N-[4-[7-(1,3-thiazol-5-yl)quinolin-4-yl]oxyphenyl]cyclopropane-1,1-dicarboxamide;

1-N'-(4-fluorophenyl)-1-N-[4-[7-(1-methyl-2-oxopyridin-4-yl)quinolin-4-yl]oxyphenyl]cyclopropane-1,1-dicarboxamide;

1-N'-[4-[7-[1-(difluoromethyl)pyrazol-4-yl]quinolin-4-yl]oxy-2,5-difluorophenyl]-1-N-(4-fluorophenyl)cyclopropane-1,1-dicarboxamide;

1-N'-(4-fluorophenyl)-1-N-[4-[7-(1-methyl-6-oxopyridin-3-yl)quinolin-4-yl]oxyphenyl]cyclopropane-1,1-dicarboxamide;

1-N'-(4-fluorophenyl)-1-N-[4-[7-(1H-imidazol-2-yl)-6-methylquinolin-4-yl]oxyphenyl]cyclopropane-1,1-dicarboxamide;

1-N'-[2,5-difluoro-4-[7-(1H-imidazol-2-yl)-6-methylquinolin-4-yl]oxyphenyl]-1-N-(4-fluorophenyl)cyclopropane-1,1-dicarboxamide;

1-N'-[3-fluoro-4-[7-(1H-imidazol-2-yl)-6-methylquinolin-4-yl]oxyphenyl]-1-N-(4-fluorophenyl)cyclopropane-1,1-dicarboxamide;

1-N'-[4-[7-[1-(difluoromethyl)pyrazol-4-yl]quinolin-4-yl]oxy-3-fluorophenyl]-1-N-(4-fluorophenyl)cyclopropane-1,1-dicarboxamide;

1-N-[4-[7-(5,6-dihydro-4H-pyrrolo[1,2-b]pyrazol-2-yl)quinolin-4-yl]oxyphenyl]-1-N'-(4-fluorophenyl)cyclopropane-1,1-dicarboxamide; and 1-N-[4-[7-[1-(difluoromethyl)pyrazol-4-yl]quinolin-4-yl]oxyphenyl]-1-N'-(4-fluorophenyl)-1-N'-methylcyclopropane-1,1-dicarboxamide, or a pharmaceutically acceptable salt thereof.

10. A pharmaceutical composition comprising a compound of claim 1, or a pharmaceutically acceptable salt thereof and a pharmaceutically acceptable carrier or excipient.

* * * * *